(12) United States Patent
Ikai et al.

(10) Patent No.: US 8,995,776 B2
(45) Date of Patent: Mar. 31, 2015

(54) IMAGE FILTER DEVICE, DECODING APPARATUS, ENCODING APPARATUS, AND DATA STRUCTURE

(75) Inventors: Tomohiro Ikai, Osaka (JP); Tomoyuki Yamamoto, Osaka (JP); Takanori Yamazaki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 153 days.

(21) Appl. No.: 13/704,169

(22) PCT Filed: Jun. 2, 2011

(86) PCT No.: PCT/JP2011/062656
§ 371 (c)(1),
(2), (4) Date: Feb. 1, 2013

(87) PCT Pub. No.: WO2011/158657
PCT Pub. Date: Dec. 22, 2011

(65) Prior Publication Data
US 2013/0136371 A1   May 30, 2013

(30) Foreign Application Priority Data

Jun. 17, 2010 (JP) .................................. 2010-138675
Dec. 28, 2010 (JP) .................................. 2010-294114

(51) Int. Cl.
*G06K 9/40* (2006.01)
*G06T 5/00* (2006.01)
(Continued)

(52) U.S. Cl.
CPC ................ *G06T 5/001* (2013.01); *G06T 9/004* (2013.01); *H04N 19/176* (2014.11); *H04N 19/70* (2014.11);
(Continued)

(58) Field of Classification Search
CPC ... H04N 1/00; H04N 19/00; H04N 19/00066; H04N 19/00763; H04N 19/00278; H04N 19/0026; H04N 19/00157; H04N 19/00884; H04N 19/00896; G06T 5/00; G06T 5/001; G06T 9/004; G06T 9/00; G06T 1/00; G06T 9/00281

USPC ......... 382/118, 224, 260, 261, 294, 232, 254; 375/240.01, 240.25, E7.027, 240.12, 375/240.16; 358/448, 453

See application file for complete search history.

(56) References Cited

U.S. PATENT DOCUMENTS 7,783,083 B2 * 8/2010 Sung et al. .................... 382/118
8,488,889 B2 * 7/2013 Moriya et al. ................ 382/232
(Continued)

FOREIGN PATENT DOCUMENTS

JP          5-316361 A    11/1993
WO    WO 2010/026770 A1  3/2010

OTHER PUBLICATIONS

"Advanced video coding for generic audiovisual services," ITU-T Telecommunication Standardization Sector of ITU, Series H: Audiovisual and Multimedia Systems, Infrastructure of audiovisual services—Coding of moving video, Recommendation ITU-T H.264, Mar. 2009.

(Continued)

*Primary Examiner* — Sheela Chawan
(74) *Attorney, Agent, or Firm* — Birch, Stewart, Kolasch & Birch, LLP

(57) ABSTRACT

An adaptive filter includes: an edge direction detection section which discriminates directionality of an input image in each of a plurality of unit regions constituting the input image; a region classification section which classifies the each of the plurality of unit regions into one of a plurality of unit region groups in accordance with to which of a plurality of predetermined groups the directionality of the input image in the each of the plurality of unit regions belongs, the directionality having been discriminated by the edge direction detection section; and a filter process section which calculates a pixel value of the each pixel of an output image by use of a filter coefficient group optimized for a unit region group to which a unit region including the each pixel belongs.

14 Claims, 43 Drawing Sheets

(51) Int. Cl.
G06T 9/00 (2006.01)
H04N 19/176 (2014.01)
H04N 19/70 (2014.01)
H04N 19/593 (2014.01)
H04N 19/117 (2014.01)
H04N 19/14 (2014.01)
H04N 19/17 (2014.01)
H04N 19/82 (2014.01)

(52) U.S. Cl.
CPC ........... H04N 19/593 (2014.11); H04N 19/117 (2014.11); H04N 19/14 (2014.11); H04N 19/17 (2014.11); H04N 19/82 (2014.11)
USPC .......................................... 382/224; 382/260

(56) References Cited

U.S. PATENT DOCUMENTS

2010/0254463 A1* 10/2010 Narroschke et al. ..... 375/240.29
2010/0322517 A1* 12/2010 Kobayashi .................... 382/173

OTHER PUBLICATIONS

Chien, W. et al., "Adaptive Filter Based on Combination of Sum-Modified Laplacian Filter Indexing and Quadtree Partitioning," ITU-Telecommunications Standardization Sector, Study Group 16 Question 6, Video Coding Experts Group (VCEG), Document VCEG-AL27, 38th Meeting: London, UK/ Geneva, CH, Jul. 1-8, 2009.

International Search Report issued in PCT/JP2011/062656 mailed Sep. 6, 2011.

Karczewicz, M. et al. "Video coding technology proposal by Qualcomm Inc.," Joint Collaborative Team on Video Coding (JCT-VC) of ITU-T SG16 WP3 and ISO/IEC JTC1/SC29/WG11, Document: JCTVC-A121, 1st Meeting, Dresden, DE, Apr. 15-23, 2010.

* cited by examiner (a)

| Prediction Mode | Prediction Mode Number | Prediction Index PI | | | |
|---|---|---|---|---|---|
| | | 16x16 | 8x8 | 4x4 | 8x1, 1x8 |
| DC Prediction | 0 | 0 | 0 | 0 | 0 |
| Planar Prediction | 1 | 1 | | | |
| Directional Prediction 0 | 2 | 2 | 1 | 1 | 1 |
| Directional Prediction 1 | 3 | | 2 | 2 | |
| Directional Prediction 2 | 4 | | 3 | 3 | 2 |
| Directional Prediction 3 | 5 | | 4 | 4 | |
| Directional Prediction 4 | 6 | 3 | 5 | 5 | 3 |
| Directional Prediction 5 | 7 | | 6 | 6 | 4 |
| Directional Prediction 6 | 8 | | 7 | 7 | |
| Directional Prediction 7 | 9 | | 8 | 8 | |
| TM Prediction | 10 | | | 9 | |
| Scale Prediction | 11 | 4 | | | |

(b)

FIG. 10
(a)
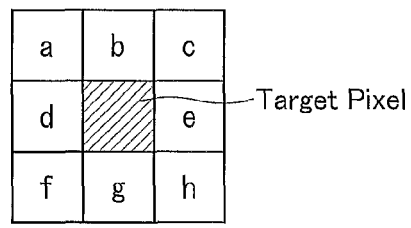
Target Pixel
(b)
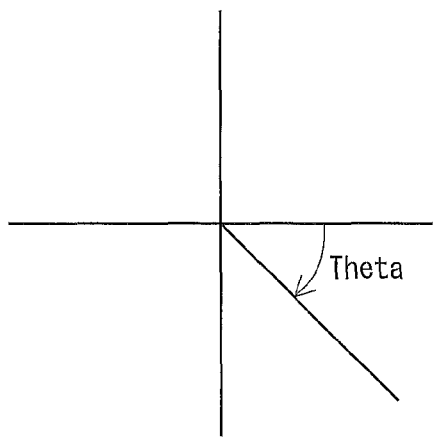
Theta

| Filter Set 0 | |
|---|---|
| All Thetas | Type 0 |

(b)

| Filter Set 1 | |
|---|---|
| $0° \leq \Theta < 45°$, $135° \leq \Theta < 180°$ | Type 0 |
| $45° \leq \Theta < 135°$ | Type 1 |

(c)

| Filter Set 2 | |
|---|---|
| $0° \leq \Theta < 22.5°$, $157.5° \leq \Theta < 180°$ | Type 0 |
| $22.5° \leq \Theta < 67.5°$ | Type 1 |
| $67.5° \leq \Theta < 112.5°$ | Type 2 |
| $112.5° \leq \Theta < 157.5°$ | Type 3 |

| Filter Set 0 | |
|---|---|
| All Thetas | Type 0 |

(b)

| Filter Set 1 | Activity≦TH | Activity>TH |
|---|---|---|
| All Thetas | Type 0 | Type 1 |

(c)

| Filter Set 2 | Activity≦TH | Activity>TH |
|---|---|---|
| 0° ≦Θ< 45°, 135° ≦Θ<180° | Type 0 | Type 1 |
| 45° ≦Θ<135° | | Type 2 |

(d)

| Filter Set 3 | Activity≦TH1 | TH1<Activity≦TH2 | Activity>TH2 |
|---|---|---|---|
| 0° ≦Θ< 22.5°, 157.5°≦Θ<180° | Type 0 | Type 1 | Type 5 |
| 22.5°≦Θ< 67.5° | | Type 2 | |
| 67.5°≦Θ<112.5° | | Type 3 | |
| 112.5°≦Θ<157.5° | | Type 4 | |

| Filter Set 0 | |
|---|---|
| All Sizes | Type 1 |

(b)

| Filter Set 1 | |
|---|---|
| 16x16, 8x8 | Type 0 |
| 4x4, 8x1, 1x8 | Type 1 |

(c)

| Filter Set 2 | |
|---|---|
| 16x16, 8x8 | Type 0 |
| 4x4 | Type 1 |
| 8x1 | Type 2 |
| 1x8 | Type 3 |

| Filter Set 0 | |
|---|---|
| All Intra Prediction Modes | Type 0 |

(b)

| Filter Set 1 | |
|---|---|
| DC Prediction, Planar Prediction, Scale Prediction | Type 0 |
| Other Than Those Above | Type 1 |

(c)

| Filter Set 2 | |
|---|---|
| DC Prediction, Planar Prediction, Scale Prediction | Type 0 |
| Directional Prediction 0 | Type 1 |
| Directional Prediction 4 | Type 2 |
| Directional Prediction 1~3 | Type 3 |
| Directional Prediction 5~7 | Type 4 |
| TM Prediction | Type 5 |

| Filter Set 0 | |
|---|---|
| All Intra Prediction Modes | Type 0 |

(b)

| Filter Set 1 | |
|---|---|
| 16x16, 8x8 | Type 0 |
| 4x4, 8x1, 1x8 | Type 1 |

(c)

| Filter Set 2 | 16x16, 8x8 | 4x4, 8x1, 1x8 |
|---|---|---|
| DC Prediction, Planar Prediction, Scale Prediction | Type 0 | Type 2 |
| Other Than Those Above | Type 1 | Type 3 |

(d)

| Filter Set 3 | 16x16, 8x8 | 4x4 | 8x1 | 1x8 |
|---|---|---|---|---|
| DC Prediction, Planar Prediction, Scale Prediction | Type 0 | | Type 1 | Type 2 |
| Directional Prediction 0 | Type 1 | | | |
| Directional Prediction 4 | Type 2 | | | |
| Directional Prediction 1~3 | | Type 3 | | |
| Directional Prediction 5~7 | | | | |
| TM Prediction | Type 4 | | | |

(e)

| Filter Set 4 | 16x16, 8x8 | 4x4 | 8x1 | 1x8 |
|---|---|---|---|---|
| DC Prediction, Planar Prediction, Scale Prediction | Type 0 | Type 4 | Type 5 | Type 6 |
| Directional Prediction 0 | Type 1 | Type 5 | | |
| Directional Prediction 4 | Type 2 | Type 6 | | |
| Directional Prediction 1~3 | Type 1 | Type 7 | | |
| Directional Prediction 5~7 | Type 2 | Type 8 | | |
| TM Prediction | Type 3 | Type 9 | | |

| Filter Set 0 | |
|---|---|
| All | Type 0 |

(b)

| Filter Set 1 | Activity≦TH | Activity>TH |
|---|---|---|
| All | Type 0 | Type 1 |

(c)

| Filter Set 2 | Activity≦TH | Activity>TH |
|---|---|---|
| DC Prediction, Planar Prediction, Scale Prediction | Type 0 | Type 1 |
| Other Than Those Above | | Type 2 |

(d)

| Filter Set 3 | Activity≦TH | Activity>TH |
|---|---|---|
| DC Prediction, Planar Prediction, Scale Prediction | Type 0 | Type 1 |
| Directional Prediction 0 | | Type 2 |
| Directional Prediction 4 | | Type 3 |
| Other Than Those Above | | Type 4 |

(e)

| Filter Set 4 | Activity≦TH | Activity>TH |
|---|---|---|
| DC Prediction, Planar Prediction, Scale Prediction | Type 0 | Type 1 |
| Directional Prediction 0 | | Type 2 |
| Directional Prediction 4 | | Type 3 |
| Directional Prediction 1~3 | | Type 4 |
| Directional Prediction 5~7 | | Type 5 |
| TM Prediction | | Type 6 |

FIG. 18

| Filter On/Off Information | Filter Allocation Table | Filter Coefficient Group 0 | Filter Coefficient Group 1 | ... | Filter Coefficient Group $N_f-1$ |
|---|---|---|---|---|---|

| | |
|---|---|
| $0° \leq \Theta < 22.5°$, $157.5° \leq \Theta < 180°$ | 0 |
| $22.5° \leq \Theta < 67.5°$ | 2 |
| $67.5° \leq \Theta < 112.5°$ | 1 |
| $112.5° \leq \Theta < 157.5°$ | 2 |

(b)

| | 16x16 | 8x8 | 4x4 | 8x1 | 1x8 |
|---|---|---|---|---|---|
| DC Prediction | 0 | 0 | 0 | 0 | 0 |
| Planar Prediction | 1 | | | | |
| Directional Prediction 0 | 2 | 2 | 2 | 2 | 2 |
| Directional Prediction 4 | 3 | 3 | 3 | 3 | 3 |
| Directional Prediction 1 | | 4 | 6 | | |
| Directional Prediction 2 | | 4 | 6 | 8 | 8 |
| Directional Prediction 3 | | 4 | 6 | | |
| Directional Prediction 5 | | 5 | 7 | | |
| Directional Prediction 6 | | 5 | 7 | 8 | 8 |
| Directional Prediction 7 | | 5 | 7 | | |
| TM Prediction | | | 8 | | |
| Scale Prediction | 0 | | | | |

| | Reference Region |
|---|---|
| $0° \leqq \Theta < 22.5°$, $157.5° \leqq \Theta < 180°$ | Horizontally Oriented |
| $22.5° \leqq \Theta < 67.5°$ | Obliquely Oriented |
| $67.5° \leqq \Theta < 112.5°$ | Vertically Oriented |
| $112.5° \leqq \Theta < 157.5°$ | Obliquely Oriented |

(b)

| | Reference Region |
|---|---|
| DC Prediction | Basic |
| Planar Prediction | Basic |
| Directional Prediction 0 | Horizontally Oriented |
| Directional Prediction 4 | Vertically Oriented |
| Directional Prediction 1 | Obliquely Oriented |
| Directional Prediction 2 | Obliquely Oriented |
| Directional Prediction 3 | Obliquely Oriented |
| Directional Prediction 5 | Obliquely Oriented |
| Directional Prediction 6 | Obliquely Oriented |
| Directional Prediction 7 | Obliquely Oriented |
| TM Prediction | Basic |
| Scale Prediction | Basic |

FIG. 21

| Filter | |
|---|---|
| $0° \leq \Theta < 22.5°$, $337.5° \leq \Theta < 360°$ | Type 0 |
| $22.5° \leq \Theta < 67.5°$ | Type 1 |
| $67.5° \leq \Theta < 112.5°$ | Type 2 |
| $112.5° \leq \Theta < 157.5°$ | Type 3 |
| $157.5° \leq \Theta < 202.5°$ | Type 4 |
| $202.5° \leq \Theta < 247.5°$ | Type 5 |
| $247.5° \leq \Theta < 292.5°$ | Type 6 |
| $292.5° \leq \Theta < 337.5°$ | Type 7 |

FIG. 26

| alf_param() { | C | Descriptor |
|---|---|---|
| adaptive_loop_filter_flag | 2 | u(1) |
| if( adaptive_loop_filter_flag ) { | | |
| alf_enable_region_filter | 2 | u(1) |
| if(alf_enable_region_filter != 0) { | | |
| alf_num_first_split_minus1 | 2 | ue(v) |
| alf_first_split_val_shift | 2 | u(1) |
| alf_second_split_type | 2 | u(1) |
| for (i0 = 0; i0 < AlfNumFirstSplit; i0++) { | | |
| alf_second_split_flag[i0] | 2 | u(2) |
| alf_length_luma_minus5_div2[i0] | 2 | ue(v) |
| if (alf_second_split_type == 0) { | | |
| if (alf_second_split_flag [i0] == 2) { | | |
| alf_region_pred_luma[i0*2][1] | 2 | ue(v) |
| } else if (alf_second_split_flag [i0] == 3) { | | |
| alf_region_pred_luma[i0*2][1] | 2 | ue(v) |
| alf_region_pred_luma[i0*2+1][1] | 2 | ue(v) |
| } | | |
| } else if (alf_second_split_type == 1) { | | |
| if (alf_second_split_flag [i0] == 1) { | | |
| alf_region_pred_luma[i0][2] | 2 | ue(v) |
| } else if (alf_second_split_flag [i0] == 2) { | | |
| alf_region_pred_luma[i0][1] | 2 | ue(v) |
| } else if (alf_second_split_flag [i0] == 3) { | | |
| alf_region_pred_luma[i0][1] | 2 | ue(v) |
| alf_region_pred_luma[i0][2] | 2 | ue(v) |
| alf_region_pred_luma[i0][3] | 2 | ue(v) |
| } | | |
| if (alf_second_split_type == 0) { | | |
| if (alf_second_split_flag[i0] == 0) { | | |
| alf_coeff_luma[i0*2][0] | 2 | ue(v) |
| }else if (alf_second_split_flag [i0] == 1) { | | |
| alf_coeff_luma[i0*2][0] | 2 | ue(v) |
| alf_coeff_luma[i0*2+1][0] | 2 | ue(v) |
| } else if (alf_second_split_flag [i0] == 2) { | | |
| alf_coeff_luma[i0*2][0] | 2 | ue(v) |
| alf_coeff_luma[i0*2][1] | 2 | ue(v) |
| } else if (alf_second_split_flag [i0] == 3) { | | |
| alf_coeff_luma[i0*2][0] | 2 | ue(v) |
| alf_coeff_luma[i0*2][1] | 2 | ue(v) |
| alf_coeff_luma[i0*2+1][0] | 2 | ue(v) |
| alf_coeff_luma[i0*2+1][1] | 2 | ue(v) |
| } | | |
| } else if (alf_second_split_type == 1) { | | |
| if (alf_second_split_flag[i0] == 0) { | | |
| alf_coeff_luma[i0][0] | 2 | ue(v) |
| }else if (alf_second_split_flag [i0] == 1) { | | |
| alf_coeff_luma[i0][0] | 2 | ue(v) |
| alf_coeff_luma[i0][2] | 2 | ue(v) |
| } else if (alf_second_split_flag [i0] == 2) { | | |
| alf_coeff_luma[i0][0] | 2 | ue(v) |
| alf_coeff_luma[i0][1] | 2 | ue(v) |
| } else if (alf_second_split_flag [i0] == 3) { | | |
| alf_coeff_luma[i0][0] | 2 | ue(v) |
| alf_coeff_luma[i0][1] | 2 | ue(v) |
| alf_coeff_luma[i0][2] | 2 | ue(v) |
| alf_coeff_luma[i0][3] | 2 | ue(v) |
| } | | |
| } | | |
| } | | |
| } else { | | |
| alf_length_luma_minus5_div2 | 2 | ue(v) |
| alf_coeff_luma[0][0] | 2 | ue(v) |
| } | | |
| } | | |

|  | (0,-1) | (1,-1) | (2,-1) | (3,-1) | UR |
|---|---|---|---|---|---|
| (-1,0) | (0,0) | (1,0) | (2,0) | (3,0) | (4,0) |
| (-1,1) | (0,1) | (1,1) | (2,1) | (3,1) | (4,1) |
| (-1,2) | (0,2) | (1,2) | (2,2) | (3,2) | (4,2) |
| (-1,3) | (0,3) | (1,3) | (2,3) | (3,3) | (4,3) |
|  | (0,4) | (1,4) | (2,4) | (3,4) |  |

CRR (b)

| (0,0) | (1,0) | (2,0) | (3,0) |
|---|---|---|---|
| (0,1) | (1,1) | (2,1) | (3,1) |
| (0,2) | (1,2) | (2,2) | (3,2) |
| (0,3) | (1,3) | (2,3) | (3,3) |

UR, CRR

FIG. 39

| alf_param() { | C | Descriptor |
|---|---|---|
| adaptive_loop_filter_flag | 2 | u(1) |
| if ( adaptive_loop_filter_flag ) { | | |
| alf_enable_region_filter | 2 | u(1) |
| if (alf_enable_region_filter != 0) { | | |
| alf_num_first_split_minus1 | 2 | ue(v) |
| for (i0 = 0; i0 < AlfNumFirstSplit; i0++) { | | |
| alf_second_split_flag[i] | 2 | u(2) |
| alf_length_luma_minus5_div2[i0] | 2 | ue(v) |
| if (alf_second_split_flag [i0] == 2) { | | |
| alf_region_pred_luma[i*2][1] | 2 | ue(v) |
| } else if (alf_second_split_flag [i0] == 3) { | | |
| alf_region_pred_luma[i0*2][1] | 2 | ue(v) |
| alf_region_pred_luma[i0*2+1][1] | 2 | ue(v) |
| } | | |
| if (alf_second_split_flag[i0] == 0) { | | |
| alf_coeff_luma[i0*2][0] | 2 | ue(v) |
| } else if (alf_second_split_flag [i0] == 1) { | | |
| alf_coeff_luma[i0*2][0] | 2 | ue(v) |
| alf_coeff_luma[i0*2+1][0] | 2 | ue(v) |
| } else if (alf_second_split_flag [i0] == 2) { | | |
| alf_coeff_luma[i0*2][0] | 2 | ue(v) |
| alf_coeff_luma[i0*2][1] | 2 | ue(v) |
| } else if (alf_second_split_flag [i0] == 3) { | | |
| alf_coeff_luma[i0*2][0] | 2 | ue(v) |
| alf_coeff_luma[i0*2][1] | 2 | ue(v) |
| alf_coeff_luma[i0*2+1][0] | 2 | ue(v) |
| alf_coeff_luma[i0*2+1][1] | 2 | ue(v) |
| } | | |
| } | | |
| } else { | | |
| alf_length_luma_minus5_div2 | 2 | ue(v) |
| alf_coeff_luma[0][0] | 2 | ue(v) |
| } | | |
| } | | |

FIG. 40

| | alf_num_first_split_minus1=0 | alf_num_first_split_minus1=1 | alf_num_first_split_minus1=2 |
|---|---|---|---|
| PX1 | 64 | 16 | 16 |
| PX2 | | 32 | 32 |
| PX3 | | 128 | 64 |
| PX4 | | | 128 |
| PX5 | | | 256 |

FIG. 41

| alf_param() {                                      | C | Descriptor |
|----------------------------------------------------|---|------------|
| adaptive_loop_filter_flag                          | 2 | u(1)       |
| if( adaptive_loop_filter_flag ) {                  |   |            |
| alf_enable_region_filter                           | 2 | u(1)       |
| if(alf_enable_region_filter != 0) {                |   |            |
| for (i=1; i< AlfMaxNumFilters; i++) {              |   |            |
| alf_filter_pattern[i]                              | 2 | u(1)       |
| }                                                  |   |            |
| alf_enable_second_split                            | 2 | u(1)       |
| if(alf_enable_second_split== 1) {                  |   |            |
| alf_select_split_char                              | 2 | ue(v)      |
| alf_enable_second_split_val                        | 2 | u(1)       |
| if(alf_enable_second_split_val) {                  |   |            |
| alf_second_split_val[0]                            | 2 | ue(v)      |
| alf_second_split_val[1]                            | 2 | ue(v)      |
| alf_second_split_val[2]                            | 2 | ue(v)      |
| }                                                  |   |            |
| }                                                  |   |            |
| for (i0 = 0; i0 < AlfNumFirstSplit; i0++) {        |   |            |
| alf_length_luma_minus5_div2[i0]                    | 2 | ue(v)      |
| if (alf_enable_second_split== 0) {                 |   |            |
| alf_coeff_luma[i0][0]                              |   |            |
| }                                                  |   |            |
| else {                                             |   |            |
| alf_second_split_flag[i0]                          | 2 | u(2)       |
| alf_region_disable_idc[i0]                         | 2 | ue(v)      |
| if(alf_second_split_flag[i0] == 0) {               |   |            |
| if(alf_region_disable_idc[i0] != 0)                |   |            |
| alf_coeff_luma[i0][0]                              | 2 | ue(v)      |
| }else if(alf_second_split_flag [i0] == 1) {        |   |            |
| if (alf_region_disable_idc[i0] != 0)               |   |            |
| alf_coeff_luma[i0][0]                              | 2 | ue(v)      |
| if (alf_region_disable_idc[i0] != 1)               |   |            |
| alf_coeff_luma[i0][2]                              | 2 | ue(v)      |
| } else if (alf_second_split_flag [i0] == 2) {      |   |            |
| if (alf_region_disable_idc[i0] != 0)               |   |            |
| alf_coeff_luma[i0][0]                              | 2 | ue(v)      |
| if (alf_region_disable_idc[i0] != 1)               |   |            |
| alf_coeff_luma[i0][1]                              | 2 | ue(v)      |
| } else if (alf_second_split_flag [i0] == 3) {      |   |            |
| if (alf_region_disable_idc[i0] != 0)               |   |            |
| alf_coeff_luma[i0][0]                              | 2 | ue(v)      |
| if (alf_region_disable_idc[i0] != 1)               |   |            |
| alf_coeff_luma[i0][1]                              | 2 | ue(v)      |
| if (alf_region_disable_idc[i0] != 2)               |   |            |
| alf_coeff_luma[i0][2]                              | 2 | ue(v)      |
| if (alf_region_disable_idc[i0] != 3)               |   |            |
| alf_coeff_luma[i0][3]                              | 2 | ue(v)      |
| }                                                  |   |            |
| }                                                  |   |            |
| }                                                  |   |            |
| } else {                                           |   |            |
| alf_length_luma_minus5_div2                        | 2 | ue(v)      |
| alf_coeff_luma[0][0]                               | 2 | ue(v)      |
| }                                                  |   |            |
| }                                                  |   |            |

| alf_second_split_char | Characteristic Value X | Characteristic Value Y |
|---|---|---|
| 0 | Activity | Directionality |
| 1 | Activity | Average Pixel Value |
| 2 | Activity | y Coordinate |
| 3 | Activity | x Coordinate |

(b)

| | Characteristic Value Y=Directionality alf_second_split_char=0 | Characteristic Value Y=Average Pixel Value alf_second_split_char=1 | Characteristic Value Y=y Coordinate alf_second_split_char=2 | Characteristic Value Y=x Coordinate alf_second_split_char=3 |
|---|---|---|---|---|
| PY1 | 2 | 64 | 8 × height/32 | 8 × width/32 |
| PY2 | 4 | 128 | 16 × height/32 | 16 × width/32 |
| PY3 | 8 | 160 | 24 × height/32 | 24 × width/32 |

(c)

| | Characteristic Value Y=Directionality alf_second_split_char=0 | Characteristic Value Y=Average Pixel Value alf_second_split_char=1 | Characteristic Value Y=y Coordinate alf_second_split_char=2 | Characteristic Value Y=x Coordinate alf_second_split_char=3 |
|---|---|---|---|---|
| PY1 | alf_second_split_val[0] | alf_second_split_val[0] × 32 | alf_second_split_val[0] × height/32 | alf_second_split_val[0] × width/32 |
| PY2 | alf_second_split_val[1] × 2 | alf_second_split_val[1] × 32 | alf_second_split_val[1] × height/32 | alf_second_split_val[1] × width/32 |
| PY3 | alf_second_split_val[2] × 2 | alf_second_split_val[2] × 32 | alf_second_split_val[2] × height/32 | alf_second_split_val[2] × width/32 |

IMAGE FILTER DEVICE, DECODING APPARATUS, ENCODING APPARATUS, AND DATA STRUCTURE

TECHNICAL FIELD

The present invention relates to an image filter device which carries out image filtering. The present invention also relates to an encoding apparatus and a decoding apparatus each including such an image filter. The present invention also relates to a data structure of coded data which is decoded by such a decoding apparatus.

BACKGROUND ART

A moving image encoder (an encoding apparatus) which generates coded data by encoding a moving image and a moving image decoder (a decoding apparatus) which generates a decoded image by decoding the coded data are used to efficiently transmit or record a moving image. A specific moving image encoding method is exemplified by methods employed in H.264/MPEG-4.AVC (Non Patent Literature 1) and KTA software which is CODEC for joint development in VCEG (Video Coding Expert Group).

Further, according to such an encoding method, an image (a picture) constituting a moving image is managed by a hierarchical structure which is composed of (i) a slice obtained by dividing the image, (ii) a macroblock obtained by dividing the slice, and (iii) a block obtained by dividing the macroblock, and the image is normally encoded for each block.

Further, according to such an encoding method, normally, a predicted image is generated in accordance with a locally decoded image obtained by encoding/decoding an input image, and difference data between the predicted image and the input image is encoded. A known method for generating a predicted image is exemplified by methods called inter prediction and intra prediction.

According to the intra prediction, predicted images in an identical frame are sequentially generated in accordance with a locally decoded image in the identical frame. Specifically, according to the intra prediction, normally, any one of prediction directions included in a predetermined prediction direction (prediction mode) group is selected for each prediction unit (e.g., block), and a predicted pixel value in a prediction target region is generated by extrapolating a pixel value of a reference pixel of a locally decoded image in the selected prediction direction. Meanwhile, according to the inter prediction, a predicted image in a prediction target frame is generated for each prediction unit (e.g., block) by applying motion compensation using a motion vector to a reference image in a reference frame (decoded image) which has been entirely decoded.

Each of Non Patent Literature 2 and Non Patent Literature 3 discloses an adaptive loop filter (hereinafter simply referred to as an "adaptive filter") which divides a (locally) decoded image into a plurality of regions and carries out a filter process while changing a filter coefficient group for each of the plurality of regions in accordance with a magnitude of activity indicative of local disorder of the (locally) decoded image in the each of the plurality of regions. Note here that the filter coefficient group for the each of the plurality of regions is determined by an encoding apparatus so that a difference between a filtered image in the each of the plurality of regions and an encoding target image is minimized.

An encoding apparatus and a decoding apparatus each including such an adaptive filter allows an increase in prediction accuracy and an improvement in coding efficiency by generating a predicted image with reference to a filtered decoded image which is obtained by causing the adaptive filter to carry out a filter process with respect to a (locally) decoded image.

CITATION LIST

Non Patent Literatures

Non Patent Literature 1

"Recommendation ITU-T H.264", Telecommunication Standardization Sector of ITU, March 2009 (Published in March, 2009)

Non Patent Literature 2

"VCEG-AL27", Telecommunication Standardization Sector, 38th Meeting: London, UK/Geneva, CH, July 2009 (Published in July, 2009)

Non Patent Literature 3

"JCTVCA-A121", Joint Collaborative Team on Video Coding (JCT-VC) of ITU-T SG16 WP3 and ISO/IEC JTC1/SC29/WG11, 1st Meeting: Dresden, Del., April 2010 (Published in April, 2010)

SUMMARY OF INVENTION

Technical Problem

However, there is a problem such that depending on a characteristic of an encoding target image, coding efficiency is not improved or is less improved than expected even if the adaptive filter disclosed in each of Non Patent Literature 2 and Non Patent Literature 3 is used.

The present invention has been made in view of the problem in accordance with knowledge acquired by inventors, and an object of the present invention is to provide an image filter device which allows an improvement in coding efficiency of a (locally) decoded image which has an image characteristic such that coding efficiency is not improved even if a filter coefficient group is changed in accordance with activity, and a decoding apparatus and an encoding apparatus each including such an image filter device.

Solution to Problem

In view of the problem, the inventors acquired knowledge that depending on an image characteristic of an encoding target image, it is possible to more effectively improve coding efficiency by changing a filter coefficient group not in accordance with a magnitude of local activity of a (locally) decoded image but in accordance with a difference in local directionality of the (locally) decoded image.

In order to attain the object, an image filter device in accordance with the present invention which calculates a pixel value of each pixel of an output image by use of (i) a pixel value in a reference region which is defined in accordance with a location of the each pixel in an input image and (ii) a filter coefficient group, the image filter device includes: directionality discrimination means for discriminating directionality of the input image in each of a plurality of unit regions constituting the input image; classification means for classifying the each of the plurality of unit regions into one of a plurality of unit region groups in accordance with to which of a plurality of predetermined groups the directionality of the input image in the each of the plurality of unit regions belongs, the directionality having been discriminated by the directionality discrimination means; and filter means for calculating the pixel value of the each pixel of the output image by use of the filter coefficient group optimized for a unit region group to which a unit region including the each pixel belongs.

Based on the knowledge, the inventors found that, in a case where directionality of an input image which is supplied to an image filter device differs in accordance with each region (unit region) constituting the input image, a change in filter coefficient group in accordance with the difference in directionality allows an increase in prediction accuracy of a predicted image which is generated with reference to the output image.

According to the image filter device in accordance with the present invention which is arranged as above, directionality discrimination means discriminates directionality of the input image in each of a plurality of unit regions constituting the input image; classification means classifies the each of the plurality of unit regions into one of a plurality of unit region groups in accordance with to which of a plurality of predetermined groups the directionality of the input image in the each of the plurality of unit regions belongs, the directionality having been discriminated by the directionality discrimination means; and filter means calculates the pixel value of the each pixel of the output image by use of the filter coefficient group optimized for a unit region group to which a unit region including the each pixel belongs. This makes it possible to carry out a suitable filter process in accordance with the directionality of the input image in a case where the directionality differs in accordance with the each of the plurality of unit regions.

Therefore, according to the image filter device which is arranged as above, a predicted image which is generated with reference to the output image can have higher prediction accuracy also in a case where the input image has an image characteristic such that coding efficiency is not improved even if a filter coefficient group is changed in accordance with activity.

Note that the directionality of the input image in the each of the plurality of unit regions can be defined as, for example, a direction which is orthogonal to a local gradient direction of the input image in the each of the plurality of unit regions. Note here that, in a case where a pixel (x, y) has a pixel value z (x, y), a gradient of an image refers to a gradient of a curved surface $\{(x, y, z (x, y)|0 \leq x \leq Nx, 0 \leq y \leq Ny, 0 \leq z \leq Nz)\}$ which is defined in a three-dimensional space in which x, y, and z are coordinates. Note here that Nx refers to a total number of pixels in an x direction, Ny refers to a total number of pixels in a y direction, and Nz refers to an upper limit value which the pixel value z can have. Note also that the directionality of the input image in the each of the plurality of unit regions can also be expressed as a direction with which a pixel value of the input image in the each of the plurality of unit regions is more correlated.

The directionality discrimination means may be arranged to directly discriminate the directionality of the input image in the each of the plurality of unit regions by detecting an edge of the input image. Alternatively, in a case where the image filter device is used in combination with predicted image generation means for generating an intra predicted image by intra prediction, the directionality discrimination means may be arranged to indirectly discriminate the directionality of the input image in the each of the plurality of unit regions in accordance with a direction indicated by an intra prediction mode which is referred to for generating the intra predicted image, or may be arranged to discriminate the directionality of the input image in the each of the plurality of unit regions in another method.

The each of the plurality of unit regions refers to each of a plurality of regions which constitute the input image and do not overlap with each other. In a case where the image filter device is used in each of an encoding apparatus which encodes an image and a decoding apparatus which decodes an image from coded data, the each of the plurality of unit regions may be, for example, a prediction unit (partition) which is a unit in which a predicted image is generated, a transformation unit which is a unit for frequency transformation, or another unit.

A decoding apparatus in accordance with the present invention which decodes coded data and generates a filtered decoded image, the decoding apparatus includes: an image filter device mentioned above; and predicted image generation means for generating a predicted image in the each of the plurality of unit regions with reference to an output image generated by the image filter device, assuming that a decoded image obtained by adding (i) the predicted image generated by the predicted image generation means and (ii) a residual image decoded from the coded data is an input image, the image filter device generating the filtered decoded image as the output image.

According to the decoding apparatus in accordance with the present invention which is arranged as above, assuming that a decoded image obtained by adding (i) the predicted image generated by the predicted image generation means and (ii) a residual image decoded from the coded data is an input image, the image filter device included in the decoding apparatus generates the output image (filtered decoded image) by use of the filter coefficient group which has been optimized for the each of the plurality of unit regions in accordance with the directionality of the input image (decoded image). Therefore, also in a case where the directionality of the input image differs in accordance with the each of the plurality of unit regions, it is possible to generate the output image which is suitable as an image that is referred to for generating the predicted image. Consequently, the arrangement allows an increase in prediction accuracy of the predicted image generated by the predicted image generation means.

According to an encoding apparatus which has an arrangement corresponding to the arrangement described above, also in a case where directionality of an encoding target image varies in accordance with the each of the plurality of unit regions, it is possible to increase prediction accuracy of the predicted image. This allows generation of coded data having high coding efficiency. Further, according to the decoding apparatus which has the arrangement described above, it is possible to suitably decode such coded data having high coding efficiency.

A decoding apparatus in accordance with the present invention which decodes coded data and generates a filtered decoded image, the decoding apparatus includes: an image filter device mentioned above, assuming that a decoded image obtained by adding (i) the predicted image generated by intra prediction with reference to a reference image corresponding to the input image and (ii) a residual image decoded from the coded data is an input image, the image filter device generating the filtered decoded image as an output image.

According to the decoding apparatus in accordance with the present invention which is arranged as above, assuming that a decoded image obtained by adding (i) the predicted image generated by intra prediction and (ii) a residual image decoded from the coded data is an input image, the image filter device included in the decoding apparatus generates the output image (filtered decoded image) by use of the filter coefficient group which has been optimized for the each of the plurality of unit regions in accordance with the directionality of the input image (decoded image). Therefore, also in a case where the directionality of the input image differs in accordance with the each of the plurality of unit regions, it is possible to generate the output image which is suitable as an image that is referred to for generating the predicted image. Consequently, the arrangement allows an increase in prediction accuracy of the predicted image generated by the predicted image generation means.

According to an encoding apparatus which has an arrangement corresponding to the arrangement described above, also in a case where directionality of an encoding target image differs in accordance with the each of the plurality of unit regions, it is possible to increase prediction accuracy of the predicted image. This allows generation of coded data having high coding efficiency. Further, according to the decoding apparatus which has the arrangement described above, it is possible to suitably decode such coded data having high coding efficiency.

In a case where the image filter device discriminates the directionality of the input image in the each of the plurality of unit regions in accordance with at least one of (i) a direction indicated by a prediction parameter which is used in intra prediction and (ii) a shape of the each of the plurality of unit regions, it is possible to discriminate the directionality of the input image without the need of carrying out calculation such as edge detection which refers to a pixel value. This makes it possible to reduce throughput for discriminating the directionality and to decode coded data having high coding efficiency.

An encoding apparatus in accordance with the present invention which generates coded data by encoding a residual image between an encoding target image and a predicted image, the encoding apparatus includes: an image filter device mentioned above; and predicted image generation means for generating a predicted image in the each of the plurality of unit regions with reference to an output image generated by the image filter device, assuming that a decoded image obtained by adding (i) the predicted image generated by the predicted image generation means and (ii) the residual image is an input image, the image filter device generating the output image.

According to the encoding apparatus in accordance with the present invention which has the arrangement, assuming that a decoded image obtained by adding (i) the predicted image generated by the predicted image generation means and (ii) a residual image between an encoding target image and a predicted image is an input image, the image filter device included in the encoding apparatus generates the output image by use of the filter coefficient group which has been optimized for the each of the plurality of unit regions in accordance with the directionality of the input image (decoded image). Therefore, also in a case where the directionality of the input image differs in accordance with the each of the plurality of unit regions, it is possible to generate the output image which is suitable as an image that is referred to for generating the predicted image. Consequently, the arrangement allows an increase in prediction accuracy of the predicted image generated by the predicted image generation means. Further, the increase in prediction accuracy allows the encoding apparatus to generate coded data having high coding efficiency.

An encoding apparatus in accordance with the present invention which generates coded data by encoding a residual image between an encoding target image and a predicted image, the encoding apparatus includes: an image filter device mentioned above, assuming that a decoded image obtained by adding (i) the predicted image generated by intra prediction with reference to a reference image corresponding to the input image and (ii) the residual image is an input image, the image filter device generating an output image.

According to the decoding apparatus in accordance with the present invention which is arranged as above, assuming that a decoded image obtained by adding (i) the predicted image generated by intra prediction and (ii) a residual image between an encoding target image and a predicted image is an input image, the image filter device included in the decoding apparatus generates the output image by use of the filter coefficient group which has been optimized for the each of the plurality of unit regions in accordance with the directionality of the input image (decoded image). Therefore, also in a case where the directionality of the input image differs in accordance with the each of the plurality of unit regions, it is possible to generate the output image which is suitable as an image that is referred to for generating the predicted image. Consequently, the arrangement allows an increase in prediction accuracy of the predicted image generated by the predicted image generation means.

In a case where the image filter device discriminates the directionality of the input image in the each of the plurality of unit regions in accordance with at least one of (i) a direction indicated by a prediction parameter which is used in intra prediction and (ii) a shape of the each of the plurality of unit regions, it is possible to discriminate the directionality of the input image without the need of carrying out calculation such as edge detection which refers to a pixel value. This makes it possible to reduce throughput for discriminating the directionality and to generate coded data having high coding efficiency.

A data structure in accordance with the present invention of coded data to which an image filter device refers, the image filter device calculating a pixel value of each pixel of an output image by use of (i) a pixel value in a reference region which is defined in accordance with a location of the each pixel in an input image and (ii) a filter coefficient group, the data structure includes: a plurality of filter coefficient groups; and directionality information which is associated with each of the plurality of filter coefficient groups, the image filter device (i) classifying each of a plurality of unit regions constituting the input image into one of a plurality of unit region groups in accordance with to which of a plurality of predetermined groups directionality of the input image in the each of the plurality of unit regions belongs, (ii) with reference to the directionality information, selecting, from the plurality of filter coefficient groups, a filter coefficient group optimized for each of the plurality of unit region groups, and (iii) calculating the pixel value of the each pixel of the output image by use of the filter coefficient group selected for a unit region group to which a unit region including the each pixel belongs.

The coded data in accordance with the present invention which is arranged as above includes: a plurality of filter coefficient groups; and directionality information which is associated with each of the plurality of filter coefficient groups. Therefore, the image filter device which refers to the coded data (i) with reference to the directionality information, selects, from the plurality of filter coefficient groups, a filter coefficient group optimized for each of the plurality of unit region groups, and (ii) calculates the pixel value of the each pixel of the output image by use of the filter coefficient group selected for a unit region group to which a unit region including the each pixel belongs. This yields an effect such that an output image which is more suitable for generation of a predicted image can be generated in a case where the directionality of the input image differs in accordance with the each of the plurality of unit regions. This allows an increase in prediction accuracy of a predicted image which is generated with reference to an output image that is generated by the image filter device in accordance with the present invention which is arranged as above.

An image filter device in accordance with the present invention which generates an output image from an input image generated for each unit region by use of intra prediction, the image filter device calculating a pixel value of each pixel of the output image by use of (i) a pixel value in a reference region which is defined in accordance with a location of the each pixel in the input image and (ii) a filter coefficient group, the image filter device includes: classification means for classifying the each unit region into one of a plurality of unit region groups in accordance with to which of a plurality of predetermined groups a shape and a size of the each unit region belongs; and filter means for calculating the pixel value of the each pixel of the output image by use of the filter coefficient group optimized for a unit region group to which a unit region including the each pixel belongs.

The inventors found that, since an output image which is more suitable for generation of a predicted image can be generated by changing a filter coefficient group for each unit region in accordance with a shape and a size of a unit region (prediction unit) constituting an input image generated for the each unit region by use of intra prediction, a predicted image which is generated with reference to the output image can have higher prediction accuracy also in a case where the input image has an image characteristic such that coding efficiency is not improved even if a filter coefficient group is changed in accordance with activity.

According to the image filter device which is arranged as above, classification means classifies the each unit region into one of a plurality of unit region groups in accordance with to which of a plurality of predetermined groups a shape and a size of the each unit region belongs; and filter means calculates the pixel value of the each pixel of the output image by use of the filter coefficient group optimized for a unit region group to which a unit region including the each pixel belongs. Therefore, a predicted image which is generated with reference to the output image can have higher prediction accuracy also in a case where the input image has an image characteristic such that coding efficiency is not improved even if a filter coefficient group is changed in accordance with activity.

An image filter device in accordance with the present invention includes: filter means for acting on an input image constituted by a plurality of unit regions; characteristic value calculating means for calculating a first characteristic value and a second characteristic value each of which indicates an image characteristic of the input image in each of the plurality of unit regions and which differ in derivation method; and characteristic value division means for in accordance with characteristic value division information, dividing, into a plurality of characteristic value partial regions, a characteristic value region spanned by the first characteristic value and the second characteristic value, the filter means calculating a pixel value of each pixel of an output image in the each of the plurality of unit regions by use of a filter coefficient set for a characteristic value partial region to which the first characteristic value and the second characteristic value belong, the first characteristic value and the second characteristic value each having been calculated for the each of the plurality of unit regions.

The image filter device in accordance with the present invention which is arranged as above, divides, into a plurality of characteristic value partial regions, a characteristic value region spanned by a first characteristic value and a second characteristic value which differ in derivation method, and acts on an input image in each of the plurality of characteristic value partial regions by use of a filter coefficient set for a characteristic value partial region to which the first characteristic value and the second characteristic value belong, the first characteristic value and the second characteristic value each having been calculated for the each of the plurality of unit regions.

Therefore, according to the arrangement, a filter process is carried out which uses a filter coefficient set for the each of the plurality of unit regions in accordance with the first characteristic value and the second characteristic value. This makes it possible to carry out a filter process with respect to the each of the plurality of unit regions by use of a suitable filter coefficient also in a case where there is a variation between the first characteristic value and the second characteristic value of the input image in the each of the plurality of unit regions. Further, it is possible to increase prediction accuracy of a predicted image which is generated with reference to an output image of the image filter device which is arranged as above.

Note that the first characteristic value and the second characteristic value, which differ in derivation method, allow a two-dimensional characteristic value region to be spanned. Note also that two characteristic values can be used as the first characteristic value and the second characteristic value provided that the two characteristic values allow a two-dimensional characteristic value region to be spanned.

The each of the plurality of unit regions refers to each of a plurality of regions which constitute the input image and do not overlap with each other. In a case where the image filter device is used in each of an encoding apparatus which encodes an image and a decoding apparatus which decodes an image from coded data, the each of the plurality of unit regions may be, for example, a prediction unit (partition) which is a unit in which a predicted image is generated, a transformation unit which is a unit for frequency transformation, a unit for encoding, or another unit.

A decoding apparatus in accordance with the present invention which decodes coded data and generates a filtered decoded image, the decoding apparatus includes: an image filter device mentioned above; and predicted image generation means for generating a predicted image in the each of the plurality of unit regions with reference to an output image generated by the image filter device, assuming that a decoded image obtained by adding (i) the predicted image generated by the predicted image generation means and (ii) a residual image decoded from the coded data is an input image, the image filter device generating the filtered decoded image as the output image.

According to the decoding apparatus in accordance with the present invention which is arranged as above, assuming that a decoded image obtained by adding (i) the predicted image generated by the predicted image generation means and (ii) a residual image decoded from the coded data is an input image, the image filter device included in the decoding apparatus generates the output image (filtered decoded image) by acting on the input image in each of the plurality of characteristic value partial regions by use of a filter coefficient set for a characteristic value partial region to which the first characteristic value and the second characteristic value belong, the first characteristic value and the second characteristic value each having been calculated for the each of the plurality of unit regions. Therefore, also in a case where there is a variation between the first characteristic value and the second characteristic value of the input image in the each of the plurality of unit regions, it is possible to generate the output image which is suitable as an image that is referred to for generating the predicted image. Consequently, the arrangement allows an increase in prediction accuracy of the predicted image generated by the predicted image generation means.

According to an encoding apparatus which has an arrangement corresponding to the arrangement described above, also in a case where there is a variation between the first characteristic value and the second characteristic value of an encoding target image in the each of the plurality of unit regions, it is possible to increase prediction accuracy of the predicted image. This allows generation of coded data having high coding efficiency. Further, according to the decoding apparatus which has the arrangement described above, it is possible to suitably decode such coded data having high coding efficiency.

An encoding apparatus in accordance with the present invention which generates coded data by encoding a residual image between an encoding target image and a predicted image, the encoding apparatus includes: an image filter device mentioned above; and predicted image generation means for generating a predicted image in the each of the plurality of unit regions with reference to an output image generated by the image filter device, assuming that a decoded image obtained by adding (i) the predicted image generated by the predicted image generation means and (ii) the residual image is an input image, the image filter device generating the output image.

According to the encoding apparatus in accordance with the present invention which is arranged as above, assuming that a decoded image obtained by adding (i) the predicted image generated by the predicted image generation means and (ii) a residual image between an encoding target image and a predicted image is an input image, the image filter device included in the encoding apparatus generates the output image (filtered decoded image) by acting on the input image in each of the plurality of characteristic value partial regions by use of a filter coefficient set for a characteristic value partial region to which the first characteristic value and the second characteristic value belong, the first characteristic value and the second characteristic value each having been calculated for the each of the plurality of unit regions. Therefore, also in a case where there is a variation between the first characteristic value and the second characteristic value of the input image in the each of the plurality of unit regions, it is possible to generate the output image which is suitable as an image that is referred to for generating the predicted image. Consequently, the arrangement allows an increase in prediction accuracy of the predicted image generated by the predicted image generation means. Further, the increase in prediction accuracy allows the encoding apparatus to generate coded data having high coding efficiency.

A data structure in accordance with the present invention of coded data to which an image filter device refers, the image filter device including: characteristic value calculating means for calculating a first characteristic value and a second characteristic value each of which indicates an image characteristic of the input image in each of a plurality of unit regions constituting the input image and which differ in derivation method; characteristic value division means for dividing, into a plurality of characteristic value partial regions, a characteristic value region spanned by the first characteristic value and the second characteristic value; and filter means for calculating a pixel value of each pixel of an output image in each of the plurality of unit regions by use of a filter coefficient group set for a characteristic value partial region to which the first characteristic value and the second characteristic value belong, the first characteristic value and the second characteristic value each having been calculated for the each of the plurality of unit regions, the data structure includes: characteristic value division information to which the characteristic value division means refers and which specifies how to divide the characteristic value region; and a filter coefficient for each of the plurality of characteristic value partial regions, the filter coefficient being used by the filter means.

The image filter device which refers to the coded data that is arranged as above (i) in accordance with characteristic value division information included in the coded data, divides, into a plurality of characteristic value partial regions, a characteristic value region spanned by the first characteristic value and the second characteristic value, and (ii) carries out a filter process by use of a filter coefficient for each of the plurality of characteristic value partial regions, the filter coefficient being included in the coded data.

Therefore, the image filter device which refers to the coded data that is arranged as above can carry out a suitable filter process with respect to the input image by use of a filter coefficient set for each of the plurality of characteristic value partial regions.

Advantageous Effects of Invention

As described earlier, an image filter device in accordance with the present invention which calculates a pixel value of each pixel of an output image by use of (i) a pixel value in a reference region which is defined in accordance with a location of the each pixel in an input image and (ii) a filter coefficient group, the image filter device includes: directionality discrimination means for discriminating directionality of the input image in each of a plurality of unit regions constituting the input image; classification means for classifying the each of the plurality of unit regions into one of a plurality of unit region groups in accordance with to which of a plurality of predetermined groups the directionality of the input image in the each of the plurality of unit regions belongs, the directionality having been discriminated by the directionality discrimination means; and filter means for calculating the pixel value of the each pixel of the output image by use of the filter coefficient group optimized for a unit region group to which a unit region including the each pixel belongs.

According to the image filter device, it is possible to carry out a suitable filter process in accordance with a difference in directionality of the input image in the each of the plurality of unit regions. Therefore, according to the image filter device which is arranged as above, a predicted image which is generated with reference to the output image can have higher prediction accuracy also in a case where the input image has an image characteristic such that coding efficiency is not improved even if a filter coefficient group is changed in accordance with activity.

An image filter device in accordance with the present invention which generates an output image from an input image generated for each unit region by use of intra prediction, the image filter device calculating a pixel value of each pixel of the output image by use of (i) a pixel value in a reference region which is defined in accordance with a location of the each pixel in the input image and (ii) a filter coefficient group, the image filter device includes: classification means for classifying the each unit region into one of a plurality of unit region groups in accordance with to which of a plurality of predetermined groups a shape and a size of the each unit region belongs; and filter means for calculating the pixel value of the each pixel of the output image by use of the filter coefficient group optimized for a unit region group to which a unit region including the each pixel belongs.

According to the image filter device, it is possible to carry out a suitable filter process in accordance with a difference in shape and size of the each unit region. Therefore, according to the image filter device which is arranged as above, a predicted image which is generated with reference to the output image can have higher prediction accuracy also in a case where the input image has an image characteristic such that coding efficiency is not improved even if a filter coefficient group is changed in accordance with activity.

An image filter device in accordance with the present invention includes: filter means for acting on an input image constituted by a plurality of unit regions; characteristic value calculating means for calculating a first characteristic value and a second characteristic value each of which indicates an image characteristic of the input image in each of the plurality of unit regions and which differ in derivation method; and characteristic value division means for in accordance with characteristic value division information, dividing, into a plurality of characteristic value partial regions, a characteristic value region spanned by the first characteristic value and the second characteristic value, the filter means calculating a pixel value of each pixel of an output image in the each of the plurality of unit regions by use of a filter coefficient set for a characteristic value partial region to which the first characteristic value and the second characteristic value belong, the first characteristic value and the second characteristic value each having been calculated for the each of the plurality of unit regions.

According to the image filter device, it is possible to carry out a filter process with respect to the each of the plurality of unit regions by use of a suitable filter coefficient also in a case where there is a variation between the first characteristic value and the second characteristic value of the input image in the each of the plurality of unit regions.

A data structure in accordance with the present invention of coded data to which an image filter device refers, the image filter device including: characteristic value calculating means for calculating a first characteristic value and a second characteristic value each of which indicates an image characteristic of the input image in each of a plurality of unit regions constituting the input image and which differ in derivation method; characteristic value division means for dividing, into a plurality of characteristic value partial regions, a characteristic value region spanned by the first characteristic value and the second characteristic value; and filter means for calculating a pixel value of each pixel of an output image in each of the plurality of unit regions by use of a filter coefficient group set for a characteristic value partial region to which the first characteristic value and the second characteristic value belong, the first characteristic value and the second characteristic value each having been calculated for the each of the plurality of unit regions, the data structure includes: characteristic value division information to which the characteristic value division means refers and which specifies how to divide the characteristic value region; and a filter coefficient for each of the plurality of characteristic value partial regions, the filter coefficient being used by the filter means.

The image filter device which refers to the coded data that is arranged as above can carry out a suitable filter process with respect to the input image by use of a filter coefficient set for each of the plurality of characteristic value partial regions.

BRIEF DESCRIPTION OF DRAWINGS

FIG. 10 explains an edge detection process carried out by an edge detection section of an adaptive filter in accordance with the first embodiment. (a) of FIG. 10 shows pixels which include a target pixel and belong to a reference region. (b) of FIG. 10 shows how to specify an angle in an embodiment.

FIG. 11 explains a first example of a classification process carried out by a region classification section of the adaptive filter in accordance with the first embodiment. (a) of FIG. 11 is a table showing classification carried out in a case where a filter set number is 0 (zero). (b) of FIG. 11 is a table showing the classification carried out in a case where the filter set number is 1. (c) of FIG. 11 is a table showing the classification carried out in a case where the filter set number is 2.

FIG. 12 explains a second example of the classification process carried out by the region classification section of the adaptive filter in accordance with the first embodiment. (a) of FIG. 12 is a table showing the classification carried out in a case where the filter set number is 0. (b) of FIG. 12 is a table showing the classification carried out in a case where the filter set number is 1. (c) of FIG. 12 is a table showing the classification carried out in a case where the filter set number is 2. (d) of FIG. 12 is a table showing the classification carried out in a case where the filter set number is 3.

FIG. 13 explains a third example of the classification process carried out by the region classification section of the adaptive filter in accordance with the first embodiment. (a) of FIG. 13 is a table showing the classification carried out in a case where the filter set number is 0. (b) of FIG. 13 is a table showing the classification carried out in a case where the filter set number is 1. (c) of FIG. 13 is a table showing the classification carried out in a case where the filter set number is 2.

FIG. 14 explains a fourth example of the classification process carried out by the region classification section of the adaptive filter in accordance with the first embodiment. (a) of FIG. 14 is a table showing the classification carried out in a case where the filter set number is 0 (zero). (b) of FIG. 14 is a table showing the classification carried out in a case where the filter set number is 1. (c) of FIG. 14 is a table showing the classification carried out in a case where the filter set number is 2.

FIG. 15 explains a fifth example of the classification process carried out by the region classification section of the adaptive filter in accordance with the first embodiment. (a) of FIG. 15 is a table showing the classification carried out in a case where the filter set number is 0 (zero). (b) of FIG. 15 is a table showing the classification carried out in a case where the filter set number is 1. (c) of FIG. 15 is a table showing the classification carried out in a case where the filter set number is 2. (d) of FIG. 15 is a table showing the classification carried out in a case where the filter set number is 3. (e) of FIG. 15 is a table showing the classification carried out in a case where the filter set number is 4.

FIG. 16 explains a sixth example of the classification process carried out by the region classification section of the adaptive filter in accordance with the first embodiment. (a) of FIG. 16 is a table showing the classification carried out in a case where the filter set number is 0 (zero). (b) of FIG. 16 is a table showing the classification carried out in a case where the filter set number is 1. (c) of FIG. 16 is a table showing the classification carried out in a case where the filter set number is 2. (d) of FIG. 16 is a table showing the classification carried out in a case where the filter set number is 3. (e) of FIG. 16 is a table showing the classification carried out in a case where the filter set number is 4.

FIG. 18 shows another arrangement example of the coded data which is generated by the moving image encoder in accordance with the first embodiment and decoded by the moving image decoder in accordance with the embodiment.

FIG. 19 explains a filter allocation table included in coded data in accordance with the first embodiment. (a) of FIG. 19 is a table showing a first example of the filter allocation table. (b) of FIG. 19 is a table showing a second example of the filter allocation table.

FIG. 20 shows a correspondence between the shape of the reference region to which the adaptive filter in accordance with the first embodiment refers and directionality of an image. (a) of FIG. 20 shows a correspondence between the shape of the reference region and an edge angle. (b) of FIG. 20 shows a correspondence between the shape of the reference region and a prediction mode used for intra prediction.

FIG. 21 is a table showing an example of the classification process which is carried out by the region classification section of the adaptive filter in accordance with the first embodiment in a case where the edge detection section of the adaptive filter detects an edge angle Theta of each unit region in a range of $0 \leq \text{Theta} < 360°$.

FIG. 26 shows syntaxes included in a filter parameter of coded data in accordance with the second embodiment.

FIG. 36 explains a filter process carried out by the adaptive filter in accordance with the second embodiment. (a) of FIG. 36 shows a characteristic value calculation reference region CRR which is composed of pixels provided in a target unit region UR and pixels adjacent to the target unit region UR. (b) of FIG. 36 shows the characteristic value calculation reference region CRR which is composed of pixels provided in the target unit region UR.

FIG. 39 shows syntaxes included in a filter parameter in accordance with a modification of the second embodiment.

FIG. 40 is a table illustrating characteristic value division points which are specified by a syntax alf_num_first_split_minus1 included in the filter parameter in accordance with the modification of the second embodiment.

FIG. 41 shows syntaxes included in a filter parameter of coded data in accordance with a third embodiment.

FIG. 42 explains an adaptive filter in accordance with the third embodiment. (a) of FIG. 42 is a table showing a first characteristic value X and a second characteristic value Y each of which is specified by a syntax alf_select_split_char. (b) of FIG. 42 is a table showing a specific example of subdivision points PY1 through PY3 which are set for each value of the syntax alf_select_split_char. (c) of FIG. 42 is table showing a specific example of the subdivision points PY1 through PY3 which are set in accordance with each value of a syntax alf_second_split_val[k].

DESCRIPTION OF EMBODIMENTS

Embodiment 1

Arrangement of Coded Data

Prior to discussion of a moving image encoder 2 and a moving image decoder 1 which are in accordance with the present embodiment, the following description discusses a data structure of coded data #1 which is generated by the moving image encoder 2 and decoded by the moving image decoder 1. The coded data #1 which is generated by the moving image encoder 2 and decoded by the moving image decoder 1 has a hierarchical structure which is composed of a sequence layer, a GOP (Group of Pictures) layer, a picture layer, a slice layer, and a macroblock layer.

Figure 2:
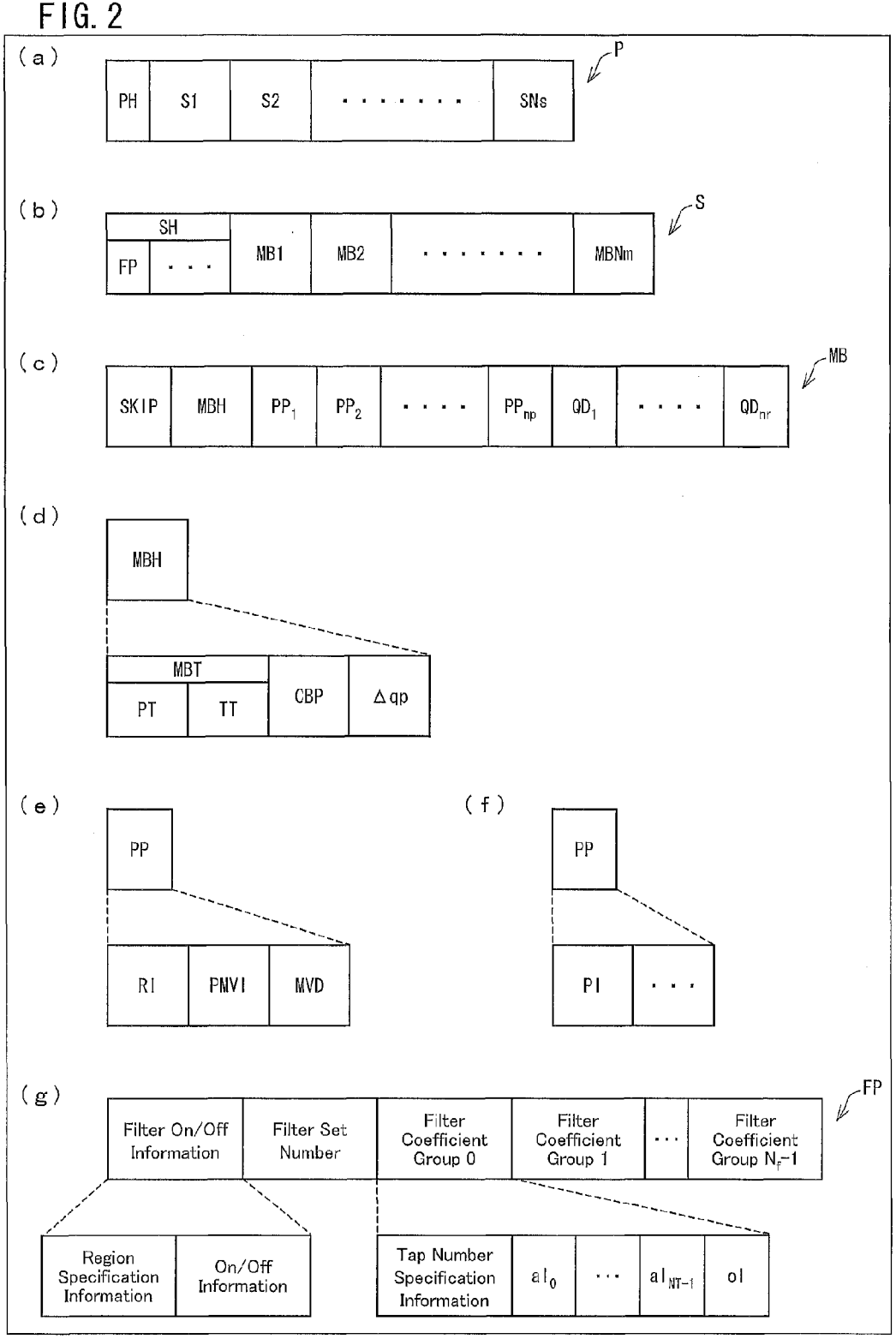
FIG. 2 shows an arrangement example of coded data which is generated by a moving image encoder in accordance with the first embodiment and decoded by a moving image decoder in accordance with an embodiment. (a) of FIG. 2 shows an arrangement of a picture layer of the coded data. (b) of FIG. 2 shows an arrangement of a slice layer included in the picture layer. (c) of FIG. 2 shows a macroblock layer included in the slice layer. (d) of FIG. 2 shows a macroblock header included in the macroblock layer. (e) of FIG. 2 shows an arrangement of a prediction parameter for an inter prediction partition of prediction parameters included in the macroblock layer. (f) of FIG. 2 shows an arrangement of a prediction parameter for an intra prediction partition of the prediction parameters included in the macroblock layer. (g) of FIG. 2 shows an arrangement of a filter parameter included in a slice header.

FIG. 2 shows a structure of coded data for the picture layer and layers below the picture layer. (a) through (g) of FIG. 2 show respective structures of a picture layer P, a slice layer S, a macroblock layer MB, a macroblock header MBH, a prediction parameter PP for an inter prediction partition, a prediction parameter PP for an intra prediction partition, and a filter parameter FP.

The picture layer P is a set of data to which the moving image decoder 1 refers so as to decode a target picture. The picture layer P includes a picture header PH and slice layers $S_1$ through $S_{NS}$ (Ns is a total number of slice layers included in the picture layer P) (see (a) of FIG. 2).

The picture header PH includes an encoding parameter group to which the moving image decoder 1 refers so as to determine a method for decoding the target picture. An encoding parameter included in the picture header PH is exemplified by coding mode information (entoropy_coding_mode_flag) indicative of a mode of variable length coding which mode has been used by the moving image encoder 2 during encoding.

Each of the slice layers S included in the picture layer P is a set of data to which the moving image decoder 1 refers so as to decode a target slice. A slice layer S includes a slice header SH and macroblock layers $MB_1$ through $MB_{Nm}$ (Nm is a total number of macroblocks included in the slice S) (see (b) of FIG. 2).

The slice header SH includes an encoding parameter group to which the moving image decoder 1 refers so as to determine a method for decoding the target slice. An encoding parameter included in the slice header SH is exemplified by (1) slice type specification information (slice_type) for specifying a slice type, (2) POC specification information (such as pic_order_cnt_lbs and delta_pic_order_cnt) for specifying an order in which pictures including the target slice are displayed, and (3) weighting factor specification information (pred_weight_table) for specifying a weighting factor which has been used by the moving image encoder 2 during encoding.

Note that a slice type which can be specified by the slice type specification information is exemplified by (1) an I slice which uses only intra prediction during encoding, (2) a P slice which uses unidirectional prediction or intra prediction during encoding, and (3) a B slice which uses unidirectional prediction, bidirectional prediction, or intra prediction during encoding.

The slice header SH includes the filter parameter FP to which an adaptive filter of the moving image decoder 1 refers. Note here that the adaptive filter of the moving image decoder 1 classifies each of one or more divisional regions (or partitions) included in the target slice or a target macroblock into one of a plurality of types, and carries out a filter process by use of a filter coefficient group which differs in accordance with each of the plurality of types (described later). (g) of FIG. 2 shows a data structure of the filter parameter FP. The filter parameter FP includes filter on/off information, a filter set number, and a filter coefficient group n (n, which is a filter number for discriminating filter coefficient groups, can have values of 0, 1, . . . , Nf−1. Nf is a total number of filter coefficient groups included in the filter parameter FP) (see (g)

of FIG. 2). Note that the partitions refer to units (prediction units) in each of which a predicted image is generated in each of the moving image encoder 2 and the moving image decoder 1. Note also that the one or more divisional regions described above refer to one or more regions which constitute a macroblock and do not overlap with each other and that the moving image encoder 2 determines how each macroblock is divided into the one or more divisional regions.

The filter on/off information includes (1) region specification information for specifying a size and a location of each of the one or more divisional regions of the target slice or each macroblock included in the target slice and (2) on/off information for specifying on/off of the filter process for each of the one or more divisional regions (or each of the partitions).

The filter set number is a number for specifying, for each slice, how to classify the one or more divisional regions (or partitions) included in the target slice or the target macroblock. With reference to the filter set number, the adaptive filter of the moving image decoder 1 can determine into how many types to classify the one or more divisional regions and what filter coefficient group to use in each of the one or more divisional regions which have been classified into the respective types.

A filter coefficient group I (I=0 through Nf−1) includes (1) tap number specification information for specifying a tap number of a filter (or a total number of filter coefficients for each filter coefficient group), (2) filter coefficients $aI_0$ through $aI_{NT-1}$ (NT is a total number of filter coefficients included in the filter coefficient group I), and (3) an offset oI. Note that filter coefficient groups which are given respective different filter numbers are used to carry out the filter process with respect to the one or more divisional regions (or partitions) which have been classified into the respective types that are different from each other. For example, a filter coefficient group 0 is used to carry out the filter process with respect to a divisional region which has been classified as a type A, and a filter coefficient group 1 is used to carry out the filter process with respect to a divisional region which has been classified as a type B that is different from the type A.

Each of the macroblock layers MB included in the slice layer S is a set of data to which the moving image decoder 1 refers so as to decode the target macroblock. A macroblock layer MB includes a skip flag SKIP, a macroblock header MBH, prediction parameters $PP_1$ through $PP_{NP}$, and quantization prediction errors $QD_1$ through $QD_{Nb}$ (see (c) of FIG. 2). Note here that Np refers to the number of types of partitions (prediction units) included in the target macroblock, and Nb refers to the number of types of blocks (transformation units) included in the target macroblock. In a case where the skip flag SKIP has a value of 1, i.e., in a case where the target macroblock is a skip block, the macroblock header MBH, the prediction parameters $PP_1$ through $PP_{NP}$, and the quantization prediction errors $QD_1$ through $QD_{Nb}$ of the macroblock layer are ignored.

The macroblock header MBH includes an encoding parameter to which the moving image decoder 1 refers so as to determine a method for decoding the target macroblock. Specifically, the macroblock header MBH includes macroblock type specification information MBT (mb_type) for specifying a macroblock type of the target macroblock, CBP (coded_block_pattern) for specifying an encoding block pattern, and a quantization parameter difference Δqp (mb_qp_delta) for specifying a size of a quantization step (see (d) of FIG. 2). The macroblock type specification information MBT includes prediction unit specification information PT and transformation unit specification information TT.

The prediction unit specification information PT specifies a pattern of division of the target macroblock into partitions (prediction units) (i.e., a size of each of the partitions included in the target macroblock and a location of the each of the partitions in the target macroblock), and a prediction method (such as L0 unidirectional prediction, L1 unidirectional prediction, bidirectional prediction, or intra prediction) used by the moving image encoder 2 to generate a predicted image in each of the partitions. The each of the partitions can have a size which is selected from, for example, 16×16 pixels, 8×8 pixels, 4×4 pixels, 16×8 pixels, 8×16 pixels, 8×4 pixels, 4×8 pixels, 8×1 pixels, and 1×8 pixels. More commonly, the each of the partitions can be a region having a size of M×N pixels (M is an integer which is not more than the number of pixels located in a transverse direction of the target macroblock, and N is an integer which is not more than the number of pixels located in a longitudinal direction of the target macroblock).

The transformation unit specification information TT specifies a pattern of division of the target macroblock into blocks (transformation units) (i.e., a size of each of the blocks included in the target macroblock and a location of the each of the blocks in the target macroblock). The each of the blocks can have a size which is selected from, for example, 16×16 pixels, 8×8 pixels, 4×4 pixels, 16×8 pixels, 8×16 pixels, 8×4 pixels, 4×8 pixels, 8×1 pixels, and 1×8 pixels. More commonly, the each of the blocks can be a region having a size of M'×N' pixels (M' is an integer which is not more than the number of pixels located along a side in one direction of the target macroblock, and N' is an integer which is not more than the number of pixels located along a side in the other direction of the target macroblock).

Note that the above description gives an example of a partition obtained assuming that a macroblock is a square region having a size of 16×16 pixels. However, a partition or a block is not limited to this. For example, for a macroblock having a size of 64×64 pixels, a square region having a size of 64×64 pixels or 32×32 pixels, or a rectangular region having a size of 64×32 pixels, 32×64 pixels, 32×16 pixels, or 16×32 pixels is also acceptable as a partition or a block.

The quantization parameter difference Δqp is a difference of (qp−qp') between a quantization parameter qp for the target macroblock and a quantization parameter qp' for a macroblock which has been encoded immediately before the target macroblock.

Each of quantization prediction residuals $QD_n$ included in the macroblock layer MB is coded data generated from the following Processes 1 through 3 carried out by the moving image encoder 2 with respect to a target block. Process 1: The moving image encoder 2 carries out a DCT (Discrete Cosine Transform) with respect to a prediction residual obtained by subtracting a predicted image from an encoding target image. Process 2: The moving image encoder 2 quantizes a DCT coefficient obtained in Process 1. Process 3: The moving image encoder 2 carries out variable length coding with respect to the DCT coefficient quantized in Process 2. The quantization parameter qp (described earlier) refers to a size of a quantization step QP ($QP=2^{pq/6}$) which is used by the moving image encoder 2 to quantize the DCT coefficient.

Of the prediction parameters PP included in the macroblock layer MB, the prediction parameter PP for the inter prediction partition in which a predicted image is generated by inter prediction includes a reference image index RI, an estimated motion vector index PMVI, and a motion vector residual MVD (see (e) of FIG. 2).

The motion vector residual MVD is coded data generated from the following Processes 4 through 6 carried out by the moving image encoder 2. Process 4: The moving image encoder 2 selects a locally decoded image which has been encoded/decoded (more accurately, an image which is obtained by carrying out a deblock process and an adaptive filter process with respect to the locally decoded image which has been encoded/decoded), and derives a motion vector my with respect to a target partition with reference to the selected locally decoded image which has been encoded/decoded (hereinafter also referred to as a "reference image"). Process 5: The moving image encoder 2 selects an estimation method, and uses the selected estimation method to derive an estimated value of the motion vector my (hereinafter also referred to as an "estimated motion vector") pmv which is allocated to the target partition. Process 6: The moving image encoder 2 encodes the motion vector residual MVD obtained by subtracting, from the motion vector my derived in Process 4, the estimated motion vector pmv derived in Process 5.

The reference image index RI (described earlier) specifies the locally decoded image (reference image) which has been encoded/decoded and selected in Process 4, and the estimated motion vector index PMVI (described earlier) specifies the estimation method selected in Process 5. The estimation method selectable in Process 5 is exemplified by (1) a method for causing a median of a motion vector allocated to a partition which is adjacent to the target partition (hereinafter also referred to as an "adjacent partition") to be the estimated motion vector pmv in the locally decoded image which is being encoded/decoded (more accurately, an image obtained by carrying out the deblock process and the adaptive filter process with respect to a decoded region of the locally decoded image which is being encoded/decoded) and (2) a method for causing a motion vector allocated to a partition which occupies a position occupied by the target partition (frequently referred to as a "collocated partition") to be the estimated motion vector pmv in the locally decoded image which has been encoded/decoded.

Note that the prediction parameter PP for a partition in which unidirectional prediction is carried out includes one (1) reference image index RI, one (1) estimated motion vector index PMVI, and one (1) motion vector residual MVD. Meanwhile, the prediction parameter PP for a partition in which bidirectional prediction (weighed prediction) is carried out includes two reference image indices RI1 and RI2, two estimated motion vector indices PMVI1 and PMVI2, and two motion vector residuals MVD1 and MVD2.

Of the prediction parameters PP included in the macroblock layer MB, the prediction parameter PP for the intra prediction partition in which a predicted image is generated by intra prediction includes a prediction index PI (see (f) of FIG. 2). Note here that the prediction index PI is an index for specifying an intra prediction method (prediction mode) for the target partition. Note that a type of prediction mode which is selectable for the target partition differs in accordance with a size of the target partition. Therefore, a range of values which the prediction index can have also differs in accordance with the size of the target partition.

Figure 3:
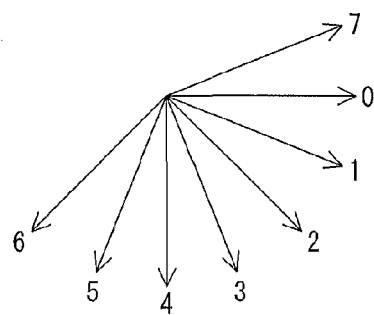
FIG. 3 explains a prediction mode which is a prediction parameter used for intra prediction. (a) of FIG. 3 is a correspondence table showing a correspondence between a prediction index PI and a prediction mode for each partition size. (b) of FIG. 3 shows prediction directions corresponding to respective directional predictions 0 through 7 of a plurality of prediction modes.

(a) of FIG. 3 is a correspondence table showing a correspondence between the prediction index PI and the prediction mode for each partition size. Prediction modes are given respective prediction mode numbers 0 through 11 (see (a) of FIG. 3). The prediction index PI is a relative number whose meaning differs in accordance with a partition size, whereas a prediction mode number is a unique number which is independent of the partition size. The prediction modes can be discriminated from each other by the respective prediction mode numbers (hereinafter a prediction mode whose prediction mode number is A is referred to as a prediction mode A). In a case where a partition has a size of 16×16 pixels, the prediction index PI has a value of any one of 0, 1, 2, 3, and 4 (see (a) of FIG. 3). For the partition having a size of 16×16 pixels, the prediction index 0 corresponds to the prediction mode 0 (a DC prediction), the prediction index 1 corresponds to the prediction mode 1 (a planar prediction), the prediction index 2 corresponds to the prediction mode 2 (a directional prediction 0), and the prediction index 3 corresponds to the prediction mode 6 (a directional prediction 4). Also in a case where a partition has a size of 8×8 pixels, 4×4 pixels, 8×1 pixels, or 1×8 pixels, the prediction index PI for each partition size is associated with a corresponding one of the prediction modes (see (a) of FIG. 3).

The moving image decoder 1, which stores the correspondence table (see (a) of FIG. 3) in a memory thereof, can specify, by use of a size of a target partition and a prediction index, a prediction mode to be allocated to the target partition.

Note that the moving image encoder 2 which generates the coded data #1 may be arranged to calculate an estimated value of a prediction index for a target partition in accordance with a prediction index for a partition in a vicinity of the target partition and cause the coded data #1 to include a flag indicative of whether or not the estimated value and the prediction index for the target partition are identical. Such an arrangement allows omission of encoding of the prediction index for the target partition in a case where the estimated value and the prediction index for the target partition are identical.

(Moving Image Decoder 1)

The moving image decoder 1 in accordance with the present embodiment is described below with reference to FIG. 1 through FIG. 21. The moving image decoder 1 is a decoding apparatus which partially includes techniques employed in H.264/MPEG-4.AVC and KTA software.

Figure 1:
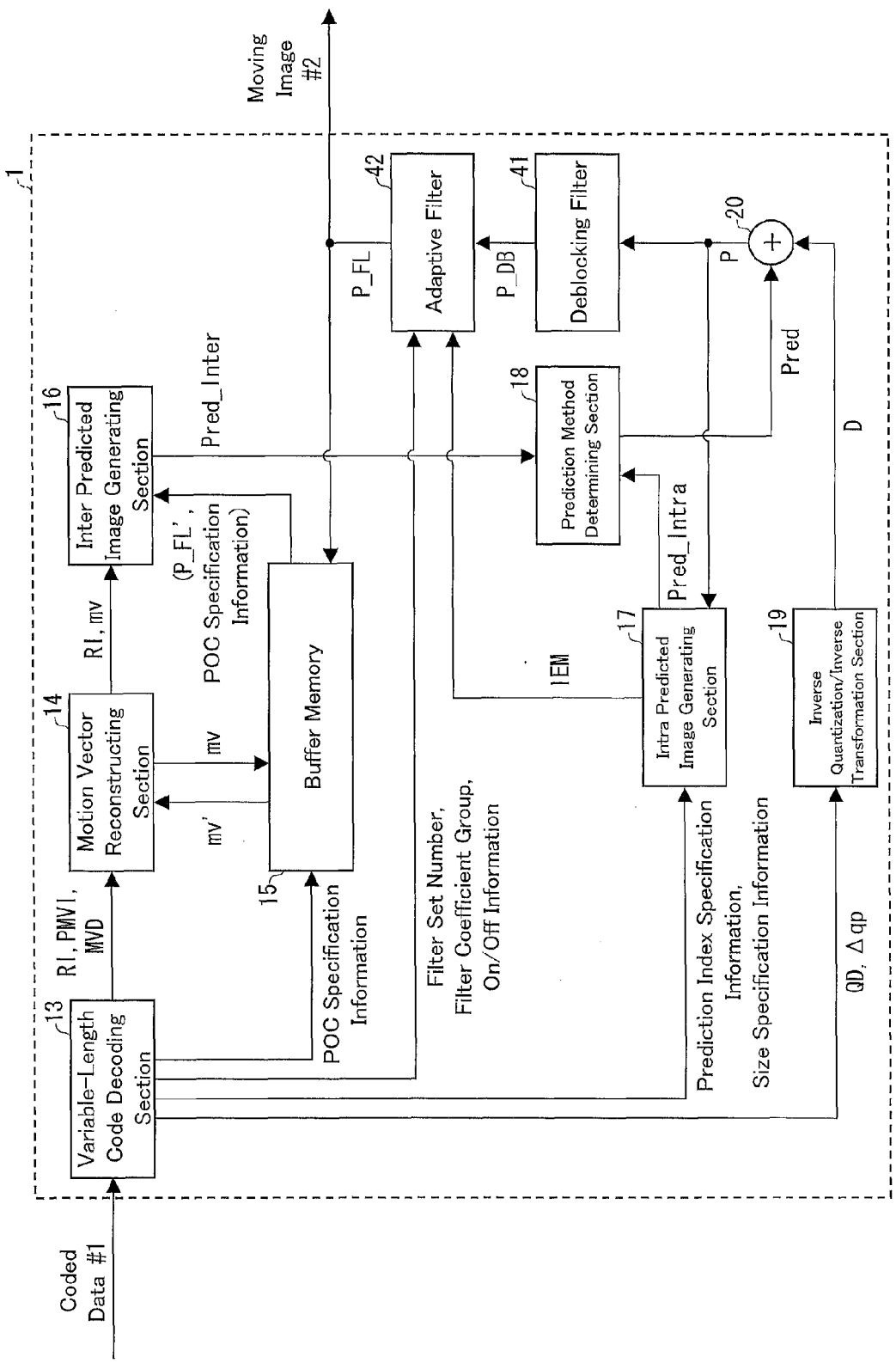
FIG. 1 is a block diagram showing an arrangement of a moving image decoder in accordance with a first embodiment of the present invention.

FIG. 1 is a block diagram showing an arrangement of the moving image decoder 1. The moving image decoder 1 includes a variable-length code decoding section 13, a motion vector reconstructing section 14, a buffer memory 15, an inter predicted image generating section 16, an intra predicted image generating section 17, a prediction method determining section 18, an inverse quantization/inverse transformation section 19, an adder 20, a deblocking filter 41, and an adaptive filter 42. The moving image decoder 1 is an apparatus for generating a moving image #2 by decoding the coded data #1.

The variable-length code decoding section 13 decodes, from the coded data #1, a prediction parameter PP for each partition. Namely, for an inter prediction partition, the variable-length code decoding section 13 decodes, from the coded data #1, a reference image index RI, an estimated motion vector index PMVI, and a motion vector residual MVD, and supplies these to the motion vector reconstructing section 14. For an intra prediction partition, the variable-length code decoding section 13 decodes, from the coded data #1, (1) size specification information for specifying a partition size and (2) prediction index specification information for specifying a prediction index, and supplies these to the intra predicted image generating section 17. The variable-length code decoding section 13 also decodes a macroblock type MBT from the coded data, and supplies this to the prediction method determining section 18 (not illustrated). The variable-length code decoding section 13 also decodes, from the coded data #1, a quantization prediction residual QD for each block and a quantization parameter difference Δqp for a macroblock including the each block, and supplies these to the inverse quantization/inverse transformation section 19. The variable-length code decoding section 13 also decodes, from the coded data #1, filter on/off information, a filter set number, and a filter coefficient group, and supplies these to the adaptive filter 42.

The motion vector reconstructing section 14 reconstructs a motion vector my for each inter prediction partition from a motion vector residual MVD for a first partition and a reconstructed motion vector mv' for a second partition. Specifically, the motion vector reconstructing section 14 (1) derives an estimated motion vector pmv from the reconstructed motion vector mv' in accordance with an estimation method specified by an estimated motion vector index PMVI, and (2) obtains the motion vector my by adding the derived estimated motion vector pmv and the motion vector residual MVD. Note that the reconstructed motion vector mv' for the second partition can be read out from the buffer memory 15. The motion vector reconstructing section 14 supplies, to the inter predicted image generating section 17, the reconstructed motion vector my together with a corresponding reference image index RI. Note also that for an inter prediction partition in which bidirectional prediction (weighed prediction) is carried out, the motion vector reconstructing section 14 supplies, to the inter predicted image generating section 17, two reconstructed motion vectors mv1 and mv2 together with respective reference image indices RI1 and RI2.

The inter predicted image generating section 16 generates a motion compensated image mc for each inter prediction partition. Specifically, the inter predicted image generating section 16 uses the motion vector my supplied from the motion vector reconstructing section 14, and generates the motion compensated image mc from a filtered decoded image P_FL' which is specified by the reference image index RI supplied from the motion vector reconstructing section 14. Note here that the filtered decoded image P_FL' is obtained by subjecting a decoded image, which has already been decoded, to a deblock process carried out by the deblocking filter 41 and an adaptive filter process carried out by the adaptive filter 42. The inter predicted image generating section 16 can read out, from the buffer memory 15, a pixel value of each pixel constituting the filtered decoded image P_FL'. The motion compensated image mc generated by the inter predicted image generating section 16 is supplied as an inter predicted image Pred_Inter to the prediction method determining section 18. Note that for the inter prediction partition in which bidirectional prediction (weighed prediction) is carried out, the inter predicted image generating section 16 (1) uses the motion vector mv1 to generate a motion compensated image mc1 from a filtered decoded image P_FL1' specified by the reference image index RI1, (2) uses the motion vector mv2 to generate a motion compensated image mc2 from a filtered decoded image P_FL2' specified by the reference image index RI2, and (3) generates the inter predicted image Pred_Inter by adding an offset value to a weighed average of the motion compensated image mc1 and the motion compensated image mc2.

The intra predicted image generating section 17 generates a predicted image Pred_Intra for each intra prediction partition. Specifically, first, with reference to the correspondence table (see (a) of FIG. 3) recorded in a memory of the intra predicted image generating section 17, the intra predicted image generating section 17 specifies a prediction mode in accordance with the size specification information and the prediction index specification information which have been supplied from the variable-length code decoding section 13. Then, for example, in an order in which raster scanning is carried out, the intra predicted image generating section 17 allocates the specified prediction mode for a target partition. Subsequently, in accordance with a prediction method indicated by the prediction mode, the intra predicted image generating section 17 generates the predicted image Pred_Intra from a decoded image P. The intra predicted image Pred_Intra generated by the intra predicted image generating section 17 is supplied to the prediction method determining section 18.

The intra predicted image generating section 17 also supplies, to the adaptive filter 42, a size of the target partition and intra coding mode information IEM indicative of the prediction mode allocated to the target partition. Note that, since a specific process in which the intra predicted image generating section 17 generates the intra predicted image Pred_Intra is described later, an explanation thereof is omitted here.

The prediction method determining section 18 determines, in accordance with the macroblock type MBT, whether each partition is an inter prediction partition in which inter prediction is supposed to be carried out or an intra prediction partition in which intra prediction is supposed to be carried out. In a case where the each partition is the inter prediction partition, the prediction method determining section 18 supplies, as a predicted image Pred to the adder 20, the inter predicted image Pred_Inter generated by the inter predicted image generating section 16. In a case where the each partition is the intra prediction partition, the prediction method determining section 18 supplies, as the predicted image Pred to the adder 20, the intra predicted image Pred_Intra generated by the intra predicted image generating section 17.

The inverse quantization/inverse transformation section 19 (1) inversely quantizes the quantization prediction residual QD, (2) subjects a DCT coefficient obtained by the inverse quantization to an inverse DCT (Discrete Cosine Transform), and (3) supplies, to the adder 20, a prediction residual D obtained by the inverse DCT. Note that, in order to inversely quantize the quantization prediction residual QD, the inverse quantization/inverse transformation section 19 derives a quantization step QP from the quantization parameter difference $\Delta qp$ supplied from the variable-length code decoding section 13. A quantization parameter qp can be derived by adding the quantization parameter difference $\Delta qp$ to a quantization parameter qp' for a macroblock that has been subjected to the inverse quantization and the inverse DCT immediately before a macroblock to which the quantization parameter qp is related. The quantization step QP can be derived from the quantization step qp based on $QP=2^{pq/6}$. Note that the inverse quantization/inverse transformation section 19 generates the prediction residual D per block (transformation unit).

The adder 20 generates the decoded image P by adding the predicted image Pred supplied from the prediction method determining section 18 and the prediction residual D supplied from the inverse quantization/inverse transformation section 19.

In a case where a difference between respective pixel values of pixels which are adjacent to each other via a block boundary or a macroblock boundary in the decoded image P is smaller than a predetermined threshold value, the deblocking filter 41 carries out a deblocking process with respect to the block boundary or the macroblock boundary in the decoded image P, so as to carry out image smoothing with respect to a vicinity of the block boundary or the macroblock boundary. An image which has been subjected to the deblocking process carried out by the deblocking filter 41 is supplied as a deblocked decoded image P_DB to the adaptive filter 42.

The adaptive filter 42 generates a filtered decoded image P_FL by subjecting the deblocked decoded image P_DB supplied from the deblocking filter 41 to a filter process which uses a filter coefficient decoded from the coded data #1. An image which has been subjected to the filter process carried out by the adaptive filter 42 is supplied as the filtered decoded image P_FL to an outside, and is stored in the buffer memory 15 so that the image is associated with POC specification information decoded from the coded data by the variable-length code decoding section 13. Since a specific arrangement of the adaptive filter 42 is described later, an explanation thereof is omitted here.

(Process in which Intra Predicted Image Generating Section 17 Generates Intra Predicted Image)

Figure 4:
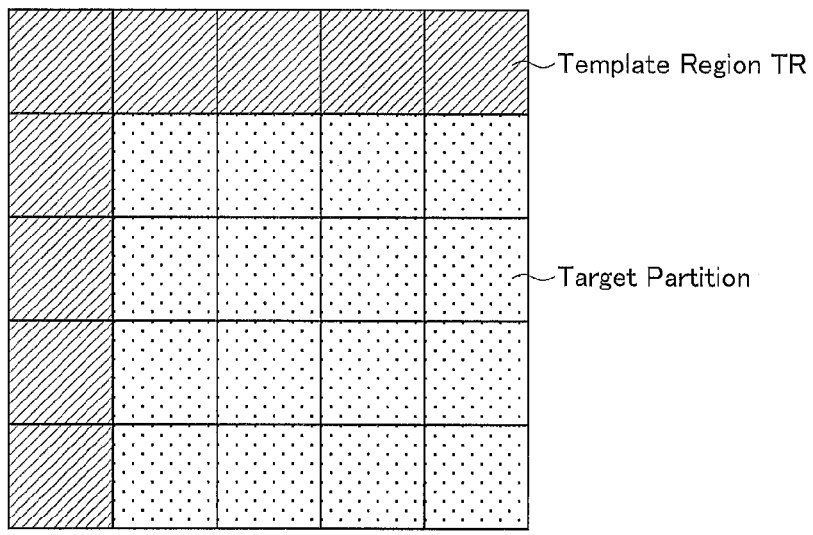
FIG. 4 explains a process in which an intra prediction generating section of a moving image decoder in accordance with the first embodiment generates an intra predicted image. (a) of FIG. 4 shows pixels provided in a target partition having a size of 4×4 pixels and pixels located in a vicinity of the target partition. (b) of FIG. 4 shows pixels provided in a target partition having a size of 4×4 pixels, and a template region set in a vicinity of the target partition.

The following description discusses, with reference to FIG. 3 and FIG. 4, a process in which the intra predicted image generating section 17 generates the intra predicted image Pred_Intra.

The intra predicted image generating section 17 uses a pixel value of each pixel that constitutes the decoded image P and belongs to a block which has been decoded, and generates the intra predicted image Pred_Intra for a target partition by an intra prediction method specified by a prediction mode allocated to the target partition.

Prediction modes can be discriminated from each other by respective prediction mode numbers. According to the present embodiment, prediction modes (a DC prediction, a planar prediction, directional predictions 0 through 7, a TM prediction, and a scale prediction) (see (a) of FIG. 3) are selectable. Each of the directional predictions 0 through 7 shows a prediction method for generating a predicted image of a target partition by extrapolating, in a given direction (prediction direction), a pixel value of a pixel which is located in a vicinity of the target partition and has been decoded. (b) of FIG. 3 shows prediction directions corresponding to the respective directional predictions 0 through 7. The directional predictions 0 through 7 show that a predicted image is generated by extrapolating, in respective directions of 0°, 22.5°, 45°, 67.5°, 90°, 112.5°, 135°, and −22.5°, a pixel value of a pixel which is located in a vicinity of a target partition and has been decoded. Note that these angles are expressed assuming that a horizontal rightward direction is 0° and the angles increase clockwise (same applies to the following description).

The following description discusses, with reference to (a) of FIG. 4, the DC prediction and the directional predictions 0 through 7 for a target partition having a size of 4×4 pixels. (a) of FIG. 4 shows pixels (prediction target pixels) provided in a target partition having a size of 4×4 pixels and pixels (reference pixels) located in a vicinity of the target partition. It is assumed that each of a prediction target pixel and a reference pixel is specified by coordinates (x, y) (see (a) of FIG. 4). It is assumed here that each of the prediction target pixels is specified by coordinates (x, y) which satisfy x=0 through 3 and y=0 through 3 and that each of the reference pixels is specified by coordinates (x, −1) which satisfy x=−1 through 7 or coordinates (−1, y) which satisfy y=0 through 3. Note that a pixel value of a prediction target pixel at coordinates (x, y) is represented by pred4×4[x,y] and a pixel value of a reference pixel at coordinates (x, y) is represented by p[x,y]. Note also that it is assumed that each of the reference pixels has been decoded.

(DC Prediction: Prediction Mode Number 0)

In a case where the prediction mode allocated to the target partition is the DC prediction, the intra predicted image generating section 17 generates a pixel value of a prediction target pixel by obtaining an average value of respective pixel values of reference pixels which are adjacent to an upper side or a left side of the target partition. More specifically, the intra predicted image generating section 17 generates the pixel value pred[x,y] of the prediction target pixel based on, for example, the following equation:

$$\text{pred4×4}[x,y]=(p[0,-1]+p[1,-1]+p[2,-1]+p[3,-1]+p[-1,0]+p[-1,1]+p[-1,2]+p[-1,3]+4)>>3$$

Note here that >> denotes right shift operation and a value of a>>b is equal to a value obtained by disregarding fractions of a value obtained by dividing a by $2^b$. Note also that << denotes left shift operation and a value of a<<b is equal to a value obtained by multiplying a by $2^b$. Note that the present prediction mode corresponds to a DC prediction mode of H.264/MPEG-4.AVC standards.

(Directional Prediction 0: Prediction Mode Number 2)

In a case where the prediction mode for the target partition is the directional prediction 0, the intra predicted image generating section 17 generates a pixel value of a prediction target pixel by extrapolating a pixel value of a reference pixel in the horizontal rightward direction. More specifically, the intra predicted image generating section 17 generates the pixel value pred4×4[x,y] of the prediction target pixel based on, for example, the following equation:

$$\text{pred4×4}[x,y]=p[-1,y], (x,y=0\ldots3)$$

Note that the present prediction mode corresponds to a Horizontal prediction mode of the H.264/MPEG-4.AVC standards.

(Directional Prediction 1: Prediction Mode Number 3)

In a case where the prediction mode for the target partition is the directional prediction 1, the intra predicted image generating section 17 generates a pixel value of a prediction target pixel by extrapolating a pixel value of a reference pixel in the direction of 22.5°. More specifically, the intra predicted image generating section 17 generates pred4×4[x,y] based on, for example, the following equations:

$$\text{pred4×4}[x,y]=(p[-1,y-(x-1)-1]+p[-1,y-(x-1)]+1)-1,$$
(in a case where zHD=0,2,4,6)

$$\text{pred4×4}[x,y]=(p[-1,y-(x>>1)-2]+2*p[-1,y-(x>>1)-1]+p[-1,y-(x>>1)]+2)>>2, \text{(in a case where } zHD=1,3,5)$$

$$\text{pred4×4}[x,y]=(p[-1,0]+2*p[-1,-1]+p[0,-1]+2)-2,$$
(in a case where zHD=−1)

$$\text{pred4×4}[x,y]=(p[x-1,-1]+2*p[x-2,-1]+p[x-3,-1]+2)>>2 \text{ (in a case where } zHD=-2,-3)$$

Note here that zHD is defined as zHD=2*y−x. Note also that a symbol * is an operation symbol indicative of multiplication (same applies to the following description). Note that the present prediction mode corresponds to a Horizontal down prediction mode of the H.264/MPEG-4.AVC standards.

(Directional Prediction 2: Prediction Mode Number 4)

In a case where the prediction mode for the target partition is the directional prediction 2, the intra predicted image generating section 17 generates a pixel value of a prediction target pixel by extrapolating a pixel value of a reference pixel in the direction of 45°. More specifically, the intra predicted image generating section 17 generates pred4×4[x,y] based on, for example, the following equations:

$$\text{pred4×4}[x,y]=(p[x-y-2,-1]+2*p[x-y-1,-1]+p[x-y,-1]+2)>>2, \text{(in a case where } x>y)$$

$$\text{pred4×4}[x,y]=(p[-1,y-x-2]+2*p[-1,y-x-1]+p[-1,y-x]+2)>>2, \text{(in a case where } x<y)$$

$$\text{pred4×4}[x,y]=(p[0,-1]+2*p[-1,-1]+p[-1,0]+2)>>2,$$
(in a case where x=y)

Note that the present prediction mode corresponds to a Diagonal down-right prediction mode of the H.264/MPEG-4.AVC standards.

(Directional Prediction 3: Prediction Mode Number 5)

In a case where the prediction mode for the target partition is the directional prediction 3, the intra predicted image generating section 17 generates a pixel value of a prediction target pixel by extrapolating a pixel value of a reference pixel in the direction of 67.5°. More specifically, the intra predicted image generating section 17 generates pred4×4[x,y] based on, for example, the following equations:

pred4×4[x,y]=(p[x−(y>>1)−1,−1]+p[x−(y>>1),−1]+1)>>1, (in a case where zVR=0,2,4,6)

pred4×4[x,y]=(p[x−(y>>1)−2,−1]+2*p[x−(y>>1)−1,−1]+p[x−(y>>1),−1]+2)>>2, (in a case where zVR=1,3,5)

pred4×4[x,y]=(p[−1,0]+2*p[−1,−1]+p[0,−1]+2)>>2, (in a case where zVR=−1)

pred4×4[x,y]=(p[−1,y−1]+2*p[−1,y−2]+p[−1,y−3]+2)>>2, (in a case where zVR=−2,−3)

Note here that zVR is defined as zVR=2*x−y. Note that the present prediction mode corresponds to a Vertical right prediction mode of the H.264/MPEG-4.AVC standards.

(Directional Prediction 4: Prediction Mode Number 6)

In a case where the prediction mode for the target partition is the directional prediction 4, the intra predicted image generating section 17 generates a pixel value of a prediction target pixel by extrapolating a pixel value of a reference pixel in a vertical downward direction. More specifically, the intra predicted image generating section 17 generates pred4×4[x, y] based on, for example, the following equation:

pred4×4[x,y]=p[x,−1], (x,y=0 . . . 3)

Note that the present prediction mode corresponds to a Vertical prediction mode of the H.264/MPEG-4.AVC standards.

(Directional Prediction 5: Prediction Mode Number 7)

In a case where the prediction mode for the target partition is the directional prediction 5, the intra predicted image generating section 17 generates a pixel value of a prediction target pixel by extrapolating a pixel value of a reference pixel in the direction of 112.5°. More specifically, the intra predicted image generating section 17 generates pred4×4[x,y] based on, for example, the following equations:

pred4×4[x,y]=(p[x+(y>>1),−1]+p[x+(y>>1)+1,−1]+1)>>1, (in a case where y=0,2)

pred4×4[x,y]=(p[x+(y>>1),−1]+2*p[x+(y>>1)+1,−1]+p[x+(y>>1)+2,−1]+2)>>2, (in a case where y=1,3)

Note that the present prediction mode corresponds to a Vertical left prediction mode of the H.264/MPEG-4.AVC standards.

(Directional Prediction 6: Prediction Mode Number 8)

In a case where the prediction mode for the target partition is the directional prediction 6, the intra predicted image generating section 17 generates a pixel value of a prediction target pixel by extrapolating a pixel value of a reference pixel in the direction of 135°. More specifically, the intra predicted image generating section 17 generates pred4×4[x,y] based on, for example, the following equations:

pred4×4[x,y]=(p[6,−1]+3*p[7,−1]+2)>>2, (in a case where x=3,y=3)

pred4×4[x,y]=(p[x+y,−1]+2*p[x+y+1,−1]+p[x+y+2,−1]+2)>>2, (in a case where x≠3,y≠3)

Note that the present prediction mode corresponds to a Diagonal down left prediction mode of the H.264/MPEG-4.AVC standards.

(Directional Prediction 7: Prediction Mode Number 9)

In a case where the prediction mode for the target partition is the directional prediction 7, the intra predicted image generating section 17 generates a pixel value of a prediction target pixel by extrapolating a pixel value of a reference pixel in the direction of −22.5°. More specifically, the intra predicted image generating section 17 generates pred4×4[x,y] based on, for example, the following equations:

pred4×4[x,y]=(p[−1,y+(x>>1)]+p[−1,y+(x>>1)+1]+1)>>1, (in a case where zHU=0,2,4)

pred4×4[x,y]=(p[−1,y+(x>>1)]+2*p[−1,y+(x>>1)+1]+p[−1,y+(x>>1)+2]+2)>>2, (in a case where zHU=1,3)

pred4×4[x,y]=(p[−1,2]+3*p[−1,3]+2)>>2, (in a case where zHU=5)

pred4×4[x,y]=p[−1,3], (in a case where zHU>5)

Note here that zHU is defined as zHU=x+2*y. Note that the present prediction mode corresponds to a Horizontal up prediction mode of the H.264/MPEG-4.AVC standards.

The above description discusses the DC prediction and the directional predictions 0 through 7 for the target partition having a size of 4×4 pixels. In a case where the intra predicted image generating section 17 extrapolates a pixel value of a reference pixel in each of the directions, a pixel value of each pixel provided also in the target partition having a size other than 4×4 pixels can be generated by a method substantially identical to a method described above.

Subsequently, the following description discusses the planar prediction, the TM (template matching) prediction, and the scale prediction each of which is carried out by the intra predicted image generating section 17.

(Planar Prediction: Prediction Mode Number 1)

The planar prediction is a prediction mode which is selectable in a case where the target partition has a size of 16×16 pixels. In a case where the prediction mode for the target partition is the planar prediction, the intra predicted image generating section 17 uses a pixel value of a reference pixel which is adjacent to the target partition and has been decoded, and generates, by planar prediction, a pixel value of each pixel provided in the target partition.

The following description assumes that each pixel provided in the target partition having a size of 16×16 pixels is specified by coordinates (x, y) (x=0 through 15, y=0 through 15). Note that the following description also assumes that a pixel provided at the upper left in the target partition has coordinates of (0, 0) and a pixel provided in a more rightward direction of the target partition has a larger x and a pixel provided in a more downward direction of the target partition has a larger y. Note also that coordinates of a reference pixel which is adjacent to an upper side of the target partition and has been decoded are represented by (x, −1) and a pixel value of the reference pixel is represented by P (x, −1) (x=0 through 15) and that coordinates of a reference pixel which is adjacent to a left side of the target partition and has been decoded are represented by (−1, y) and a pixel value of the reference pixel is represented by P (−1, y) (y=0 through 15). Note also that a pixel value of a pixel specified by coordinates (x, y) in the target partition is represented by pred_P(x,y).

(First Example of Planar Prediction)

In a case where the prediction mode for the target partition is the planar prediction, the intra predicted image generating section 17 generates the pixel value pred_P(x,y) for the target partition based on, for example, the following equation:

$$\text{pred\_}P(x,y)=((15-y)*TR(x)+(y+1)*BR(x)\pm(15-x)*LC(y)+(x+1)*RC(y)+16)/32 \ (x,y=0\ldots15)$$

Note here that $$TR(x)=P(x,-1), (x=0\ldots15),$$

$$LC(y)=P(-1,y), (y=0\ldots15),$$

$$BR(x)=((15-x)*LC(15)+(x+1)*BRS+8)/16, (x=0\ldots15),$$

$$RC(y)=((15-y)*TR(15)+(y+1)*BRS+8)/16, (y=0\ldots15), \text{ and}$$

$$BRS=DC+planar\_delta\_y \text{ where } DC \text{ denotes a pixel value generated by the } DC \text{ prediction.}$$

(Second Example of Planar Prediction)

The intra predicted image generating section 17 may also be arranged to calculate the pixel value pred_P(x,y) for the target partition based on, for example, the following equation:

$$\text{pred\_}P[x,y]=Clip1Y((a+b*(x-7)+c*(y-7)+16)>>5), (x,y=0\ldots15)$$

Note here that $$a=16*(p[-1,15]+p[15,-1]),$$

$$b=(5*H+32)>>6,$$

$$c=(5*V+32)>>6,$$

$$H=\Sigma\_x'\{(x'+1)*(p[8+x',-1]-p[6-x',-1])\}, \text{ and}$$

$$V=\Sigma\_y'\{(y'+1)*(p[-1,8+y']-p[-1,6-y'])\}.$$

Note that in the above equations, $\Sigma\_x'\{\ldots\}$ represents a sum total of x'=0 through x'=7 for the expression in { } and $\Sigma\_y'\{\ldots\}$ represents a sum total of y'=0 through x'=7 for the expression in { }. Note also that Clip1Y is defined as the following equation:

$$Clip1Y(x)=Clip3(0,(1<<BitDepthY)-1,x)$$

Clip1Y is a clip function in which Clip3(a,b,c) has a value a in a case where c<a, has a value b in a case where c>b, and has a value c in the other cases. Note also that BitDepthY has a value determined in accordance with a bit depth. Note that the present example corresponds to an Intra_16x16_Plane prediction mode of the H.264/MPEG-4.AVC standards.

(TM Prediction: Prediction Mode Number 10)

Subsequently, the following description discusses the TM prediction with reference to (b) of FIG. 4.

The TM prediction is a prediction mode which is selectable in a case where the target partition has a size of 4×4 pixels. In a case where the prediction mode for the target partition is the TM prediction, the intra predicted image generating section 17 sets a template region in a vicinity of the target partition, searches the decoded image P which has been decoded (or the filtered decoded image P_FL) for a region which is the most similar to the template region, and sets a pixel value of each pixel provided in a region in a vicinity of the region thus found to a pixel value of each pixel provided in the target partition.

More specifically, the intra predicted image generating section 17 carries out, for example, the following process in a case where the TM prediction is selected for the target partition.

(Step S101)

First, the intra predicted image generating section 17 sets, to a template region TR, an inverted-L-shaped region constituted by pixels which are adjacent to a left side or an upper side of the target partition and pixels which share a vertex at the upper left of the target partition.

(Step S102)

Subsequently, the intra predicted image generating section 17 searches the decoded image P which has been decoded (or the filtered decoded image P_FL) for a reference region RR which is identical in shape and the most similar to the template region TR. Note here that the search for the reference region RR can be carried out by, for example, evaluating a sum of absolute differences between pixel values.

(Step S103)

Finally, a pixel value of each pixel provided in a region that has a size of 4×4 pixels and has an upper side and a left side each of which is in contact with the reference region RR is set to a pixel value of each corresponding pixel provided in the target partition.

(Scale Prediction: Prediction Mode Number 11)

Subsequently, the following description discusses the scale prediction.

The scale prediction is a prediction mode which is selectable in a case where the target partition has a size of 16×16 pixels. In a case where the scale prediction is selected for the target partition, the intra predicted image generating section 17 (1) generates image data of a reduced image by subjecting a quantization coefficient for the reduced image to inverse quantization and frequency transformation, the reduced image having been down-sampled by a moving image encoder, and (2) generates a predicted image for the target partition by adding (i) an average value of respective pixel values of pixels provided in a partition in a vicinity of the target partition and (ii) the image data of the reduced image, and then carrying out up sampling.

More specifically, the intra predicted image generating section 17 carries out, for example, the following process in a case where the scale prediction is selected for the target partition.

(Step S201)

First, the intra predicted image generating section 17 decodes a quantization coefficient Fsr which is transmitted from a moving image encoder and is obtained by subjecting residual data to frequency transformation and quantization, the residual data being a difference between (i) image data obtained by down-sampling the target partition having a size of 16×16 pixels to a partition having a size of 4×4 pixels and (ii) an average value of respective pixel values of pixels provided in a partition in a vicinity of the target partition.

(Step S202)

Next, the intra predicted image generating section 17 calculates a predicted value d by obtaining an average value of respective pixel values of pixels provided in a partition in a vicinity of the target partition.

(Step S203)

Subsequently, the intra predicted image generating section 17 generates residual data B'sr of 4×4 pixels by carrying out inverse quantization and inverse frequency transformation with respect to the quantization coefficient which has been decoded at step S201.

(Step S204)

Then, the intra predicted image generating section 17 generates image data B's of 4×4 pixels by adding (i) the predicted value d which has been calculated at step S202 and (ii) the residual data B'sr of 4×4 pixels which data has been generated at step S203.

(Step S205)

Finally, the intra predicted image generating section 17 generates the predicted image Pred_Intra of 16×16 pixels for the target partition by up-sampling, to image data of 16×16 pixels, the image data B's of 4×4 pixels which data has been generated at step S204.

Note that an intra predicted image generating section of the moving image encoder 2 (described later) carries out the following process for a target partition for which the scale prediction is selected.

(Step S201')

First, the intra predicted image generating section generates image data Bs of 4×4 pixels by down-sampling the target partition having a size of 16×16 pixels to a partition having a size of 4×4 pixels.

(Step S202')

Next, the intra predicted image generating section calculates a predicted value d by obtaining an average value of respective pixel values of pixels provided in a partition in a vicinity of the target partition.

(Step S203')

Subsequently, the intra predicted image generating section generates residual data Bsr by obtaining a difference between (i) the image data Bs which has been generated at step S201' and (ii) the predicted value d which has been calculated at step S202'.

(Step S204')

Then, the intra predicted image generating section generates a quantization coefficient by carrying out frequency transformation and quantization with respect to the residual data Bsr. The quantization coefficient thus generated is transmitted to the moving image decoder 1.

(Step S205')

Next, the intra predicted image generating section generates residual data B'sr by carrying out inverse frequency transformation and inverse quantization with respect to the quantization coefficient which has been generated at step S204'.

(Step S206')

Subsequently, the intra predicted image generating section generates image data B's by adding (i) the residual data B'sr which has been generated at step S205' and (ii) the predicted value d which has been calculated at step S202'.

(Step S207')

Finally, the intra predicted image generating section generates the intra predicted image Pred_Intra of 16×16 pixels by up-sampling, to image data of 16×16 pixels, the image data B's which data has been generated at step S206.

(Adaptive Filter 42)

The adaptive filter 42 included in the moving image decoder 1 is described below with reference to FIGS. 5 through 9.

Figure 5:
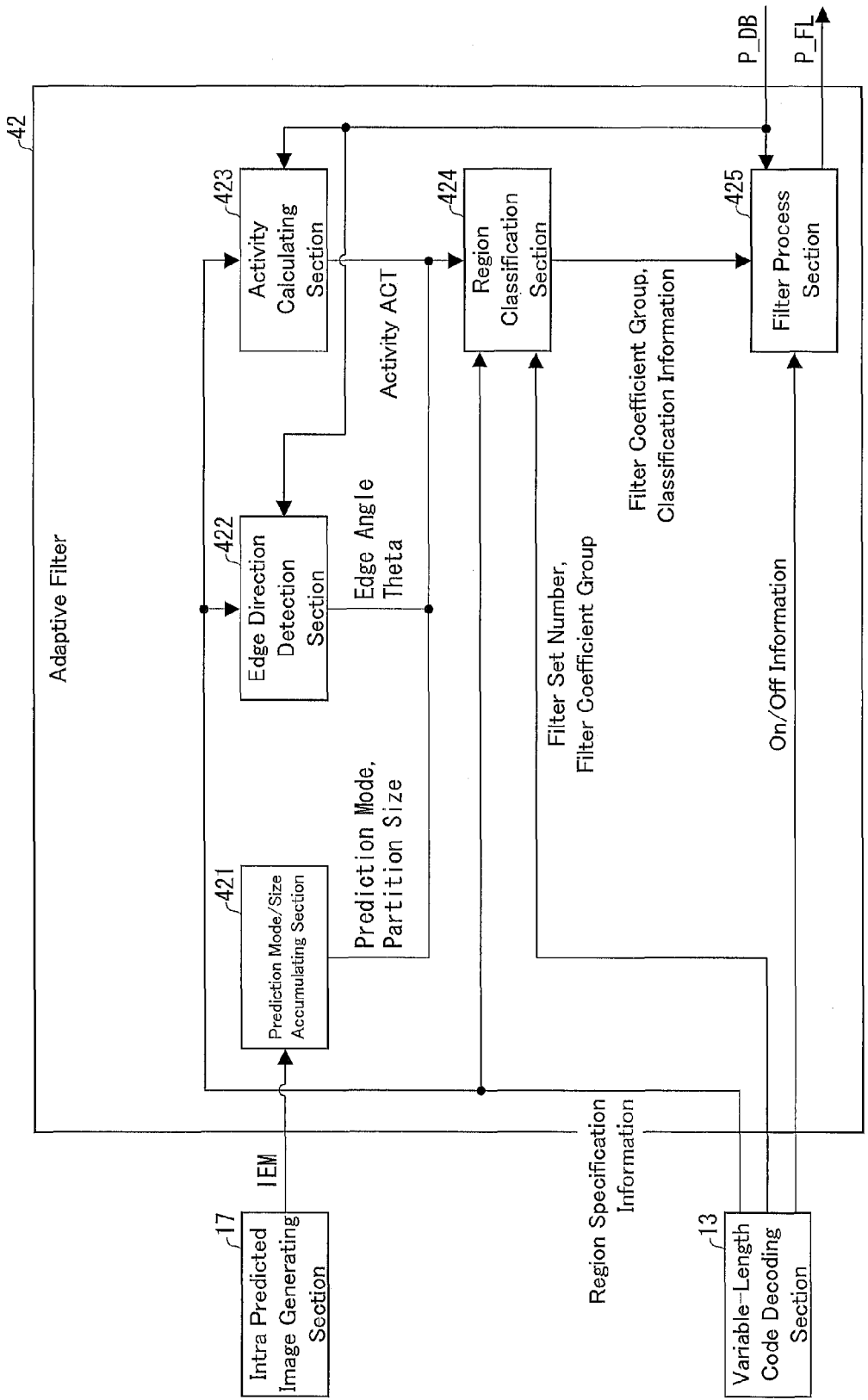
FIG. 5 is a block diagram showing an arrangement of an adaptive filter of the moving image decoder in accordance with the first embodiment.

FIG. 5 is a block diagram showing an arrangement of the adaptive filter 42. As illustrated in FIG. 5, the adaptive filter 42 includes a prediction mode/size accumulating section 421, an edge direction detection section 422, an activity calculating section 423, a region classification section 424, and a filter process section 425.

The adaptive filter 42 generates a filtered decoded image P_FL by performing a filter process, by use of a filter coefficient which is decoded from coded data #1, to a deblocked decoded image P_DB which is supplied from the de-blocking filter 41. Here, the generation of the filtered decoded image P_FL may be performed (i) per macroblock, (ii) per region smaller than the macroblock, or (iii) per region larger than the macroblock. The following description will discuss the generation of the filtered decoded image P_FL, referring to an example where the adaptive filter 42 generates a filtered decoded image P_FL per macroblock.

(Prediction Mode/Size Accumulating Section 421)

The prediction mode/size accumulating section 421 accumulates (i) a size (shape and dimension) of a partition and (ii) a prediction mode which is allocated to the partition, the size and the prediction mode each being indicated by an intra coding mode information IEM supplied from an intra predicted image generating section 17. The prediction mode/size accumulating section 421 can be configured to accumulate sizes and prediction modes of all of partitions included in a target macroblock.

Furthermore, information including the size and the prediction mode of each of the partitions is supplied to a region classification section 424 from the prediction mode/size accumulating section 421 where the sizes and the prediction modes are accumulated.

Note that a shape of each of partitions and a direction indicated by a prediction mode tend to have a correspondence with directionality of a decoded image P (or deblocked decoded image P_DB) in each of the partitions. For example, in a case where a size of a partition is rectangular such as 8×1 pixels or 8×2 pixels, the partition tends to include a transverse edge. Meanwhile, in a case where a size of a partition is elongated to a size of, for example, 1×8 pixels or 2×8 pixels, the partition tends to include a longitudinal edge. Moreover, in a direction prediction which is carried out by extrapolating a decoded pixel value in a predetermined direction (predicted direction), an edge along the predicted direction tends to be included.

Furthermore, a size of a partition tends to have a correspondence with flatness of a decoded image P (or deblocked decoded image P_DB) of each of the partitions. For example, in a case where a size of a partition is small, flatness tends to be small, and in a case where a size of a partition is large, flatness tends to be large. In a case where flatness is small, activity (described below) is large. As such, it can be also said that in a case where a size of a partition is small, activity tends to be large, and in a case where a size of a partition is large, activity tends to be small.

Moreover, some of the prediction modes tend to have a correspondence with flatness of a decoded image P (or deblocked decoded image P_DB) in a partition for which a prediction mode is used. For example, a partition which is predicted by a plain prediction and a scale prediction tends to have large flatness (i.e., a small activity).

The region classification section 424, as describes below, (i) classifies each of partitions into one of one or more types, in accordance with a size and a prediction mode of the partitions, and (ii) allocates filter coefficients, in accordance with their types, to divisional regions or the partitions included in a target macroblock. As such, the adaptive filter 42 can carry out an appropriate filter process in accordance with directionality and flatness of a decoded image P (or deblocked decoded image P_DB) in each of the partitions.

(Edge Direction Detection Section 422)

The edge direction detection section 422 is described with reference to (a) through (b) of FIG. 10.

The edge direction detection section 422 (i) divides a target macroblock in a deblocked decoded image P_DB into one divisional region or a plurality of divisional regions with reference to region specification information included in filter on/off information supplied from a variable-length code decoding section 13 and (ii) carries out edge detection with respect to an image of each of the divisional regions. Moreover, for each of the divisional regions, an angle Theta indicating a direction of an edge is supplied to a region classification section 424. Note that it is possible for the divisional region to include only one pixel or to have a plurality of pixels. The following description will discuss a calculation process of an angle Theta by the edge direction detection section 422 in both of cases (i) where a divisional region (target divisional region) to be subject of edge detection includes only one pixel and (ii) where a target divisional region includes a plurality of pixels.

(Theta Calculation Process for Target Divisional Region Including Only One Pixel)

In a case where a target divisional region includes only one pixel (target pixel), the edge detection section 422 sets a reference region of 3×3 pixels, in which a target pixel is centered, and acts sobel filter matrices SFM_x and SFM_y defined by the following Equations (1a) and (1b) to each of pixels in the reference region, so as to calculate pixel values Sobel_x and Sobel_y after a sobel filtering.

[Math. 1]

$$SFM\_x = \begin{pmatrix} -1 & 0 & 1 \\ -2 & 0 & 2 \\ -1 & 0 & 1 \end{pmatrix} \quad (1a)$$

[Math. 2]

$$SFM\_y = \begin{pmatrix} -1 & -2 & -1 \\ 0 & 0 & 0 \\ 1 & 2 & 1 \end{pmatrix} \quad (1b)$$

Specifically, for example, in a case where pixel values of each of pixels included in a reference region of 3×3 pixels are indicated by letters a through h as illustrated in (a) of FIG. 10, the edge detection section 422 calculates pixel values Sobel_x and Sobel_y after a sobel filtering by the following Equations (2a) and (2b) respectively.

$$Sobel\_x = -a + c - 2 \times d + 2 \times e - f + h \quad (2a)$$

$$Sobel\_y = -a - 2 \times b - c + f + 2 \times g + h \quad (2b)$$

Next, the edge detection section 422 calculates an angle indicating an edge direction (hereinafter also referred to as "edge angle") Theta by use of the following Equation (3).

$$Theta = \arctan(Sobel\_x / Sobel\_y) \quad (3)$$

where arctan is an inverse function of a trigonometric function tan. Moreover, an angle Theta shall increase clockwise as illustrated in (b) of FIG. 10 and shall be indicated in a range from 0° to 180° (0°≤Theta<180°).

(Theta Calculation Process for Target Divisional Region Including a Plurality of Pixels)

In a case where a target divisional region includes a plurality of pixels, first, the edge detection section 422 sets a reference region of 3×3 pixels for each of pixels included in a target divisional region and calculates, by the above-mentioned method, pixel values Sobel_x and Sobel_y for each of the pixels after a sobel filtering.

Next, the edge detection section 422 (i) calculates an edge strength ES for each of the pixels respectively by the following Equation (4) and (ii) calculates, by the above Equation (3), an edge angle Theta by use of pixel values Sobel_x and Sobel_y after a sobel filtering, for a pixel having the greatest edge strength ES.

$$ES = (Sobel\_x)^2 + (Sobel\_y)^2 \quad (4)$$

In a case where edge strengths ES for all pixels included in a target divisional region are not more than a predetermined threshold, the edge detection section 422 determines that the target divisional region has no edge and supplies the determined result to the region classification section 424.

It is also possible for the edge detection section 422 to be arranged to output a number (a directionality index) corresponding to an edge direction, without calculating an edge angle.

For example, instead of using an inverse function of a trigonometric function tan, it is possible, as described below, to generate a directionality index by considering separately in accordance with a relationship in sizes of Sobel_y and Sobel_x.

In a case where |Sobel_y|<a×|Sobel_x|, the directionality index is 0.

In a case where (i) |Sobel_y|≥a×|Sobel_x|, (ii) |Sobel_y|≤b×|Sobel_x|, and (iii) a sign of Sobel_y and a sign of Sobel_x are identical, the directionality index is 1.

In a case where |Sobel_y|>b×|Sobel_x|, the directionality index is 2.

In a case where (i) |Sobel_y|≥a×|Sobel_x|, (ii) |Sobel_y|≤b×|Sobel_x|, and (iii) a sign of Sobel_y and a sign of Sobel_x are opposite, the directionality index is 3.

In the above equations, a=tan (22.5°)=0.414 . . . , b=tan (67.5°)=2.414 . . . . In this example, four direction indices were calculated. Note, however, that it is possible to employ such an arrangement in which two direction indices and eight direction indices are calculated.

(Activity Calculating Section 423)

The activity calculating section 423 (i) divides a target macroblock in a deblocked code image P_DB into one divisional region or a plurality of divisional regions with reference to region specification information included in filter on/off information supplied from the variable-length code decoding section 13 and (ii) calculates activity ACT for an image in each of the divisional regions. Here the activity is generally an indicator of disorder of the image and can be measured by detecting whether or not a large high-frequency component exists in a transformation coefficient obtained when a DCT is carried out to a region including a divisional region. Here, however, the measurement is carried out based on a pixel value of an adjacent pixel. A greater difference between pixel values of pixels adjacent to each other indicates a greater activity. The activity ACT calculated out for each of the divisional regions is supplied to the region classification section 424.

In a case where (i) (i, j) indicates coordinates of a pixel in a divisional region (target divisional region), activity of which is subject to be calculated, and (ii) R (i, j) indicates the pixel value, the activity calculating section 423 can calculate activity ACT by use of, for example, the following Equation (5a).

[Math. 3]

$$ACT = \sum_{i,j} |R(i, j) - R(i+1, j)| + \sum_{i,j} |R(i, j) - R(i, j+1)| \quad (5a)$$

where a sum symbol Σ regarding i and j indicates that the sum total of pixels included in a target divisional region is calculated. Equation (5a) is for evaluating activity by using, as an indicator, the sum total of absolute pixel values (i.e., Sum of Absolute Difference, SAD) of adjacent pixels.

Furthermore, the activity calculating section 423 can be arranged so as to calculate activity ACT by use of the following numerical formula (5b).

[Math. 4]

$$ACT(i, j) =$$

$$\sum_{k=-K}^{K}\sum_{l=-L}^{L}|2R(i+k, j+l) - R(i+k-1, j+l) - R(i+k+1, j+l)| +$$

$$\sum_{k=-K}^{K}\sum_{l=-L}^{L}|2R(i+k, j+l) - R(i+k, j+l-1) - R(i+k, j+l+1)| \quad (5b)$$

where a sum regarding k and l in Equation (5b) indicates the sum of a rectangular region (x direction: 2K+1 pixel, y direction: 2L+1 pixel), which is centered at coordinates (i, j). In the present embodiment, the sum regarding k and l in Equation (5b) can be the sum total of pixels included in a target divisional region. Equation (5b) is for evaluating activity by using Sum-Modified Laplacian (SML) as an indicator.

Note that in case where an intra prediction is applied to a target macroblock, the activity calculating section 423 calculates activity ACT per partition included in the target macroblock.

(Region Classification Section 424)

The region classification section 424 classifies each divisional region or each partition included in a target macroblock into either one or plural types (hereafter also referred to as "divisional region groups"), on the basis of (i) a size of each partition, which size is supplied from the prediction mode/size accumulating section 421, (ii) a prediction mode allocated to each partition, which predication mode is supplied from the prediction mode/size accumulating section 421, (iii) an edge angle Theta supplied from the edge direction detection section 422, and (iv) activity ACT supplied from the activity calculating section 423. The classification of each divisional region or each partition is carried out by the region classification section 424 with reference to a filter set number, which was decoded from the coded data #1 by the variable-length code decoding section 13.

Note that the information supplied from the edge direction detection section 422 may be a directionality index, instead of the edge angle Theta. For a case where the classification is carried out by using the directionality index, the feature described below may be modified such that, in the following description, an edge angle Theta of (0°≤Theta<22.5° or 157.5°≤Theta<180°) is read as a directionality index 0, an edge angle Theta of (22.5°≤Theta<67.5°) is read as a directionality index 1, an edge angle Theta of (67.5°≤Theta<112.5°) is read as a directionality index 2, and an edge angle Theta of (112.5°≤Theta<157.5°) is read as a directionality index 3. Such modification can also allow similar classification.

The region classification section 424 also allocates a filter coefficient group received from the variable-length code decoding section 13, to each divisional region or each partition in the target macroblock by type. More specifically, a filter coefficient group I decoded from coded data #1 is allocated to a divisional region or a partition classified as type I (I=1, 2, . . . ). For example, a filter coefficient group I is allocated to a divisional region classified as type I, and a filter coefficient group II is allocated to a divisional region classified as type II.

Further, classification information showing the type as which each divisional region or each partition included in the target macroblock is classified is supplied to the filter process section 425 together with the filter coefficient group allocated to the each divisional region or the each partition.

A preferable arrangement for the region classification section 424 is that, in a case where an intra prediction is applied to a target macroblock, the region classification section 424 classifies each partition into one of a plurality of types on the basis of the size of the each partition, the prediction mode allocated to the each partition, and the activity ACT of the each partition, and in a case where an inter prediction is applied to a target macroblock, the region classification section 424 classifies each divisional region into one of a plurality of types on the basis of an edge angle in the each divisional region and activity ACT of the each divisional region. Note, however, that the embodiment is not limited to the preferable arrangement.

Further, the present embodiment is not limited to the example described above in which the adaptive filter 42 is one illustrated in FIG. 5 (hereafter, the arrangement of the adaptive filter 42 shown in FIG. 5 may be referred to as a basic arrangement of the adaptive filter 42).

Figure 6:
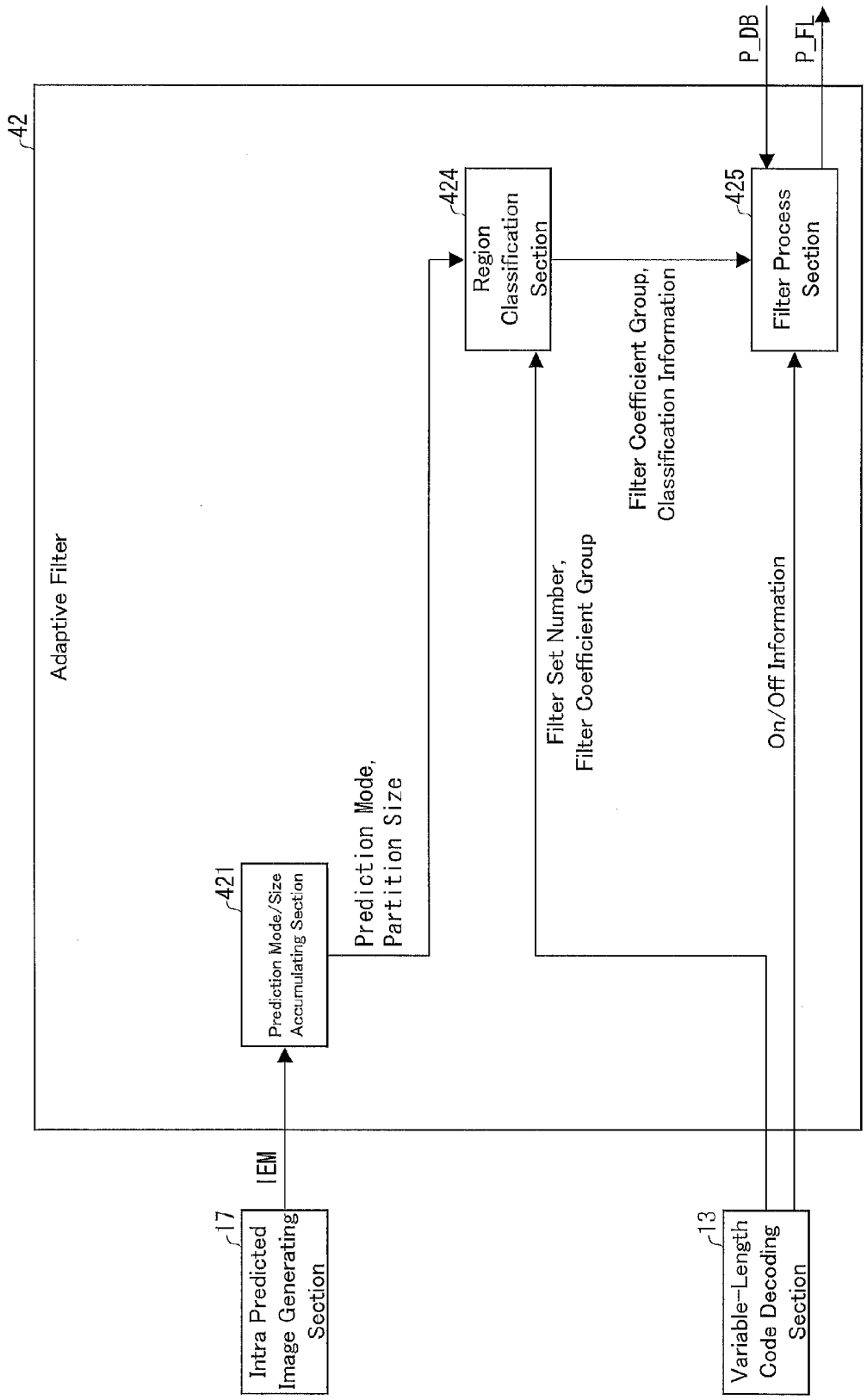
FIG. 6 is a block diagram showing a first modification of the adaptive filter of the moving image decoder in accordance with the first embodiment.

For example, the adaptive filter 42 can be arranged to have only the prediction mode size accumulating section 421 as shown in FIG. 6, from among the prediction mode/size accumulating section 421, the edge direction detection section 422, and the activity calculating section 423 shown in the arrangement in FIG. 5 (hereafter, the arrangement of the adaptive filter 42 in FIG. 6 is also referred to as a first modification of the adaptive filter 42).

Figure 7:
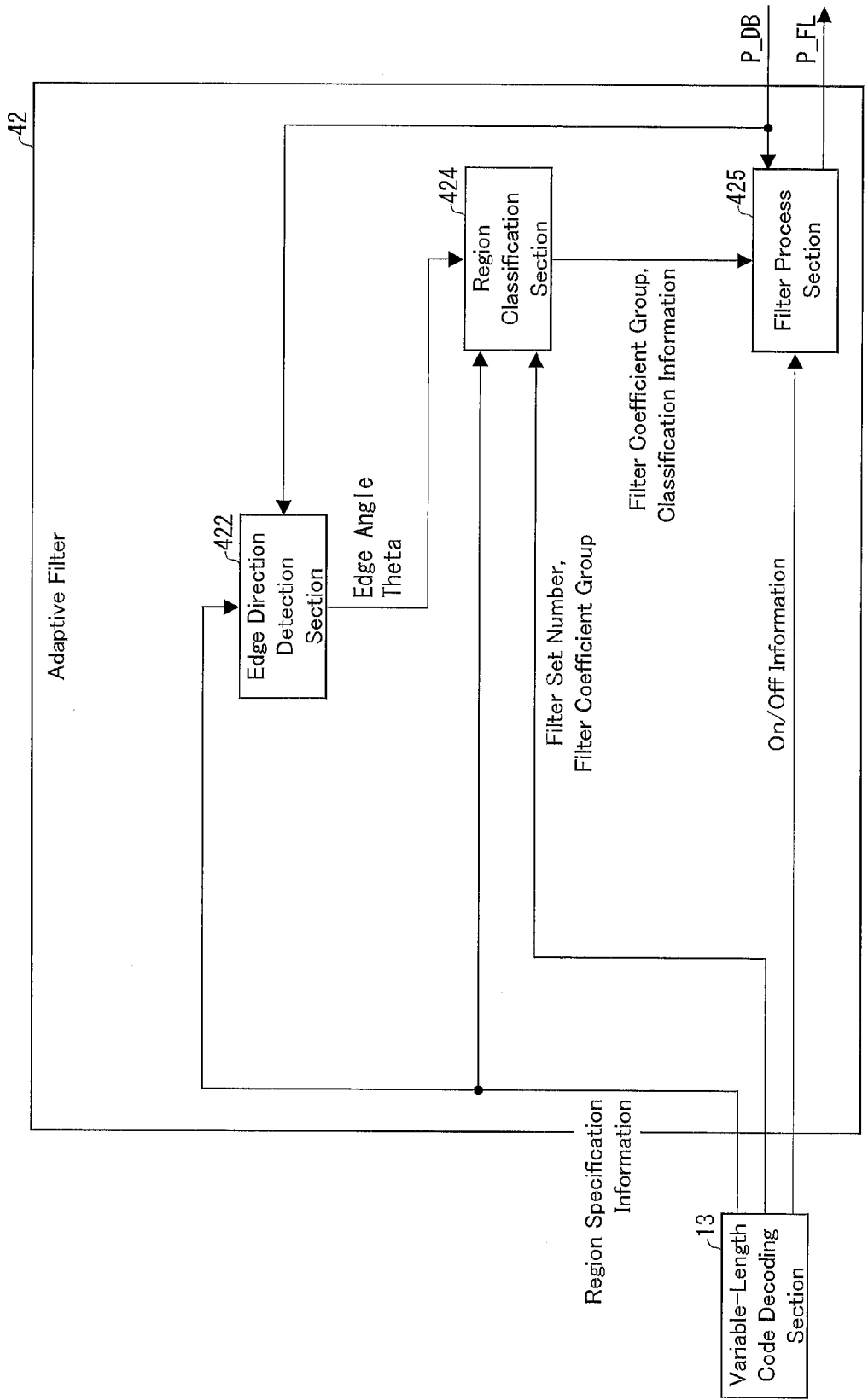
FIG. 7 is a block diagram showing a second modification of the adaptive filter of the moving image decoder in accordance with the first embodiment.

The adaptive filter 42 can also be arranged to have only the edge direction detection section 422 as shown in FIG. 7, from among the prediction mode/size accumulating section 421, the edge direction detection section 422, and the activity calculating section 423 shown in the arrangement in FIG. 5 (hereafter, the arrangement of the adaptive filter 42 in FIG. 7 is also referred to as a second modification of the adaptive filter 42).

Figure 8:
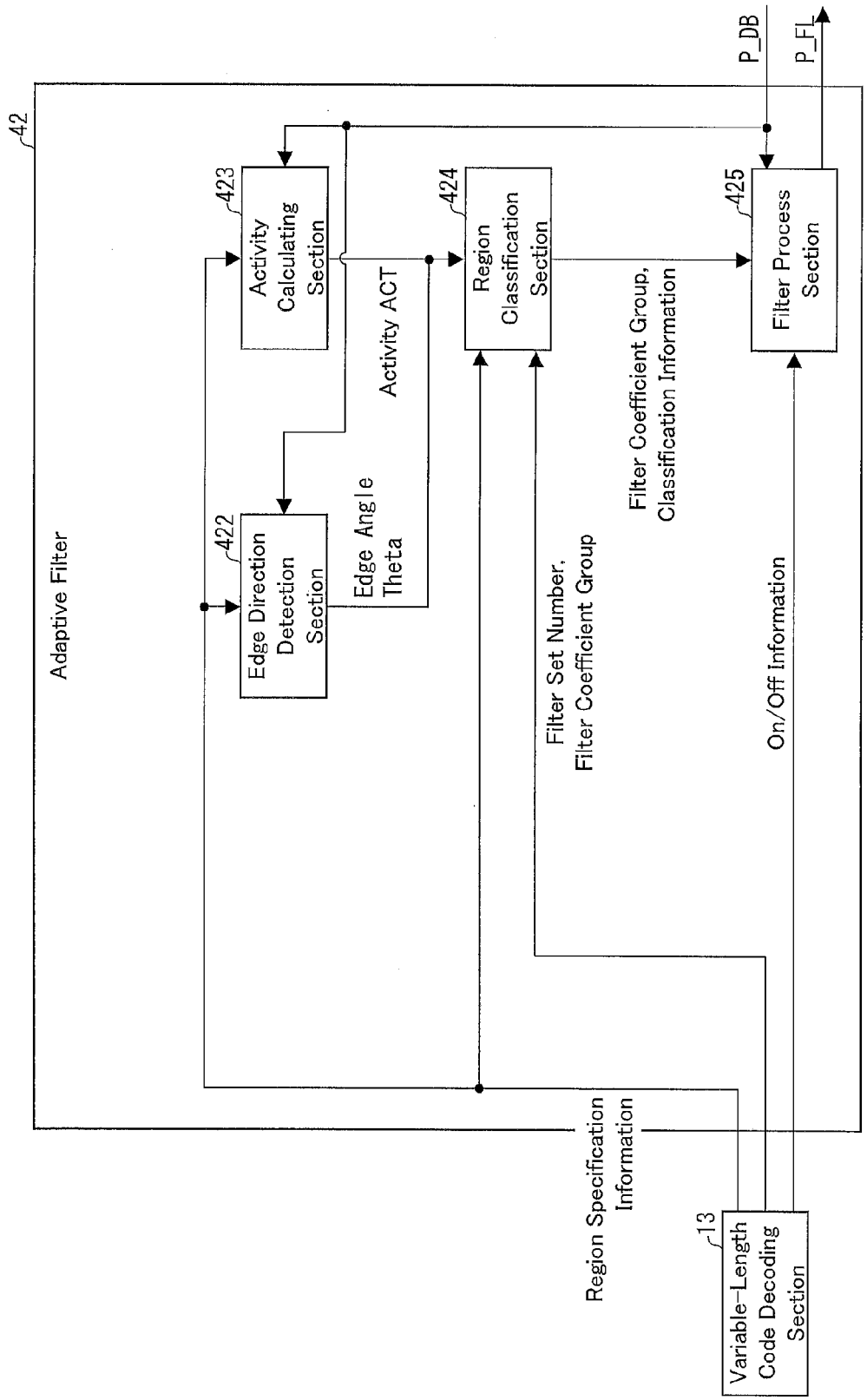
FIG. 8 is a block diagram showing a third modification of the adaptive filter of the moving image decoder in accordance with the first embodiment.

Further, the adaptive filter 42 can also be arranged to have only the edge direction detection section 422 and the activity calculating section 423 as shown in FIG. 8, from among the prediction mode/size accumulating section 421, the edge direction detection section 422, and the activity calculating section 423 shown in the arrangement in FIG. 5 (hereinafter, the arrangement of the adaptive filter 42 in FIG. 8 is also referred to as a third modification of the adaptive filter 42).

Figure 9:
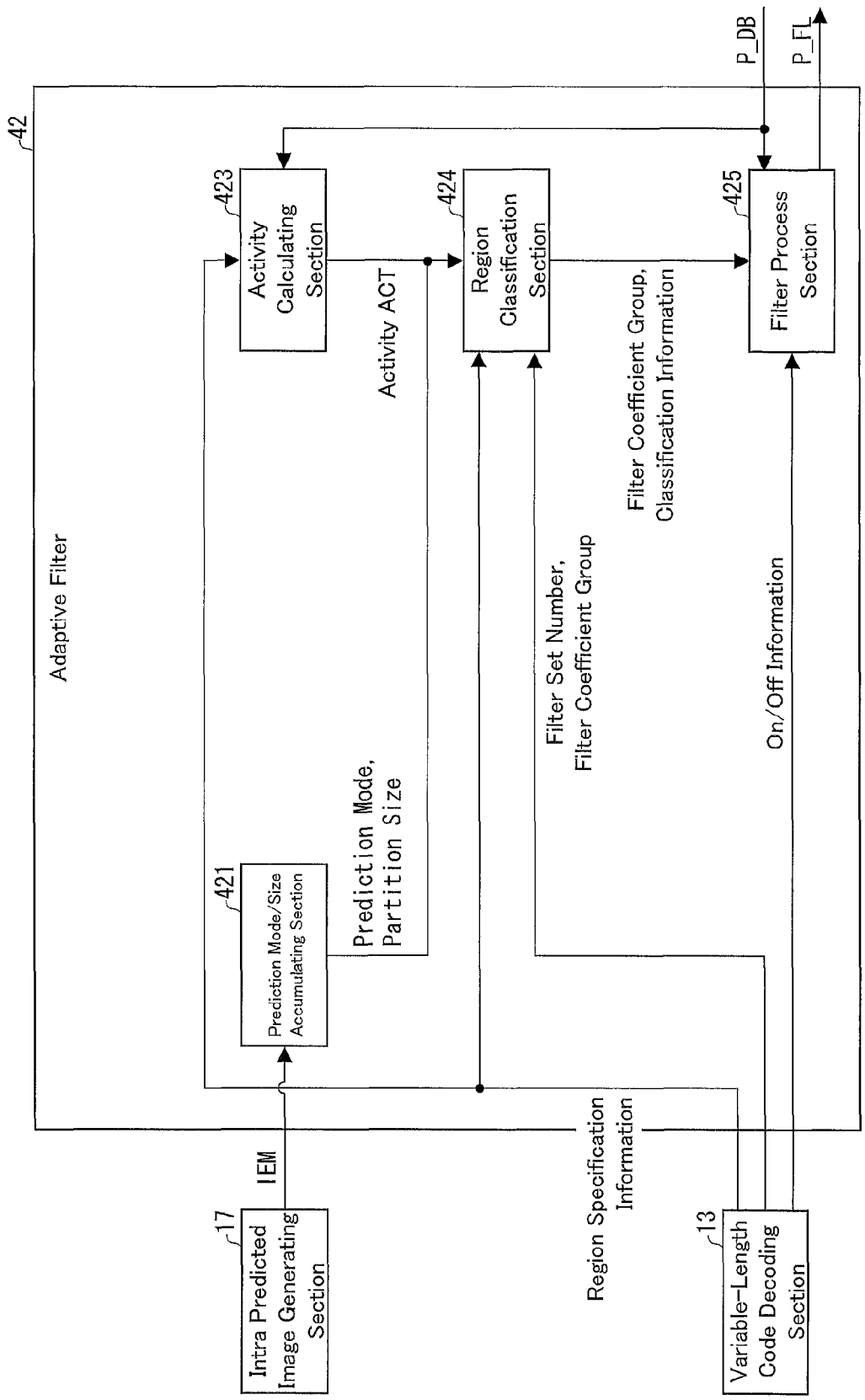
FIG. 9 is a block diagram showing a fourth modification of the adaptive filter of the moving image decoder in accordance with the first embodiment.

Further, the adaptive filter 42 can be arranged to have only the prediction mode/size accumulating section 421 and the activity calculating section 423 as shown in FIG. 9, from among the prediction mode/size accumulating section 421, the edge direction detection section 422, and the activity calculating section 423 shown in the arrangement in FIG. 5 (hereinafter, the arrangement of the adaptive filter 42 in FIG. 9 is also referred to as a fourth modification of the adaptive filter 42).

In the following description, examples of the classification process carried out by the region classification section 424 are discussed with reference to FIG. 11 to FIG. 16. Note that the moving image encoder 2 may be arranged such that, in a case where any one of the following methods shown in (Classification Process Example 1) to (Classification Process Example 6) is used selectively to generate coded data #1, the coded data #1 includes a flag indicative of which classification process was carried out for the coded data #1, and with reference to the flag, the region classification section 424 carries out any one of the following classification process shown in (Classification Process Example 1) to (Classification Process Example 6).

Classification Process Example 1

The following discusses a first example of the classification process carried out by the region classification section 424 with reference to (a) to (c) in FIG. 11.

In this example, the region classification section 424 carries out the classification of each divisional region included in a target macroblock, on the basis of a filter set number and an edge angle Theta in the each divisional region. FIG. 11 is explains the classification process carried out by the region classification section 424 in this example. (a) of FIG. 11 is a table showing the classification in which a filter set number is 0. (b) of FIG. 11 is a table showing the classification in which the filter set number is 1. (c) of FIG. 11 is a table showing the classification in which the filter set number is 2. Note that Θ in (a) to (c) of FIG. 11 indicates the edge angle Theta (this symbol indicates the same hereinafter).

(1-1: Case with Filter Set Number 0)

In a case where the filter set number is 0, the region classification section 424 classifies all the divisional regions included in a target macroblock as type 0, as shown in (a) of FIG. 11.

(1-2: Case where Filter Set Number is 1)

In a case where the filter set number is 1, the region classification section 424 classifies, as shown in (b) in FIG. 11, the divisional regions as the following types: type 0 for the divisional region in which the edge angle Theta satisfies ($0° \leq \text{Theta} < 45°$ or $135° \leq \text{Theta} < 180°$), and type 1 for the divisional region in which the edge angle Theta satisfies ($45° \leq \text{Theta} < 135°$).

(1-3: Case where Filter Set Number is 2)

In a case where the filter set number is 2, the region classification section 424 classifies, as shown in (c) in FIG. 11, the divisional regions into the following types: type 0 for the divisional region in which the edge angle Theta satisfies ($0° \leq \text{Theta} < 22.5°$ or $157.5° \leq \text{Theta} < 180°$), type 1 for the divisional region in which the edge angle Theta satisfies ($22.5° \leq \text{Theta} < 67.5°$), type 2 for the divisional region in which an edge angle Theta satisfies ($67.5° \leq \text{Theta} < 112.5°$), and type 3 for the divisional region in which the edge angle Theta satisfies ($112.5° \leq \text{Theta} < 157.5°$).

For any of the cases with any filter set numbers, it is possible to arrange such that, if there is a divisional region judged to have no edges by the edge detection section 422, the region classification section 424 classifies such divisional region as type 0. (The same applies to the subsequent classification process examples).

Further, the adaptive filter 42 for the process in this example may be the one with the basic arrangement as shown in FIG. 5, the second modification shown in FIG. 7, or the third modification as shown in FIG. 8. In a case where only this example is processed from among (Classification Process Example 1) to (Classification Process Example 6), the arrangement of the adaptive filter 42 can be simplified by adopting a modification shown in FIG. 7.

Classification Process Example 2

The following discusses a second example of the classification process carried out by the region classification section 424, with reference to (a) to (d) in FIG. 12.

In this example, the region classification section 424 classifies each divisional region included in a target macroblock, on the basis of a filter set number, an edge angle Theta of the each divisional region, and activity ACT of the each divisional region. FIG. 12 explains the classification process carried out by the region classification section 424 in this example. (a) of FIG. 12 is a table showing the classification in which the filter set number is 0. (b) of FIG. 12 is a table showing the classification in which the filter set number is 1. (c) of FIG. 12 is a table showing the classification in which the filter set number is 2. (d) of FIG. 12 is a table showing the classification in which the filter set number is 3.

(2-1: Case where Filter Set Number is 0)

In a case where the filter set number is 0, the region classification section 424 classifies all the divisional regions included in the target macroblock as type 0, as shown in (a) of FIG. 12.

(2-2: Case where Filter Set Number is 1)

In a case where the filter set number is 1, the region classification section 424 classifies, as shown in (b) of FIG. 12, the divisional regions into the following types: type 0 for a divisional region which has activity ACT of not more than a predetermined threshold value TH, and type 1 for a divisional region which has an activity ACT of more than the threshold value TH.

(2-3: Case where Filter Set Number is 2)

In a case where the filter set number is 2, the region classification section 424 classifies, as shown in (c) of FIG. 12, the divisional regions into the following types: type 0 for a divisional region which has activity ACT of not more than a predetermined threshold value TH, type 1 for a divisional region which has activity ACT of more than the threshold value TH, and an edge angle Theta which satisfies ($0° \leq \text{Theta} < 45°$ or $135° \leq \text{Theta} < 180°$), and type 2 for a divisional region which has activity ACT of more than the threshold value TH, and an edge angle Theta which satisfies ($45° \leq \text{Theta} < 135°$).

(2-4: Case where Filter Set Number is 3)

In a case where the filter set number is 3, the region classification section 424 classifies, as shown in (d) of FIG. 12, divisional regions into the following types: type 0 for a divisional region which has activity ACT of not more than a first threshold value TH1, and type 5 for a divisional region which has activity ACT of more than a second threshold value TH2 that is more than the first threshold value.

Further, for a divisional region which has activity ACT of more than the first threshold value and not less than the second threshold value, the region classification section 424 classifies the divisional region into the following types: type 1 for a divisional region in which an edge angle Theta satisfies ($0° \leq \text{Theta} < 22.5°$ or $157.5° \leq \text{Theta} < 180°$), type 2 for a divisional region in which an edge angle Theta satisfies ($22.5° \leq \text{Theta} < 67.5°$), type 3 for a divisional region in which an edge angle Theta satisfies ($67.5° \leq \text{Theta} < 112.5°$), and type 4 for a divisional region in which an edge angle Theta satisfies ($112.5° \leq \text{Theta} < 157.5°$).

In this example, as described above, each divisional region included in the target macroblock is classified as (i) one type in a case where activity is not more than a given threshold, or (ii) plural types by directionality measured by an edge angle only in a case where activity is more than a given threshold value. This is because the use of the directionality of an image can provide only a small advantage when the activity is small, while the use of the directionality of an image can provide a large advantage when the activity is large.

Note that the adaptive filter 42 for processing this example can be the one with the basic arrangement shown in FIG. 5, or the third modification shown in FIG. 8. In a case where a process for this example is carried out from among (Classification Process Example 1) to (Classification Process Example 6), the arrangement of the adaptive filter 42 can be simplified by using a modification shown in FIG. 8.

Classification Process Example 3

The following description will discuss, with reference to (a) through (c) of FIG. 13, a third example of a classification process carried out by the region classification section 424.

In Classification Process Example 3, the region classification section 424 carries out classification of partitions contained in a target macroblock, based on a filter set number and on the size of each of the partitions. FIG. 13 explains classification carried out by the region classification section 424 in Classification Process Example 3. (a) of FIG. 13 is a table showing the classification in which the filter set number is 0. (b) of FIG. 13 is a table showing the classification in which the filter set number is 1. (c) of FIG. 13 is a table showing the classification in which the filter set number is 2.

(3-1: Case where Filter Set Number is 0)

As illustrated in (a) of FIG. 13, in the case where the filter set number is 0, the region classification section 424 classifies all the partitions contained in a target macroblock as type 0.

(3-2: Case where Filter Set Number is 1)

As illustrated in (b) of FIG. 13, in the case where the filter set number is 1, the region classification section 424 classifies (i) 16×16-pixel-sized partitions and 8×8-pixel-sized partitions as the type 0 and (ii) 4×4-pixel-sized partitions, 8×1-pixel-sized partitions, and 1×8-pixel-sized partitions as type 1.

(3-3: Case where Filter Set Number is 2)

As illustrated in (c) of FIG. 13, in the case where the filter set number is 2, the region classification section 424 classifies (i) 16×16-pixel-sized partitions and 8×8-pixel-sized partitions as the type 0, (ii) 4×4-pixel-sized partitions as the type 1, (iii) 8×1-pixel-sized partitions as the type 2, and (iv) 1×8-pixel-sized partitions as type 3.

In Classification Process Example 3, the partitions contained in the target macroblock are thus classified into plurality of types, according to the size and shape of each of the partitions. As described earlier, there is a negative correspondence between the size of a partition and the image activity of the partition. Therefore, classifying partitions according to their sizes is equal to classifying the partitions according to their image activity. Moreover, as described earlier, there is a correspondence between the shape of a partition and the image directionality of the partition. Therefore, classifying partitions according to their shapes is equal to classifying the partitions according to their directionality. Thus, in Classification Process Example 3, since the correspondence between the size and activity of a partition and the correspondence between the shape and directionality of the partition are observed, the classification of partitions is carried out substantially in accordance with their activity and directionality without actually referring to the activity and the directionality.

Note that as an adaptive filter 42 for carrying out the classification in Classification Process Example 3, any of the following can be used: (i) the adaptive filter 42 with the basic arrangement illustrated in FIG. 5, (ii) the adaptive filter 42 illustrated in the modification 1 in FIG. 6, and (iii) the adaptive filter 42 illustrated in the modification 4 in FIG. 9. In a case where at least one of Classification Process Examples 3 through 5 (out of 1 through 6) is carried out, the arrangement of the adaptive filter 42 can be simplified by applying the modification illustrated in FIG. 6.

Classification Process Example 4

The following description will discuss, with reference to (a) through (c) of FIG. 14, a fourth example of classification carried out by the region classification section 424.

In Classification Process Example 4, the region classification section 424 carries out classification of partitions contained in a target macroblock, according to (i) a filter set number and (ii) a prediction mode applied to each of the partitions. FIG. 14 explains the classification carried out by the region classification section 424 in Classification Process Example 4. (a) of FIG. 14 is a table showing the classification in which the filter set number is 0. (b) of FIG. 14 is a table showing the classification in which the filter set number is 1. (c) of FIG. 14 is a table showing the classification in which the filter set number is 2.

(4-1: Case where Filter Set Number is 0)

As illustrated in (a) of FIG. 14, in the case where the filter set number is 0, the region classification section 424 classifies all the partitions contained in a target macroblock as type 0.

(4-2: Case where Filter Set Number is 1)

As illustrated in (b) of FIG. 14, in the case where the filter set number is 1, the region classification section 424 classifies (i) partitions, to which one of the DC prediction, the planar prediction, and the scale prediction is applied, as the type 0 and (ii) partitions, to which any prediction mode other than the above-mentioned predictions is applied, as type 1.

(4-3: Case where Filter Set Number is 2)

As illustrated in (c) of FIG. 14, in the case where the filter set number is 1, the region classification section 424 classifies (i) partitions, to which one of the DC prediction, the planar prediction, and the scale prediction is applied, as the type 0, (ii) partitions, to which the directional prediction 0 is applied, as the type 1, (iii) partitions, to which the directional prediction 4 is applied, as type 2, (iv) partitions, to which one of the directional predictions 1 through 3 is applied, as type 3, (v) partitions, to which one of the directional predictions 5 through 7 is applied, as type 4, and (vi) partitions, to which the TM prediction is applied, as type 5.

In Classification Process Example 4, the classification is carried out by taking advantage of the fact that specific prediction modes tend to have low partition activity. In other words, types into which partitions are classified vary, depending on whether specific prediction modes causing low partition activity are applied or prediction modes other than such prediction modes are applied. In the classification described above, the DC prediction, the planar prediction, and the scale prediction are observed as prediction modes that tend to have low partition activity. However, since there is a possibility that the DC prediction causes high partition activity, types into which partitions are classified may vary, depending on whether the DC prediction is applied to the partitions or the planar prediction/the scale prediction is applied to the partitions. In such a case, if the DC prediction is applied, the types into which partitions are classified are varied such that partitions with the filter set number 1 is classified as type 1, and partitions with the filter set number 2 is classified as type 5.

Note that an adaptive filter 42 for carrying out the classification in Classification Process Example 4 may be any of the following: (i) the adaptive filter 42 with the basic arrangement illustrated in FIG. 5, (ii) the adaptive filter 42 illustrated in the modification 1 in FIG. 6, and (iii) the adaptive filter 42 illustrated in the modification 4 in FIG. 9. In a case where at least one of Classification Process Examples 3 through 5 (out of 1 through 6) is carried out, the arrangement of the adaptive filter 42 can be simplified by applying the modification illustrated in FIG. 6.

Classification Process Example 5

The following description will discuss, with reference to (a) through (e) of FIG. 15, a fifth example of classification carried out by the region classification section 424.

In Classification Process Example 5, the region classification section 424 carries out classification of partitions contained in a target macroblock, according to (i) a filter set number, (ii) the size of each of the partitions, and (iii) a prediction mode applied to each of the partitions. FIG. 15 explains the classification carried out by the region classification section 424 in Classification Process Example 5. (a) of FIG. 15 is a table showing the classification in which the filter set number is 0. (b) of FIG. 15 is a table showing the classification in which the filter set number is 1. (c) of FIG. 15 is a table showing the classification in which the filter set number is 2. (d) of FIG. 15 is a table showing the classification in which the filter set number is 3. (e) of FIG. 15 is a table showing the classification in which the filter set number is 4.

(5-1: Case where Filter Set Number is 0)

As illustrated in (a) of FIG. 15, in the case where the filter set number is 0, the region classification section 424 classifies all the partitions contained in a target macroblock as type 0.

(5-2: Case where Filter Set Number is 1)

As illustrated in (b) of FIG. 15, in the case where the filter set number is 1, the region classification section 424 classifies (i) 16×16-pixel-sized partitions and 8×8-pixel-sized partitions as the type 0 and (ii) 4×4-pixel-sized partitions, 8×1-pixel-sized partitions, and 1×8-pixel-sized partitions as type 1.

(5-3: Case where Filter Set Number is 2)

As illustrated in (c) of FIG. 15, in the case where the filter set number is 2, the region classification section 424 classifies (i) partitions, (a) which are 16×16-pixel sized or 8×8-pixel sized and (b) to which one of the DC prediction, the planar prediction, and the scale prediction is applied, as the type 0, (ii) partitions, (a) which are 16×16-pixel sized or 8×8-pixel sized and (b) to which any prediction mode other than the above-mentioned predictions is applied, as the type 1, (iii) partitions, (a) which are 4×4-pixel sized, 8×1-pixel sized, or 1×8-pixel sized and (b) one of the DC prediction, the planar prediction, and the scale prediction is applied, as type 2, and (iv) partitions, (a) which are 4×4-pixel sized, 8×1-pixel sized, or 1×8-pixel sized and (b) to which any prediction mode other than the above-mentioned predictions is applied, as type 3.

(5-4: Case where Filter Set Number is 3)

As illustrated in (d) of FIG. 15, in the case where the filter set number is 3, the region classification section 424 classifies partitions that are 16×16-pixel sized, 8×8-pixel sized, or 4×4-pixel sized as follows: (i) partitions, to which one of the DC prediction, the planar prediction, and the scale prediction is applied, are type 0, (ii) partitions, to which the directional prediction 0 is applied, are type 1, (iii) partitions, to which the directional prediction 4 is applied, are type 2, (iv) partitions, to which one of the directional predictions 1 through 3 or one of the directional predictions 5 through 7 is applied, are type 3, and (v) partitions, to which the TM prediction is applied, are type 4.

Furthermore, as illustrated in (d) of FIG. 15, the region classification section 424 classifies (i) 8×1-pixel-sized partitions as the type 1 (i.e. the same type as that as which the partitions, (a) which are 16×16-pixel sized, 8×8-pixel sized, or 4×4-pixel sized and (b) to which the directional prediction 0 is applied, are classified) and (ii) 1×8-pixel sized partitions as the type 2 (i.e. the same type as that as which the partitions, (a) which are 16×16-pixel sized, 8×8-pixel sized, or 4×4-pixel sized and (b) to which the directional prediction 4 is applied, are classified).

(5-5: Case where Filter Set Number is 4)

As illustrated in (e) of FIG. 15, in the case where the filter set number is 4, the region classification section 424 classifies partitions that are 16×16-pixel sized or 8×8-pixel sized as follows: (i) partitions, to which one of the DC predictions, the planar prediction, and the scale prediction is applied, are type 0, (ii) partitions, to which the directional prediction 0 is applied, are type 1, (iii) partitions, to which the directional prediction 4 is applied, are type 2, (iv) partitions, to which one of the directional predictions 1 through 3 is applied, as the type 1, (v) partitions, to which one of the directional predictions 5 through 7 is applied, as the type 2, and (vi) partitions, to which the TM prediction is applied, are type 3.

Moreover, as illustrated in (e) of FIG. 15, the region classification section 424 classifies 4×4-pixel sized partitions as follows: (i) partitions, to which one of the DC predictions, the planar prediction, and the scale prediction is applied, are type 4, (ii) partitions, to which the directional prediction 0 is applied, are type 5, (iii) partitions, to which the directional prediction 4 is applied, are type 6, (iv) partitions, to which one of the directional predictions 1 through 3 is applied, are type 7, (v) partitions, to which one of the directional predictions 5 through 7 is applied, are type 8, and (vi) partitions, to which the TM prediction is applied, are type 9.

Furthermore, as illustrated in (e) of FIG. 15, the region classification section 424 classifies (i) 8×1-pixel-sized partitions as the type 5 (i.e. the same type as that as which the 4×4-pixel-sized partitions, to which the directional prediction 0 is applied, are classified) and (ii) 1×8-pixel-sized partitions as the type 6 (i.e. the same type as that as which the 4×4-pixel-sized partitions, to which the directional prediction 4 is applied, are classified).

Thus, in Classification Process Example 5, (i) the correspondence between the size of as partition and the activity of the partition and (ii) the correspondence between (a) the shape and prediction mode of the partition and (b) the directionality of the partition, are observed.

Note that an adaptive filter 42 for carrying out the classification in Classification Process Example 5 may be any of the following: (i) the adaptive filter 42 with the basic arrangement illustrated in FIG. 5, (ii) the adaptive filter 42 illustrated in the modification 1 in FIG. 6, and (iii) the adaptive filter 42 illustrated in the modification 4 in FIG. 9. In a case where at least one of Classification Process Examples 3 and 4 (out of 1 through 6) is carried out, the arrangement of the adaptive filter 42 can be simplified by applying the modification illustrated in FIG. 6.

Classification Process Example 6

The following description will discuss, with reference to (a) through (e) of FIG. 16, a sixth example of classification carried out by the region classification section 424.

In Classification Process Example 6, the region classification section 424 carries out classification of partitions contained in a target macroblock, according to (i) a filter set number, (ii) a prediction mode applied to each of the partitions, and (iii) the activity of each of the partitions. FIG. 16 explains the classification carried out by the region classification section 424 in Classification Process Example 6. (a) of FIG. 16 is a table showing the classification carried out in a case where the filter set number is 0. (b) of FIG. 16 is a table showing the classification carried out in a case where the filter set number is 1. (c) of FIG. 16 is a table showing the classification carried out in a case where the filter set number is 2. (d) of FIG. 16 is a table showing the classification carried out in a case where the filter set number is 3. (e) of FIG. 16 is a table showing the classification carried out in a case where the filter set number is 4.

(6-1: Case where Filter Set Number is 0)

As illustrated in (a) of FIG. 16, in the case where the filter set number is 0, the region classification section 424 classifies all the partitions contained in a target macroblock as type 0.

(6-2: Case where Filter Set Number is 1)

As illustrated in (b) of FIG. 16, in the case where the filter set number is 1, the region classification section 424 classifies (i) partitions, whose activity ACT is not more than a predetermined threshold value TH, as type 0 and (ii) partitions, whose activity ACT is more than the predetermined threshold value TH, as type 1.

(6-3: Case where Filter Set Number is 2)

As illustrated in (c) of FIG. 16, in the case where the filter set number is 2, the region classification section 424 classifies (i) partitions, whose activity ACT is not more than a predetermined threshold value TH, as type 0, (ii) partitions, (a) whose activity ACT is more than the predetermined threshold value TH and (b) to which one of the DC prediction, the planar prediction, and the scale prediction is applied, as type 1, and (iii) partitions, (a) whose activity ACT is more than the predetermined threshold value TH and (b) to which any prediction mode other than the above-mentioned predictions is applied, as type 2.

(6-4: Case where Filter Set Number is 3)

As illustrated in (d) of FIG. 16, in the case where the filter set number is 3, the region classification section 424 classifies partitions, whose activity ACT is not more than a predetermined threshold value TH, as type 0. The region classification section 424 also classifies partitions whose activity ACT is more than the predetermined threshold value TH as follows: (i) partitions, to which one of the DC prediction, the planar prediction, and the scale prediction is applied, are type 1, (ii) partitions, to which the directional prediction 0 is applied, are type 2, (iii) partitions, to which the directional prediction 4 is applied, are type 3, and (iv) partitions, to which any prediction mode other than the above-mentioned predictions is applied, are type 4.

(6-5: Case where Filter Set Number is 4)

As illustrated in (e) of FIG. 16, in the case where the filter set number is 3, the region classification section 424 classifies partitions, whose activity ACT is not more than a predetermined threshold value TH, as type 0. The region classification section 424 also classifies partitions whose activity ACT is more than the predetermined threshold value TH as follows: (i) partitions, to which one of the DC prediction, the planar prediction, and the scale prediction is applied, region type 1, (ii) partitions, to which the directional prediction 0 is applied are type 2, (iii) partitions, to which the directional prediction 4 is applied region type 3, (iv) partitions, to which one of the directional predictions 1 through 3 is applied, region type 4, (v) partitions, to which one of the directional prediction 5 through 7 is applied, region type 5, and (vi) partitions, to which the TM prediction is applied, are type 6.

Thus, in Classification Process Example 6, (i) the correspondence between the size of a partition and the activity of the partition and (ii) the correspondence between (a) the shape or prediction mode of the partition and (b) the directionality of the partition, are observed.

Note that an adaptive filter 42 for carrying out the classification in Classification Process Example 6 may be any of the following: (i) the adaptive filter 42 with the basic arrangement illustrated in FIG. 5 and (ii) the adaptive filter 42 illustrated in the modification 4 in FIG. 9. In a case where only Classification Process Example 6 (out of 1 through 6) is carried out, the arrangement of the adaptive filter 42 can be simplified by applying the modification illustrated in FIG. 9.

(Filter Process Section 425)

The filter process section 425 generates a filtered decoded image P_FL by carrying out a filter process, with the use of filter coefficient groups supplied from the region classification section 424, with respect to each divisional region (or partition) included in a target macroblock of a deblocked decoded image P_DB. Note that divisional regions or partitions, which are classified as type I (I=1, 2, . . . ), are subjected to a filter process with the use of filter coefficient groups I.

To be more specific, the filter process section 425 calculates a pixel value $S_F$ (X', Y') by an equality (6) below, where (i) $S_F$ (X', Y') represents a pixel value which (a) falls within the target macroblock of the filtered decoded image P_FL (hereinafter referred to also as a "filtered image") and (b) is of a filter target pixel of a divisional region (or partition) classified as the type I (I=1, 2, . . . ) and (ii) S (x, y) represents a pixel value located inside of or in the vicinity of a target macroblock of the deblocked decoded image P_DB (hereinafter referred to also as an "unfiltered image"):

[Math. 5]

$$S_F(x', y') = \left( \sum_{(i,j) \in R} aI(i, j) \times S(x+i, y+j) \right) + oI \quad (6)$$

The coordinates (x, y) and the coordinates (x', y') can be the same, or can be different provided that there is a one-to-one correspondence between them. "aI(i, j)" (i) represents a filter coefficient to be multiplied by the pixel value S(x+i, y+j) of an unfiltered image and (ii) corresponds to a filter coefficient included in a filter coefficient group contained in coded data #1. "oI" represents an offset included in the filter coefficient group I.

"R" represents a region (hereinafter referred to also as "filter reference region R") to be referred to as a reference in a filter process. An example of the filter reference region R in Embodiment 1 is illustrated in (a) of FIG. 17. In (a) of FIG. 17, (i) a shaded pixel represents a filter target pixel and (ii) "a0" through "a12" represent filter coefficients that are (I) obtained by decoding coded data #1 and (II) allocated to each pixel included in the filter reference region R. As illustrated in (a) of FIG. 17, the filter reference region R can be made up of, for example, pixels, each of which is away from the filter target pixel by a city block distance of 3 or less.

Figure 17:
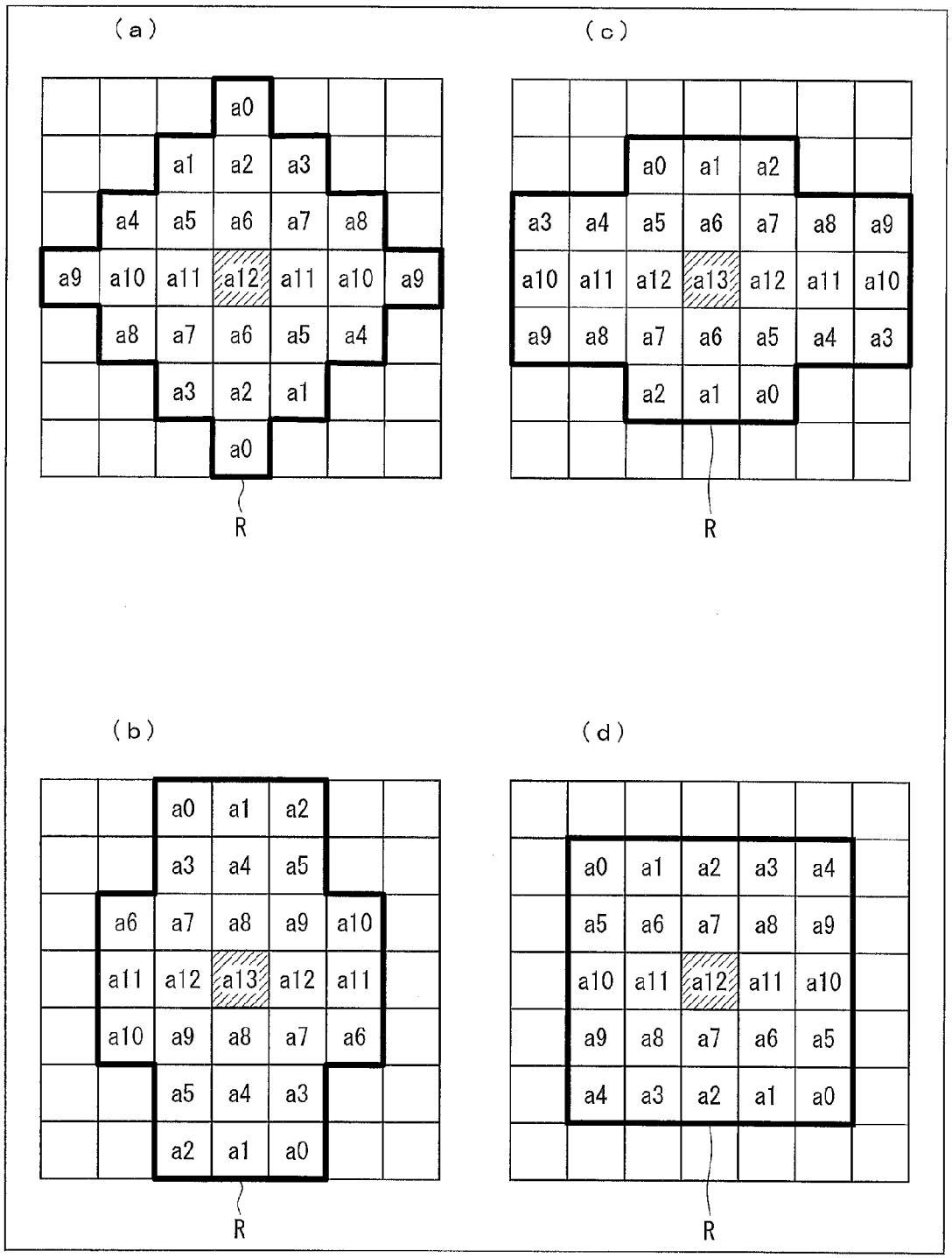
FIG. 17 explains a shape of a reference region to which the adaptive filter in accordance with the first embodiment refers. (a) of FIG. 17 shows a basic reference region. (b) of FIG. 17 shows a vertically oriented reference region. (c) of FIG. 17 shows a horizontally oriented reference region. (d) of FIG. 17 shows an obliquely oriented reference region.

As illustrated in (a) of FIG. 17, the filter coefficients can be allocated to the pixels included in the filter reference region R such that the same filter coefficients are allocated to pixels which share 2-fold rotational symmetry with respect to a central pixel in the filter reference region R as a reference point. That is, the filter reference region R can be such that, in the equation (6), aI(i, j)=aI(−i, −j) is satisfied with the use of the filter coefficients a0 through a12 decoded from the coded data #1, such as aI(0, −3)=aI(0, 3), a0, aI(1, −2)=aI(−1, 2), a1, . . . .

It should be noted that Embodiment 1 is not limited to this arrangement, that is, the filter coefficients do not necessarily have to be allocated to pixels in view of the rotational symmetries. Rather, the filter reference region R can generally be (i) a region to be made up of pixels, each of which is away from coordinates (x, y) by a city block distance of Ncb or less (unit: pixel), (ii) a rectangular region which is defined by Nx×Ny taps while having coordinates (x, y) as a center thereof, or (iii) a region arranged so as to include other pixels as well.

Details, such as (i) a method of allocating filter coefficients to pixels included in the filter reference region R and (ii) the shape of the filter reference region R, can be, as needed, arranged according to the arrangement of a moving image encoder for generating the coded data #1.

The filter process section 425 can be arranged so as not to carry out a filter process with respect to a divisional region and a partition for each of which on/off information supplied from the variable-length code decoding section 13 specifies that the filter process is off.

As described earlier, the adaptive filter 42 is an image filter device which calculates a pixel value of each pixel of an output image (the filtered decoded image P_FL) by use of (i) a pixel value in a reference region R which is defined in accordance with a location of the each pixel in an input image (the deblocked image P_DB) and (ii) a filter coefficient group, the image filter device including: direction discrimination means (the edge direction detection section 422, the region classification section 424) for discriminating directionality of the input image in each of a plurality of unit regions (divisional regions or partitions) constituting the input image; classification means (the region classification section 424) for classifying the each of the plurality of unit regions into one of a plurality of unit region groups (types) in accordance with to which of a plurality of predetermined groups the directionality of the input image in the each of the plurality of unit regions belongs, the directionality having been discriminated by the directionality discrimination means; and filter means (the filter process section 425) for calculating the pixel value of the each pixel of the output image by use of the filter coefficient group optimized for a unit region group to which a unit region including the each pixel belongs.

According to the adaptive filter 42 which has the arrangement, filter means calculates the pixel value of the each pixel of the output image by use of the filter coefficient group optimized for a unit region group to which a unit region including the each pixel belongs. This makes it possible to carry out a suitable filter process in accordance with the directionality of the input image in a case where the directionality differs in accordance with the each of the plurality of unit regions.

Hence, according to the adaptive filter 42, a predicted image which is generated with reference to the output image can have higher prediction accuracy also in a case where the input image has an image characteristic such that coding efficiency is not improved even if a filter coefficient is changed in accordance with activity.

Note that the directionality of the input image (deblocked image P_DB) in the each of the plurality of unit regions can be (i) discriminated by detection of an edge of the input image by the edge direction detection section 422 or (ii) indirectly discriminated by the region classification section 424 in accordance with a direction indicated by an intra prediction mode (prediction mode) which is referred to for generating an intra predicted image.

The adaptive filter 42 can also be described as an image filter device which generates an output image (the filtered decoded image P_FL) from an input image (the deblocked image P_DB) generated for each unit region (divisional region or partition) by use of intra prediction, the image filter device calculating a pixel value of each pixel of the output image by use of (i) a pixel value in a reference region which is defined in accordance with a location of the each pixel in the input image and (ii) a filter coefficient group, the image filter device including: classification means (the region classification section 424) for classifying the each unit region into one of a plurality of unit region groups (types) in accordance with to which of a plurality of predetermined groups a shape and a size of the each unit region belongs; and filter means (the filter process section 425) for calculating the pixel value of the each pixel of the output image by use of the filter coefficient group optimized for a unit region group to which a unit region including the each pixel belongs.

As described above, the adaptive filter 42 can (i) classify each partition into one of a plurality of groups in accordance with a shape and a size of the each partition (as described in Classification Process Example 3, for example) and then (ii) carry out a filter process with the use of a filter coefficient optimum for each of the plurality of groups.

Hence, according to the adaptive filter 42, a predicted image which is generated with reference to the output image can have higher prediction accuracy also in a case where the input image has an image characteristic such that coding efficiency is not improved even if a filter coefficient is changed in accordance with activity.

<Modification 1>

Embodiment 1 is not limited to the examples described above in which a filter set number is included in a slice header SH of coded data #1. For example, a slice header SH of coded data #1 can be arranged to include, instead of a filter set number, a table (hereinafter referred to also as "filter allocation table") indicative of a correspondence between (i) any of edge angles Theta, prediction modes, partition sizes, and activity ACT and (ii) one or more filter coefficient groups (more specifically, filter numbers that specify filter coefficient groups).

FIG. 18 is a view illustrating an arrangement of a slice header SH' containing a filter allocation table. The slice header SH', as in the case of the slice header SH described earlier, contains filter on/off information and filter coefficient groups 0 through Nf−1. The slice header SH' also contains, instead of a filter set number contained in the slice header SH, the filter allocation table described above.

Examples of the filter allocation table are illustrated in (a) and (b) of FIG. 19. The filter allocation table can be, for example, (i) a table illustrating a correspondence between edge angles Theta and filter numbers (see (a) of FIG. 19) or (ii) a table illustrating a correspondence between (I) prediction modes and partition sizes and (II) filter numbers (see (b) of FIG. 19). The filter allocation table is not limited to those illustrated in (a) and (b) of FIG. 19, provided that at least one of edge directions, partition sizes, prediction modes, and activity corresponds to filter numbers.

The region classification section 424 included in the adaptive filter 42 can be arranged to refer to the filter allocation table, and then to use it for allocating, to each divisional region or partition contained in a target macroblock, a filter coefficient group which is (i) obtained by decoding coded data #1 and (ii) specified by the filter allocation table.

For example, in a case where the filter allocation table is as illustrated in (a) of FIG. 18, the region classification section 424 (i) allocates a filter coefficient group 0 to a divisional region where an edge angle Theta satisfies 0°≤Theta<22.5°, or 157.5°≤Theta<180°, (ii) allocates a filter coefficient group 2 to a divisional region where an edge angle Theta satisfies 22.5°≤Theta<67.5°, (iii) allocates a filter coefficient group 1 to a divisional region where an edge angle Theta satisfies 67.5°≤Theta<112.5°, and (iv) allocates a filter coefficient group 2 to a divisional region where an edge angle Theta satisfies 112.5°≤Theta<157.5°. The same principle applies to the case of the filter allocation table illustrated in (b) of FIG. 19.

By thus referring to a filter allocation table, the degree of freedom, to which a plurality of filter coefficient groups are individually associated with varying types (unit region groups), is increased. This increases flexibility in the selection of filter coefficient groups.

Note that information obtained from a filter allocation table can be regarded also as information (directionality information) indicative of which edge angle is associated with which of a plurality of filter coefficient groups contained in coded data #1.

<Modification 2>

Embodiment 1 is not limited to the examples described above in which the filter reference region R illustrated in (a) of FIG. 17 is used as that of the equality (6). For example, filter reference regions R illustrated in (b) through (d) of FIG. 17 can be used as filter reference regions R of Embodiment 1. In (a) through (d) of FIG. 17, pixels in contact with oblique lines represent filter target pixels. Hereinafter, (i) the filter reference region R illustrated in (a) of FIG. 17 is referred to as a "basic reference region", (ii) the filter reference region R illustrated in (b) of FIG. 17 is referred to as a "vertically oriented reference region", (iii) the filter reference region R illustrated in (c) of FIG. 17 is referred to as a "horizontally oriented reference region", and (iv) the filter reference region R illustrated in (d) of FIG. 17 is referred to as a "obliquely oriented reference region."

The basic reference region illustrated in (a) of FIG. 17 can be suitably used to carry out a filter process with respect to (i) divisional regions (or partitions) not having edges in a target macroblock of a deblocked decoded image P_DB or (ii) divisional regions (or partitions) having edges, whose sharpness value is smaller than a predetermined value, in the target macroblock of the deblocked decoded image P_DB.

As illustrated in (b) of FIG. 17, the vertically oriented reference region is distinct in that a vertical length is longer than a horizontal length. This enables the vertically oriented reference region to be suitably used to carry out a filter process with respect to divisional regions (or partitions) having vertical edges in a target macroblock of a deblocked decoded image P_DB.

As illustrated in (c) of FIG. 17, the horizontally oriented reference region is distinct in that a horizontal length is longer than a vertical length. This enables the horizontally oriented reference region to be suitably used to carry out a filter process with respect to divisional regions (or partitions) having horizontal edges in a target macroblock of a deblocked decoded image P_DB.

As illustrated in (d) of FIG. 17, the obliquely oriented reference region has a rectangular shape. This enables the obliquely oriented reference region to be suitably used to carry out a filter process with respect to divisional regions (or partitions) having oblique edges in a target macroblock of a deblocked decoded image P_DB.

The filter process section 425 included in the adaptive filter 42 can be arranged to selectively use, as the filter reference region R, any one of the basic reference region, the vertically oriented reference region, the horizontally oriented reference region, and the obliquely oriented reference region. More specifically, the adaptive filter 42 can be arranged such that (i) the prediction mode/size accumulating section 421 and the edge direction detection section 422 supply, to the filter process section 425, a prediction mode of each partition and an edge angle Theta of each divisional region, respectively, and then (ii) the filter process section 425 selectively uses any one of the above reference regions in accordance with the edge angle or the prediction mode thus received.

One example of correspondence between edge angles and reference regions to be used is illustrated in (a) of FIG. 20. As illustrated in (a) of FIG. 20, the filter process section 425 uses, for example, (i) a horizontally oriented reference region in a case where there are filter target pixels in a divisional region where an edge angle Theta satisfies 0°≤Theta<22.5°, or 157.5°≤Theta<180°, (ii) an obliquely oriented reference region in a case where there are filter target pixels in a divisional region where an edge angle Theta satisfies 22.5°≤Theta<67.5°, (iii) a vertically oriented reference region in a case where there are filter target pixels in a divisional region where an edge angle Theta satisfies 67.5°≤Theta<112.5°, and (iv) an obliquely oriented reference region in a case where there are filter target pixels in a divisional region where an edge angle Theta satisfies 112.5°≤Theta<157.5°.

One example of correspondence between prediction modes and reference regions to be used is illustrated in (b) of FIG. 20. As illustrated in (b) of FIG. 20, the filter process section 425 uses, for example, (i) a basic reference region in a case where there are filter target pixels in a partition where a prediction mode is one of the DC prediction, the planar prediction, the TM prediction, and the scale prediction, (ii) a horizontally oriented reference region in a case where there are filter target pixels in a partition where a prediction mode is the directional prediction 0, (iii) a vertically oriented reference region in a case where there are filter target pixels in a partition where a prediction mode is the directional prediction 4, and (iv) an obliquely oriented reference region in a case where there are filter target pixels in a partition where a prediction mode is one of the directional predictions 1 through 3 or one of the directional predictions 5 through 7.

A moving image encoder having an arrangement identical to that described in Embodiment 1 can carry out a more suitable filter process by selecting, in accordance with an edge angle and a prediction mode, a filter reference region having the most appropriate shape out of a plurality of filter reference regions. This improves prediction accuracy and therefore increases coding efficiency. By thus selecting a filter reference region having the most appropriate shape, it is also possible for such a moving image encoder to efficiently carry out a filter process while minimizing the total number of filter coefficient groups.

In addition, a moving image decoder 1 having the arrangement described in Modification 2 is capable of properly decoding coded data having such high coding efficiency.

Note that, in Embodiment 1, selectable shapes of reference regions are not limited to those illustrated in (a) through (d) of FIG. 20. That is, other reference regions of various shapes and sizes can be used according to edge angles and prediction modes.

<Modification 3>

The present embodiment is not limited to the examples described above where a slice header of coded data #1 includes a filter set number and a case where the slice header of coded data #1 includes a filter allocation table instead of the filter set number.

For example, it is also possible to employ an arrangement in which the slice header of coded data #1 includes neither the filter set number nor the filter allocation table.

In a case where such an arrangement is employed, the region classification section 424 (i) classifies, as one of one or more types, each of divisional regions or each of partitions included in a target macroblock and (ii) allocates a filter coefficient group I which is decoded from the coded data #1 to a divisional region or a partition which have been classified as type I (I=1, 2, . . . ), based on (1) a size of each of the partitions, (2) a prediction mode, (3) an edge angle Theta, and (4) activity ACT, without reference to a filter set number.

Moreover, according to the above description, the edge detection section 422 detects an edge angle Theta of each divisional region in a range of 0°≤Theta<180°. However, the present embodiment is not limited to this. For example, it is also possible to employ an arrangement in which the edge detection section 422 detects an edge angle Theta of each divisional region in a range of 0°≤Theta<360°.

FIG. 21 shows an example of a classification process carried out by the region classification section 424 in a case where coded data #1 includes neither a filter set number nor a filter allocation table and where the edge detection section 422 detects an edge angle Theta of each divisional region in a range of 0°≤Theta<360°. The region classification section 424 classifies a divisional region whose edge angle Theta meets (0°≤Theta<22.5° or 337.5°≤Theta<360°) as type 0, classifies a divisional region whose edge angle Theta meets (22.5°≤Theta<67.5°) as type 1, classifies a divisional region whose edge angle Theta meets (67.5°≤Theta<112.5°) as type 2, classifies a divisional region whose edge angle Theta meets (112.5°≤Theta<157.5°) as type 3, classifies a divisional region whose edge angle Theta meets (157.5°≤Theta<202.5°) as type 4, classifies a divisional region whose edge angle Theta meets (202.5°≤Theta<247.5°) as type 5, classifies a divisional region whose edge angle Theta meets (247.5°≤Theta<292.5°) as type 6, and classifies a divisional region whose edge angle Theta meets (292.5°≤Theta<337.5°) as type 7 (see FIG. 21).

The region classification section 424 also allocates a filter coefficient groups I which is decoded from the coded data #1 to the divisional regions classified as type I (I=1 to 7).

According to the present modification, an edge angle is detected in the range of 0°≤Theta<360°, and a filter coefficient group is allocated in accordance with the detected edge angle. This enables a more effective filter process. Furthermore, according to the present modification, the coded data #1 includes neither a filter set number nor a filter allocation table. This makes it possible to reduce a code amount of the coded data #1.

<Modification 4>

The present embodiment is not limited to the example described above in which the region classification section 424 classifies, into one of a plurality of types, each of divisional regions or each of partitions (prediction unit) which are included in a target macroblock. For example, it is also possible to employ an arrangement in which the region classification section 424 classifies, into one of a plurality of types, each of blocks (transformation unit) included in a target macroblock. In this case, it is possible to employ an arrangement substantially identical to the above arrangement in which the region classification section 424 classifies each of the blocks included in the target macroblock into one of the plurality of types in accordance with a size of the each of the blocks, a prediction mode, an edge angle Theta, and activity ACT.

In a case of such an arrangement, the intra prediction mode accumulating section 421 allocates a prediction mode of each of partitions included in a target macroblock to a corresponding block and accumulates therein a prediction mode of each of blocks and a size of each of the blocks. The edge direction detection section 422 detects an edge for each of the blocks included in the target macroblock. The activity calculating section 423 calculates activity ACT of each of the blocks included in the target macroblock. The filter process section 425 carries out a filter process with respect to a block which is classified as type I (I=1, 2, . . . ), the filter process being carried out with a filter coefficient group I.

Even in an arrangement such as the present modification, it is still possible for the adaptive filter 42 to carry out a suitable filter process with respect to a deblocked decoded image P_DB.

(Moving Image Encoder 2)

Figure 22:
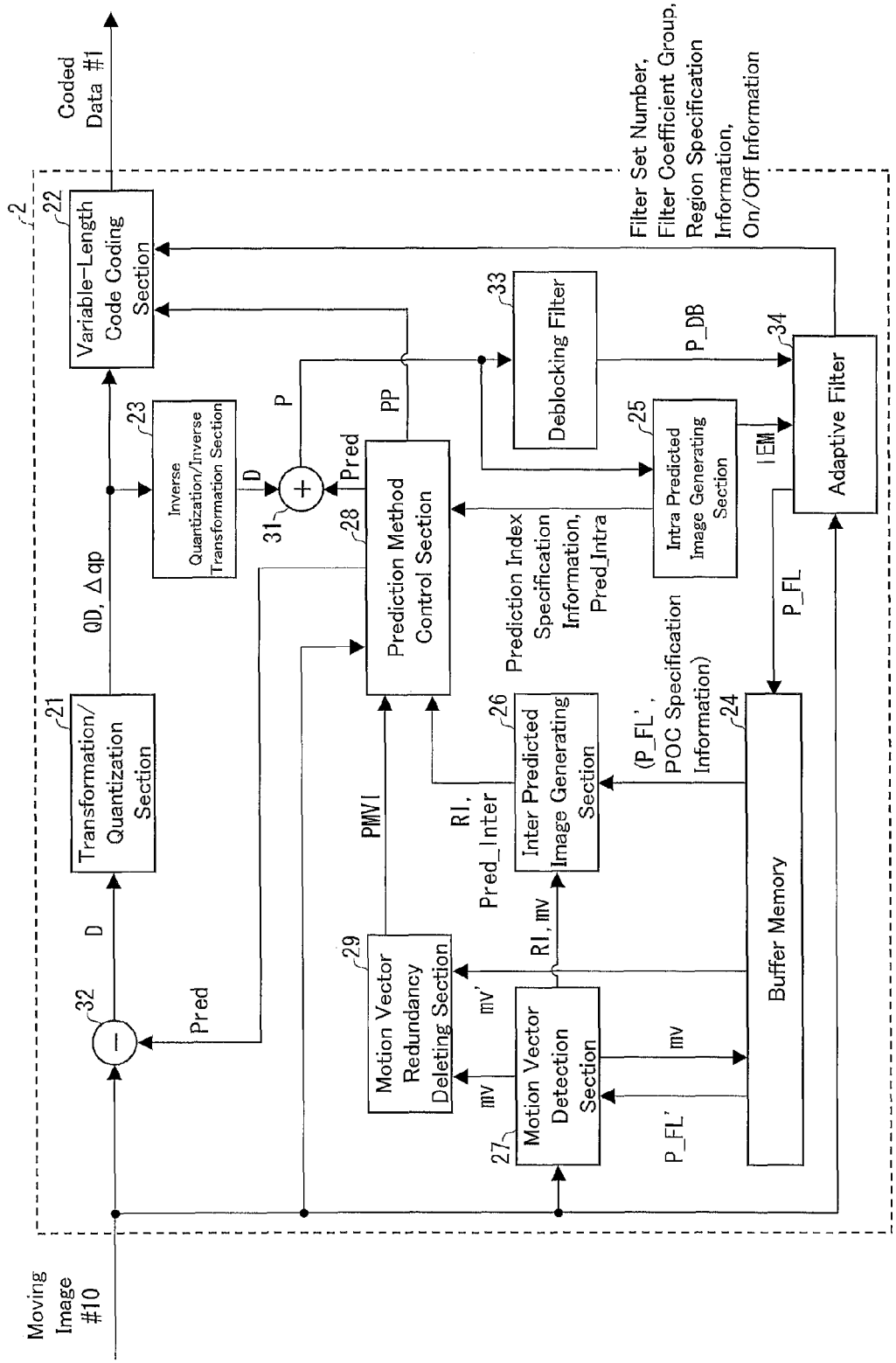
FIG. 22 is a block diagram showing an arrangement of the moving image encoder in accordance with the first embodiment.
Figure 23:
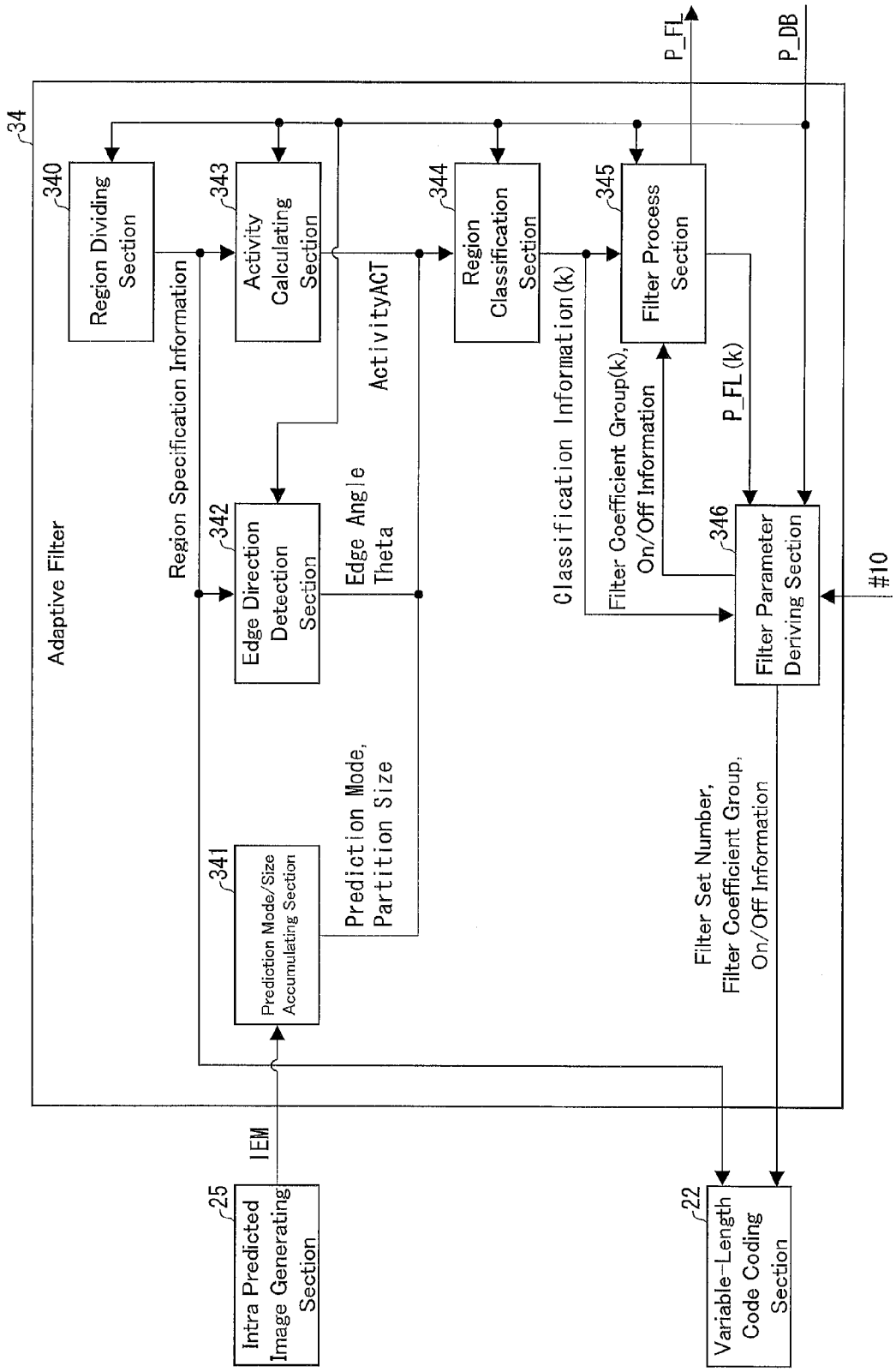
FIG. 23 is a block diagram showing an arrangement of an adaptive filter of the moving image encoder in accordance with the first embodiment.
Figure 24:
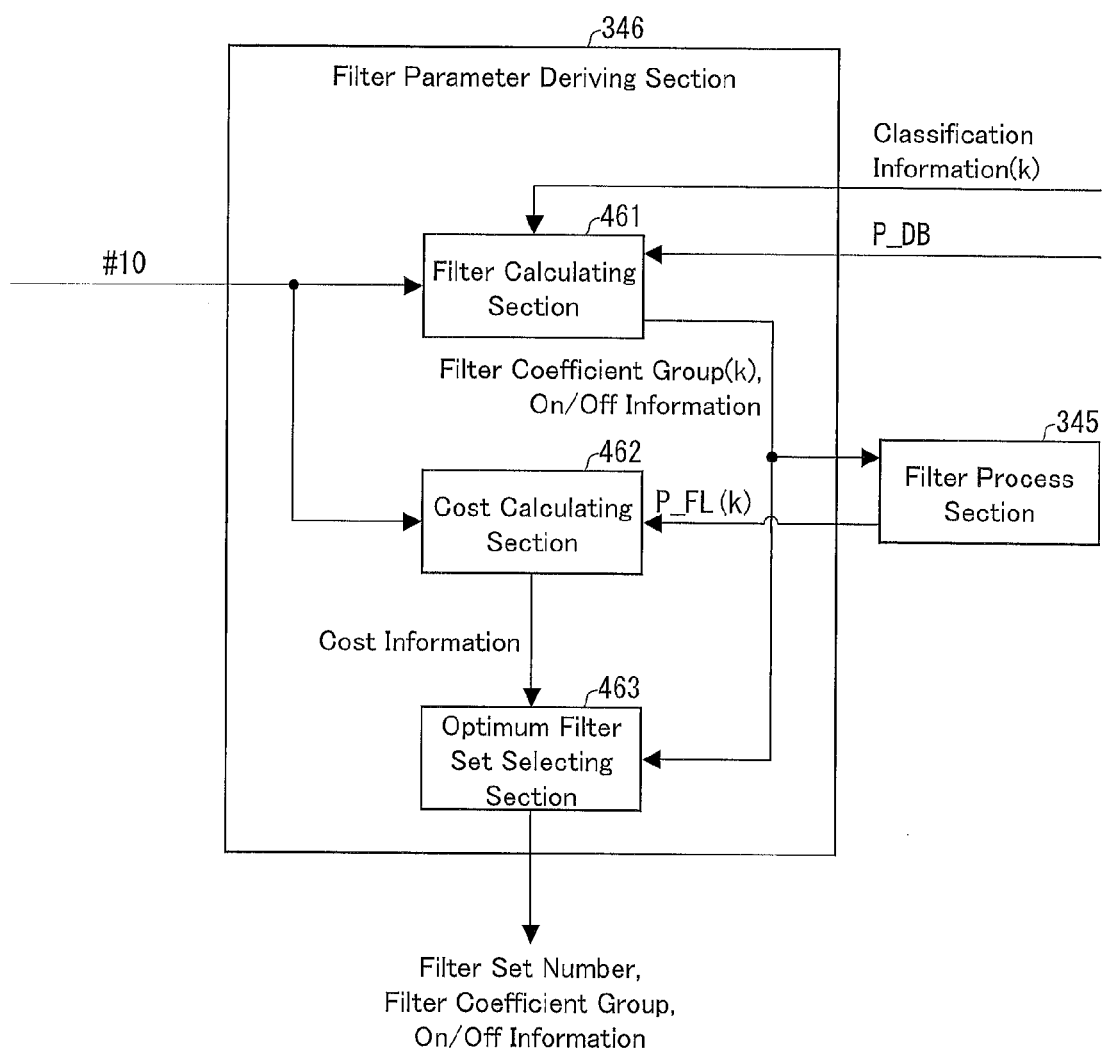
FIG. 24 is a block diagram showing an arrangement of a filter parameter deriving section of the adaptive filter of the moving image encoder in accordance with the first embodiment.

The following description discusses an arrangement of the moving image encoder 2 in accordance with the present embodiment with reference to FIGS. 22 through 24. The moving image encoder 2 is a decoding apparatus, which partly adopts a technique employed in H.264/MPEG-4. AVC, and KTA software.

FIG. 22 is a block diagram showing an arrangement of the moving image encoder 2. The moving image encoder 2 includes a transformation/quantization section 21, a variable-length code coding section 22, an inverse quantization/inverse transformation section 23, a buffer memory 24, an intra predicted image generating section 25, an inter predicted image generating section 26, a motion vector detection section 27, a prediction method control section 28, a motion vector redundancy deleting section 29, an adder 31, a subtracter 32, a deblocking filter 33, and an adaptive filter 34 (see FIG. 22). The moving image encoder 2 generates coded data #1 by encoding a moving image #10 (encoding target image).

The transformation/quantization section 21 (i) subjects, to a DCT (Discrete Cosine Transform), prediction residual D which is obtained by subtracting a predicted image Pred from an encoding target image, (ii) quantizes a DCT coefficient obtained by the DCT, and (iii) supplies, to the variable-length code coding section 22 and the inverse quantization/inverse transformation section 23, a quantized prediction residual QD which is obtained by the quantization. The transformation/quantization section 21 (i) selects, for each macroblock, a quantization step QP which is used for quantization of the macroblock, (ii) supplies, to the variable-length code coding section 22, a quantization parameter difference Δqp indicative of a size of the selected quantization step QP, and (iii) supplies the selected quantization step QP to the inverse quantization/inverse transformation section 23. The quantization parameter difference Δqp here means a difference value obtained by subtracting, from (a) a quantization parameter qp (QP=$2^{qp/6}$) for a macroblock to be subjected to the DCT/quantization, (b) a quantization parameter qp' for a macroblock subjected to the DCT/quantization right before the macroblock to be subjected to the DCT/quantization.

The variable-length code coding section 22 generates coded data #1 by carrying out variable length coding for encoding (i) a quantized prediction residual QD and Δqp supplied from the transformation/quantization section 21, (ii) a quantization parameter PP supplied from the prediction method control section 28 (described later), and (iii) a filter set number, a filter coefficient group, region specification information, and on/off information each of which is supplied from the adaptive filter 34 (described later).

The inverse quantization/inverse transformation section 23 (i) carries out inverse quantization with respect to the quantized prediction residual QD, (ii) carry out an inverse DCT (Discrete Cosine Transform) with respect to a DCT coefficient obtained by the inverse quantization, (iii) supplies, to the adder 31, a prediction residual D obtained by the inverse DCT. In carrying out the inverse quantization with respect to the quantized prediction residual QD, a quantization step QP supplied from the transformation/quantization section 21 is used. The prediction residual D supplied from the inverse quantization/inverse transformation section 23 includes a quantization error in addition to a prediction residual D received by the transformation/quantization section 21. However, both the prediction residuals D are called identically for easy explanation.

The intra predicted image generating section 25 generates a predicted image Pred_Intra for each of partitions, respectively. More specifically, the intra predicted image generating section 25 (i) selects a prediction mode to be used for intra prediction for a partition and (ii) generates a predicted image Pred_Intra from a decoded image P by using the prediction mode. The intra predicted image generating section 25 supplies the intra predicted image Pred_Intra thus generated to the prediction method control section 28.

For each of the partitions, the intra predicted image generating section 25 (i) specifies a prediction index PI for the partition in accordance with a prediction mode selected for the partition and a size of the partition, with reference to a look-up table shown in (a) of FIG. 3 which table is stored in the memory of the intra predicted image generating section 25 itself, and (ii) supplies, to the prediction method control section 28, prediction index specification information indicative of the prediction indexes PI for the partitions.

The intra predicted image generating section 25 also supplies, to the adaptive filter 34, intra coding mode information IEM indicative of a size of a target partition and a prediction mode allocated to the target partition.

The generation of the intra predicted image by the intra predicted image generating section 25 can be carried out by a process similar to the process described in (Process in which Intra Predicted Image Generating Section 17 Generates Intra Predicted Image).

The motion vector detection section 27 detects motion vectors my for the partitions, respectively. Specifically, the motion vector detection section 27 detects a motion vector my for a target partition by (i) selecting a filtered decoded image P_FL' to be used as a reference image and (ii) searching, in the filtered decoded image P_FL, a region in which the target partition is the most approximated. The filtered decoded image P_FL' here is an image obtained by subjecting a decoded image which has been decoded, to a deblocking process by the deblocking filter 33 and to an adaptive filter process by the adaptive filter 34. It is possible for the motion vector detection section 27 to read out, from the buffer memory 24, pixel values of pixels which constitute the filtered decoded image P_FL'. The motion vector detection section 27 supplies, to the inter predicted image generating section 26 and the motion vector redundancy deleting section 29, the detected motion vector my together with a reference image index RI that indicates the filtered decoded image P_FL' which has been used as a reference image. For a partition for which bidirectional prediction (weighed prediction) is to be carried out, a filtered decoded image P_FL1' and a filtered decoded image P_FL2' are selected as reference images, and the motion vector detection section 27 then supplies, to the inter predicted image generating section 26 and the motion vector redundancy deleting section 29, motion vectors mv1 and mv2 and reference image indexes RI1 and RI2, which are motion vectors and reference image indexes corresponding to the filtered decoded image P_FL1' and P_FL2', respectively.

The inter predicted image generating section 26 generates a motion compensated image mc for each of inter prediction partitions. Specifically, the inter predicted image generating section 26 generates, by use of a motion vector my supplied from the motion vector detection section 27, a motion compensated image mc from a filtered decoded image P_FL' which is specified by a reference image index RI supplied from the motion vector detection section 27. Similarly to the motion vector detection section 27, it is possible for the inter predicted image generating section 26 to read out, from the buffer memory 24, a pixel value of each of pixels which constitute the filtered decoded image P_FL'. The inter predicted image generating section 26 supplies, to the prediction method control section 28, the generated motion compensated image mc (inter predicted image Pred_Inter) together with the reference image index RI which is supplied from the motion vector detection section 27. In a case of a partition for bidirectional prediction (weighed prediction), (i) the motion vector mv1 is used to generate a motion compensated image mc1 from the filtered decoded image P_FL1' which is specified by the reference image index RI1, (ii) the motion vector mv2 is used to generate a motion compensated image mc2 from the filtered decoded image P_FL2' which is specified by the reference image index RI2, and (iii) an inter predicted image Pred_Inter is generated by adding an offset value to weighted average between the motion compensated images mc1 and mc2.

The prediction method control section 28 selects whether intra prediction or inter prediction is carried out by comparing, with an encoding target image, the intra predicted image Pred_Intra and the inter predicted image Pred_Inter. In a case where the intra prediction is selected, the prediction method control section 28 (i) supplies the intra predicted image Pred_Intra as a predicted image Pred to the adder 31 and the subtracter 32 and (ii) supplies, to the variable-length code coding section 22, the prediction index PI which has been supplied from the intra predicted image generating section 25 as a prediction parameter PP. In contrast, in a case where the inter prediction is selected, the prediction method control section 28 (i) supplies the inter predicted image Pred_Intra as a predicted image Pred to the adder 31 and the subtracter 32 and (ii) supplies, to the variable-length code coding section, the reference image index RI which has been supplied from the inter predicted image generating section 26, and an estimated motion vector index PMVI and a motion vector residual MVD each of which has been supplied from the motion vector redundancy deleting section 29 (described later), the reference image index RI, the estimated motion vector index PMVI, and the motion vector residual MVD serving as a prediction parameter PP.

The subtracter 32 subtracts, from the encoding target image, the predicted image Pred which has been selected by the prediction method control section 28, whereby the subtracter 32 generates a prediction residual D. The prediction residual D generated by the subtracter 32 is, as mentioned earlier, subjected to DCT/quantization by the transformation/quantization section 21. In contrast, the adder 31 adds the predicted image Pred which has been selected by the prediction method control section 28 to the prediction residual D generated by the inverse quantization/inverse transformation section 23, whereby the adder 31 generates a locally decoded image P. The locally decoded image P generated by the adder 31 passes through the deblocking filter 33 and the adaptive filter 34, and then is stored in the buffer memory 24 as a filtered decoded image P_FL so as to be used as a reference image in carrying out an inter prediction.

The motion vector redundancy deleting section 29 deletes redundancy in the motion vector my detected by the motion vector detection section 27. More specifically, the motion vector redundancy deleting section 29 generates a motion vector residual MVD by (i) selecting an estimation method to be used in estimating a motion vector my, (ii) deriving an estimated motion vector pmv in accordance with the estimation method, and (iii) subtracting the estimated motion vector pmv from the motion vector my. The motion vector redundancy deleting section 29 supplies, to the prediction method control section 28, the generated motion vector residual MVD with an estimated motion vector index PMVI indicative of the selected estimation method.

In a case where a difference in pixel value between pixels adjacent each other across a block boundary or a macroblock boundary in a decoded image P is less than a predetermined threshold, the deblocking filter 33 carries out a deblocking process with respect to the block boundary or the macroblock boundary in the decoded image P, so as to carry out image smoothing across the block boundary or the macroblock boundary. The image which has been subjected to the deblocking process by the deblocking filter 33 is supplied to the adaptive filter 34 as a deblocked decoded image P_DB.

The adaptive filter 34 carries out an adaptive filter process with respect to the deblocked decoded image P_DB which is supplied from the deblocking filter 33, whereby the adaptive filter 34 generates a filtered decoded image P_FL. The filtered decoded image P_FL which has been subjected to the filter process by the adaptive filter 34 is stored in the buffer memory 24. A detailed description of an arrangement of the adaptive filter 34 is omitted here since it is described in detail later.

(Adaptive Filter 34)

The following description discusses the adaptive filter 34 included in the moving image encoder 2 with reference to FIGS. 23 through 24.

FIG. 23 is a block diagram showing an arrangement of the adaptive filter 34. As illustrated in FIG. 23, the adaptive filter 34 includes a region dividing section 340, an intra coding mode accumulating section 341, an edge direction detection section 342, an activity calculating section 343, a region classification section 344, a filter process section 345, and a filter parameter deriving section 346.

The adaptive filter 34 carries out a filter process with respect to the deblocked decoded image P_DB which is supplied from the deblocking filter 33. The adaptive filter 34 carries out the filter process by use of a filter coefficient determined so that a difference between a filtered image and the encoding target image is minimum. The filtered image is stored in the buffer memory 24 as a filtered decoded image P_FL. The generation of the filtered decoded image P_FL may be carried out per macroblock, per region smaller than the macroblock, or per region larger than the macroblock. The following description discusses, as an example, a case where the adaptive filter 34 generates a filtered decoded image P_FL per macroblock.

(Region Dividing Section 340)

The region dividing section 340 (i) divides a target macroblock into one or more divisional regions and (ii) supplies, to the edge direction detection section 342, the activity calculating section 343, and the variable-length code coding section 22, region specification information which specifies a size and a position of each of the one or more divisional regions. The each of the one or more divisional regions here can be constituted by one (1) pixel. Alternatively, it can be constituted by a plurality of pixels. Note that it is possible to employ an arrangement where the region dividing section 340 divides a target macroblock into divisional regions in accordance with a feature (luminance, texture, etc.) of an image in the target macroblock. It is also possible to employ an arrangement where the region dividing section 340 divides a target macroblock into divisional regions so that coding efficiency is optimized.

(Intra Coding Mode Accumulating section 341)

The intra coding mode accumulating section 341 accumulates therein a size of a partition and a prediction mode allocated to the partition, each of the size and the prediction mode being indicated by intra coding mode information IEM which is supplied from the intra predicted image generating section 25. It is possible to employ an arrangement in which the intra coding mode accumulating section 341 accumulates therein sizes and prediction modes of all partitions included in a target macroblock.

The information which contains the size and the prediction mode of each of partitions is supplied to the region classification section 344 from the intra coding mode accumulating section 341.

(Edge Direction Detection Section 342)

The edge direction detection section 342 (i) divides a target macroblock in a deblocked decoded image P_DB into one or more divisional regions with reference to region specification information which is supplied from the region dividing section 340 and (ii) detects an edge for an image of each of the one or more divisional regions. For each of the one or more divisional regions, the edge direction detection section 342 supplies an angle (edge angle) Theta indicative of directionality of an edge to the region classification section 344. Calculation of an edge angle Theta by the edge direction detection section 342 can be carried out in a method similar to that carried out by the edge detection section 422. Note that, it is possible to employ an arrangement in which in a case where edge strength of all pixels included in a target divisional region is not more than a predetermined threshold, the edge direction detection section 342 determines that the target divisional region has no edge, and then supplies a result of the determination to the region classification section 344.

(Activity Calculating Section 343)

The activity calculating section 343 (i) divides a target macroblock in a deblocked decoded image P_DB into one or more divisional regions with reference to region specification information which is supplied from the region dividing section 340 and (ii) calculates activity ACT for an image of each the divisional regions. Furthermore, in a case where intra prediction is applied to the target macroblock, the activity calculating section 343 calculates activity ACT for each of partitions included in the target macroblock. The calculated activity ACT is supplied to the region classification section 344. The calculation of the activity ACT by the activity calculating section 343 can be carried out by a method similar to that carried out by the activity calculating section 423.

(Region Classification Section 344)

The region classification section 344 classifies, into one of one or more types, each of the divisional regions or each of the partitions which are included in the target macroblock in accordance with (i) the size of each of the partitions which size is notified from the intra coding mode accumulating section 341, (ii) the prediction mode allocated to each of the partitions which prediction mode is supplied from the intra coding mode accumulating section 341, (iii) the edge angle Theta which is supplied from the edge direction detection section 342, and (iv) the activity ACT which is supplied from the activity calculating section 343.

The classification of each divisional region and each partition by the region classification section 344 is carried out by a method similar to (Classification Process Example 1) through (Classification Process Example 6) by the region classification section 424, except that the region classification section 344 repeats the classification process for the filter set numbers renewed every classification process so as to generate classification information for each filter set number. That is, the region classification section 344 is arranged to carry out the following process.

(Step S301)
The filter set number k is set to 0.
(Step S302)
A classification process which is specified by the filter set number k is carried out by a method similar to the region classification section 424.
(Step S303)
Classification information (k) is generated, the classification information being indicative of as which type each divisional region or each partition is classified by the classification carried out at the step S303.
(Step S304)
1 is added to k. When k is not more than 4, the steps 302 and 303 are carried out. The process is terminated when k reaches 5.

The above process enables the region classification section 344 to generate classification information (k) obtained when the filter set number k is 0 to 4. The classification information (k) thus generated is supplied to the filter parameter deriving section 346 and the filter process section 345.

Note that in a case where the region classification section 344 selectively uses a method shown in (Classification Process Example 1) through (Classification Process Example 6), a flag indicative of which classification process has been carried out can be included in coded data #1.

(Filter Process Section 345)
For each of the classification information (k) for k=0 to 4, the filter process section 345 carries out a filter process with respect to each of divisional regions or each of partitions which are included in a target macroblock by use of the filter coefficient group (k) calculated on a basis of the classification information (k) by the filter parameter deriving section 346, whereby the filter process section 345 generates a filtered decoded image P_FL (k). The filtered decoded image P_FL (k) (k=0 to 4) thus generated is stored in a memory included in the filter process section 345 or in the buffer memory 24. The filter process section 345 also supplies, to the buffer memory 24, a filtered decoded image as a filtered decoded image P_FL, which filtered decoded image is one generated by use of a filter coefficient group which is supplied from the filter parameter deriving section 346 and included in a filter set number that achieves a minimum encoding cost.

The generation of the filtered decoded image P_FL (k) by the filter process section 345 can be carried out by a process similar to a process in which the filtered decoded image P_FL is generated by the filter process section 425. The filter process section 345 can be arranged so as not to carry out the filter process with respect to a divisional region and a partition for each of which on/off information supplied from the filter parameter deriving section 346 specifies that the filter process is off.

(Filter Parameter Deriving Section 346)
The following description discusses an arrangement of the filter parameter deriving section 346 with reference to FIG. 24. FIG. 24 is a block diagram showing the arrangement of the filter parameter deriving section 346. The filter parameter deriving section 346 includes a filter calculating section 461, a cost calculating section 462, and an optimum filter set selecting section 463 (see FIG. 24).

(Filter Calculating Section 461)
For each of the classification information (k) for k=0 to 4, the filter calculating section 461 (i) classifies each of divisional regions or each of partitions which are included in the deblocked decoded image P_DB as one of one or more types in accordance with the classification information (k) and (ii) calculates an optimum filter coefficient for each of the one or more types.

More specifically, the filter calculating section 461 carries out the following process.

(Step S401)
The filter set number k is set to 0.
(Step S402)
Each of divisional regions or each of partitions which are included in a deblocked decoded image P_DB is classified into one of one or more types in accordance with the classification information (k).
(Step S403)
The filter calculating section 461 derives, for example, a filter coefficient aI(i, j) and an offset oI each of which minimizes a square error E given by the following formula (7), where (i) an image I is an image of the deblocked decoded image P_DB in a target macroblock which image consists of divisional regions or partitions each classified as type I, (ii) SI(x, y) is a pixel value of a pixel with coordinates (x, y) in the image I, and (iii) ST(x, y) is a pixel value of a pixel with coordinates (x, y) in an encoding target image of the target macroblock:

[Math. 6]

$$E = \sum_{x,y} \left( S_T(x, y) - \sum_{(i,j) \in R} aI(i, j) S_I(x+i, y+j) - oI \right)^2 \quad (7)$$

(Step S404)
The filter coefficient aI(i, j) and the offset oI each derived at the step S404 are supplied, as a filter coefficient group (k), to the filter process section 345 and the optimum filter set selecting section 463.
(Step S405)
1 is added to k. When k is not more than 4, the steps 402 through 404 are carried out. The process is terminated when k reaches 5.

The above process enables the filter calculating section 461 to supply, to the filter process section 345 and the optimum filter set selection section 463, a filter coefficient group (k) which is calculated on a basis of the classification information (k) obtained when the filter set number k is 0 to 4.

The filter calculating section 461 also supplies, to the filter process section 345, on/off information which indicates whether to carry out the filter process with respect to each of the divisional regions or each of the partitions.

(Cost Calculating Section 462)
The cost calculating section 462 calculates an encoding cost for each of the filter set numbers k (k=0 to 4) by comparing, with the encoding target image, each of the filtered decoded images P_FL (k) (k=0 to 4) which are supplied from the filter process section 345. Cost information indicative of the encoding cost for each of the filter set numbers k (k=0 to 4) is supplied to the optimum filter set selecting section 463. Note that Rate-Distortion function can be used for calculation of the encoding cost.

(Optimum Filter Set Selecting Section 463)
The optimum filter set selecting section 463 (i) compares between the filter set numbers k (k=0 to 4) which is indicated by the cost information supplied from the cost calculating section 462 and (ii) supplies, to the variable-length code coding section 22 and the filter process section 345, a filter set number which is associated with a minimum encoding cost. The optimum filter set selecting section 463 also supplies, to the variable-length code coding section 22, a filter coefficient group and on/off information which are included in the filter set associated with the minimum encoding cost.

<Modification 1'>

The moving image encoder 2 is not limited to the arrangement described above where the moving image encoder 2 is arranged such that coded data #1 includes a filter set number. As described in <Modification 1>, it is also possible to arrange the moving image encoder 2 such that coded data #1 includes, instead of a filter set number, a table (filter allocation table) indicative of a correspondence between (i) any of edge angles Theta, prediction modes, partition sizes, and activity ACT and (ii) one or more filter coefficient groups (more specifically, filter numbers that specify filter coefficient groups). In this case, it is only necessary that the region classification section 344 included in the adaptive filter 34 supply, to the filter parameter deriving section 346, the edge angle Theta, the prediction mode, the size of each partition, and the activity ACT and that the filter parameter deriving section 346 generate a filter allocation table indicative of correspondence between (i) the one or more filter coefficient groups and (ii) the edge angle Theta, the prediction mode, the size of each partition, and the activity ACT.

According to the present modification, the filter allocation table which is generated by the filter parameter deriving section 346 is exemplified by the table shown in (a) and (b) of FIG. 19.

<Modification 2'>

As described in <Modification 2>, the filter process section 345 included in the adaptive filter 34 can be arranged to selectively use, as the filter reference region R, any one of the basic reference region, the vertically oriented reference region, the horizontally oriented reference region, and the obliquely oriented reference region. More specifically, the adaptive filter 34 can be arranged such that (i) the intra coding mode accumulating section 341 and the edge direction detection section 342 supply, to the filter process section 345, a prediction mode of each partition and an edge angle Theta of each divisional region, respectively, and then (ii) the filter process section 345 selectively uses any one of the above reference regions in accordance with the edge angle or the prediction mode thus received.

The correspondence between the filter reference regions which are selectively used in the present modification and a prediction mode and an edge angle is exemplified by tables shown in (a) and (b) of FIG. 20.

The moving image encoder 2 according to the present modification can carry out a more suitable filter process by using any one of a plurality of filter reference regions selectively in accordance with an edge angle and a prediction mode. This improves prediction accuracy and thus increases coding efficiency.

<Modification 3'>

It is also possible to arrange the moving image encoder 2 such that coded data #1 includes neither a filter set number nor a filter allocation table.

That is, it is possible to employ an arrangement where the region classification section 344 generates classification information on a basis of a predetermined filter set number, the filter parameter deriving section 346 derives a filter coefficient group on the basis of the predetermined filter set number, and the filter process section 345 carries out a filter process by use of the filter coefficient group.

It is also possible to employ an arrangement where the edge detection section 342 detects an edge angle Theta of each divisional region in a range of 0°≤Theta<360°.

One example of the classification process carried out by the region classification section 344 according to the present modification is shown in FIG. 21.

According to the present modification, an edge angle is detected in a range of 0°≤Theta<360° and a filter coefficient group is allocated in accordance with the detected edge angle. This enables a more effective filter process. Furthermore, according to the present modification, coded data #1 includes neither a filter set number nor a filter allocation table. This makes it possible to reduce a code amount of the coded data #1.

<Modification 4'>

It is also possible to employ an arrangement where the region classification section 344 classifies each of blocks (transformation units) included in a target macroblock into one of a plurality of types. In this case, it is possible to employ an arrangement substantially identical to the above arrangement in which the region classification section 344 classifies each of the blocks included in a macroblock into one of a plurality of types in accordance with a size of the each of the blocks, a prediction mode, an edge angle, and activity ACT for the each of the blocks.

In a case of such an arrangement, the intra prediction mode accumulating section 341 (i) allocates a prediction mode of each of partitions included in the target macroblock to a corresponding block and (ii) accumulates therein a prediction mode of each of the blocks and a size of the each of the blocks. The edge direction detection section 342 detects an edge for each of the blocks included in the target macroblock. The activity calculating section 343 calculates activity ACT for each of the blocks included in the target macroblock. The filter process section 345 carries out a filter process with respect to a block which has been classified as type I (I=1, 2, . . . ), the filter process using a filter coefficient group I.

According to the present modification, it is again possible for the adaptive filter 34 to carry out a suitable filter process with respect to the deblocked decoded image P_DB.

Embodiment 2

The following description discusses, with reference to FIGS. 25 to 38, a second embodiment of the present invention.

An adaptive filter in accordance with the present embodiment (i) derives two characteristic values for each of unit regions constituting an unfiltered image (for example, a deblocked decoded image P_DB), which two characteristic values differ in extraction method, and (ii) classifies the each of the unit regions into one or more groups depending on the two characteristic values thus derived. Further, the adaptive filter in accordance with the present embodiment deals with the unfiltered image on a unit region basis by use of a filter coefficient derived for each of the unit regions.

Note here that a unit region can be a block which is a unit of DCT (more generally, frequency transform), or can be a partition which is a unit for generating a predicted image. Alternatively, instead of the block or the partition, the unit region can be a region whose size and position are set as suitable for the adaptive filter in accordance with the present embodiment. Further, the unit region can be constituted by one pixel.

The one group or each of the plurality of groups has one-to-one correspondence respectively with each of partial regions set on a two-dimensional region which is spanned by the two characteristic values. Therefore, by specifying how to divide the two-dimensional region into the partial regions, it is determined how to set the one group or the plurality of groups. Further, among the derived two characteristic values, a characteristic value which is given a higher priority, that is, a characteristic value with which more efficient classification is expected is referred to as a first characteristic value X. On the other hand, the other is referred to as a second characteristic value Y. Note that, in the following description, the two-dimensional region which is spanned by the two characteristic values is also referred to as a characteristic value region, and each of the partial regions set on the characteristic value region is also referred to as a characteristic value partial region.

Possible examples of a combination of the first characteristic value X and the second characteristic value Y are exemplified below. The present embodiment is described based on a case where the first characteristic value X is activity of an image. However, the invention in accordance with the present application is not limited to the examples, and the present embodiment can be easily applied to other characteristic values and combinations.

- X: activity of an image, Y: directionality of the image
- X: activity of an image, Y: average pixel value
- X: activity of an image, Y: coordinates of a unit region
- X: coordinates of a unit region, Y: activity of an image
- X: slice number, Y: activity of an image
- X: average pixel value, Y: activity of an image
- X: y coordinates of a unit region, Y: x coordinates of the unit region
- X: x coordinates of a unit region, Y: y coordinates of the unit region Note that, in view of effects of reducing errors between a filtered image and an encoding target image (effects of noise reduction) by the adaptive filter, activity is given a priority. That is, it is suitable that the first characteristic value X be activity of an image. Alternatively, in view of complexity, it is considered to give a priority to a characteristic value which is easy to calculate. Specifically, coordinates of a unit region, a slice number, an average pixel value, and the like can be used for the first characteristic value. In this case, when an application which requires less complexity is used, it is possible to employ a method in which division is completed only by a first division, thereby to achieve effects of a regional filter with less complexity.

Note here that variance of pixel values can be used instead of the activity of the image. Further, depending on the extraction method, each of characteristic values derived for each of the unit regions may depend on a size of the each of the unit regions. In this case, as the each of the characteristic values, it is possible to use a regulated characteristic value obtained by eliminating such dependence on the size of the each of the unit regions.

The adaptive filter in accordance with the present embodiment hierarchically divides the characteristic value region into the partial regions by a first division and a second division. Note here that the first division is a division carried out on the first characteristic value X, and the second division is a division carried out on at least either of the first characteristic value X and the second characteristic value Y. Further, the characteristic value region is divided into the partial regions by a division unit. Therefore, each of the partial regions is constituted by one or a plurality of division units DU. Further, a border of each of division units is determined by a division point (also referred to as a characteristic value division point) set according to each of the characteristic values. Note that the first division is also referred to as an initial division and the second division is also referred to as a subdivision.

Figure 25:
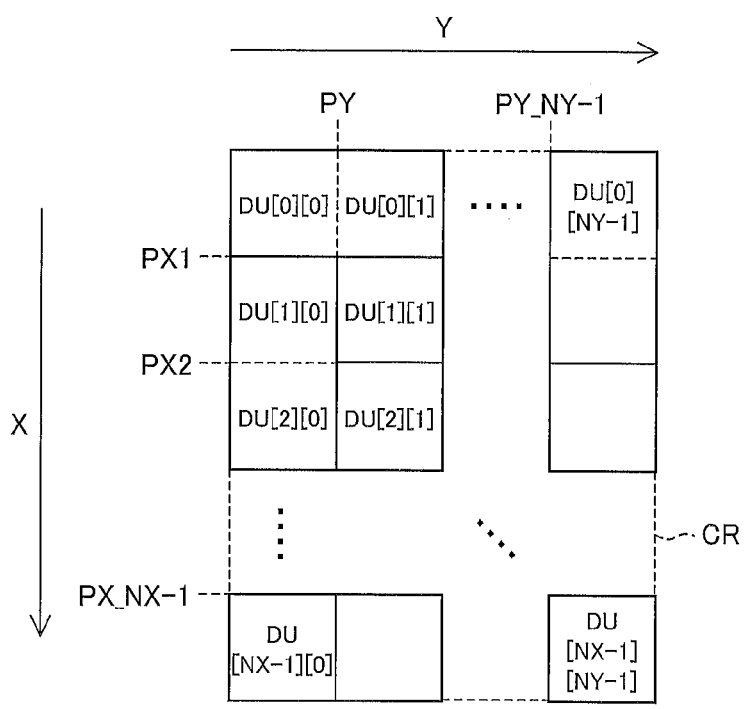
FIG. 25, which explains an adaptive filter in accordance with a second embodiment, shows a characteristic value region CR and division units [i] [j] which are set in the characteristic value region CR.

FIG. 25 is a view illustrating a characteristic value region CR and a division unit DU[i][j] set in the characteristic value region CR (i is an integer satisfying $0 \leq i \leq NX-1$, j is an integer satisfying $0 \leq j \leq NY-1$, NX is a total number of division units aligned along the first characteristic value X, and NY is a total number of division units aligned along the second characteristic value Y).

According to an example in FIG. 25, solid lines indicate borders of characteristic value partial regions and borders of division units, and dotted lines indicate borders of division units. Further, according to the example in FIG. 25, a division unit DU[0][0] and a division unit DU[0][1] constitute one characteristic value partial region, and a division unit DU[1][0] and a division unit DU[2][0] constitute another characteristic value partial region. A division unit DU[1][1] constitutes one characteristic value partial region by itself.

As illustrated in FIG. 25, a border of each of division units DU is specified by characteristic value division points PX1 to PX_NX−1 with respect to the first characteristic value X and characteristic value dividing points PY1 to PY_NY−1 with respect to the second characteristic value Y.

Note that, in the following description, the first characteristic value X is also referred to as merely a characteristic value X, and the second characteristic value Y is also referred to as merely a characteristic value Y.

Further, an index [i][j] which specifies each of the division units is also referred to as a characteristic index. Particularly, an index with respect to the characteristic value X ([i] in the above example) is also referred to as a characteristic X index, and an index with respect to the characteristic value Y ([j] in the above example) is also referred to as a characteristic Y index. The characteristic index is a two-dimensional index which uniquely specifies each of the dividing units.

(Coded Data #3)

Prior to detailed descriptions of a moving image encoder 4 and a moving image decoder 3, the following description discusses a data structure of coded data #3 which is generated by the moving image encoder 4 and decoded by the moving image decoder 3.

The data structure of the coded data #3 is almost same as that of the coded data #1 in accordance with Embodiment 1. However, the data structure of the coded data #3 is different in a structure of a filter parameter FP from that of the coded data #1. FIG. 26 is shows syntaxes included in a filter parameter FP (written as alf_param( ) in FIG. 26) of the coded data #3 in accordance with the present embodiment.

(adaptive_loop_filter_flag)

Here, adaptive_loop_filter_flag is a flag which specifies on/off of an adaptive filter process carried out by an adaptive filter 50 (described later). When the adaptive_loop_filter_flag is 0, it is specified that the adaptive filter process is off. When the adaptive_loop_filter_flag is 1, it is specified that the adaptive filter process is on.

(alf_enable_region_filter)

Further, alf_enable_region_filter is a flag which specifies whether to carry out a filter process carried out with respect to each of the characteristic value partial regions by the adaptive filter 50. When the alf_enable_region_filter is 0, it is specified that the filter process with respect to each of the characteristic value partial regions is off. When the alf_enable_region_filter is 1, it is specified that the filter process with respect to each of the characteristic value partial regions is on. Various syntaxes (described later), such as alf_num_first_split_minus1, alf_first_split_val_shift, alf_second_split_type, alf_second_split_flag[i0], alf_length_luma_minus5_div2[i0], alf_region_pred_luma[i][j], and alf_coeff_luma[i][j] are encoded only when the alf_enable_region_filter is 1.

Here, alf_num_first_split_minus1, alf_first_split_val_shift, alf_second_split_type, and alf_second_split_flag[i0] constitute characteristic value division information which specifies how to divide the characteristic value region CR into characteristic value partial regions CPR. The characteristic value division information is information which specifies how to divide the characteristic value region CR, and is made up with (i) information indicating division number and shape of partial regions (in this case, alf_num_first_split_minus1) into which the characteristic value region CR is divided by the first division, (ii) information (in this case, alf_second_split_flag[i0]) indicating division number and shape of partial regions into which each of the characteristic value partial regions obtained by the first division is divided by the second division, and (iii) information (alf_second_split_type) specifying borders of the characteristic values used for division. Further, it is possible to employ information (in this case, alf_second_split_type) for specifying how to divide the characteristic value region CR, apart from the division number and shape of the partial regions into which the characteristic value region CR is to be divided, and this information is also one type of the characteristic value division information.

According to the present embodiment, the characteristic value division information is information which hierarchically specifies how to divide the characteristic value region CR. By hierarchically specifying how to divide the characteristic value region CR, an increase in an encoding amount needed for specifying a division can be avoided while keeping a high degree of freedom of division, which increase in the encoding amount is otherwise caused when the degree of freedom of division is increased. Further, according to hierarchical expression, it is possible to express a plurality of regions having the same characteristic as a group of the plurality of regions. Because it is possible to apply the same filter coefficient to the group of the plurality of regions, it is possible to reduce the encoding amount of filter coefficients as compared to such a simple arrangement in which filter coefficients are individually allocated to the characteristic values or combinations of the characteristic values. It is possible to employ the hierarchical expression also in a case where the same characteristic value (for example, activity) is used for the first division and the second division, although this is not described in embodiment. Also in this case, it is possible to encode filter coefficients with a small encoding amount by (i) expressing a plurality of regions having similar characteristic values as a group of the plurality of regions and (ii) applying the same filter coefficient to the group of the plurality of regions. Further, in a case where a plurality of characteristic values are used, division is preferentially carried out with the use of a characteristic value which brings about a greater noise reduction effect, and regions for which the division is less effective are treated as a group. Thereby, it is possible to relatively reduce the encoding amount of filter coefficients.

(alf_num_first_split_minus1)

Here, alf_num_first_split_minus1 is a syntax which specifies division number AlfNumFirstSplit into which the characteristic value region is divided by the first division. In accordance with this syntax, the division number AlfNumFirstSplit is determined by AlfNumFirstSplit=alf_num_first_split_minus1+1.

Figure 27:
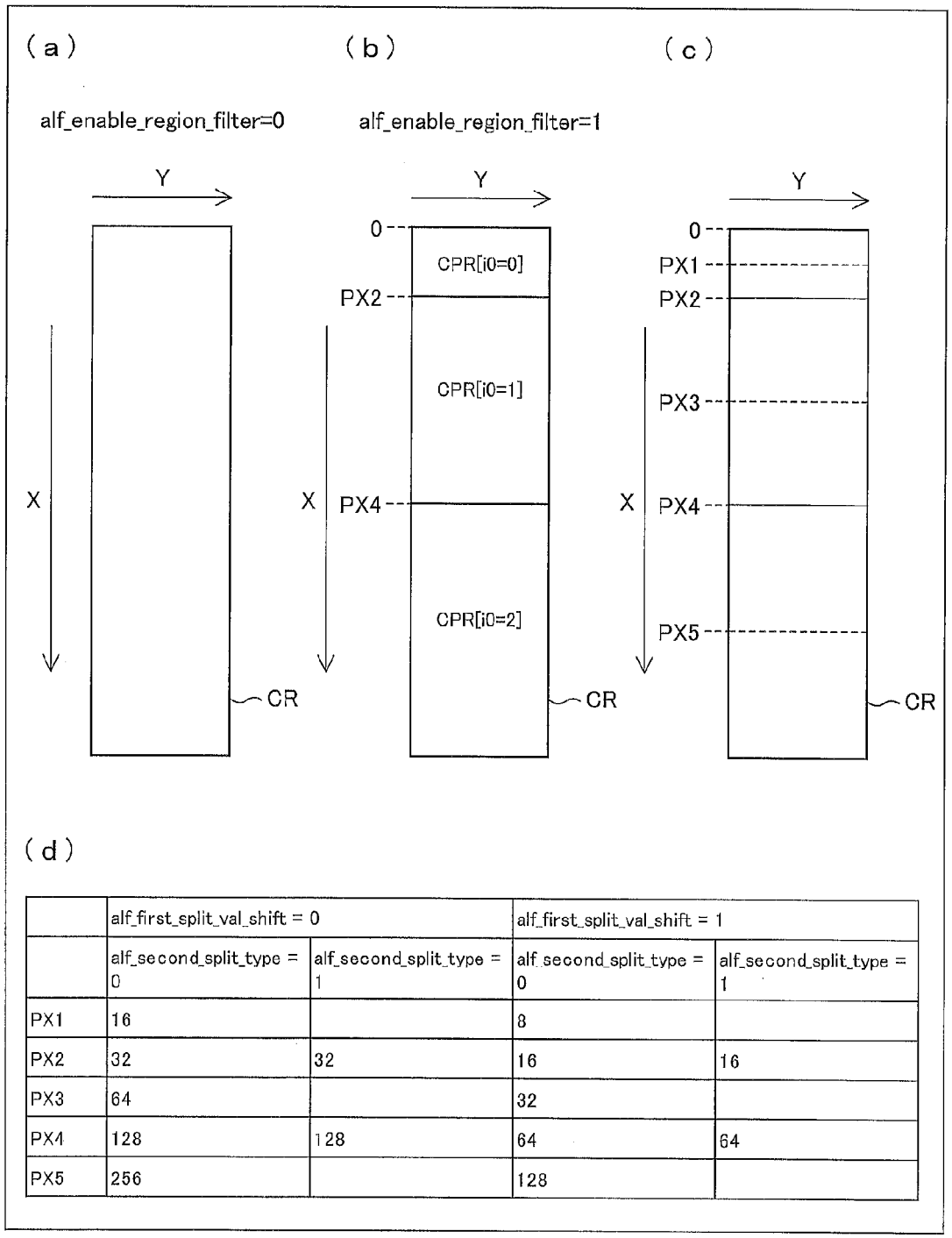
FIG. 27 explains the adaptive filter in accordance with the second embodiment. (a) of FIG. 27 shows a characteristic value region which has not been divided. (b) of FIG. 27 shows a characteristic value region which has been divided by a first division. (c) of FIG. 27 shows characteristic value division points used in the first division and characteristic value division points used in a second division. (d) of FIG. 27 is a table illustrating characteristic value division points which are set in accordance with respective values of syntaxes alf_first_split_val_shift and alf_second_split_type in a case where activity is used as a first characteristic value.

(a) of FIG. 27 shows the characteristic value region CR in which alf_enable_region_filter is 0, that is, the characteristic value region CR which has not been divided. (b) of FIG. 27 shows the characteristic value region CR which is divided by the first division when alf_enable_region_filter is 1 and AlfNumFirstSplit is 3. As illustrated in (b) of FIG. 27, when AlfNumFirstSplit is 3, the characteristic value region CR is divided into three characteristic value partial regions with respect to the characteristic value X by the first division. (b) of FIG. 27 shows an example in which borders of the three characteristic value partial regions are specified by characteristic value division points PX2 and PX4. A characteristic value division point used in the first division is also referred to as an initial division point. Further, a characteristic value division point used in the second division is also referred to as a subdivision point. (c) of FIG. 27 is a table illustrating not only initial division points PX2 and PX4 but also subdivision points PX1, PX3, and PX5 which are used by the second division.

Note that each of the characteristic value partial regions obtained by the first division is discriminated by an initial division index [i0] (0≤i0≤AlfNumFirstSplit−1). Correspondence between the initial division index [i0] and a characteristic X index [i] is as below, depending on a value of alf_second_split_type (described later).

When alf_second_split_type is 0, $i=2 \times i0$, or $2 \times i0+1$

When alf_second_split_type is 1, $i=i0$

A characteristic value partial region which is obtained by the first division and which is specified by the initial division index [i0] is also referred to as a characteristic value partial region CPR[i0].

(alf_first_split_val_shift)

Here, alf_first_split_val_shift is a flag to be referred to for changing a characteristic value division point PXn (1≤n≤NX−1). The characteristic value division point PXn is changed depending on a value of alf_first_split_val_shift.

(alf_second_split_type)

Here, alf_second_split_type is a flag for specifying a kind of the second division. When alf_second_split_type is 0, each of the characteristic value partial regions is further divided into one or a plurality of characteristic value partial regions with respect to the characteristic value X and the characteristic value Y. When alf_second_split_type is 1, each of the characteristic value partial regions is further divided into one or a plurality of characteristic value partial regions with respect to the characteristic value Y.

(d) of FIG. 27 is a table showing the characteristic value division points PX1 to PX5 which are set in accordance with values of alf_first_split_val_shift and values of alf_second_split_type in a case where the characteristic value X is activity. According to an example in (d) of FIG. 27, when alf_second_split_type is 1, a value of each of the initial division points PX2 and PX4 is specified. When alf_second_split_type is 0, a value of each of the characteristic value division points PX1 to PX5 including the initial division points is specified. According to the example in (d) of FIG. 27, a value of each of the characteristic value division points PX1 to PX5 in a case where alf_first_split_val_shift is 1 is set to a half of a value of each of the characteristic value division points PX1 to PX5 in a case where alf_first_split_val_shift is 0. In this way, a value of the characteristic value division point PXn is changed, depending on a value of alf_first_split_val_shift.

Further, as shown in (d) of FIG. 27, in a case where the characteristic value X is activity, the greater a value of the characteristic value X is, the longer a distance between the initial division points is set. This is because most of the unit regions included in a process target frame (or a slice) have small activity. As shown in (d) of FIG. 27, by finely dividing a region in which the value of the characteristic value X is small, it is possible to uniform the number of the unit regions classified as each of the characteristic value partial regions. In consideration of frequencies of the characteristic values, it is appropriate that not only distances between the initial division points but also distances between the division points at a subdivision are set unequal. That is, in a case where there is a part to which the frequencies are likely to concentrate in many cases in a histogram of the characteristic values, distances in the part are set to be narrow, and, on the contrary, distances in a part in which the frequencies are low are set to long. For example, as for activity, frequencies thereof are likely to concentrate to a part in which the activity is small, and as for directionality, frequencies thereof are likely to concentrate in a horizontal direction and a vertical direction.

Here, alf_first_split_val_shift constitutes information (first division point specification information) for specifying a division point at an initial division (the first division).

(alf_second_split_flag)

alf_second_split_flag[i0] is a syntax which specifies a specific mode of the second division carried out on each of the characteristic value partial regions obtained by the first division. The above alf_second_split_type and alf_second_split_flag[i0] specifically designate the second division carried out on each of the characteristic value partial regions obtained by the first division.

Figure 28:
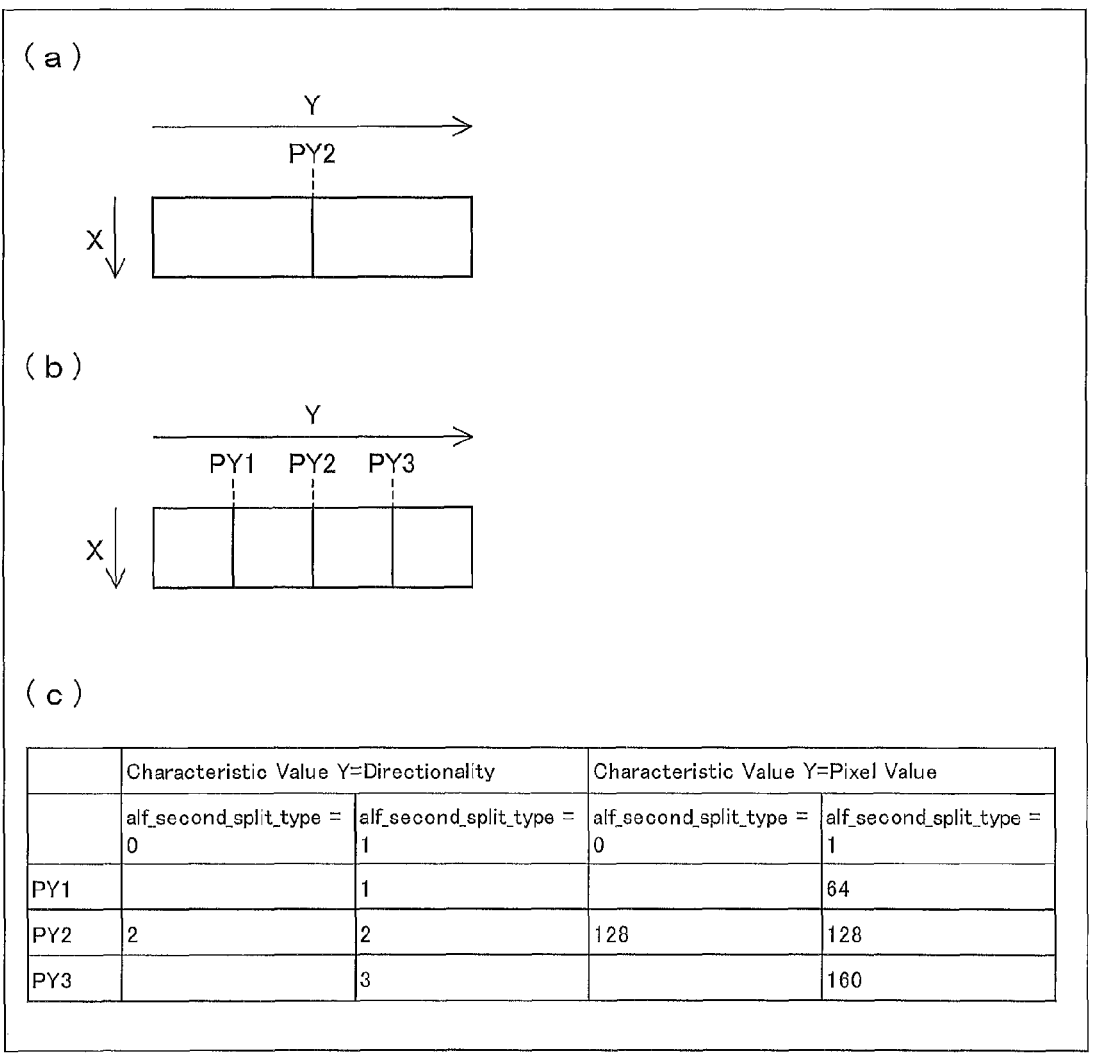
FIG. 28 explains the adaptive filter in accordance with the second embodiment. (a) of FIG. 28 shows a case where a characteristic value partial region obtained by the first division is divided into two characteristic value partial regions with respect to a second characteristic value by the second division specified by the syntax alf_second_split_type=0. (b) of FIG. 28 shows a case where the characteristic value partial region obtained by the first division is divided into four characteristic value partial regions with respect to the second characteristic value by the second division specified by the syntax alf_second_split_type=1. (c) of FIG. 28 is a table illustrating (i) characteristic value division points set in a case where the second characteristic value is directionality of an image and (ii) the characteristic value division points set in a case where the second characteristic value is an average pixel value.

(a) of FIG. 28 shows a case where one of the characteristic value partial regions obtained by the first division is divided into two characteristic value partial regions with respect to the characteristic value Y by the second division specified by alf_second_split_type=0. (b) of FIG. 28 shows a case where one of the characteristic value partial regions obtained by the first division is divided into four characteristic value partial regions with respect to the characteristic value Y by the second division specified by alf_second_split_type=1. In this way, alf_second_split_flag[i0] specifies the division number and shape into which each of the characteristic value partial regions is divided by the second division.

(c) of FIG. 28 shows (i) the characteristic value division points PY1 to PY3 set in a case where the characteristic value Y is directionality of an image and (ii) the characteristic value division points PY1 to PY3 set in a case where the characteristic value Y is an average pixel value.

alf_second_split_type constitutes information (second division point specification information) for specifying a division point at the subdivision (the second division).

Figure 29:
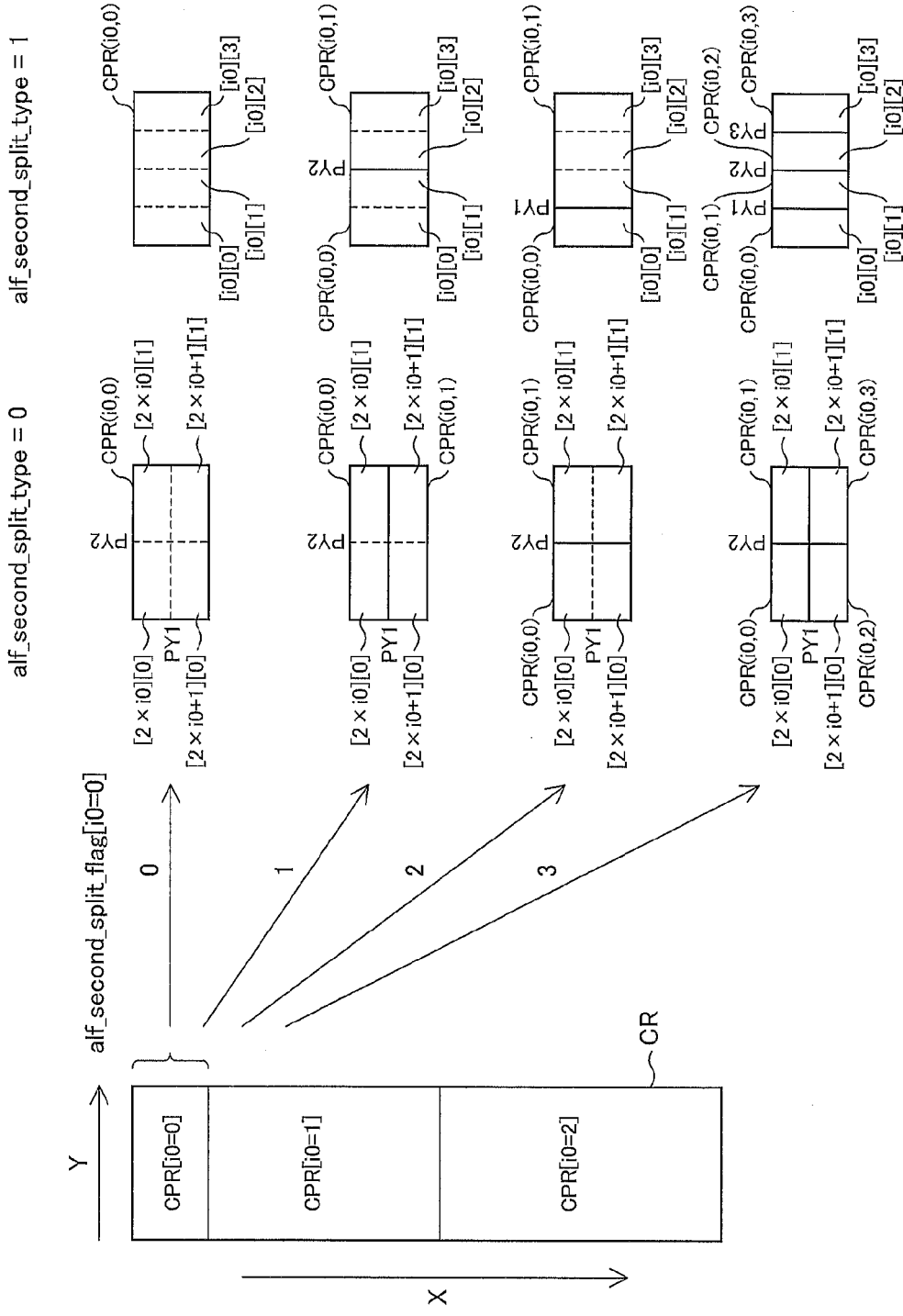
FIG. 29, which explains the adaptive filter in accordance with the second embodiment, specifically shows how the characteristic value partial region obtained by the first division is divided by the second division in accordance with respective values of a syntax alf_second_split_flag[i0] and the syntax alf_second_split_type.

FIG. 29 is a view specifically illustrating how a characteristic value partial region CPR[i0=0] obtained by the first division is divided by the second division in accordance with respective values of alf_second_split_flag[i0] and alf_second_split_type. The second division carried out on a characteristic value partial region CPR[i0] specified by an initial division index other than [i0=0] is also the same.

As illustrated in in FIG. 29, when alf_second_split_type is 0, the characteristic value partial region CPR[i0=0] obtained by the first division is divided as below.

alf_second_split_flag[i0]=0: no division is carried out
    alf_second_split_flag[i0]=1: the characteristic value partial region CPR[i0=0] is divided into two with respect to the characteristic value X (the characteristic value division point: PX1)
    alf_second_split_flag[i0]=2: the characteristic value partial region CPR[i0=0] is divided into two with respect to the characteristic value Y (the characteristic value division point: PY2)
    alf_second_split_flag[i0]=3: the characteristic value partial region CPR[i0=0] is divided into two with respect to each of the characteristic value X and the characteristic value Y, that is, divided into four (the characteristic value division points: PX1, PX2) in total Alternatively, when alf_second_split_type is 1, the characteristic value partial region CPR[i0=0] obtained by the first division is divided as below.

alf_second_split_flag[i0]=0: no division is carried out
    alf_second_split_flag[i0]=1: the characteristic value partial region CPR[i0=0] is divided into two with respect to the characteristic value Y (the characteristic value division point: PY2)
    alf_second_split_flag[i0]=2: the characteristic value partial region CPR[i0=0] is divided into two with respect to the characteristic value Y (the characteristic value division point: PY1)
    alf_second_split_flag[i0]=3: the characteristic value partial region CPR[i0=0] is divided into four with respect to the characteristic value Y (the characteristic value division points: PY1, PY2, PY3)

Each of the characteristic value partial regions obtained by the second division of the characteristic value partial region CPR[i0=0] obtained by the first division is specified by a characteristic value in-region index (i0, j0) obtained from a combination of the initial index [i0] and a subdivision index [j0]. Note here that the subdivision index [j0] is an index which specifies each of the characteristic value partial regions included in the characteristic value partial region CPR[i0]. A characteristic value partial region specified by the characteristic value in-region index (i0, j0) is also referred to as a characteristic value partial region CPR(i0,j0).

As shown in FIG. 29, in either case of alf_second_split_type=0 and alf_second_split_type=1, the characteristic value partial region CPR[i0] obtained by the first division includes the following characteristic value partial region CPR(i0,j0).

alf_second_split_flag[i0]=0: CPR(i0,0)
    alf_second_split_flag[i0]=1: CPR(i0,0) and CPR(i0,1)
    alf_second_split_flag[i0]=2: CPR(i0,0) and CPR(i0,1)
    alf_second_split_flag[i0]=3: CPR(i0,0), CPR(i0,1), CPR(i0,2), and CPR(i0,3)

When alf_second_split_type is 0, the division unit DU[i][j] included in each of the characteristic value partial regions CPR(i0,j0) is as below.

alf_second_split_flag=0:
        CPR(i0,0): DU[2×i0][0], DU[2×i0][1], DU[2×i0+1][0], and DU[2×i0+1][1]
    alf_second_split_flag=1:
        CPR(i0,0): DU[2×i0][0] and DU[2×i0][1]
        CPR(i0,1): DU[2×i0+1][0] and DU[2×i0+1][1]
    alf_second_split_flag=2:
        CPR(i0,0): DU[2×i0][0] and DU[2×i0+1][0]
        CPR(i0,1): DU[2×i0][1] and DU[2×i0+1][1]
    alf_second_split_flag=3:
        CPR(i0,0): DU[2×i0][0]
        CPR(i0,1): DU[2×i0][1]
        CPR(i0,2): DU[2×i0+1][0]
        CPR(i0,3): DU[2×i0+1][1]

When alf_second_split_type is 1, the division unit DU[i][j] included in each of the characteristic value partial regions CPR(i0, j0) is as below.

alf_second_split_flag=0:
        CPR(i0,0): DU[i0][0], DU[i0][1], DU[i0][2], and DU[i0][3]
    alf_second_split_flag=1:
        CPR(i0,0): DU[i0][0] and DU[i0][1]
        CPR(i0,1): DU[i0][2] and DU[i0][3]
    alf_second_split_flag=2:
        CPR(i0,0): DU[i0][0]
        CPR(i0,1): DU[i0][1], DU[i0][2], and DU[i0][3]

alf_second_split_flag=3:
  CPR(i0,0): DU[i0][0]
  CPR(i0,1): DU[i0][1]
  CPR(i0,2): DU[i0][2]
  CPR(i0,3): DU[i0][3]
(alf_length_luma_minus5_div2)

alf_length_luma_minus5_div2[i0] is a syntax (tap number specification information) for specifying a tap number of a filter for each of the characteristic value partial regions obtained by the first division. In accordance with this syntax, a tap number AlfLengthLuma is determined by AlfLengthLuma=alf_length_luma_minus5_div2×2+5.

Figure 30:
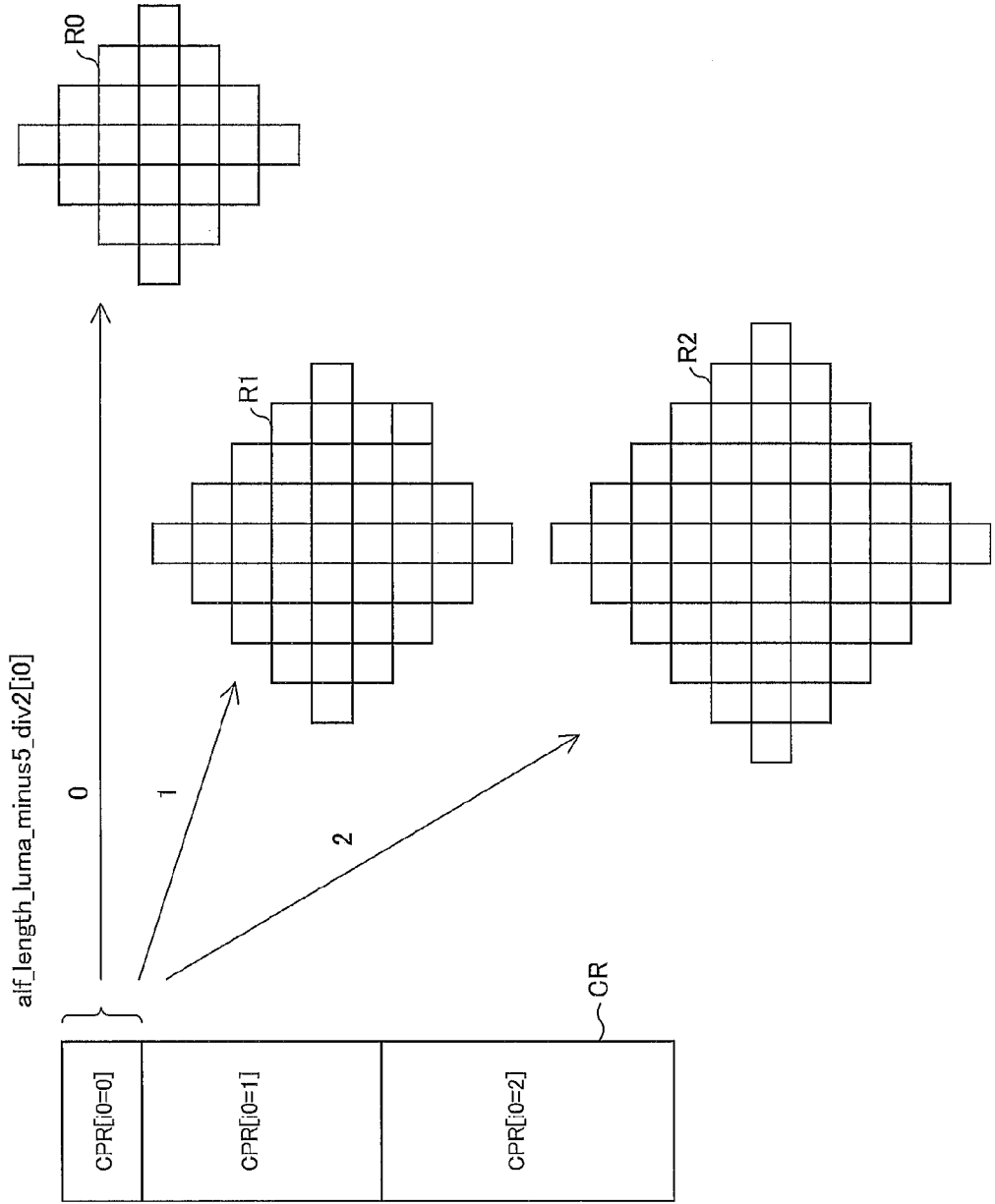
FIG. 30, which explains the adaptive filter in accordance with the second embodiment, illustrates a reference region which is set in accordance with a value of a syntax alf_length_luma_minus5_div2[i0].

FIG. 30 illustrates reference regions R0, R1, and R2 which are set by the adaptive filter in accordance with the present embodiment in a case where alf_length_luma_minus5_div2[i0] has respective values of 1, 2, and 3. According to FIG. 30, the reference regions R0, R1, and R2 each has a rectangular shape. However, the reference regions in the present embodiment are not limited to a rectangular shape, and can be a rectangle in which the tap number is specified by alf_length_luma_minus5_div2[i0].

Further, as shown in FIG. 26, according to the filter parameter FP, alf_length_luma_minus5_div2 [i0] is transmitted in a higher hierarchy than alf_coeff_luma[i][j] for specifying a filter coefficient (described later). Further, although it is not illustrated, a syntax for specifying a tap number of a filter for each of the characteristic value partial regions obtained by the second division can be encoded. In this case, the syntax alf_length_luma_minus5_div2[i][j] for specifying a tap number of a filter for each of the characteristic value partial regions obtained by the second division is encoded in the same hierarchy as alf_coeff_luma[i][j]. The above structure makes it possible to carry out an adaptive filter process in which filter coefficients different in tap number are used per region. Different tap numbers are appropriate for regions different in activity and effect. Therefore, according to the above structure in which the tap number can be adaptively selected, it is possible to increase efficiency of encoding. For example, in a case where activity of a region is low, it is appropriate that the tap number is greater than a case where the activity of the region is high. In the characteristic value partial regions in which effects of the adaptive filter are high, it is appropriate that the tap number is greater than that in the characteristic value partial regions in which effects of the adaptive filter is low.

Further, according to the structure illustrated in FIG. 30, the tap number is encoded based on a group of filter coefficients of filters acting on a plurality of characteristic value partial regions, not on a filter coefficient of a filter acting on one characteristic value partial region. Thereby, it is possible to reduce an encoding amount of the tap number even in a case where a large number of filter coefficients are encoded.

(alf_coeff_luma)

Here, alf_coeff_luma[i][j](i=i0, 2×i0, 2×i0+1, j=0, 1, 2, 3) is a syntax for specifying a filter coefficient (including an offset, hereinafter as well) for each of the characteristic value partial regions.

In a case where alf_second_split_type is 0, correspondence between each of the characteristic value partial regions CPR(i0,j0) and alf_coeff_luma[i][j] allocated to each of the characteristic value partial regions CPR(i0,j0), that is, correspondence between the characteristic value in-region index (i0,j0) and alf_coeff_luma[i][j] is as below. Note that, in the following notation, "*" is a calculation symbol of a product.
  alf_second_split_flag=0:
    CPR(i0,0): alf_coeff_luma[i0*2][0]
  alf_second_split_flag=1:
    CPR(i0,0): alf_coeff_luma[i0*2][0]
    CPR(i0,1): alf_coeff_luma[i0*2][1]
  alf_second_split_flag=2:
    CPR(i0,0): alf_coeff_luma[i0*2][0]
    CPR(i0,1): alf_coeff_luma[i0*2][1]
  alf_second_split_flag=3:
    CPR(i0,0): alf_coeff_luma[i0*2][0]
    CPR(i0,1): alf_coeff_luma[i0*2][1]
    CPR(i0,2): alf_coeff_luma[i0*2+1][0]
    CPR(i0,3): alf_coeff_luma[i0*2+1][1]

In a case where alf_second_split_type is 1, correspondence between each of the characteristic value partial regions (i0,j0) and alf_coeff_luma[i][j] allocated to each of the characteristic value partial regions (i0,j0), that is, correspondence between the characteristic value in-region index (i0,j0) and alf_coeff_luma[i][j] is as below.
  alf_second_split_flag=0:
    CPR(i0,0): alf_coeff_luma[i0][0]
  alf_second_split_flag=1:
    CPR(i0,0): alf_coeff_luma[i0][0]
    CPR(i0, 1): alf_coeff_luma[i0][2]
  alf_second_split_flag=2:
    CPR(i0,0): alf_coeff_luma[i0][0]
    CPR(i0,1): alf_coeff_luma[i0][1]
  alf_second_split_flag=3:
    CPR(i0,0): alf_coeff_luma[i0][0]
    CPR(i0,1): alf_coeff_luma[i0][1]
    CPR(i0,2): alf_coeff_luma[i0][2]
    CPR(i0,3): alf_coeff_luma[i0][3]

Note that, among alf_coeff_luma[i][j], alf_coeff_luma[0][0] which is encoded and decoded at first is a filter coefficient itself for a characteristic value partial region CPR(0,0), and alf_coeff_luma[i][j] (i≠0, j≠0) is a residual (a filter coefficient residual) between a prediction value (a prediction filter coefficient) of a filter coefficient for a target characteristic value partial region and a filter coefficient which is actually used. To be more accurate, alf_coeff_luma[i][j] has an index [k] (0≤k≤Ncomp−1, Ncomp is the total number of components of the filter coefficient) for specifying a component of the filter coefficient or the filter coefficient residual. Note here that a notation of such index is omitted.

Further, for example, the filter parameter FP can be arranged such that a component of an offset included in alf_coeff_luma[i][j] is transmitted in an upper hierarchy than components other than the offset. Specifically, the filter parameter FP can be arranged such that the component of the offset included in alf_coeff_luma[i][j] is transmitted in the same hierarchy as alf_length_luma_minus5_div2[i0] and the components other than the offset are transmitted in a lower hierarchy than alf_length_luma_minus5_div2[i0].

Note that, in the following description, alf_coeff_luma[i][j] allocated to the characteristic value partial regions CPR(i0,j0) is also referred to as alf_coeff_luma(i0,j0).

(alf_region_pred_luma)

Here, alf_region_pred_luma[i][j] (i=i0, 2×i0, 2×i0+1, j=1, 2, 3) is a flag for specifying a prediction directionality at a time of extraction of a prediction value of a filter coefficient for each of the characteristic value partial regions. alf_region_pred_luma[i] [j] is encoded with respect to, among the characteristic value partial regions CPR(i0,j0), a characteristic value partial region CPR adjoined by a plurality of characteristic value partial regions which can be referred to at a time of extraction of a prediction value of a filter coefficient. For example, when a filter coefficient for each of the characteristic value partial regions included in the characteristic value region CR is decoded in a raster scan order, alf_region_ pred_luma is encoded with respect to a characteristic value partial region both of whose upper side and left side are adjoined with other characteristic value partial regions. For example, when alf_region_pred_luma is 0, a characteristic value partial region adjoining the upper side of the characteristic value partial region is referred to, and when alf_region_pred_luma is 1, a characteristic value partial region adjoining the left side of the characteristic value region is referred to.

On the other hand, when a filter coefficient for each of the characteristic value partial regions included in the characteristic value region CR is decoded in reverse order of a raster scan order, alf_region_pred_luma is encoded with respect to a characteristic value partial region both of whose right side and lower side are adjoined with other characteristic value partial regions.

Figure 31:
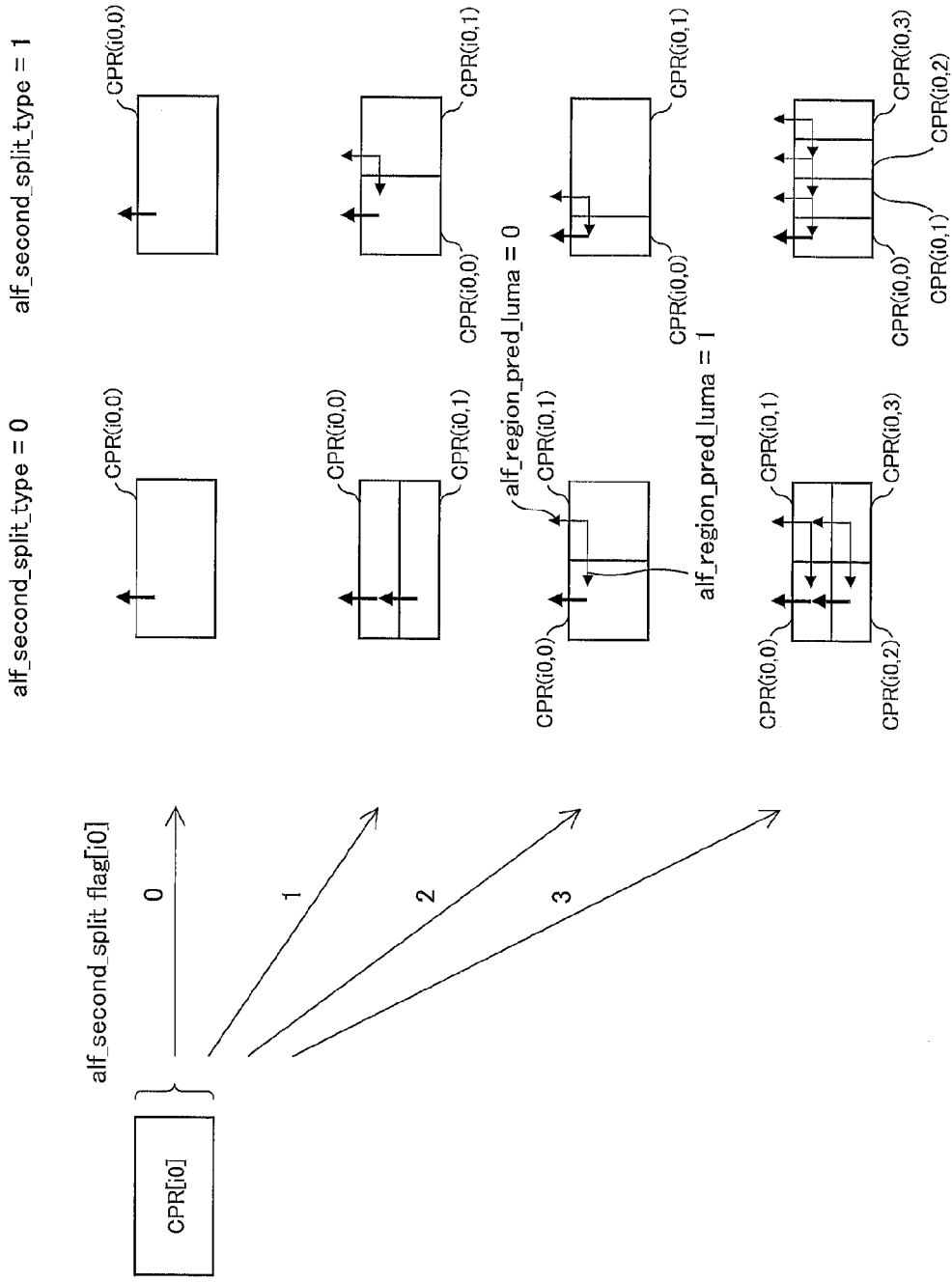
FIG. 31, which explains the adaptive filter in accordance with the second embodiment, shows prediction directions adaptively allocated to respective characteristic value partial regions obtained by carrying out the second division with respect to a characteristic value partial region.

FIG. 31 shows predication directions allocated to the respective characteristic value partial regions CPR(i0,j0) obtained by carrying out the second division with respect to the characteristic value partial region CPR[i0].

In a case where the filter coefficient for each of the characteristic value partial regions is decoded in a raster scan order and alf_second_split_type is 0, correspondence between each of the characteristic value partial regions CPR(i0,j0) and alf_region_pred_luma[i][j] allocated to each of the characteristic value partial regions CPR(i0,j0) is as below.

alf_second_split_flag=2:
        CPR(i0,1): alf_region_pred_luma[i0*2][1]
    alf_second_split_flag=3:
        CPR(i0,1): alf_region_pred_luma[i0*2][1]
        CPR(i0,3): alf_region_pred_luma[i0*2+1][1]

As illustrated in FIG. 31, each of these characteristic value partial regions is allocated with either of an upward directionality and a leftward directionality as a prediction directionality, depending on a value of alf_region_pred_luma.

Use of alf_region_pred_luma makes it possible to choose a prediction directionality from between (1) a prediction directionality (an upward directionality) in which a prediction value is a filter coefficient which has been already decoded with respect to a characteristic value partial region whose characteristic value Y is the same as or closest to that of a target characteristic value partial region and (2) a prediction directionality (a lateral directionality) in which a prediction value is a filter coefficient which has been already decoded with respect to a characteristic value partial region whose characteristic value X is the same as or closest to that of the target characteristic value partial region.

Note here that whether or not characteristic values are close to each other is determined in accordance with kinds of the characteristic values. For example, in a case of a characteristic value expressed by simple scalar quantity such as activity, values having small difference are values closest to each other. On the other hand, in a case of a characteristic value expressed by indexes allocated to vector quantity (here, direction) such as directionality, values having a narrow angle made by an original vector are values closest to each other.

Further, in a case where the filter coefficient for each of the characteristic value partial regions is decoded in a raster scan order and alf_second_split_type is 1, correspondence between each of the characteristic value partial regions CPR(i0,j0) and alf_region_pred_luma[i][j] allocated to each of the characteristic value partial regions CPR(i0,j0) is as below.

alf_second_split_flag=1:
        CPR(i0,1): alf_region_pred_luma[i0][2]
    alf_second_split_flag=2:
        CPR(i0,1): alf_region_pred_luma[i0][1]
    alf_second_split_flag=3:
        CPR(i0,1): alf_region_pred_luma[i0][1]
        CPR(i0,2): alf_region_pred_luma[i0][2]
        CPR(i0,3): alf_region_pred_luma[i0][3]

As illustrated in FIG. 31, each of these characteristic value partial regions is allocated with either of an upward directionality and a leftward directionality as a prediction directionality, depending on a value of alf_region_pred_luma.

On the other hand, as illustrated in FIG. 31, each of the characteristic value partial regions listed below is allocated with an upward directionality only as a prediction directionality because only a characteristic value partial region adjoining the upper side of the characteristic value partial region can be referred to.

alf_second_split_type=0:
        alf_second_split_flag=0:
            CPR(i0,0)
        alf_second_split_flag=1:
            CPR(i0,0)
            CPR(i0,1)
        alf_second_split_flag=2:
            CPR(i0,0)
        alf_second_split_flag=3:
            CPR(i0,0)
            CPR(i0,2)
    alf_second_split_type=1:
        alf_second_split_flag=0:
            CPR(i0,0)
        alf_second_split_flag=1:
            CPR(i0,0)
        alf_second_split_flag=2:
            CPR(i0,0)
        alf_second_split_flag=3:
            CPR(i0,0)

Note that, in the following description, alf_region_pred_luma[i][j] allocated to the characteristic value partial regions CPR(i0,j0) is also referred to as alf_region_pred_luma(i0,j0).

Figure 32:
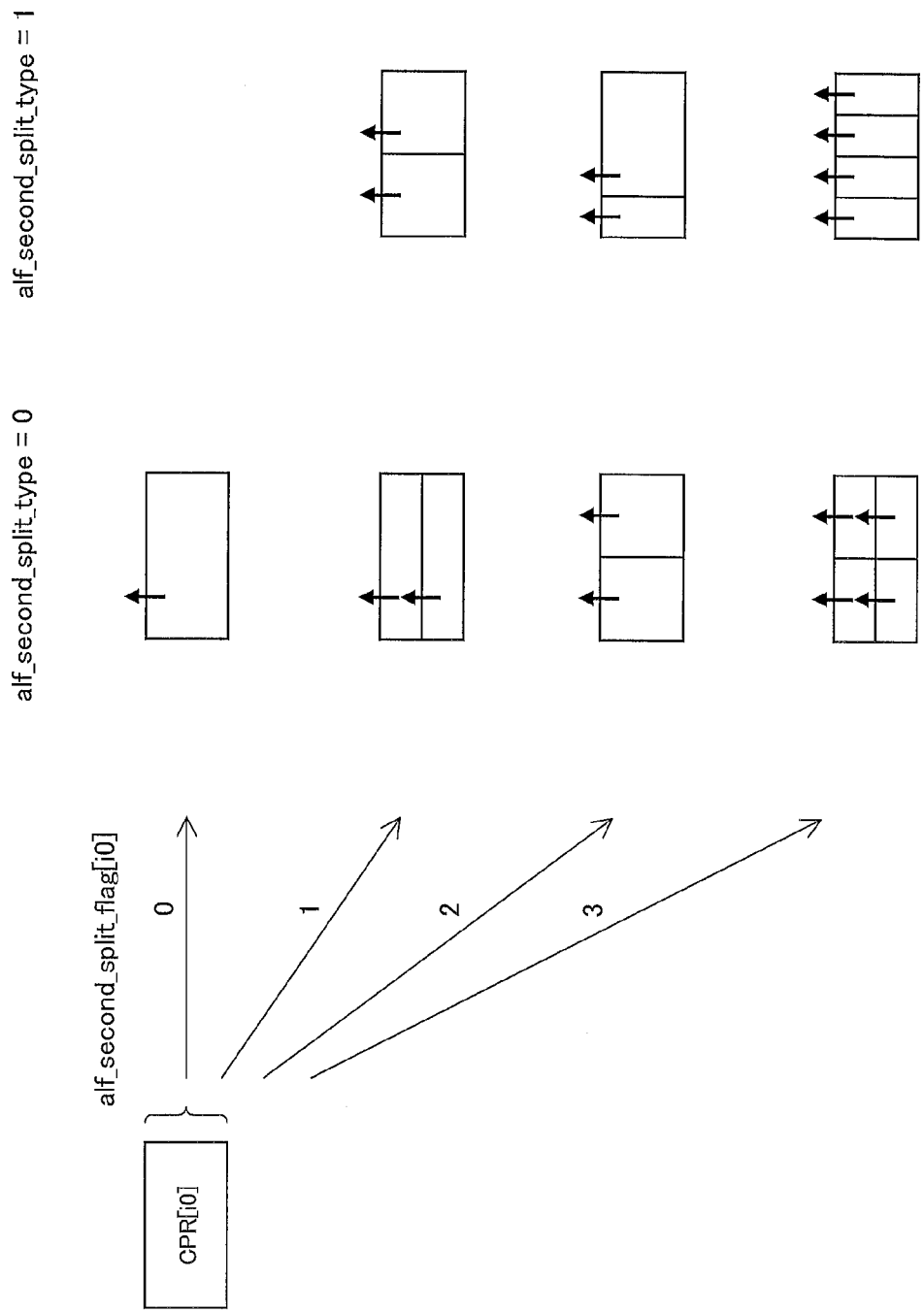
FIG. 32, which explains the adaptive filter in accordance with the second embodiment, shows prediction directions fixedly allocated to respective characteristic value partial regions obtained by carrying out the second division with respect to a characteristic value partial region.

Further, the filter parameter FP can be arranged not to include alf_region_pred_luma[i][j]. In this case, as illustrated in FIG. 32, an upward directionality can be fixedly used as a prediction directionality for each of the characteristic value partial regions.

Syntaxes alf_length_luma_minus5_div2 and alf_coeff_luma[0][0] listed in the bottom of FIG. 26 are included in the filter parameter FP when the syntax alf_enable_region_filter is 0, that is, when it is specified that the filter process with respect to each of the characteristic value partial regions is off. alf_length_luma_minus5_div2 specifies a tap number, and alf_coeff_luma[0][0] specifies a filter coefficient.

Note that Descriptors u(1) in FIG. 26 indicates that fixed length coding is carried out on syntaxes associated with the Descriptors u(1) by 1 bit. Descriptors u(2) indicates that fixed length coding is carried out on syntaxes associated with the Descriptors u(2) by 2 bits. Descriptors u(v) indicates that variable length coding is carried out on syntaxes associated with the Descriptors ue (v).

Figure 33:
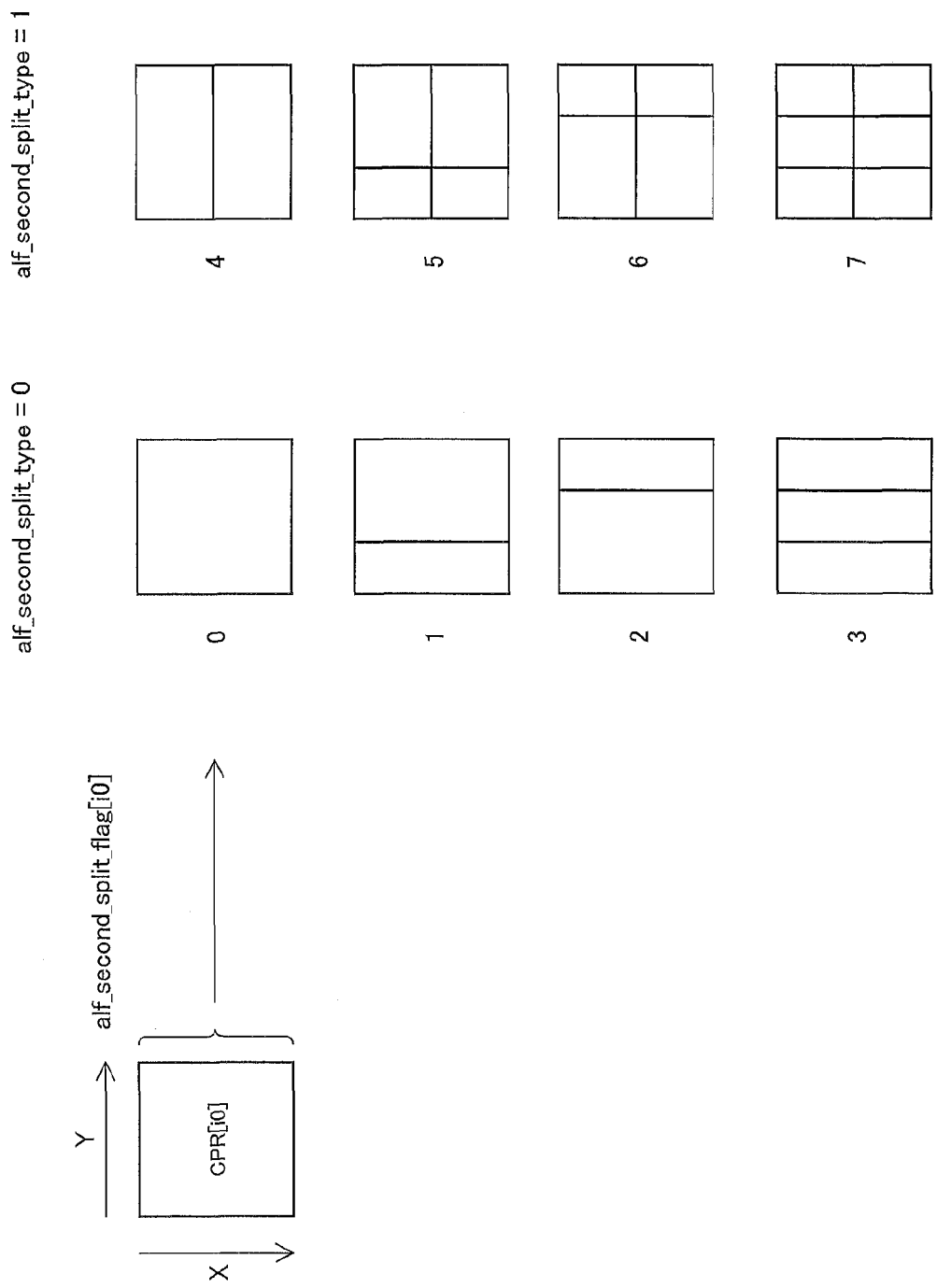
FIG. 33, which explains the adaptive filter in accordance with the second embodiment, shows an example in which the characteristic value partial region obtained by the first division is divided into up to two with respect to the first characteristic value and up to with respect to the second characteristic value.

Further, the present embodiment is not limited to the above example in which a value of the syntax alf_second_split_flag[i0] is any of 0 to 3. For example, the value of the syntax alf_second_split_flag[i0] can be any of 0 to 7. An example of a subdivision specified by such syntax alf_second_split_flag[i0] is illustrated in FIG. 33. According the example illustrated in FIG. 33, the characteristic value partial region CPR[i0] obtained by the initial division is divided, in accordance with a value of alf_second_split_flag[i0], into up to two with respect to the characteristic value X and up to three with respect to the characteristic value Y.

(Moving Image Decoder 3)

Figure 34:
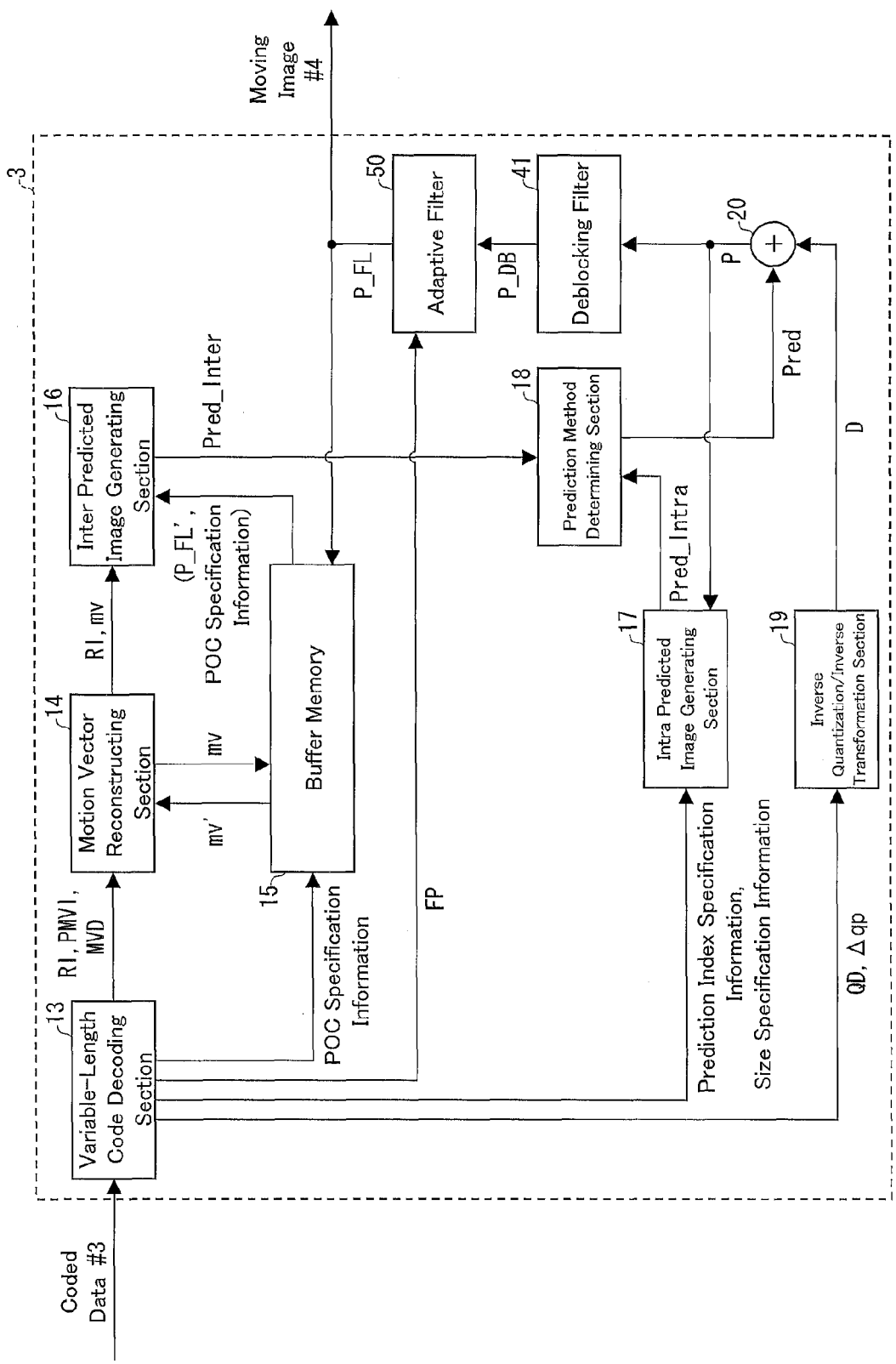
FIG. 34 is a block diagram showing an arrangement of a moving image decoder in accordance with the second embodiment.
Figure 35:
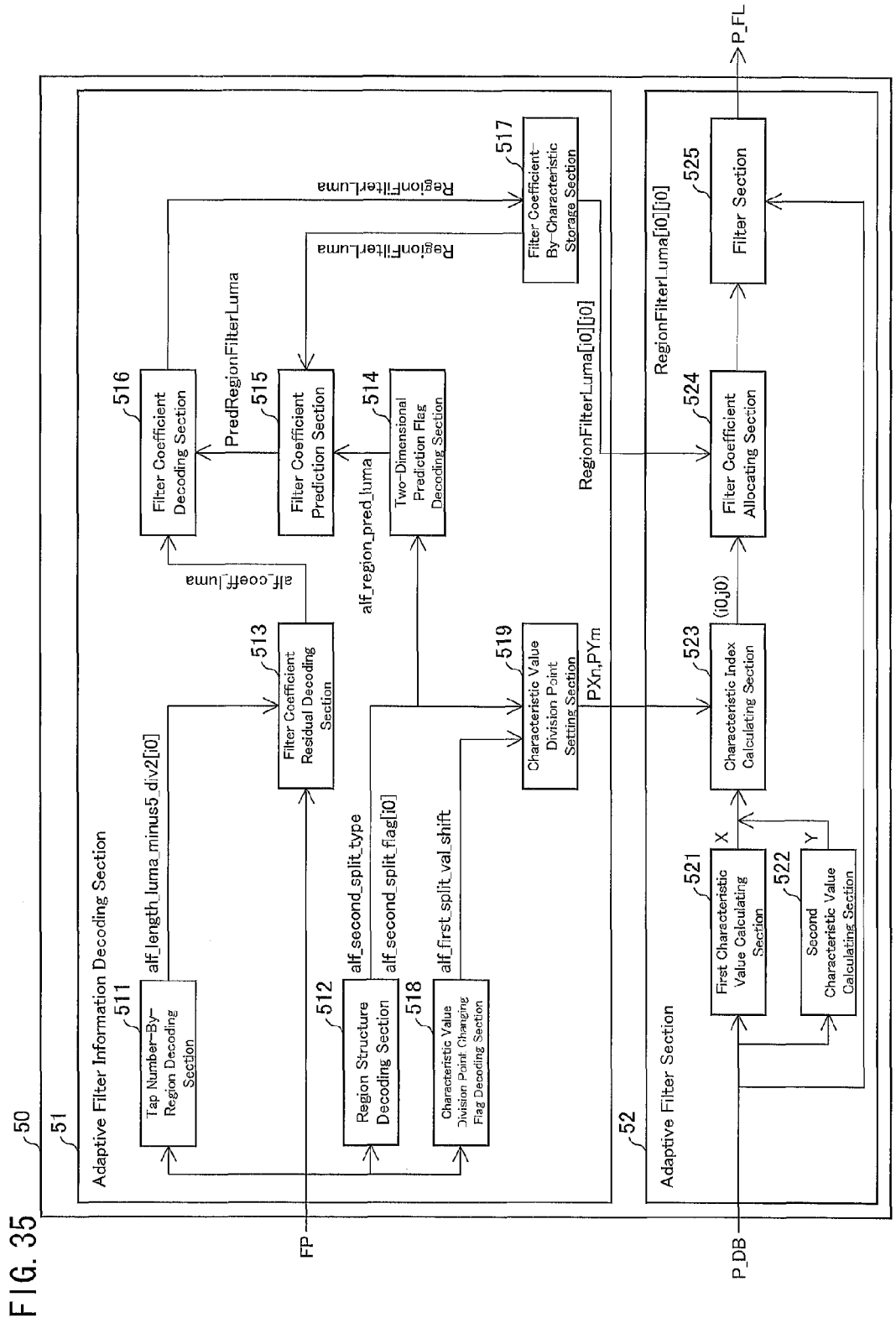
FIG. 35 is a block diagram showing an arrangement of an adaptive filter of the moving image decoder in accordance with the second embodiment.

The following description will discuss a moving image decoder 3 in accordance with the present embodiment, with reference to FIGS. 34 through 36. Note that like reference numerals are given to members which are identical with those already described in Embodiment 1, and explanations for such members are omitted.

FIG. 34 is a block diagram showing an arrangement of the moving image decoder 3. The moving image decoder 3 includes an adaptive filter 50 (see FIG. 34) instead of the adaptive filter 42 included in the moving image decoder 1. A filter parameter FP contained in coded data #3 is supplied to the adaptive filter 50. Note that the other arrangements of the moving image decoder 3 are identical with those of the moving image decoder 1, and therefore explanations for such arrangements are omitted.

(Adaptive Filter 50)

In a case where syntax adaptive_loop_filter_flag is 1, the adaptive filter 50 generates a filtered decoded image P_FL by carrying out an adaptive filter process with respect to a deblocked decoded image P_DB.

The adaptive filter 50 associates a target unit region with any of the above described characteristic value partial regions in accordance with a characteristic value of the deblocked decoded image P_DB in the target unit region. Then, the adaptive filter 50 carries out a filter process with respect to the target unit region with the use of a filter coefficient which has been decoded for the characteristic value partial region associated with the target unit region.

FIG. 35 is a block diagram showing an arrangement of the adaptive filter 50. The adaptive filter 50 includes an adaptive filter information decoding section 51 and an adaptive filter section 52 (see FIG. 35). Note that, although not illustrated in FIG. 35, the adaptive filter 50 further includes an upper-level syntax decoding section for decoding syntax alf_enable_region_filter and syntax alf_num_first_split_minus1.

In a case where the syntax alf_enable_region_filter is 1, the adaptive filter 50 carries out a filter process with respect to each characteristic value partial region, respectively. Moreover, the adaptive filter 50 sets a division number AlfNumFirstSplit to alf_num_first_split_minus1+1 with the use of a value of alf_num_first_split_minus1.

(Adaptive Filter Information Decoding Section 51)

The adaptive filter information decoding section 51 is arranged to extract characteristic value division points PXn and PYm and at least one filter coefficient RegionFilterLuma[i0][j0] by decoding the filter parameter FP contained in the coded data #3. The characteristic value division points and the at least one filter coefficient RegionFilterLuma[i0][j0] thus derived are supplied to the adaptive filter process section 52. The following description will discuss a case where the adaptive filter information decoding section 51 derives the at least one filter coefficient RegionFilterLuma[i0][j0], in the order of raster scans, for respective characteristic value partial regions constituting a characteristic value region CR. Note, however, that the present embodiment is not limited to this, and the present embodiment is applicable to a case where the at least one filter coefficient RegionFilterLuma[i0][j0] are derived in reverse order of the raster scans. In such a case, a "left side" and an "upper side" in the description below may be read as a "right side" and a "lower side", respectively.

As illustrated in FIG. 35, the adaptive filter information decoding section 51 includes a tap number-by-region decoding section 511, a region structure decoding section 512, a filter coefficient residual decoding section 513, a two-dimensional prediction flag decoding section 514, a filter coefficient prediction section 515, a filter coefficient decoding section 516, a filter coefficient-by-region storage section 517, a characteristic value division point changing flag decoding section 518, and a characteristic value division point setting section 519.

The tap number-by-region decoding section 511 decodes syntax alf_length_luma_minus5_div2[i0] (0≤i0<AlfNumFirstSplit) contained in the filter parameter FP. The syntax alf_length_luma_minus5_div2[i0] thus decoded is allocated to a characteristic value partial region CPR[i0] and is supplied to the filter coefficient residual decoding section 513. Moreover, the syntax alf_length_luma_minus5_div2[i0] is also supplied to the filter coefficient prediction section 515, the filter coefficient decoding section 516, the filter coefficient-by-region storage section 517, a filter coefficient allocating section 524, and a filter section 525 (note that arrows are not illustrated in FIG. 35).

The region structure decoding section 512 decodes syntax alf_second_split_type and syntax alf_second_split_flag[i0] contained in the filter parameter FP. The syntax alf_second_split_type thus decoded is allocated to the entire characteristic value region CR and is supplied to the filter coefficient residual decoding section 513, the two-dimensional prediction flag decoding section 514, and the characteristic value division point setting section 519. The syntax alf_second_split_flag[i0] thus decoded is allocated to the characteristic value partial region CPR[i0] and is supplied to the filter coefficient residual decoding section 513, the two-dimensional prediction flag decoding section 514, and the characteristic value division point setting section 519.

The filter coefficient residual decoding section 513 (i) decodes syntax alf_coeff_luma[i][j] contained in the filter parameter FP with reference to alf_length_luma_minus5_div2[i0], alf_second_split_type, and alf_second_split_flag[i0] and (ii) allocates each syntax alf_coeff_luma[i][j] to a corresponding characteristic value partial region CPR (i0, j0). The correspondence between alf_coeff_luma[i][j] and the characteristic value partial region CPR (i0, j0) is already described in the explanation for the coded data #3, and therefore an explanation for the correspondence is omitted here. The syntax alf_coeff_luma[i][j] thus decoded is supplied to the filter coefficient decoding section 516.

The two-dimensional prediction flag decoding section 514 (i) decodes syntax alf_region_pred_luma[i][j] contained in the filter parameter FP with reference to alf_second_split_type and alf_second_split_flag[i0] and (ii) allocates each syntax alf_region_pred_luma[i][j] to a corresponding characteristic value partial region CPR (i0, j0). The correspondence between alf_region_pred_luma[i][j] and the characteristic value partial region CPR (i0, j0) is already described in the explanation for the coded data #3, and therefore an explanation for the correspondence is omitted here. The syntax alf_region_pred_luma thus decoded is supplied to the filter coefficient prediction section 515.

The filter coefficient prediction section 515 derives, with reference to the syntax alf_region_pred_luma, a prediction filter coefficient PredRegionFilterLuma[i0][j0] for each characteristic value partial region from a filter coefficient RegionFilterLuma[i0'][j0'] which has been decoded and is stored in the filter coefficient-by-region storage section 517. The prediction filter coefficient PredRegionFilterLuma[i0][j0] thus derived is supplied to the filter coefficient decoding section 516.

In a case where the syntax alf_region_pred_luma is allocated to a target characteristic value partial region which is a characteristic value partial region to be processed, the filter coefficient prediction section 515 sets a filter coefficient RegionFilterLuma[i0'][j0'], which has been decoded for a characteristic value partial region adjacent to the target characteristic value partial region in a direction indicated by the syntax alf_region_pred_luma, to a prediction filter coefficient PredRegionFilterLuma[i0][j0] for the target characteristic value partial region. On the other hand, in a case where syntax alf_region_pred_luma is not allocated to the target characteristic value partial region, the filter coefficient prediction section 515 sets a filter coefficient RegionFilterLuma[i0'][j0'], which has been decoded for a characteristic value partial region adjacent to an upper side of the target characteristic value partial region, to a prediction filter coefficient PredRegionFilterLuma[i0][j0] for the target characteristic value partial region.

The filter coefficient decoding section 516 (i) generates a filter coefficient RegionFilterLuma[i0][j0] for each characteristic value partial region by adding a filter coefficient residual alf_coeff_luma(i0, j0) to a prediction filter coefficient PredRegionFilterLuma[i0][j0] and (ii) allocates the filter coefficient RegionFilterLuma[i0] [j0] to the characteristic value partial region. The filter coefficient RegionFilterLuma[i0][j0] thus generated is stored in the filter coefficient-by-region storage section 517.

The characteristic value division point changing flag decoding section 518 decodes syntax alf_first_split_val_shift contained in the filter parameter FP. The syntax alf_first_split_val_shift thus decoded is supplied to the characteristic value division point setting section 519.

The characteristic value division point setting section 519 derives characteristic value division points PXn (1≤n≤NX−1) and PYm (1≤m≤NX−1) based on alf_first_split_val_shift and alf_second_split_type. The characteristic value division points PXn and PYm thus derived are supplied to a characteristic index calculating section 523 included in the adaptive filter section 52.

A concrete example of the characteristic value division points PXn and PYm with respect to respective values of syntax alf_first_split_val_shift and syntax alf_second_split_type is already described in the explanation for the coded data #3, and therefore an explanation for such a concrete example is omitted here.

Note that the characteristic value division point setting section 519 may be arranged to extract the characteristic value division points PXn (1≤n≤NX−1) and PYm (1≤m≤NX−1) without referring to any of alf_first_split_val_shift and alf_second_split_type but based on characteristic value division information stored in advance in a memory which is provided in the characteristic value division point setting section 519. In a case where such an arrangement is employed, it is preferable that the characteristic value division information is shared by the moving image decoder 3 and the moving image encoder 4.

(Adaptive Filter Section 52)

The adaptive filter section 52 is arranged to generate a filtered decoded image P_FL by carrying out an adaptive filter process with respect to each of unit regions constituting the deblocked decoded image P_DB. Here, a filter coefficient used in the filter process with respect to each of the unit regions is selected from at least one filter coefficient RegionFilterLuma[i0][j0], which have been decoded from the filter parameter FP, in accordance with (i) a characteristic value X of a deblocked decoded image P_DB in the unit region or (ii) the characteristic value X and a characteristic value Y of the deblocked decoded image P_DB in the unit region. The filtered decoded image P_FL thus generated is stored in a buffer memory 15.

The adaptive filter section 52 includes a first characteristic value calculating section 521, a second characteristic value calculating section 522, a characteristic index calculating section 523, a filter coefficient allocating section 524, and a filter section 525 (see FIG. 35).

Note that an image supplied to the adaptive filter section 52 is not limited to the deblocked decoded image P_DB but can be a plurality of input images. For example, at least any of a decoded image P and a prediction residual D may be supplied to the adaptive filter section 52 in addition to the deblocked decoded image P_DB. In a case where such an arrangement is employed, (i) the first characteristic value calculating section 521 and the second characteristic value calculating section 522 (later described) may calculate characteristic values not only for the deblocked decoded image P_DB but also for at least any of the decoded image P and the prediction residual D, and (ii) the filter section 525 may carry out an adaptive filter process with respect to each of the input images and output resultant images to which respective filtered images have been added. In such a case, the filter parameter FP is arranged to contain at least one filter coefficient which (i) are set for respective input images and (ii) correspond to respective characteristic value partial regions.

(First Characteristic Value Calculating Section 521)

The first characteristic value calculating section 521 calculates a characteristic value X for a deblocked decoded image P_DB in a target unit region which is to be processed. The following explains (i) a calculation process (Calculation Process Example 1 for calculating characteristic value X) for calculating activity as the characteristic value X and (ii) a calculation process (Calculation Process Example 2 for calculating characteristic value X) for calculating variance of pixel values as the characteristic value X. Note, however, that concrete examples of the characteristic value X are not limited to those.

(Calculation Process Example 1 for Calculating Characteristic Value X)

According to the present process example, the first characteristic value calculating section 521 calculates, as the characteristic value X, activity ACT of the deblocked decoded image P_DB in the target unit region. The "activity" is generally an index indicative of disorder in image and can be calculated based on a condition such as whether or not a large high-frequency component exists in a transformation coefficient obtained when a DCT is carried out on a region including the target unit region. However, it is assumed in the present process example that the activity is calculated based on pixel values of respective adjacent pixels. As a difference between the pixel values of respective adjacent pixels becomes larger, the activity becomes larger. The calculated activity ACT is supplied to the characteristic index calculating section 523 as the characteristic value X.

In a case where (i) the target unit region is a rectangular region of Bx pixels×By pixels, (ii) coordinates of each of pixels in the target unit region are expressed as (u, v) (u is an integer satisfying 0≤u≤Bx−1, and v is an integer satisfying 0≤v≤By−1), and (iii) a pixel value of the deblocked decoded image P_DB at the coordinates is expressed as S(u, v), the first characteristic value calculating section 521 can calculate the activity ACT by the use of, for example, the following Equation (2-1a):

[Math. 7]

$$ACT = \sum_{u=0}^{Bx} \sum_{v=0}^{By-1} |S(u-1,v) - S(u,v)| + \sum_{u=0}^{Bx-1} \sum_{v=0}^{By} |S(u,v-1) - S(u,v)| \quad (2\text{-}1a)$$

Equation (2-1a) is for an activity evaluation which is carried out with the use of, as an index, a sum of absolute pixel values (i.e., Sum of Absolute Difference, SAD) of the adjacent pixels.

Alternatively, the first characteristic value calculating section 521 may calculate the activity ACT with the use of the following Equation (2-1b):

[Math. 8]

$$ACT = \sum_{u=0}^{Bx-1} \sum_{v=0}^{By-1} \left[ \begin{array}{c} |S(u-1, v) - 2S(u, v) - S(u+1, v)| + \\ |S(u, v-1) - 2S(u, v) - S(u, v+1)| \end{array} \right] \quad (2\text{-}1b)$$

Equation (2-1b) is for an activity evaluation carried out with the use of, as an index, a sum of modified Laplacian of pixel values (i.e., Sum-Modified Laplacian, SML) of the adjacent pixels.

In a case where the first characteristic value calculating section 521 calculates the activity for the target unit region with the use of Equation (2-1a) or (2-1b), the first characteristic value calculating section 521 refers not only to a pixel $S(i, j)$ in the target unit region but also to pixels $S(-1, v)$, $S(Bx, v)$, $S(u, -1)$, and $S(u, By)$ which are adjacent to the target unit region. That is, in a case where Equation (2-1a) or (2-1b) is used, a characteristic value calculation reference region is made up of the pixel $S(u, v)$ in the target unit region and the pixels $S(-1, v)$, $S(Bx, v)$, $S(u, -1)$, and $S(u, By)$ which are adjacent to the target unit region. (a) of FIG. 36 shows a characteristic value calculation reference region CRR which is referred to in a case where the first characteristic value calculating section 521 calculates activity ACT for a target unit region UR of 4×4 pixels with the use of Equation (2-1a) or (2-1b).

Note that, in a case where the target unit region abuts on a slice border or a macroblock border, it sometimes happens that pixel values of the deblocked decoded image P_DB for a part of pixels in the characteristic value calculation reference region cannot be referred to. For example, in a case where the target unit region is adjacent to a macroblock (hereinafter, referred to as "undecoded macroblock") which has not been decoded yet, pixel values of the undecoded macroblock cannot be referred to. In such a case, the first characteristic value calculating section 521 exceptionally calculates activity ACT without referring to the pixel values that cannot be referred to. For example, in a case where a right side and a lower side of the target unit region abut on undecoded macroblocks, the first characteristic value calculating section 521 may calculate activity ACT with the use of the following Equation (2-1a') obtained by partially limiting a range of the sum of u and v in Equation (2-1a).

[Math. 9]

$$ACT = \sum_{u=0}^{Bx-1}\sum_{v=0}^{By-1} |S(u-1, v) - S(u, v)| + \sum_{u=0}^{Bx-1}\sum_{v=0}^{By-1} |S(u, v-1) - S(u, v)| \quad (2\text{-}1a')$$

The same applies to Equation (2-1b).

On the other hand, the first characteristic value calculating section 521 can be arranged to calculate activity for the target unit region with reference to only pixel values in the target unit region, regardless of whether or not the target unit region abuts on a slice border or a macroblock border. For example, the first characteristic value calculating section 521 can calculate activity ACT with the use of the following Equation (2-1c).

[Math. 10]

$$ACT = \sum_{u=0}^{Bx-2}\sum_{v=0}^{By-1} |S(u, v) - S(u+1, v)| + \sum_{u=0}^{Bx-1}\sum_{v=0}^{By-2} |S(u, v) - S(u, v+1)| \quad (2\text{-}1c)$$

Equation (2-1c) is for an activity evaluation carried out for evaluating activity of pixel values of adjacent pixels with the use of, as an index, an SAD of the pixel values of the adjacent pixels, as with Equation (2-1a). However, unlike Equation (2-1a), Equation (2-1c) represents an activity calculation which is carried out with reference to only pixels included in the target unit region.

Alternatively, the first characteristic value calculating section 521 may be arranged to calculate activity ACT with the use of the following Equation (2-1d):

[Math. 11]

$$ACT = \sum_{u=1}^{Bx-2}\sum_{v=0}^{By-1} |R(u-1, v) - 2R(u, v) - R(u+1, v)| + \sum_{u=0}^{Bx-1}\sum_{v=1}^{By-2} |R(u, v-1) - 2R(u, v) - R(u, v+1)| \quad (2\text{-}1d)$$

Equation (2-1d) is for an activity evaluation carried out with the use of, as an index, an SML of the pixel values of the adjacent pixels, as with Equation (2-1b). However, unlike Equation (2-1a), Equation (2-1d) represents an activity calculation which is carried out with reference to only pixels included in the target unit region.

As such, in a case where the first characteristic value calculating section 521 calculates out activity for the target unit region with reference to only pixel values in the target unit region, the characteristic value calculation reference region CRR is identical with the target unit region UR, as illustrated in (b) of FIG. 36. Variance VP (later described) also exemplifies activity that can be calculated with reference to only pixel values in the target unit region.

Under the circumstances, in a case where the first characteristic value calculating section 521 calculates activity for the target unit region with reference to only pixel values in the target unit region, the number of pixels to be read from the buffer memory 15 is reduced and an amount of data to be transmitted from the buffer memory 15 to the adaptive filter 50 is reduced, as compared to the case where pixel values of a region other than the target unit region are also referred to. Moreover, because the number of pixels to be referred to for calculating the activity is reduced and any exceptional process is unnecessary, an amount of processes to be carried out for calculating the activity is reduced.

Note that the first characteristic value calculating section 521, which calculates activity ACT with the use of Equation (2-1c), can also be expressed as follows: That is, the first characteristic value calculating section 521 (i) calculates out activity ACT (u, v) of a pixel (u, v) with reference to pixel values of respective pixels in the vicinity {(u, v), (u+1, v), (u, v+1)} of the coordinates (u, v) and (ii) calculates out activity ACT for the target unit region with the use of a sum of pieces of activity ACT (u, v) in an internal region {(u, v)|0≤u≤Bx−2, 0≤v≤By −2} of the target unit region.

Alternatively, the first characteristic value calculating section 521, which calculates activity ACT with the use of Equation (2-1d), can also be expressed as follows: That is, the first characteristic value calculating section 521 (i) calculates out activity ACT (u, v) of a pixel (u, v) with reference to pixel values of respective pixels in the vicinity {(u, v), (u+1, v), (u, v+1), (u−1, v), (u, v−1)} of the coordinates (u, v) and (ii) calculates out activity ACT for the target unit region with the use of a sum of pieces of activity ACT (u, v) in an internal region {(u, v)|1≤u≤Bx−2, 1≤v≤By −2} of the target unit region.

The first characteristic value calculating section 521, which thus calculates activity with reference to only pixels in the target unit region, can also be expressed as follows: That is, the first characteristic value calculating section 521 (i) derives activity of first pixels belonging to an internal region, which is made up of the first pixels whose entire vicinity is included in the target unit region, with reference to pixel values of second pixels included in the vicinity of the first pixels and (ii) calculates out activity for the target unit region from the activity of the first pixels belonging to the internal region.

Note that the arrangement in which the activity is calculated out with reference to only pixels included in the target unit region is not limited to the above example, and it is possible to employ the following arrangement: that is, (i) the target unit region is divided into (a) an internal region made up of first pixels whose entire vicinity is included in the target unit region and (b) a peripheral region made up of second pixels whose vicinity is not entirely included in the target unit region, (ii) activity of the first pixels belonging to the internal region is calculated with reference to pixel values of third pixels in the vicinity of the first pixels, (iii) activity of the second pixels belonging to the peripheral region is calculated out with reference to pixel values of fourth pixels which are in the vicinity of the second pixels and in the target unit region, and (iv) activity for the target unit region is calculated out from activity of fifth pixels belonging to the target unit region.

Alternatively, the first characteristic value calculating section 521 may be arranged to calculate activity ACT by a process similar to that of the activity calculating section 423 in accordance with Embodiment 1. Note, however, that the "divisional region" and the "partition" of Embodiment 1 correspond to the "unit region" of the present embodiment.

(Calculation Process Example 2 for Calculating Characteristic Value X)

According to the present process example, the first characteristic value calculating section 521 calculates, as the characteristic value X, variance VP of pixel values of the deblocked decoded image P_DB in the target unit region. The calculated variance VP is supplied to the characteristic index calculating section 523 as the characteristic value X.

In a case where (i) the target unit region is a rectangular region of Bx pixels×By pixels, (ii) coordinates of each of pixels in the target unit region are expressed as (u, v) (u is an integer satisfying 0≤u≤Bx−1, and v is an integer satisfying 0≤v≤By−1), and (iii) a pixel value of the deblocked decoded image P_DB at the coordinates is expressed as S(u, v), the first characteristic value calculating section 521 calculates the variance VP by the use of, for example, the following Equation (2-2):

[Math. 12]

$$VP = \left[ \frac{1}{Bx \times By} \sum_{u=0}^{Bx-1} \sum_{v=0}^{By-1} S(u,v)^2 \right] - \left[ \frac{1}{Bx \times By} \sum_{u=0}^{Bx-1} \sum_{v=0}^{By-1} S(u,v) \right]^2 \quad (2\text{-}2)$$

Note that the variance VP calculated by the first characteristic value calculating section 521 serves as an index indicative of disorder in deblocked decoded image P_DB in the target unit region, as with the activity ACT.

(Second Characteristic Value Calculating Section 522)

The second characteristic value calculating section 522 calculates a characteristic value Y for a deblocked decoded image P_DB in a target unit region. The following explains (i) calculation processes (Calculation Process Examples 1 and 2 for calculating characteristic value Y) for calculating directionality of an image as the characteristic value Y, (ii) a calculation process (Calculation Process Example 2 for calculating characteristic value Y) for calculating an average pixel value as the characteristic value X, and (iii) a calculation process (Calculation Process Example 3 for calculating characteristic value Y) for calculating coordinates of the target unit region as the characteristic value X. Note, however, that concrete examples of the characteristic value Y are not limited to those.

(Calculation Process Example 1 for Calculating Characteristic Value Y)

In the present process example, the second characteristic value calculating section 522 calculates directionality of a deblocked decoded image in the target unit region as the characteristic value Y. An index (directionality index) indicative of the calculated directionality is supplied to the characteristic index calculating section 523 as the characteristic value Y.

The second characteristic value calculating section 522 first calculates vertical activity ACT_V and horizontal activity ACT_H of the deblocked decoded image P_DB in the target unit region. Note that the horizontal activity ACT_H and the vertical activity ACT_V can be calculated based on, for example, the first term and the second term in the above Equation (2-1a), respectively. Alternatively, the horizontal activity ACT_H and the vertical activity ACT_V can be calculated based on the first term and the second term, respectively, in any of the above Equations (2-1b) through (2-1d).

Subsequently, the second characteristic value calculating section 522 supplies, as the characteristic value Y, any of directionality indices listed below to the characteristic index calculating section 523, in accordance with degrees of the vertical activity ACT_V and the horizontal activity ACT_H.

In a case of ACT_H>2×ACT_V, the directionality index is set equal to 0.

In a case of ACT_H≤2×ACT_V and ACT_V ACT_H, the directionality index is set equal to 1.

In a case of ACT_H<ACT_V and ACT_V≤2×ACT_H, the directionality index is set equal to 2.

In a case of 2×ACT_H<ACT_V, the directionality index is set equal to 3.

Note that the derived directions indicated by the directionality indices in the present process example are not limited to the above examples. For example, the second characteristic value calculating section 522 may be arranged to (i) classify directionality of the deblocked decoded image in the target unit region into three types in accordance with the degrees of the vertical activity ACT_V and the horizontal activity ACT_H and (ii) output directionality indices indicative of the respective three types. Alternatively, the second characteristic value calculating section 522 may be arranged to (i) classify the directionality of the deblocked decoded image in the target unit region into two types in accordance with the degrees of the vertical activity ACT_V and the horizontal activity ACT_H and (ii) output directionality indices indicative of the respective two types. Alternatively, the second characteristic value calculating section 522 may be arranged to classify the directionality of the deblocked decoded image in the target unit region into five or more types in accordance with the degrees of the vertical activity ACT_V and the horizontal activity ACT_H.

The second characteristic value calculating section 522 can classify the directionality of the deblocked decoded image in the target unit region into three types in accordance with the degrees of the vertical activity ACT_V and the horizontal activity ACT_H as follows:

In a case of ACT_H>2×ACT_V, the directionality index is set equal to 0.

In a case of ACT_H≤2×ACT_V and 2×ACT_H≤ACT_V, the directionality index is set equal to 1.

In a case of 2×ACT_H<ACT_V, the directionality index is set equal to 2.

In a case where such an arrangement is employed, a characteristic value partial region CPR[i0] obtained by an initial division is further divided, with respect to the characteristic value Y, into a maximum of three characteristic value partial regions CPR (i0, j0) (j0=0, 1, 2). Here, j0=0, 1, and 2 correspond to the respective directionality indices 0, 1, and 2.

The second characteristic value calculating section 522 can classify directionality of the deblocked decoded image in the target unit region into, for example, two types in accordance with the degrees of the vertical activity ACT_V and the horizontal activity ACT_H as follows:

In a case of ACT_H>ACT_V, the directionality index is set equal to 0.

In a case of ACT_H<ACT_V, the directionality index is set equal to 1.

In a case where such an arrangement is employed, a characteristic value partial region CPR[i0] obtained by an initial division is further divided, with respect to the characteristic value Y, into a maximum of two characteristic value partial regions CPR (i0, j0) (j0=0, 1). Here, j0=0 and 1 correspond to the directionality indices 0 and 1, respectively.

(Calculation Process Example 2 for Calculating Characteristic Value Y)

In the present process example, the second characteristic value calculating section 522 calculates directionality of a deblocked decoded image in the target unit region as the characteristic value Y. In the present process example, however, (i) an edge direction of the deblocked decoded image in the target unit region is detected and (ii) a directionality index is supplied as the characteristic value Y to the characteristic index calculating section 523 in accordance with the detected edge direction, unlike the "Calculation Process Example 1 for calculating characteristic value Y".

An edge direction detection process in the present process example is similar to the edge direction detection process carried out by the edge direction detection section 422 in Embodiment 1. The second characteristic value calculating section 522 generates directionality indices as follows, by carrying out classifications in accordance with a relation between Sobel_y and Sobel_x in terms of magnitude.

In a case of |Sobel_y|<a×|Sobel_x|, the directionality index is 0.

In a case of |Sobel_y|≥a×|Sobel_x|, |Sobel_y|≤b×|Sobel_x|, and Sobel_y and Sobel_x have identical signs, the directionality index is 1.

In a case of |Sobel_y|>b×|Sobel_x|, the directionality index is 2.

In a case of |Sobel_y|≥a×|Sobel_x|, |Sobel_y|≤b×|Sobel_x|, and Sobel_y and Sobel_x have opposite signs, the directionality index is 3.

Note that a=tan(22.5°)=0.414 . . . , and b=tan(67.5°)= 2.414 . . . . In the present process example, four directionality indices are calculated. Note, however, that it is possible to calculate two or three directionality indices or five or more directionality indices. In such an arrangement, a characteristic value partial region CPR[i0] obtained by an initial division is further divided, with respect to the characteristic value Y, into a maximum of the number, which is identical with the total number of directionality indices, of characteristic value partial regions, as described in Calculation Process Example 1 for calculating characteristic value Y.

(Calculation Process Example 3 for Calculating Characteristic Value Y)

In the present process example, the second characteristic value calculating section 522 (i) calculates, as the characteristic value Y, an average (also referred to as "average pixel value") of pixel values of a deblocked decoded image in the target unit region and (ii) supplies the calculated average pixel value to the characteristic index calculating section 523 as the characteristic value Y.

The second characteristic value calculating section 522 (i) reads out pixel values of a deblocked decoded image P_DB in the target unit region, which is to be processed, from the buffer memory 15 and (ii) calculates an average pixel value MP by averaging the pixel values.

In a case where (i) the target unit region is a rectangular region of Bx pixels×By pixels, (ii) coordinates of each of pixels in the target unit region are expressed as (u, v) (u is an integer satisfying 0≤u≤Bx−1, and v is an integer satisfying 0≤v≤By−1), and (iii) a pixel value of the deblocked decoded image P_DB at the coordinates is expressed as S(u, v), the second characteristic value calculating section 522 can calculate the average pixel value MP by obtaining a simple average of the pixel values with the use of, for example, the following Equation (2-3):

[Math. 13]

$$MP = \frac{1}{Bx \times By} \sum_{u=0}^{Bx-1} \sum_{v=0}^{By-1} S(u, v) \tag{2-3}$$

Alternatively, the second characteristic value calculating section 522 may be arranged to calculate the average pixel value MP by obtaining a weighted average of the pixel values with the use of a predetermined weighting factor, instead of obtaining a simple average of the pixel values.

In the explanation of the coded data #3, the example has been discussed in which the characteristic value partial region CPR[i0] obtained by an initial division is further divided into a maximum of four characteristic value partial regions with respect to the characteristic value Y. Note, however, that the present embodiment is not limited to this. For example, it is possible to employ an arrangement in which the characteristic value partial region CPR[i0] obtained by the initial division is divided into a maximum of three characteristic value partial regions CPR (i0, j0)(j0=0, 1, 2) with respect to the characteristic value Y, as follows:

CPR (i0, 0) corresponds to MP≤64.

CPR (i0, 1) corresponds to 64<MP and MP≤160.

CPR (i0, 2) corresponds to 160<MP.

Alternatively, it is possible to employ an arrangement in which the characteristic value partial region CPR[i0] obtained by the initial division is divided into a maximum of two characteristic value partial regions CPR (i0, j0)(j0=0, 1) with respect to the characteristic value Y, as follows:

CPR (i0, 0) corresponds to MP≤128.

CPR (i0, 1) corresponds to 128<MP.

(Calculation Process Example 4 for Calculating Characteristic Value Y)

In the present process example, the second characteristic value calculating section 522 calculates coordinates of a target unit region in a process target frame (or process target slice). The calculated coordinates are supplied to the characteristic index calculating section 523 as a characteristic value Y. Here, the coordinates of the target unit region are, more properly, coordinates of a representative pixel of the target unit region. The representative pixel can be, for example, a pixel which is in the target unit region and is at an upper-left corner of the target unit region. Note, however, that the present embodiment is not limited to the concrete location of the representative pixel in the target unit region.

In a case where the target unit region is a block or a partition, coordinates of the target unit region in the process target frame can be calculated by referring to the following information obtained by decoding the coded data #3.

CBP (coded_block_pattern) that specifies a coded block pattern
Prediction unit specification information PT
Transformation unit specification information TT In a case where the target unit region is neither a block nor a partition but is a region set by the adaptive filter section 50, the adaptive filter 50 can identify coordinates of the target unit region by referring to information indicative of a location of the set unit region.

(Characteristic Index Calculating Section 523)

For the target unit region, the characteristic index calculating section 523 compares the characteristic value X supplied from the first characteristic value calculating section 521 and the characteristic value Y supplied from the second characteristic value calculating section 522 with the characteristic value division point PXn and the characteristic value division point PYm, respectively. The characteristic index calculating section 523 then allocates a characteristic value region index (i0, j0) to the target unit region, and supplies, to the filter coefficient allocating section 524, the characteristic value region index (i0, j0) allocated to the target unit region.

Specifically, the characteristic index calculating section 523 compares the characteristic value X for the target unit region with an initial division point of characteristic value division points PX1 through PX_NX−1, which initial division point is used for a first division, to calculate initial division indices [i0]. The characteristic index calculating section 523 then allocates the initial division indices [i0] to the target unit region. As illustrated in (b) of FIG. 27, in a case where initial division points PX2 and PX4 are used, the initial division indices [i0] are calculated as follows.

$i0=0$ in a case where $X<PX2$ $i0=1$ in a case where $PX2 \leq X < PX4$ $i0=2$ in a case where $PX4 \leq X$ Then, the characteristic index calculating section 523 compares the characteristic value X and the characteristic value Y with a subdivision point used for a second division, with reference to the syntax alf_second_split_type and the syntax alf_second_split_flag[i0], to calculate subdivision indices [j0]. The subdivision indices [j0] thus calculated are allocated to the target unit region.

As illustrated in (c) of FIG. 27, in a case where subdivision points PX1, PX3, and PX5 are used for the characteristic value X, the subdivision point PX1 is used to divide a target unit region to which an initial division index [i0=0] is allocated, the subdivision point PX3 is used to divide a target unit region to which an initial division index [i0=1] is allocated, and the subdivision point PX5 is used to divide a target unit region to which an initial division index [i0=2] is allocated.

The following describes in detail how to calculate the subdivision index [j0] for the target unit region to which the initial division index [i0=0] is allocated. For understanding calculation of the subdivision index [j0] for the target unit region to which the initial division index [i0=1] is allocated, the following description should be read by substituting PX3 for PX1. For calculation of the subdivision index [j0] for the target unit region to which the initial division index [i0=−2] is allocated, the following description should be read by substituting PX5 for PX1.

In a case where alf_second_split_type=0, the characteristic index calculating section 523 calculates the subdivision index [j0] for the target unit region to which the initial division index [i0=0] is allocated as below.

In a case where alf_second_split_flag=0, j0=0.
In a case where alf_second_split_flag=1, and $X<PX1$, j0=0.
In a case where alf_second_split_flag=1, and $PX1 \leq X$, j0=1.
In a case where alf_second_split_flag=2, and $Y<PY2$, j0=0.
In a case where alf_second_split_flag=2, and $PY2 \leq Y$, j0=1.
In a case where alf_second_split_flag=3, $X<PX1$, and $Y<PY2$, j0=0.
In a case where alf_second_split_flag=3, $X<PX1$, and $PY2 \leq Y$, j0=1.
In a case where alf_second_split_flag=3, $PX1 \leq X$, and $Y<PY2$, j0=2.
In a case where alf_second_split_flag=3, $PX1 \leq X$, and $PY2 \leq Y$, j0=3.

Meanwhile, in a case where alf_second_split_type=1, the characteristic index calculating section 523 calculates the subdivision index [j0] for the target unit region to which the initial division index [i0=0] is allocated as below.

In a case where alf_second_split_flag=0, j0=0.
In a case where alf_second_split_flag=1, and $Y<PY2$, j0=0.
In a case where alf_second_split_flag=1, and $PY2 \leq Y$, j0=1.
In a case where alf_second_split_flag=2, and $Y<PY1$, j0=0.
In a case where alf_second_split_flag=2, and $PY1 \leq Y$, j0=1.
In a case where alf_second_split_flag=3, and $Y<PY1$, j0=0.
In a case where alf_second_split_flag=3, and $PY1 \leq Y < PY2$, j0=1.
In a case where alf_second_split_flag=3, and $PY2 \leq Y < PY3$, j0=2.
In a case where alf_second_split_flag=3, and $PY3 \leq Y$, j0=3.

(Filter Coefficient Allocating Section 524)

The filter coefficient allocating section 524 reads out, from the filter coefficient-by-characteristic storing section 517, a filter coefficient RegionFilterLuma[i0][j0] corresponding to the characteristic value region index (i0, j0) allocated to the target unit region. The filter coefficient allocating section 524 then allocates the filter coefficient RegionFilterLuma[i0][j0] to the target unit region. The filter coefficient RegionFilterLuma[i0][j0] allocated to the target unit region is supplied to the filter section 525.

(Filter Section 525)

The filter section 525 carries out a filter process with respect to the target unit region by use of the filter coefficient RegionFilterLuma[i0][j0], so as to generate a filtered decoded image P_FL for the target unit region. The filtered decoded image P_FL is stored in the buffer memory 15.

More specifically, the filter section 525 calculates out a pixel value SF (x', y') according to Equation (2-4) where the pixel value SF (x', y') represents a pixel value of a pixel to be filtered of the filtered decoded image P_FL (which is also called "post-filter image"), and a pixel value S (x, y) represents a pixel value of a deblocked decoded image P_DB (which is also called "pre-filter image").

[Math. 14]

$$S_F(x', y') = \left( \sum_{(u,v) \in R} a(u, v) \times S(x+u, y+v) \right) + o \quad (2\text{-}4)$$

Note here that coordinates (x, y) and coordinates (x', y') may be in identical coordinates. Alternatively, the coordinates (x, y) and the coordinates (x', y') may be in different coordinates as long as the coordinates (x, y) and the coordinates (x', y') have a ratio of 1 to 1. Note also that a (u, v) in Equation (2-4) represents a filter coefficient to be multiplied by the pixel value S (x+u, y+v) of the pre-filter image, and corresponds to a component of the filter coefficient RegionFilterLuma[i0][j0] supplied from the filter coefficient allocating section 524. Further, o represents an offset component contained in the filter coefficient RegionFilterLuma[i0][j0].

R in Equation (2-4) represents a region (referred to also as a "filter reference region R") to be referred to in a filter process. The number of taps of a reference region R is specified by the syntax alf_length_luma_minus5_div2[i0]. As the reference region R, for example, any one of reference regions R0, R1, and R2 is used, which are determined in accordance with respective values of the syntax alf_length_luma_minus5_div2[i0] (see FIG. 30). FIG. 30 exemplifies rectangular reference regions. However, the reference region R of Embodiment 2 is not limited to the rectangular shape. The reference region R of Embodiment 2 may be a rectangular reference region whose number of taps is specified by the syntax alf_length_luma_minus5_div2[i0].

At least one filter coefficient can be allocated to respective pixels included in the filter reference region R so as to have 180-degrees rotational symmetry about a pixel to be filtered. That is, the filter coefficient a (u, v) can be set so as to equal to a filter coefficient a (−u, −v). Such setting makes it possible to reduce the number of components contained in the syntax alf_coeff_luma[i][j].

(Moving Image Encoder 4)

Figure 37:
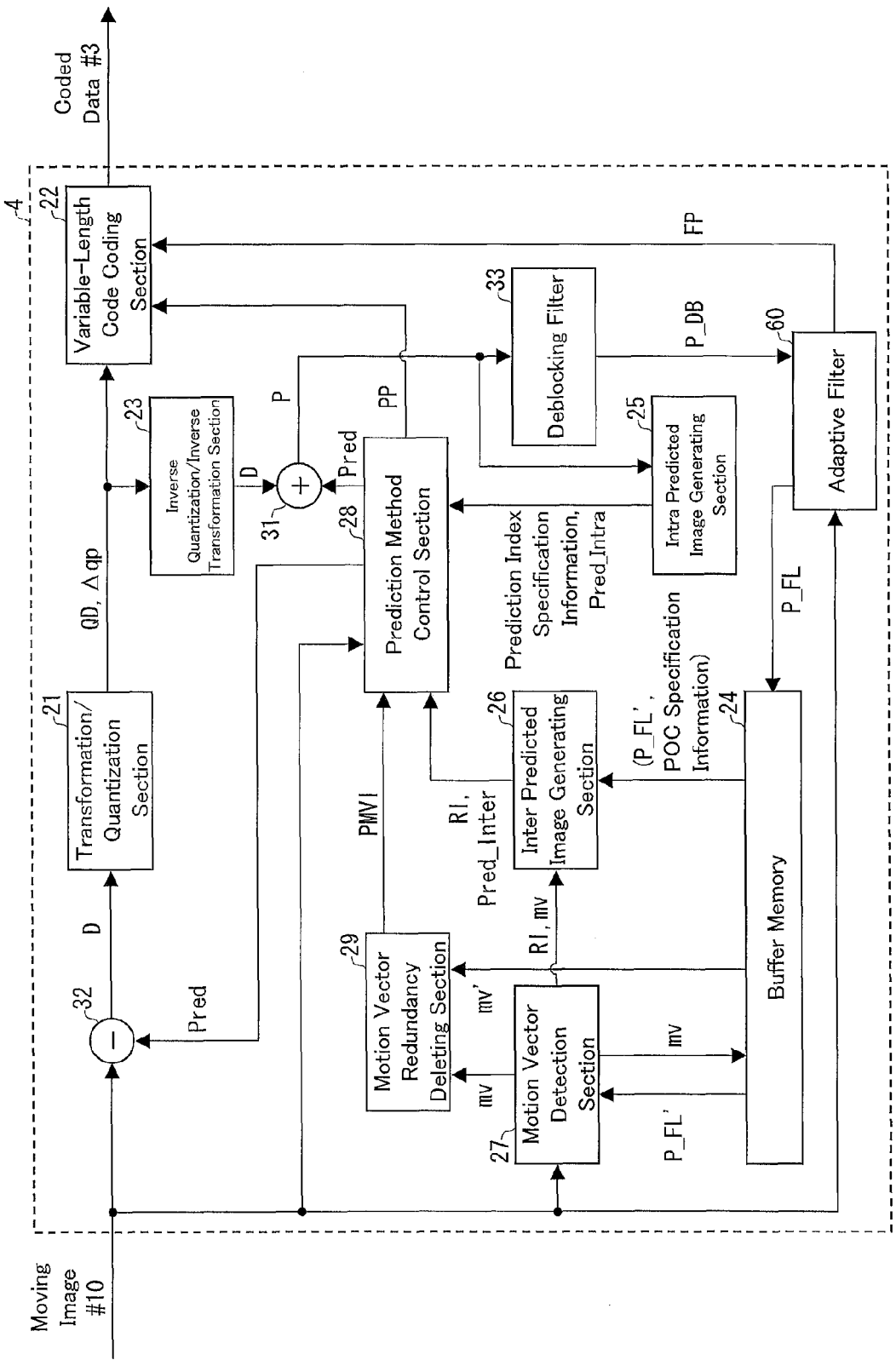
FIG. 37 is a block diagram showing an arrangement of a moving image encoder in accordance with the second embodiment.
Figure 38:
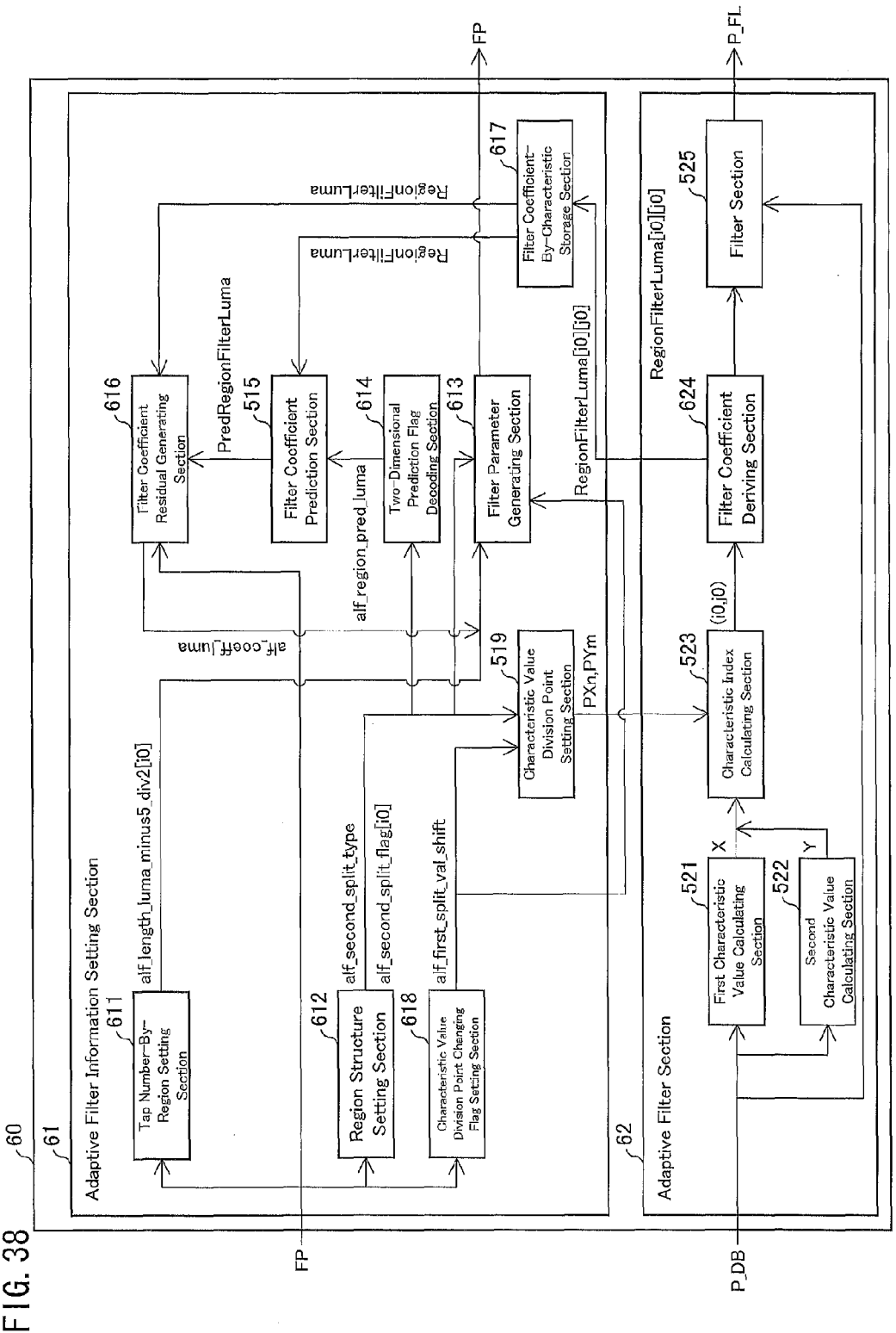
FIG. 38 is a block diagram showing an arrangement of an adaptive filter of the moving image encoder in accordance with the second embodiment.

The following describes the moving image encoder 4 for encoding an image to be encoded so as to generate coded data #3, with reference to FIGS. 37 and 38. Note that like names and reference numerals are given to respective sections identical to those which have been already described, and descriptions of such sections are omitted here.

FIG. 37 is a block diagram illustrating an arrangement of the moving image encoder 4 of Embodiment 2. As illustrated in FIG. 37, the moving image encoder 4 includes an adaptive filter 60 instead of the adaptive filter 34 included in the moving image encoder 2 of Embodiment 1. Another arrangement of the moving image encoder 4 is identical to that of the moving image encoder 2 of Embodiment 1, and therefore description of the another arrangement of the moving image encoder 4 is omitted here.

(Adaptive Filter 60)

The adaptive filter 60 carries out an adaptive filter process with respect to a deblocked decoded image P_DB so as to generate a filtered decoded image P_FL. The filtered decoded image P_FL thus generated is stored in a buffer memory 24. The adaptive filter 60 supplies pieces of adaptive filter information which have been employed in the adaptive filter process to a variable-length code coding section 22 as a filter parameter FP. The variable-length code coding section 22 encodes the filter parameter FP as part of the coded data #3.

FIG. 38 is a block diagram showing an arrangement of the adaptive filter 60. The adaptive filter 60 includes an adaptive filter information setting section 61 and an adaptive filter section 62 (see FIG. 38).

(Adaptive Filter Information Setting Section 61)

As illustrated in FIG. 38, the adaptive filter information setting section 61 includes a tap number-by-region setting section 611, a region structure setting section 612, a filter parameter generating section 613, a two-dimensional prediction flag setting section 614, a filter coefficient prediction section 515, a filter coefficient residual generating section 616, a filter coefficient-by-characteristic storing section 617, a characteristic value division point changing flag setting section 618, and a characteristic value division point setting section 519.

The filter coefficient prediction section 515 and the characteristic value division point setting section 519 have been already described, and therefore descriptions of the sections are omitted here.

(Tap Number-by-Region Setting Section 611)

The tap number-by-region setting section 611 sets a syntax alf_length_luma_minus5_div2[i0] that specifies the number of taps of a characteristic value partial region CPR[i0] obtained by an initial division. The syntax alf_length_luma_minus5_div2[i0] thus set is supplied to the filter parameter generating section 613. The syntax alf_length_luma_minus5_div2[i0] thus set is also supplied to the filter coefficient prediction section 515, the filter coefficient residual generating section 616, the filter coefficient-by-characteristic storage section 617, a filter coefficient deriving section 624, and a filter section 525 (arrows are not shown in FIG. 38).

A concrete value of the syntax alf_length_luma_minus5_div2[i0], and correspondence between the concrete value of the syntax alf_length_luma_minus5_div2[i0] and a tap number AlfLengthLuma of a reference region R have been already described, and therefore descriptions of the concrete value and the relationship are omitted here.

Note that the concrete value of the syntax alf_length_luma_minus5_div2[i0] is so determined that coding efficiency is further improved.

(Region Structure Setting Section 612)

The region structure setting section 612 sets (i) a flag alf_second_split_type that specifies type of subdivision and (ii) a syntax alf_second_split_flag[i0] that specifies how each characteristic value partial region obtained by an initial division is subdivided. The flag alf_second_split_type and the syntax alf_second_split_flag[i0] thus set are supplied to the characteristic value division point setting section 519, the two-dimensional prediction flag setting section 614, and the filter parameter generating section 613.

(i) Concrete values of the flag alf_second_split_type and the syntax alf_second_split_flag[i0], and (ii) correspondence between the concrete values and how each characteristic value partial region is subdivided have been already described, and therefore descriptions of the concrete values and the relationship are omitted here.

Note that the concrete values of the flag alf_second_split_type and the syntax alf_second_split_flag[i0] are so determined that coding efficiency is further improved.

(Two-Dimensional Prediction Flag Setting Section 614)

The two-dimensional prediction flag setting section 614 sets a flag alf_region_pred_luma[i][j] that specifies a prediction direction in which a prediction value of a filter coefficient for each characteristic value partial region is derived, with reference to the flag alf_second_split_type and the syntax alf_second_split_flag[i0]. The flag alf_region_pred_luma[i][j] thus set is supplied to the filter coefficient prediction section 515.

A concrete value of the flag alf_region_pred_luma[i][j], and correspondence between the concrete value of the flag alf_region_pred_luma[i][j] and the prediction direction have been already described, and therefore descriptions of the concrete value and the relationship are omitted here. Note that the concrete value of the flag alf_region_pred_luma[i][j] is so determined that coding efficiency is further improved.

(Filter Coefficient Residual Generating Section 616)

The filter coefficient residual generating section 616 generates a filter coefficient residual alf_coeff_luma[i][j] for each characteristic value partial region CPR (i0, j0) respectively by calculating a difference between a prediction filter coefficient PredRegionFilterLuma supplied from the filter coefficient prediction section 515 and a filter coefficient RegionFilterLuma read from the filter coefficient-by-characteristic storage section 617. The filter coefficient residual alf_coeff_luma[i][j] thus generated is supplied to the filter parameter generating section 613.

(Characteristic Value Division Point Changing Flag Setting Section 618)

The characteristic value division point changing flag setting section 618 sets a flag alf_first_split_val_shift with reference to which a characteristic value division point PXn (1≤n≤NX−1) is changed. The flag alf_first_split_val_shift thus set is supplied to the characteristic value division point setting section 519.

A concrete value of the flag alf_first_split_val_shift, and correspondence between the concrete value of the flag alf_first_split_val_shift and the characteristic value division point PXn have been already described, and therefore descriptions of the concrete value and the relationship are omitted here.

Note that the concrete value of the flag alf_first_split_val_shift is so determined that coding efficiency is further improved.

(Filter Parameter Generating Section 613)

The filter parameter generating section 613 generates a filter parameter FP by use of the syntaxes alf_length_luma_minus5_div2[i0], alf_second_split_type, alf_second_split_flag[i0], alf_first_split_val_shift, and alf_coeff_luma[i][j]. The filter parameter FP thus generated is supplied to the variable-length code coding section 22.

Note that the filter parameter FP contains (i) a syntax alf_enable_region_filter that specifies whether or not a filter process is carried out for each characteristic value partial region and (ii) a syntax alf_num_first_split_minus1 that specifies a division number AlfNumFirstSplit of an initial division. Concrete values of the respective syntaxes are so determined that coding efficiency is further improved.

(Filter Coefficient-by-Characteristic Storage Section 617)

The filter coefficient-by-characteristic storage section 617 stores a filter coefficient RegionFilterLuma[i0][j0] derived by the filter coefficient deriving section 624 (later described).

(Adaptive Filter Section 62)

The adaptive filter section 62 includes a first characteristic value calculating section 521, a second characteristic value calculating section 522, a characteristic index calculating section 523, the filter coefficient deriving section 624, and the filter section 525 (see FIG. 38).

The first characteristic value calculating section 521, the second characteristic value calculating section 522, the characteristic index calculating section 523, and the filter section 525 have been already described, and therefore descriptions of such sections are omitted here.

(Filter Coefficient Deriving Section 624)

The filter coefficient deriving section 624 derives the filter coefficient RegionFilterLuma[i0][j0] which allows to further reduce a difference between the image to be encoded and the filtered decoded image P_FL in a target unit region. The filter coefficient RegionFilterLuma[i0] [j0] thus derived is supplied to the filter section 525, and also stored in the filter coefficient-by-characteristic storage section 617.

The filter coefficient deriving section 624 derives, for example, a filter coefficient a (u, v) and an offset o which minimize a square error E calculated by Equation (2-5), where a pixel value S (x, y) represents a pixel value of the deblocked decoded image P_DB in the target unit region, and a pixel value ST (x, y) represents, in the target unit region, a pixel value of the image to be encoded. Note here that the filter coefficient a (u, v) and the offset o are components of the filter coefficient RegionFilterLuma[i0][j0].

[Math. 15]

$$E = \sum_{x,y} \left( S_T(x, y) - \sum_{(u,v) \in R} a(u, v) S(x+u, y+v) - o \right)^2 \quad (2\text{-}5)$$

Modification of Embodiment 2

The following describes a modification of Embodiment 2, with reference to FIGS. 39 and 40. FIG. 39 shows syntaxes included in a filter parameter FP (represented by "alf_param( )" in FIG. 39) of the modification of Embodiment 2. The filter parameter FP of the Modification contains neither a syntax alf_first_split_val_shift nor a syntax alf_second_split_type (see FIG. 39), and a value of the syntax alf_second_split_type is fixed to 0 (zero), unlike the filter parameter FP shown in FIG. 26.

In the Modification, characteristic value division points PX1 through PX_NX−1 for a first characteristic value X, that is, division points of an initial division, are set for each value of the syntax alf_num_first_split_minus1 that specifies the division number of the initial division. FIG. 40 is a table illustrating characteristic value division points PX1 through PX5 set in accordance with each value of the syntax alf_num_first_split_minus1.

As shown in FIG. 40, the division points are set in accordance with the division number of the initial division in the present Modification. This makes it possible to almost fix the number of unit regions classified into characteristic value partial regions. It is therefore possible to achieve a high coding efficiency.

Further, as shown in FIG. 40, a value(s) of the characteristic value division point(s) set for the syntax alf_num_first_split_minus1=0 or 1 is any of values of the characteristic value division points set for the syntax alf_num_first_split_minus1=2. For example, the value of the characteristic value division point PX1 set for the syntax alf_num_first_split_minus1=0 is 64 that is the value of the characteristic value division point PX3 set for the syntax alf_num_first_split_minus1=2. As such, in the Modification, the value(s) of the division point(s) used for a division (in a case where the syntax alf_num_first_split_minus1=0 or 1 in FIG. 40) other than a maximum division is a component(s) of a group of the values of the division points used for the maximum division (in a case where the syntax alf_num_first_split_minus1=2 in FIG. 40).

Such an arrangement eliminates the need of recalculating a characteristic value for each characteristic value partial region in order to optimize an initial division point in a moving image encoder. This makes it possible to reduce amount of processing.

Embodiment 3

The following describes Embodiment 3 of the present invention with reference to FIGS. 41 through 44. Note that like names and reference numerals are given to respective sections identical to those which have been already described in Embodiment 2, and descriptions of such sections are omitted here.

(Coded Data #5)

First is described a data structure of coded data #5 which is generated by a moving image encoder 6 of Embodiment 3 and then decoded by a moving image decoder 5 of Embodiment 3. Then, the moving image encoder 6 and the moving image decoder 5 are described in detail.

An arrangement of a filter parameter FP of the coded data #5 of Embodiment 3 is different from that of the filter parameter FP of the coded data #1 of Embodiment 1 though the data structure of the coded data #5 is substantially identical to that of the coded data #1. FIG. 41 shows syntaxes included in the filter parameter FP (represented by "alf_param( )" in FIG. 41) of the coded data #5 of Embodiment 3.

(alf_filter_pattern)

The alf_filter_pattern[i] ($1 \leq i <$ AlfMaxNumFilters, AlfMaxNumFilters is a maximum value of an initial division point) is a flag that specifies an initial division point of an initial division (first division). The initial division point is specified by the alf_filter_pattern[i] regardless of whether or not a subdivision (second division) is carried out.

(alf_enable_second_split)

The alf_enable_second_split is a flag that specifies whether or not a subdivision is carried out. In a case where the alf_enable_second_split=0, a subdivision is not carried out. In contrast, in a case where the alf_enable_second_split=1, a subdivision is carried out.

There is a case where coding efficiency is improved by reduction in encoding quantity without subdivision, depending on an image characteristic of an encoding target image. The coding efficiency can be improved by causing the coded data #5 to contain the alf_enable_second_split.

(alf_select_split_char)

The alf_select_split_char is a syntax which specifies which one of a plurality of candidates is employed as a characteristic value Y. Specifically, the alf_select_split_char specifies a characteristic value X and the characteristic value Y as follows (see (a) of FIG. 42).

In a case where alf_select_split_char=0,
the characteristic value X is activity, and the characteristic value Y is directionality.
In a case where alf_select_split_char=1,
the characteristic value X is activity, and the characteristic value Y is an average pixel value.
In a case where alf_select_split_char=2,
the characteristic value X is activity, and the characteristic value Y is a y coordinate.
In a case where alf_select_split_char=3,
the characteristic value X is activity, and the characteristic value Y is an x coordinate.

Note here that the y coordinate represents an inter-frame y coordinate of a target unit region in a frame to be processed, and the x coordinate represents an inter-frame x coordinate of the target unit region in the frame to be processed.

In a case where it is specified that the characteristic value Y is directionality, the characteristic value Y is calculated, for example, by the following Equations by use of a vertical direction activity ACT_V and a horizontal direction activity ACT_H.

$$Y=(ACT\_H+k)/(ACT\_V+k) \times 4$$

$$K=(ACT\_H+ACT\_V)/16+1$$

(b) of FIG. 42 exemplifies subdivision points PY1 through PY3 set for each value of the alf_select_split_char. In (b) of FIG. 42, "height" represents the number of pixels in a y direction of a frame, and "width" represents the number of pixels in an x direction of the frame.

(alf_enable_second_split_val)

The alf_enable_second_split_val is a flag indicative of whether or not the filter parameter FP contains alf_second_split_val[k] (k=0, 1 or 2) (later described). In a case where alf_enable_second_split_val=1, the filter parameter FP contains the alf_second_split_val[k]. The alf_enable_second_split_val is encoded in a case where a subdivision is carried out.

(alf_second_split_val)

The alf_second_split_val[k] (k=0, 1 or 2) is a syntax with reference to which a subdivision point of a subdivision for the characteristic value Y is determined.

(c) of FIG. 42 shows correspondence between the alf_second_split_val[k] and subdivision points PY1 through PY3. The values of the respective subdivision points PY1 through PY3 are determined for each value of the alf_second_split_val[k] (see (c) of FIG. 42).

The alf_filter_pattern, the alf_enable_second_split, the alf_select_split_char, the alf_enable_second_split_val, the alf_second_split_val, and alf_second_split_flag are components of characteristic value division information that specifies how to divide a characteristic value region CR into characteristic value partial regions CPR.

(alf_region_disable_idc)

The alf_region_disable_idc[i0] is a flag (on/off specification information) that specifies a characteristic value partial region which is not to be subjected to a filter process from among the characteristic value partial regions obtained by subdivision. In a case where the alf_second_split_flag[i0]=0, that is, in a case where the subdivision is not carried out, the alf_region_disable_idc[i0]=−1 or 0. In a case where the alf_second_split_flag[i0]=1 or 2, that is, in a case where two characteristic value partial regions are obtained by the subdivision, the alf_region_disable_idc[i0]=−1, 0 or 1. In a case where the alf_second_split_flag[i0]=3, that is, in a case where four characteristic value partial regions are obtained by the subdivision, the alf_region_disable_idc[i0]=−1, 0, 1, 2 or 3.

The alf_region_disable_idc[i0] of −1 specifies that a filter process is to be carried out with respect to a characteristic value partial region obtained by subdivision.

The alf_region_disable_idc[i0] of a value other than −1 specifies that a filter process is not to be carried out with respect to a characteristic value partial region specified by a subdivision index [j0] (j0=alf_region_disable_idc[i0]) from among the characteristic value partial regions obtained by subdivision. For a filter coefficient (or a filter coefficient residual) alf_coeff_luma for the characteristic value partial region, with respect to which it is specified that the filter process is not to be carried out, encoding is not performed.

Embodiment 3 is not limited to the exemplary arrangement illustrated in FIG. 41 in which the filter parameter FP contains no syntax alf_region_pred_luma that specifies a prediction direction in which a prediction filter coefficient is derived. The filter parameter FP of Embodiment 3 may contain the syntax alf_region_pred_luma, like that of Embodiment 2.

Further, Embodiment 3 is not limited to the exemplary arrangement illustrated in FIG. 41 in which the filter parameter FP contains no syntax alf_second_split_type which has been described in Embodiment 2 but contains the filter coefficient (or the filter coefficient residual) alf_coeff_luma for subdivision in a case where alf_second_split_type=1 (described in Embodiment 2). The filter parameter FP of Embodiment 3 may contain the syntax alf_second_split_type, and a filter coefficient (or a filter coefficient residual) alf_coeff_luma set for each value of the alf_second_split_type.

(Adaptive Filter 70)

The moving image decoder of Embodiment 3 includes an adaptive filter 70 instead of the adaptive filter 50 included in the moving image decoder 3 of Embodiment 2. Another arrangement of the moving image decoder of Embodiment 3 is identical to that of the moving image decoder 3 of Embodiment 2, and therefore description of the another arrangement of the moving image decoder of Embodiment 3 is omitted here.

Figure 43:
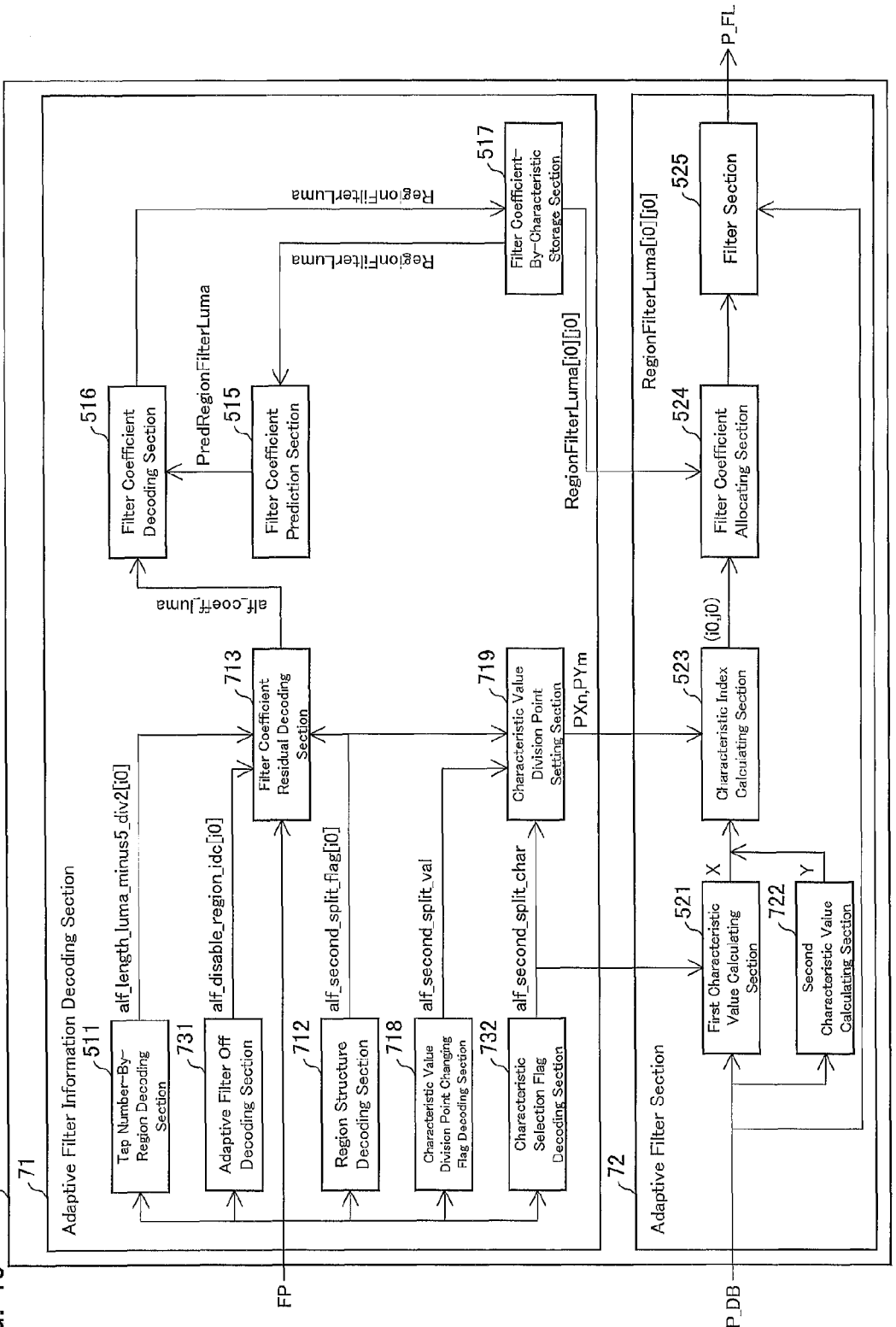
FIG. 43 is a block diagram showing an arrangement of an adaptive filter of a moving image decoder in accordance with the third embodiment.

FIG. 43 is a block diagram showing an arrangement of the adaptive filter 70. The adaptive filter 70 includes a region structure decoding section 712, a filter coefficient residual decoding section 713, a characteristic value division point changing flag decoding section 718, a characteristic value division point setting section 719, and a second characteristic value calculating section 722 (see FIG. 43), instead of the region structure decoding section 512, the filter coefficient residual decoding section 513, the characteristic value division point changing flag decoding section 518, the characteristic value division point setting section 519, and the second characteristic value calculating section 522 which are included in the adaptive filter 50. The adaptive filter 70 further includes an adaptive filter off decoding section 731 and a characteristic selection flag decoding section 732. Another arrangement of the adaptive filter 70 is identical to that of the adaptive filter 50.

Embodiment 3 is not limited to the exemplary arrangement illustrated in FIG. 43 in which the adaptive filter 70 includes no two-dimensional prediction flag decoding section 514 which is included in the adaptive filter 50. The adaptive filter 70 may include the two-dimensional prediction flag decoding section 514, and the coded data #5 may contain the syntax alf_region_pred_luma.

The adaptive filter off decoding section 731 decodes a syntax alf_disable_region_idc[i0] contained in the filter parameter FP. The syntax alf_disable_region_idc[i0] thus decoded is supplied to the filter coefficient residual decoding section 713 and a filter section 525. In a case where the syntax alf_disable_region_idc[i0] specifies that a filter process is not to be carried out, the filter section 525 does not carry out the filter process.

The region structure decoding section 712 decodes the syntax alf_second_split_flag[i0] contained in the filter parameter FP. The syntax alf_second_split_flag[i0] thus decoded is allocated to a characteristic value partial region CPR [i0], and is also supplied to the filter coefficient residual decoding section 713 and the characteristic value division point setting section 719.

The filter coefficient residual decoding section 713 decodes syntaxes alf_coeff_luma[i][j] contained in the filter parameter FP, with reference to the syntax alf_disable_region_idc[i0], the syntax alf_second_split_flag[i0], and alf_length_luma_minus5_div2[i0]. The filter coefficient residual decoding section 713 also allocates the syntaxes alf_coeff_luma[i][j] to corresponding respective characteristic value partial regions CPR (i0, j0). Correspondence between the syntaxes alf_coeff_luma[i][j] and the corresponding respective characteristic value partial regions CPR (i0, j0) is identical to that already described in the explanation of the coded data #3 of Embodiment 2, and therefore description of the relationship is omitted here. The syntaxes alf_coeff_luma[i][j] thus decoded are supplied to a filter coefficient decoding section 516.

Note that the filter coefficient residual decoding section 713 does not decode a filter coefficient residual alf_coeff_luma[i][j] for a characteristic value partial region with respect to which the syntax alf_disable_region_idc[i0] specifies that a filter process is not to be carried out.

The characteristic value division point changing flag decoding section 718 decodes the syntax alf_second_split_val[k] (k=0, 1 or 2) contained in the filter parameter FP. The syntax alf_second_split_val[k] thus decoded is supplied to the characteristic value division point setting section 719.

The characteristic value selection flag decoding section 732 decodes a syntax alf_second_split_char contained in the filter parameter FP. The syntax alf_second_split_char thus decoded is supplied to the characteristic value division point setting section 719 and to the second characteristic value calculating section 722.

The characteristic value division point setting section 719 derives a characteristic value division point PXn (1≤n≤NX−1) and a characteristic value division point PYm (1≤m≤NX−1) on the basis of the syntax alf_second_split_flag[i0], the syntax alf_second_split_val[k], and the syntax alf_second_split_char. The characteristic value division point PXn and the characteristic value division point PYm thus derived are supplied to a characteristic index calculating section 523.

Concrete examples of the characteristic value division point PXn and the characteristic value division point PYm which are set for each value of the syntax alf_second_split_val[k] and the syntax alf_second_split_char have been already described in the explanation of the coded data #5, and therefore description of the concrete examples is omitted here.

The second characteristic value calculating section 722 calculates a characteristic value for of a deblocked decoded image P_DB in a target unit region, which characteristic value is specified by the syntax alf_second_split_char. The characteristic value thus calculated is supplied as a characteristic value Y to the characteristic index calculating section 523.

(Moving Image Encoder 6)

Figure 44:
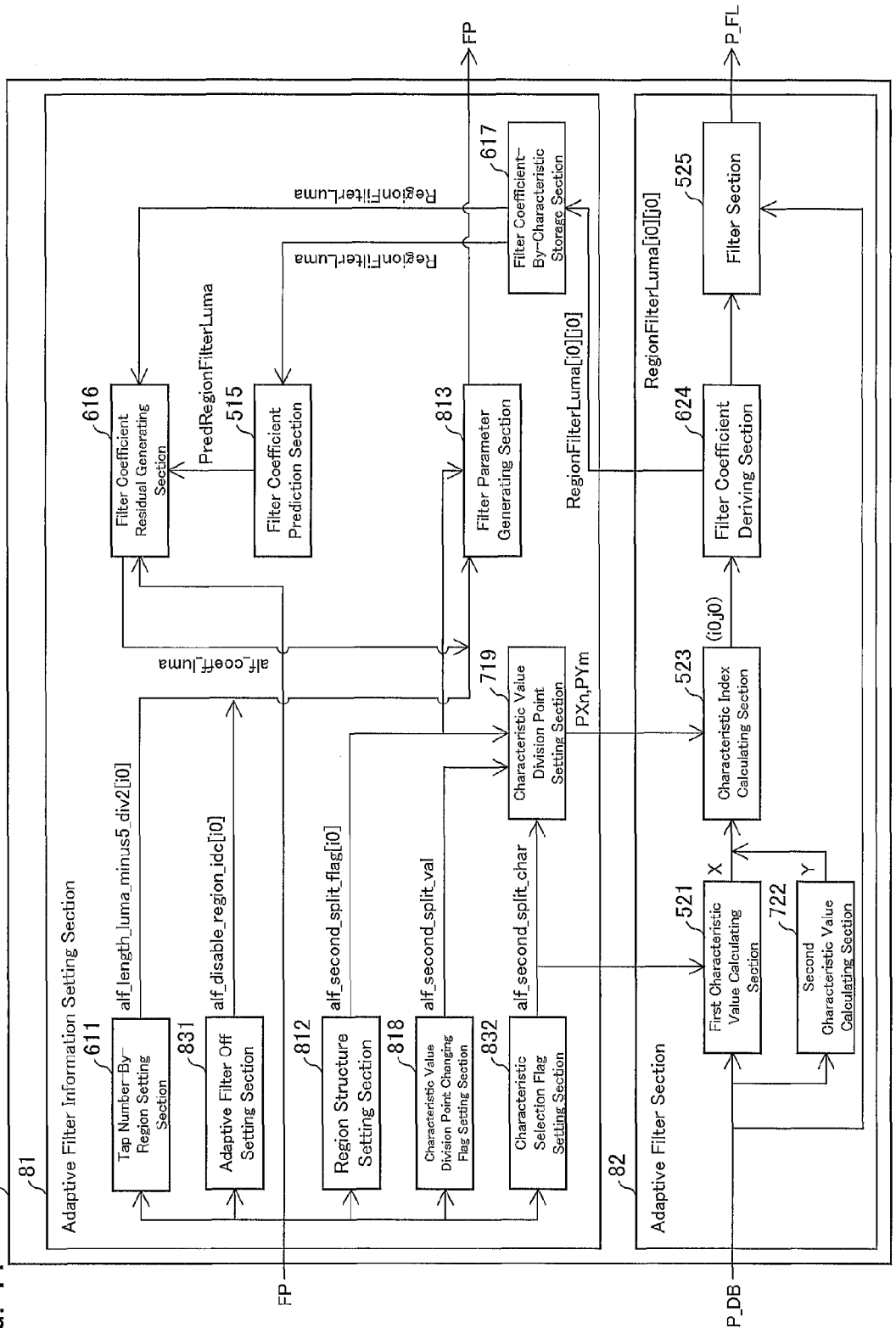
FIG. 44 is a block diagram showing an arrangement of an adaptive filter of a moving image encoder in accordance with the third embodiment.

The following description will discuss, with reference to FIG. 44, a moving image encoder 6 which generates coded data #5 by encoding an encoding target image. Note that, like members similar to those described above are given like terms and like reference numerals, and their description is not repeated here.

The moving image encoder of the present embodiment includes an adaptive filter 80 in place of the adaptive filter 60 which is provided to the moving image encoder 4 of Embodiment 2. The moving image decoder of the present embodiment is identical with the moving image encoder 4 of Embodiment 2 in terms of the other arrangements, which are not described here repeatedly.

The adaptive filter 80 generates a filtered decoded image P_FL by carrying out an adaptive filter process with respect to a deblocked decoded image P_DB. The resultant filtered decoded image P_FL thus generated is stored in a buffer memory 24. The adaptive filter 80 provides a variable-length code coding section 22 with a filter parameter FP, which is various adaptive filter information used for the adaptive filter process. The variable-length code coding section 22 encodes the filter parameter FP as a part of the coded data #5.

FIG. 44 is a block diagram showing an arrangement of the adaptive filter 80. The adaptive filter 80 includes an adaptive filter information setting section 81 and an adaptive filter section 82 as shown in FIG. 44.

(Adaptive Filter Information Setting Section 81)

As shown in FIG. 44, the adaptive filter information setting section 81 includes: a tap number-by-region setting section 611; an adaptive on/off setting section 831; a region structure setting section 812; a characteristic value division point changing flag setting section 818; a characteristic selection flag setting section 832; a characteristic value division point setting section 719; a filter coefficient residual generating section 616; a filter coefficient prediction section 515; a filter parameter generating section 813; and a filter coefficient-by-characteristic storage section 617.

The tap number-by-region setting section 611, the characteristic value division point setting section 719, the filter coefficient residual generating section 616, the filter coefficient prediction section 515, and the filter coefficient-by-characteristic storage section 617 are described earlier, and therefore, the descriptions of those members are omitted here.

(Adaptive Filter Off Setting Section 831)

The adaptive filter off setting section 831 sets a flag "alf_region_disable_idc[i0]" for specifying a region which is not to be subjected to the filter process, out of characteristic value partial regions obtained by subdivision. The set flag "alf_region_disable_idc[i0]" is supplied to the filter parameter generating section 813 and a filter section 525. In a case where "alf_region_disable_idc[i0]" specifies that the filter process is off, the filter section 525 does not carry out the filter process.

A correspondence between a possible value of "alf_region_disable_idc[i0]" and whether to carry out the filter process is described earlier, and a description of the correspondence is omitted here.

Note that a specific value of "alf_region_disable_idc[i0]" is determined so that coding efficiency is further improved.

(Region Structure Setting Section 812)

The region structure setting section 812 sets syntax "alf_second_split_flag[i0]" for specifying how to carry out the subdivision with respect to each of the characteristic value partial regions obtained by first division. The set syntax "alf_region_disable_idc[i0]" is supplied to the characteristic value division point setting section 719 and the filter parameter generating section 813.

Possible values of "alf_second_split_flag[i0]" and a correspondence between specific values of "alf_second_split_flag[i0]" and how to perform the subdivision are described earlier, and a description of them is omitted here.

Note that a specific value of "alf_second_split_flag[i0]" is determined so that coding efficiency is further improved.

(Characteristic Value Division Point Changing Flag Setting Section 818)

The characteristic value division point changing flag setting section 818 sets syntax "alf_second_split_val[k]" (k=0, 1, 2) as a reference to determine a subdivision point of the subdivision carried out with respect to a characteristic value Y. The set syntax "alf_second_split_val[k]" is supplied to the characteristic value division point setting section 719 and the filter parameter generating section 813.

Possible values of "alf_second_split_val[k]" and a correspondence between values of "alf_second_split_val[k]" and subdivision points of the subdivision carried out with respect to the characteristic value Y is described earlier, and the description of them is omitted here.

A specific value of "alf_second_split_val[k]" is determined so that coding efficiency is further improved.

(Characteristic Selection Flag Setting Section 832)

The characteristic selection flag setting section 832 sets syntax "alf_second_split_char" that specifies which characteristic value is to be used as the characteristic value Y out of a plurality of candidates. The syntax "alf_second_split_char" thus set is supplied to the characteristic value division point setting section 719, the filter parameter generating section 813, and the second characteristic value calculating section 722.

Possible values of "alf_second_split_char" and a correspondence between values of "alf_second_split_char" and values of the characteristic value Y are described earlier, and the description of them is omitted here.

Note that a specific value of "alf_second_split_char" is determined so that coding efficiency is further improved.

(Filter Parameter Generating Section 813)

The filter parameter generation section 813 generates the filter parameter FP from the syntaxes "alf_length_luma_minus5_div2[i0]", "alf_disable_region_idc[i0]", "alf_second_split_flag[i0]", "alf_second_split_val", "alt_second_split_char", and "alf_cpeff_luma[i][j]". The filter parameter FP thus generated is supplied to the variable-length code coding section 22.

The filter parameter FP includes: syntax "alf_enable_region_filter" for specifying whether or not to carry out a filter process with respect to each of the characteristic value partial regions; a flag "alf_filter_pattern" for setting an initial division point at an initial division; a flag "alf_enable_second_split_val" indicative of whether or not "alf_second_split_val[k]" is included to the filter parameter FP; and syntax "alf_num_first_split_minus1" for specifying the number of divisions "AlfNumFirstSplit" at the initial division. Specific values of these syntaxes are determined so that coding efficiency is further improved.

(Adaptive Filter Section 82)

The adaptive filter section 82 includes, as shown in FIG. 44, the first characteristic value calculating section 521, the second characteristic value calculating section 722, the characteristic index calculating section 523, the filter coefficient deriving section 624, and the filter 525. These sections are described above, and the description of those sections is omitted here.

Additional Description of Embodiments 2 and 3

The scope of the present invention encompasses a filter parameter FP' that includes at least any of the syntaxes which are included in the filter parameter FP of the coded data #3 of Embodiment 2, and at least any of syntaxes which are included in the filter parameter FP of the coded data #5 of Embodiment 3. A moving image decoder which decodes such a filter parameter FP' is arranged to have respective members that are necessary for decoding a syntax which is included in the filter parameter FP', from among the members described earlier in Embodiment 2 and Embodiment 3.

For example, the filter parameter FP of the coded data #3 in accordance with Embodiment 2 can be arranged to have syntaxes "alf_second_split_char", "alf_enable_second_split_val", and "alf_second_split_val" which are included in the filter parameter FP of the coded data #5. According to this arrangement, the adaptive filter 50 provided to the moving image decoder 3 can be arranged to include a characteristic selection flag decoding section 732 and a characteristic value division point changing flag decoding section 718.

The filter parameter FP of the coded data #5 in accordance with Embodiment 3 can be arranged not to include syntax "alf_region_disable_idc[i0]". According to this arrangement, a moving image decoder 5 which decodes the coded data #5 is arranged to carry out an adaptive filter process with respect to all unit regions.

Another Additional Description 1

The macroblock described in each of the embodiments is equivalent to an LCU (Largest Coding Unit, which can also be called a root of Coding Tree) of HEVC (High Efficiency Video Coding) that is proposed to be a successor standard of H.264/MPEG-4 AVC. Each of the macroblock and the block is equivalent to a CU (Coding Unit, which can also be called a leaf of Coding Tree), a PU (Prediction Unit), or a TU (Transformation Unit) of HEVC.

Another Additional Description 2

As described earlier, the inventors acquired knowledge that depending on an image characteristic of an encoding target image, it is possible to more effectively improve coding efficiency by changing a filter coefficient group not in accordance with a magnitude of local activity of a (locally) decoded image but in accordance with a difference in local directionality of the (locally) decoded image.

An image filter device in accordance with the present invention which calculates a pixel value of each pixel of an output image by use of (i) a pixel value in a reference region which is defined in accordance with a location of the each pixel in an input image and (ii) a filter coefficient group, the image filter device includes: directionality discrimination means for discriminating directionality of the input image in each of a plurality of unit regions constituting the input image; classification means for classifying the each of the plurality of unit regions into one of a plurality of unit region groups in accordance with to which of a plurality of predetermined groups the directionality of the input image in the each of the plurality of unit regions belongs, the directionality having been discriminated by the directionality discrimination means; and filter means for calculating the pixel value of the each pixel of the output image by use of the filter coefficient group optimized for a unit region group to which a unit region including the each pixel belongs.

Based on the knowledge, the inventors found that, in a case where directionality of an input image which is supplied to an image filter device differs in accordance with each region (unit region) constituting the input image, a change in filter coefficient group in accordance with the difference in directionality allows an increase in prediction accuracy of a predicted image which is generated with reference to the output image.

According to the image filter device in accordance with the present invention which is arranged as above, directionality discrimination means discriminates directionality of the input image in each of a plurality of unit regions constituting the input image; classification means classifies the each of the plurality of unit regions into one of a plurality of unit region groups in accordance with to which of a plurality of predetermined groups the directionality of the input image in the each of the plurality of unit regions belongs, the directionality having been discriminated by the directionality discrimination means; and filter means calculates the pixel value of the each pixel of the output image by use of the filter coefficient group optimized for a unit region group to which a unit region including the each pixel belongs. This makes it possible to carry out a suitable filter process in accordance with the directionality of the input image in a case where the directionality differs in accordance with the each of the plurality of unit regions.

Therefore, according to the image filter device which is arranged as above, a predicted image which is generated with reference to the output image can have higher prediction accuracy also in a case where the input image has an image characteristic such that coding efficiency is not improved even if a filter coefficient group is changed in accordance with activity.

Note that the directionality of the input image in the each of the plurality of unit regions can be defined as, for example, a direction which is orthogonal to a local gradient direction of the input image in the each of the plurality of unit regions. Note here that, in a case where a pixel (x, y) has a pixel value z (x, y), a gradient of an image refers to a gradient of a curved surface $\{(x, y, z(x, y)|0 \le x \le Nx, 0 \le y \le Ny, 0 \le z \le Nz)\}$ which is defined in a three-dimensional space in which x, y, and z are coordinates. Note here that Nx refers to a total number of pixels in an x direction, Ny refers to a total number of pixels in a y direction, and Nz refers to an upper limit value which the pixel value z can have. Note also that the directionality of the input image in the each of the plurality of unit regions can also be expressed as a direction with which a pixel value of the input image in the each of the plurality of unit regions is more correlated.

The directionality discrimination means may be arranged to directly discriminate the directionality of the input image in the each of the plurality of unit regions by detecting an edge of the input image. Alternatively, in a case where the image filter device is used in combination with predicted image generation means for generating an intra predicted image by intra prediction, the directionality discrimination means may be arranged to indirectly discriminate the directionality of the input image in the each of the plurality of unit regions in accordance with a direction indicated by an intra prediction mode which is referred to for generating the intra predicted image, or may be arranged to discriminate the directionality of the input image in the each of the plurality of unit regions in another method.

The each of the plurality of unit regions refers to each of a plurality of regions which constitute the input image and do not overlap with each other. In a case where the image filter device is used in each of an encoding apparatus which encodes an image and a decoding apparatus which decodes an image from coded data, the each of the plurality of unit regions may be, for example, a prediction unit (partition)

which is a unit in which a predicted image is generated, a transformation unit which is a unit for frequency transformation, or another unit.

The image filter device in accordance with the present invention is preferably arranged to further include: activity calculation means for calculating activity of the input image in the each of the plurality of unit regions, the classification means classifying the each of the plurality of unit regions into one of the plurality of unit region groups in accordance with to which of a plurality of predetermined groups the directionality and the activity of the input image in the each of the plurality of unit regions belong.

According to the arrangement, the activity calculation means calculates activity of the input image in the each of the plurality of unit regions, and the classification means classifies the each of the plurality of unit regions into one of the plurality of unit region groups in accordance with to which of a plurality of predetermined groups the directionality and the activity of the input image in the each of the plurality of unit regions belong. Therefore, in a case where directionality of an input image which is supplied to the image filter device differs in accordance with the each of the plurality of unit regions and also in a case where activity of the input image differs in accordance with the each of the plurality of unit regions, it is possible to carry out a filter process by use of a filter coefficient group which is optimum for each of the plurality of unit region groups. Namely, also in a case where each of the directionality and the activity of the input image differs in accordance with the each of the plurality of unit regions, it is possible to generate an output image which is more suitable for generation of a predicted image. This allows an increase in prediction accuracy of a predicted image which is generated with reference to an output image that is generated by the image filter device in accordance with the present invention which is arranged as above.

It is preferable that the directionality discrimination means discriminate the directionality of the input image in the each of the plurality of unit regions by detecting an edge direction of the input image in the each of the plurality of unit regions.

According to the arrangement, the directionality discrimination means discriminates the directionality of the input image in the each of the plurality of unit regions by detecting an edge direction of the input image in the each of the plurality of unit regions. Therefore, in a case where the input image has an edge direction which differs in accordance with the each of the plurality of unit regions, it is possible to carry out a filter process by use of a filter coefficient group which is optimum for each of the plurality of unit region groups. According to this, also in a case where the edge direction of the input image differs in accordance with the each of the plurality of unit regions, it is possible to generate an output image which is more suitable for generation of a predicted image.

The image filter device in accordance with the present invention is preferably arranged to further include reference region changing means for optimizing, for a unit region group to which a unit region at least a part of which overlaps the reference region belongs, a shape of the reference region, wherein the shape of the reference region which shape has been optimized is associated with the each of the plurality of unit region groups.

According to the arrangement, the reference region changing means optimizes, for a unit region group to which a unit region at least a part of which overlaps the reference region belongs, a shape of the reference region, wherein the shape of the reference region which shape has been optimized is associated with the each of the plurality of unit region groups. This makes it possible to carry out a filter process by use of the reference region which is optimum for the each of the plurality of unit regions. Therefore, the arrangement makes it possible to generate an output image which is more suitable for generation of a predicted image.

It is preferable that the directionality of the input image in the each of the plurality of unit regions be discriminated in accordance with at least one of (i) a direction indicated by a prediction parameter which is used to generate a predicted image in the each of the plurality of unit regions by intra prediction with reference to a reference image corresponding to the input image and (ii) a shape of the each of the plurality of unit regions.

The inventors found that for example, according to intra prediction which is employed in H.264/MPEG-4.AVC standards, KTA software, and the like, a prediction parameter (an intra prediction mode) which is referred to for generating an intra predicted image in the each of the plurality of unit regions by intra prediction is correlated with the directionality of the input image in the each of the plurality of unit regions.

The inventors found that for example, a shape of the each of the plurality of unit regions (also referred to as a prediction unit or a partition) set for each of intra prediction employed in H.264/MPEG-4.AVC standards, KTA software, and the like and intra prediction used in their extended systems is correlated with the directionality of the input image in the each of the plurality of unit regions. For example, in a case where a longer side direction of a unit region is a transverse direction, the input image in the unit region tends to have an edge in a transverse direction. In a case where a longer side direction of a unit region is a longitudinal direction, the input image in the unit region tends to have an edge in a longitudinal direction.

According to the arrangement, the directionality of the input image in the each of the plurality of unit regions is discriminated in accordance with at least one of (i) a direction indicated by a prediction parameter which is used to generate a predicted image in the each of the plurality of unit regions by intra prediction with reference to a reference image corresponding to the input image and (ii) a shape of the each of the plurality of unit regions. This makes it possible to discriminate the directionality of the input image without the need of carrying out calculation such as edge detection which refers to a pixel value.

Therefore, the arrangement makes it possible to reduce throughput for discriminating the directionality of the input image in the each of the plurality of unit regions and to carry out a suitable filter process in accordance with the directionality.

Note that, for example, in a case where the image filter device is used in a decoding apparatus, the input image is obtained by adding, to the predicted image, a residual image decoded from coded data. In a case where the image filter device is used in an encoding apparatus, the input image is obtained by adding, to the predicted image, a residual image between the predicted image and an encoding target image.

It is preferable that the reference image which is referred to during intra prediction and corresponds to the input image be an image which (i) is provided in an identical frame in which the input image that is supplied to the image filter device is provided and (ii) is located within a given distance from a unit region to be processed. In a case where the image filter device is used in a decoding apparatus, it is possible to use, as the reference image, a decoded image which (i) is provided in an identical frame in which the input image is provided and (ii) is located within a given distance from a unit region to be processed.

The image filter device in accordance with the present invention is preferably arranged to further include reference region changing means for optimizing, for a unit region group to which a unit region at least a part of which overlaps the reference region belongs, a shape of the reference region, wherein the shape of the reference region which shape has been optimized is associated with the each of the plurality of unit region groups.

According to the arrangement, the reference region changing means optimizes, for a unit region group to which a unit region at least a part of which overlaps the reference region belongs, a shape of the reference region, wherein the shape of the reference region which shape has been optimized is associated with the each of the plurality of unit region groups. This makes it possible to carry out a filter process by use of the reference region which is optimum for the each of the plurality of unit regions. Therefore, the arrangement makes it possible to generate an output image which is more suitable for generation of a predicted image.

A decoding apparatus in accordance with the present invention which decodes coded data and generates a filtered decoded image, the decoding apparatus includes: an image filter device mentioned above; and predicted image generation means for generating a predicted image in the each of the plurality of unit regions with reference to an output image generated by the image filter device, assuming that a decoded image obtained by adding (i) the predicted image generated by the predicted image generation means and (ii) a residual image decoded from the coded data is an input image, the image filter device generating the filtered decoded image as the output image.

According to the decoding apparatus in accordance with the present invention which is arranged as above, assuming that a decoded image obtained by adding (i) the predicted image generated by the predicted image generation means and (ii) a residual image decoded from the coded data is an input image, the image filter device included in the decoding apparatus generates the output image (filtered decoded image) by use of the filter coefficient group which has been optimized for the each of the plurality of unit regions in accordance with the directionality of the input image (decoded image). Therefore, also in a case where the directionality of the input image differs in accordance with the each of the plurality of unit regions, it is possible to generate the output image which is suitable as an image that is referred to for generating the predicted image. Consequently, the arrangement allows an increase in prediction accuracy of the predicted image generated by the predicted image generation means.

According to an encoding apparatus which has an arrangement corresponding to the arrangement described above, also in a case where directionality of an encoding target image differs in accordance with the each of the plurality of unit regions, it is possible to increase prediction accuracy of the predicted image. This allows generation of coded data having high coding efficiency. Further, according to the decoding apparatus which has the arrangement described above, it is possible to suitably decode such coded data having high coding efficiency.

A decoding apparatus in accordance with the present invention which decodes coded data and generates a filtered decoded image, the decoding apparatus includes: an image filter device mentioned above, assuming that a decoded image obtained by adding (i) the predicted image generated by intra prediction with reference to a reference image corresponding to the input image and (ii) a residual image decoded from the coded data is an input image, the image filter device generating the filtered decoded image as an output image.

According to the decoding apparatus in accordance with the present invention which is arranged as above, assuming that a decoded image obtained by adding (i) the predicted image generated by intra prediction and (ii) a residual image decoded from the coded data is an input image, the image filter device included in the decoding apparatus generates the output image (filtered decoded image) by use of the filter coefficient group which has been optimized for the each of the plurality of unit regions in accordance with the directionality of the input image (decoded image). Therefore, also in a case where the directionality of the input image differs in accordance with the each of the plurality of unit regions, it is possible to generate the output image which is suitable as an image that is referred to for generating the predicted image. Consequently, the arrangement allows an increase in prediction accuracy of the predicted image generated by the predicted image generation means.

According to an encoding apparatus which has an arrangement corresponding to the arrangement described above, also in a case where directionality of an encoding target image differs in accordance with the each of the plurality of unit regions, it is possible to increase prediction accuracy of the predicted image. This allows generation of coded data having high coding efficiency. Further, according to the decoding apparatus which has the arrangement described above, it is possible to suitably decode such coded data having high coding efficiency.

In a case where the image filter device discriminates the directionality of the input image in the each of the plurality of unit regions in accordance with at least one of (i) a direction indicated by a prediction parameter which is used in intra prediction and (ii) a shape of the each of the plurality of unit regions, it is possible to discriminate the directionality of the input image without the need of carrying out calculation such as edge detection which refers to a pixel value. This makes it possible to reduce throughput for discriminating the directionality and to decode coded data having high coding efficiency.

It is preferable that the reference image which is referred to during intra prediction and corresponds to the input image be an image which (i) is provided in an identical frame in which the input image that is supplied to the image filter device is provided and (ii) is located within a given distance from a unit region to be processed. Further, it is possible to use, as the reference image, a decoded image which (i) is provided in an identical frame in which the input image is provided and (ii) is located within a given distance from a unit region to be processed.

It is preferable that the filter means (i) with reference to directionality information which has been decoded from the coded data and is associated with each of a plurality of filter coefficient groups, select, from the plurality of filter coefficient groups included in the coded data, a filter coefficient group optimized for each of the plurality of unit region groups and (ii) calculate a pixel value of each pixel of the output image by use of the filter coefficient group selected for a unit region group to which a unit region including the each pixel belongs.

According to the arrangement, the filter means (i) with reference to directionality information which has been decoded from the coded data and is associated with each of a plurality of filter coefficient groups, selects, from the plurality of filter coefficient groups included in the coded data, a filter coefficient group optimized for each of the plurality of unit region groups and (ii) calculates a pixel value of each pixel of the output image by use of the filter coefficient group selected for a unit region group to which a unit region including the each pixel belongs. Therefore, it is possible to suitably allocate, to a unit region group which has been subjected to classification by the encoding apparatus, each of the plurality of filter coefficient groups which have been used in an encoding apparatus that generates the coded data.

Therefore, the arrangement makes it possible to subject an input image to be supplied to the image filter device to a filter process by suitably using a filter coefficient group used in an encoding apparatus. Further, a decoding apparatus including the image filter device which has the arrangement makes it possible to suitably decode coded data which has been generated by an encoding apparatus and has high coding efficiency.

An encoding apparatus in accordance with the present invention which generates coded data by encoding a residual image between an encoding target image and a predicted image, the encoding apparatus includes: an image filter device mentioned above; and predicted image generation means for generating a predicted image in the each of the plurality of unit regions with reference to an output image generated by the image filter device, assuming that a decoded image obtained by adding (i) the predicted image generated by the predicted image generation means and (ii) the residual image is an input image, the image filter device generating the output image.

According to the encoding apparatus in accordance with the present invention which has the arrangement, assuming that a decoded image obtained by adding (i) the predicted image generated by the predicted image generation means and (ii) a residual image between an encoding target image and a predicted image is an input image, the image filter device included in the encoding apparatus generates the output image by use of the filter coefficient group which has been optimized for the each of the plurality of unit regions in accordance with the directionality of the input image (decoded image). Therefore, also in a case where the directionality of the input image differs in accordance with the each of the plurality of unit regions, it is possible to generate the output image which is suitable as an image that is referred to for generating the predicted image. Consequently, the arrangement allows an increase in prediction accuracy of the predicted image generated by the predicted image generation means. Further, the increase in prediction accuracy allows the encoding apparatus to generate coded data having high coding efficiency.

An encoding apparatus in accordance with the present invention which generates coded data by encoding a residual image between an encoding target image and a predicted image, the encoding apparatus includes: an image filter device mentioned above, assuming that a decoded image obtained by adding (i) the predicted image generated by intra prediction with reference to a reference image corresponding to the input image and (ii) the residual image is an input image, the image filter device generating an output image.

According to the decoding apparatus in accordance with the present invention which is arranged as above, assuming that a decoded image obtained by adding (i) the predicted image generated by intra prediction and (ii) a residual image between an encoding target image and a predicted image is an input image, the image filter device included in the decoding apparatus generates the output image by use of the filter coefficient group which has been optimized for the each of the plurality of unit regions in accordance with the directionality of the input image (decoded image). Therefore, also in a case where the directionality of the input image differs in accordance with the each of the plurality of unit regions, it is possible to generate the output image which is suitable as an image that is referred to for generating the predicted image. Consequently, the arrangement allows an increase in prediction accuracy of the predicted image generated by the predicted image generation means.

In a case where the image filter device discriminates the directionality of the input image in the each of the plurality of unit regions in accordance with at least one of (i) a direction indicated by a prediction parameter which is used in intra prediction and (ii) a shape of the each of the plurality of unit regions, it is possible to discriminate the directionality of the input image without the need of carrying out calculation such as edge detection which refers to a pixel value. This makes it possible to reduce throughput for discriminating the directionality and to generate coded data having high coding efficiency.

It is preferable that the reference image which is referred to during intra prediction and corresponds to the input image be an image which (i) is provided in an identical frame in which the input image that is supplied to the image filter device is provided and (ii) is located within a given distance from a unit region to be processed. Further, it is possible to use, as the reference image, a decoded image which (i) is provided in an identical frame in which the input image is provided and (ii) is located within a given distance from a unit region to be processed.

It is preferable that a filter coefficient group which is used by the filter means be set for the each of the plurality of unit region groups so that a difference between the encoding target image and the output image is minimized.

According to the arrangement, a filter coefficient group which is used by the filter means is set for the each of the plurality of unit region groups so that a difference between the encoding target image and the output image is minimized. Therefore, an encoding apparatus including the filter means can generate a predicted image having high prediction accuracy. Further, this allows generation of coded data having high coding efficiency.

A data structure in accordance with the present invention of coded data to which an image filter device refers, the image filter device calculating a pixel value of each pixel of an output image by use of (i) a pixel value in a reference region which is defined in accordance with a location of the each pixel in an input image and (ii) a filter coefficient group, the data structure includes: a plurality of filter coefficient groups; and directionality information which is associated with each of the plurality of filter coefficient groups, the image filter device (i) classifying each of a plurality of unit regions constituting the input image into one of a plurality of unit region groups in accordance with to which of a plurality of predetermined groups directionality of the input image in the each of the plurality of unit regions belongs, (ii) with reference to the directionality information, selecting, from the plurality of filter coefficient groups, a filter coefficient group optimized for each of the plurality of unit region groups, and (iii) calculating the pixel value of the each pixel of the output image by use of the filter coefficient group selected for a unit region group to which a unit region including the each pixel belongs.

The coded data in accordance with the present invention which is arranged as above includes: a plurality of filter coefficient groups; and directionality information which is associated with each of the plurality of filter coefficient groups. Therefore, the image filter device which refers to the coded data (i) with reference to the directionality information, selects, from the plurality of filter coefficient groups, a filter coefficient group optimized for each of the plurality of unit region groups, and (ii) calculates the pixel value of the each pixel of the output image by use of the filter coefficient group selected for a unit region group to which a unit region including the each pixel belongs. This yields an effect such that an output image which is more suitable for generation of a predicted image can be generated in a case where the directionality of the input image differs in accordance with the each of the plurality of unit regions. This allows an increase in prediction accuracy of a predicted image which is generated with reference to an output image that is generated by the image filter device in accordance with the present invention which is arranged as above.

An image filter device in accordance with the present invention which generates an output image from an input image generated for each unit region by use of intra prediction, the image filter device calculating a pixel value of each pixel of the output image by use of (i) a pixel value in a reference region which is defined in accordance with a location of the each pixel in the input image and (ii) a filter coefficient group, the image filter device includes: classification means for classifying the each unit region into one of a plurality of unit region groups in accordance with to which of a plurality of predetermined groups a shape and a size of the each unit region belongs; and filter means for calculating the pixel value of the each pixel of the output image by use of the filter coefficient group optimized for a unit region group to which a unit region including the each pixel belongs.

The inventors found that, since an output image which is more suitable for generation of a predicted image can be generated by changing a filter coefficient group for each unit region in accordance with a shape and a size of a unit region (prediction unit) constituting an input image generated for the each unit region by use of intra prediction, a predicted image which is generated with reference to the output image can have higher prediction accuracy also in a case where the input image has an image characteristic such that coding efficiency is not improved even if a filter coefficient group is changed in accordance with activity.

According to the image filter device which is arranged as above, classification means classifies the each unit region into one of a plurality of unit region groups in accordance with to which of a plurality of predetermined groups a shape and a size of the each unit region belongs; and filter means calculates the pixel value of the each pixel of the output image by use of the filter coefficient group optimized for a unit region group to which a unit region including the each pixel belongs. Therefore, a predicted image which is generated with reference to the output image can have higher prediction accuracy also in a case where the input image has an image characteristic such that coding efficiency is not improved even if a filter coefficient group is changed in accordance with activity.

An image filter device in accordance with the present invention includes: filter means for acting on an input image constituted by a plurality of unit regions; characteristic value calculating means for calculating a first characteristic value and a second characteristic value each of which indicates an image characteristic of the input image in each of the plurality of unit regions and which differ in derivation method; and characteristic value division means for in accordance with characteristic value division information, dividing, into a plurality of characteristic value partial regions, a characteristic value region spanned by the first characteristic value and the second characteristic value, the filter means calculating a pixel value of each pixel of an output image in the each of the plurality of unit regions by use of a filter coefficient set for a characteristic value partial region to which the first characteristic value and the second characteristic value belong, the first characteristic value and the second characteristic value each having been calculated for the each of the plurality of unit regions.

The image filter device in accordance with the present invention which is arranged as above, divides, into a plurality of characteristic value partial regions, a characteristic value region spanned by a first characteristic value and a second characteristic value which differ in derivation method, and acts on an input image in each of the plurality of characteristic value partial regions by use of a filter coefficient set for a characteristic value partial region to which the first characteristic value and the second characteristic value belong, the first characteristic value and the second characteristic value each having been calculated for the each of the plurality of unit regions.

Therefore, according to the arrangement, a filter process is carried out which uses a filter coefficient set for the each of the plurality of unit regions in accordance with the first characteristic value and the second characteristic value. This makes it possible to carry out a filter process with respect to the each of the plurality of unit regions by use of a suitable filter coefficient also in a case where there is a variation between the first characteristic value and the second characteristic value of the input image in the each of the plurality of unit regions. Further, it is possible to increase prediction accuracy of a predicted image which is generated with reference to an output image of the image filter device which is arranged as above.

Note that the first characteristic value and the second characteristic value, which differ in derivation method, allow a two-dimensional characteristic value region to be spanned. Note also that two characteristic values can be used as the first characteristic value and the second characteristic value provided that the two characteristic values allow a two-dimensional characteristic value region to be spanned.

The each of the plurality of unit regions refers to each of a plurality of regions which constitute the input image and do not overlap with each other. In a case where the image filter device is used in each of an encoding apparatus which encodes an image and a decoding apparatus which decodes an image from coded data, the each of the plurality of unit regions may be, for example, a prediction unit (partition) which is a unit in which a predicted image is generated, a transformation unit which is a unit for frequency transformation, a unit for encoding, or another unit.

It is preferable that the characteristic value division means divide, by a first division, the characteristic value region into one or more characteristic value partial regions, and further divide, by a second division, each of the one or more characteristic value partial regions obtained by the first division into one or more characteristic value partial regions.

According to the arrangement, the characteristic value division means hierarchically divides the characteristic value region by the first division and the second division. Therefore, it is possible to more finely divide, by the second division, each of the one or more characteristic value partial regions obtained by the first division.

Consequently, according to the arrangement, it is possible to set a filter coefficient for each of the one or more characteristic value partial regions which have been subjected to the finer division. This makes it possible to carry out a more suitable filter process.

It is preferable that the first division be carried out with respect to the first characteristic value and the second division be carried out with respect to the second characteristic value.

According to the arrangement, the characteristic value division means carries out the first division with respect to the first characteristic value, and carries out the second division with respect to the second characteristic value for each of the one or more characteristic value partial regions obtained by the first division.

Therefore, according to the arrangement, it is possible to further carry out the division with respect to the second characteristic value for each of the one or more characteristic value partial regions obtained by the division with respect to the first characteristic value. This makes it possible to carry out a more suitable filter process.

Note that a characteristic value which is higher in priority than the second characteristic value can also be used as the first characteristic value. For example, in a case where a predicted image is generated with reference to an output image of the image filter device, a characteristic value which can be expected to further increase prediction accuracy than the second characteristic value, i.e., a characteristic value which is higher in priority than the second characteristic value can also be used as the first characteristic value. As described above, in a case where a characteristic value which is higher in priority is used as the first characteristic value, it is possible to prevent an increase in throughput and to carry out a more suitable filter process.

It is preferable that the first division be carried out with respect to the first characteristic value and the second division be carried out with respect to each of the first characteristic value and the second characteristic value.

According to the arrangement, the characteristic value division means carries out the first division with respect to the first characteristic value, and carries out the second division with respect to each of the first characteristic value and the second characteristic value for each of the one or more characteristic value partial regions obtained by the first division.

Therefore, according to the arrangement, it is possible to further carry out the division with respect to each of the first characteristic value and the second characteristic value for each of the one or more characteristic value partial regions obtained by the division with respect to the first characteristic value. This makes it possible to carry out a more suitable filter process.

Note that a characteristic value which is higher in priority than the second characteristic value can also be used as the first characteristic value. For example, in a case where a predicted image is generated with reference to an output image of the image filter device, a characteristic value which can be expected to further increase prediction accuracy than the second characteristic value, i.e., a characteristic value which is higher in priority than the second characteristic value can also be used as the first characteristic value. As described above, in a case where a characteristic value which is higher in priority is used as the first characteristic value, it is possible to prevent an increase in throughput and to carry out a more suitable filter process.

The image filter device in accordance with the present invention is preferably arranged to further include tap number setting means for in accordance with tap number specification information obtained from an outside, setting a tap number of the filter means for each of the one or more characteristic value partial regions obtained by the first division.

According to the arrangement, the image filter device sets a tap number of the filter means for each of the one or more characteristic value partial regions obtained by the first division. Therefore, according to the arrangement, a filter process is carried out by use of a tap number set for each of the one or more characteristic value partial regions obtained by the first division. This makes it possible to carry out a more suitable filter process.

Further, according to the arrangement, a tap number is set for each of the one or more characteristic value partial regions obtained by the first division. Therefore, the arrangement allows further prevention of an increase in throughput as compared to an arrangement in which a tap number is set for each of the one or more characteristic value partial regions obtained by the second division. In a case where the image filter device which is arranged as above is used in a decoding apparatus which decodes coded data or an encoding apparatus which generates coded data, it is possible to prevent an increase in encoding amount and to achieve an increase in prediction accuracy. This allows an improvement in coding efficiency.

The image filter device in accordance with the present invention is preferably arranged to further include on/off control means for in accordance with on/off specification information obtained from an outside, controlling on/off of the filter means for each of the one or more characteristic value partial regions obtained by the second division.

According to the arrangement, the image filter device controls on/off of the filter means for each of the one or more characteristic value partial regions obtained by the second division. This makes it unnecessary to carry out a filter process with respect to a unit region which may have lower coding efficiency by being subjected to the filter process. Therefore, the arrangement makes it possible to carry out a more suitable filter process.

It is preferable that the first characteristic value indicate disorder of the input image in the each of the plurality of unit regions.

The inventors found that a suitable filter process can be carried out by using, as the first characteristic value of the input image in the each of the plurality of unit regions, a characteristic value which indicates disorder of an image, and using, as the second characteristic value of the input image in the each of the plurality of unit regions, a characteristic value which differs in derivation method from disorder of an image.

Therefore, the arrangement makes it possible to carry out a suitable filter process. Further, according to a decoding apparatus and an encoding apparatus each including the image filter device which is arranged as above, it is possible to improve coding efficiency.

Note that disorder of an image can be detected by, for example, regarding, as an indicator, activity of an image or variance of pixel values.

Note also that a characteristic value which differs in derivation method from disorder of an image may be used as the second characteristic value. For example, it is possible to use, as the second characteristic value, any one of, for example, directionality of an image, an average of pixel values, and in-frame coordinates obtained in a target unit region.

A decoding apparatus in accordance with the present invention which decodes coded data and generates a filtered decoded image, the decoding apparatus includes: an image filter device mentioned above; and predicted image generation means for generating a predicted image in the each of the plurality of unit regions with reference to an output image generated by the image filter device, assuming that a decoded image obtained by adding (i) the predicted image generated by the predicted image generation means and (ii) a residual image decoded from the coded data is an input image, the image filter device generating the filtered decoded image as the output image.

According to the decoding apparatus in accordance with the present invention which is arranged as above, assuming that a decoded image obtained by adding (i) the predicted image generated by the predicted image generation means and (ii) a residual image decoded from the coded data is an input image, the image filter device included in the decoding apparatus generates the output image (filtered decoded image) by acting on the input image in each of the plurality of characteristic value partial regions by use of a filter coefficient set for a characteristic value partial region to which the first characteristic value and the second characteristic value belong, the first characteristic value and the second characteristic value each having been calculated for the each of the plurality of unit regions. Therefore, also in a case where there is a variation between the first characteristic value and the second characteristic value of the input image in the each of the plurality of unit regions, it is possible to generate the output image which is suitable as an image that is referred to for generating the predicted image. Consequently, the arrangement allows an increase in prediction accuracy of the predicted image generated by the predicted image generation means.

According to an encoding apparatus which has an arrangement corresponding to the arrangement described above, also in a case where there is a variation between the first characteristic value and the second characteristic value of an encoding target image in the each of the plurality of unit regions, it is possible to increase prediction accuracy of the predicted image. This allows generation of coded data having high coding efficiency. Further, according to the decoding apparatus which has the arrangement described above, it is possible to suitably decode such coded data having high coding efficiency.

The decoding apparatus in accordance with the present invention is preferably arranged to further include filter coefficient decoding means for decoding a filter coefficient which is set for a target characteristic value partial region that is a characteristic value partial region to be decoded, the filter coefficient being decoded by adding (i) a filter coefficient residual for the target characteristic value partial region of filter coefficient residuals included in the coded data and (ii) a filter coefficient decoded for a characteristic value partial region in a vicinity of the target characteristic value partial region.

According to the arrangement, a filter coefficient which is set for a target characteristic value partial region that is a characteristic value partial region to be decoded is decoded by adding (i) a filter coefficient residual for the target characteristic value partial region of filter coefficient residuals included in the coded data and (ii) a filter coefficient decoded for a characteristic value partial region in a vicinity of the target characteristic value partial region. This makes it possible to decode a filter coefficient for each of the plurality of characteristic value partial regions with reference to a filter coefficient residual having a low encoding amount. Therefore, according to the arrangement, it is possible to reduce an encoding amount and to carry out a suitable filter process. This allows an improvement in coding efficiency.

An encoding apparatus in accordance with the present invention which generates coded data by encoding a residual image between an encoding target image and a predicted image, the encoding apparatus includes: an image filter device mentioned above; and predicted image generation means for generating a predicted image in the each of the plurality of unit regions with reference to an output image generated by the image filter device, assuming that a decoded image obtained by adding (i) the predicted image generated by the predicted image generation means and (ii) the residual image is an input image, the image filter device generating the output image.

According to the encoding apparatus in accordance with the present invention which is arranged as above, assuming that a decoded image obtained by adding (i) the predicted image generated by the predicted image generation means and (ii) a residual image between an encoding target image and a predicted image is an input image, the image filter device included in the encoding apparatus generates the output image (filtered decoded image) by acting on the input image in each of the plurality of characteristic value partial regions by use of a filter coefficient set for a characteristic value partial region to which the first characteristic value and the second characteristic value belong, the first characteristic value and the second characteristic value each having been calculated for the each of the plurality of unit regions. Therefore, also in a case where there is a variation between the first characteristic value and the second characteristic value of the input image in the each of the plurality of unit regions, it is possible to generate the output image which is suitable as an image that is referred to for generating the predicted image. Consequently, the arrangement allows an increase in prediction accuracy of the predicted image generated by the predicted image generation means. Further, the increase in prediction accuracy allows the encoding apparatus to generate coded data having high coding efficiency.

The encoding apparatus in accordance with the present invention is preferably arranged such that a filter coefficient which is used by the filter means is set for each of the plurality of unit regions so that the encoding target image and the output image are less different from each other.

According to the arrangement, a filter coefficient which is used by the filter means is set for each of the plurality of unit regions so that the encoding target image and the output image are less different from each other. Therefore, it is possible to generate the predicted image with reference to the output image which is less different from the encoding target image. This allows an improvement in coding efficiency.

A data structure in accordance with the present invention of coded data to which an image filter device refers, the image filter device including: characteristic value calculating means for calculating a first characteristic value and a second characteristic value each of which indicates an image characteristic of the input image in each of a plurality of unit regions constituting the input image and which differ in derivation method; characteristic value division means for dividing, into a plurality of characteristic value partial regions, a characteristic value region spanned by the first characteristic value and the second characteristic value; and filter means for calculating a pixel value of each pixel of an output image in each of the plurality of unit regions by use of a filter coefficient group set for a characteristic value partial region to which the first characteristic value and the second characteristic value belong, the first characteristic value and the second characteristic value each having been calculated for the each of the plurality of unit regions, the data structure includes: characteristic value division information to which the characteristic value division means refers and which specifies how to divide the characteristic value region; and a filter coefficient for each of the plurality of characteristic value partial regions, the filter coefficient being used by the filter means.

The image filter device which refers to the coded data that is arranged as above (i) in accordance with characteristic value division information included in the coded data, divides, into a plurality of characteristic value partial regions, a characteristic value region spanned by the first characteristic value and the second characteristic value, and (ii) carries out a filter process by use of a filter coefficient for each of the plurality of characteristic value partial regions, the filter coefficient being included in the coded data.

Therefore, according to the image filter device which refers to the coded data that is arranged as above, it is possible to carry out a suitable filter process with respect to the input image by use of a filter coefficient set for each of the plurality of characteristic value partial regions.

It is preferable that the characteristic value division means divide, by a first division, the characteristic value region into a plurality of characteristic value partial regions, and further divide, by a second division, each of the plurality of characteristic value partial regions obtained by the first division into a plurality of characteristic value partial regions; and the characteristic value division information include: first division point specification information for specifying a division point in the first division; and second division point specification information for specifying a division point in the second division.

The image filter device which refers to the coded data that is arranged as above carries out the first division by use of the division point specified by the first division point specification information, and carries out the second division by use of the division point specified by the second division point specification information. This makes it possible to suitably divide the characteristic value region spanned by the first characteristic value and the second characteristic value.

Further, an encoding apparatus which generates the coded data that is arranged as above (i) sets a division point in each of the first division and the second division for improving coding efficiency and (ii) allows the coded data to include the first division specification information and the second division specification information each indicating the division point thus set. Therefore, an image filter device which refers to the coded data that is arranged as above can carry out a filter process which uses a division point that is set in an encoding apparatus for improving coding efficiency.

The coded data in accordance with the present invention is preferably arranged to further include tap number specification information for specifying a tap number of the filter means for each of the plurality of characteristic value partial regions obtained by the first division.

An image filter device which refers to the coded data that is arranged as above sets, in accordance with the tap number specification information, a tap number of the filter means for each of the one or more characteristic value partial regions obtained by the first division. Therefore, the image filter device which refers to the coded data that is arranged as above carries out a filter process by use of a tap number set for each of the one or more characteristic value partial regions obtained by the first division. This makes it possible to carry out a more suitable filter process.

The coded data in accordance with the present invention is preferably arranged to further include on/off specification information for specifying on/off of the filter means for each of the plurality of characteristic value partial regions obtained by the second division.

An image filter device which refers to the coded data that is arranged as above controls, in accordance with the on/off specification information, on/off of the filter means for each of the one or more characteristic value partial regions obtained by the second division. This makes it unnecessary to carry out a filter process with respect to a unit region which may have lower coding efficiency by being subjected to the filter process. Therefore, the arrangement makes it possible to carry out a more suitable filter process.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention can be suitably used for an image filter which carries out filtering with respect to image data. The present invention can also be suitably applied to a decoding apparatus which decodes coded data and an encoding apparatus which encodes coded data.

REFERENCE SIGNS LIST

1 Moving image decoder (Decoding apparatus)
16 Inter predicted image generating section (Predicted image generation means)
17 Intra predicted image generating section (Predicted image generation means)
42 Adaptive filter (Image filter device)
421 Prediction mode/size accumulating section
422 Edge direction detection section (Directionality discrimination means)
423 Activity calculating section (Activity calculation means)
424 Region classification section (Directionality discrimination means, Classification means)
425 Filter process section (Filter means, Reference region changing means)
2 Moving image encoder (Encoding apparatus)
25 Intra predicted image generating section (Predicted image generation means)
26 Inter predicted image generating section (Predicted image generation means)
34 Adaptive filter (Image filter device)
340 Region dividing section
341 Prediction mode/size accumulating section
342 Edge direction detection section (Directionality discrimination means)
343 Activity calculating section (Activity calculation means)
344 Region classification section (Directionality discrimination means, Classification means)
345 Filter process section (Filter means, Reference region changing means)
346 Filter parameter deriving section
3, 5 Moving image decoder (Decoding apparatus)
50, 60, 70, 80 Adaptive filter (Image filter device)
51 Adaptive filter information decoding section
511 Tap number-by-region decoding section (Tap number setting means)
512 Region structure decoding section
513 Filter coefficient residual decoding section
514 Two-dimensional prediction flag decoding section
515 Filter coefficient prediction section
516 Filter coefficient decoding section (Filter coefficient decoding means)
517 Filter coefficient-by-characteristic storage section
518 Characteristic value division point changing flag decoding section
519 Characteristic value division point setting section (Characteristic value division point setting means)
52 Adaptive filter section
521 First characteristic value calculating section (Characteristic value calculation means)

522 Second characteristic value calculating section (Characteristic value calculation means)
523 Characteristic index calculating section
524 Filter coefficient allocating section
525 Filter section (Filter means)
731 Adaptive filter off decoding section (on/off control means)
4, 6 Moving image encoder (Encoding apparatus)
CR Characteristic value region
CPR Characteristic value partial region
PX1-PX5 Characteristic value division point (Division point)
PY1-PX3 Characteristic value division point (Division point)

The invention claimed is:

1. An image filter device which calculates a pixel value of each pixel of an output image by use of (i) a pixel value in a reference region which is defined in accordance with a location of the each pixel in an input image and (ii) a filter coefficient group, said image filter device comprising:
directionality discrimination means for discriminating directionality of the input image in each of a plurality of unit regions constituting the input image;
classification means for classifying the each of the plurality of unit regions as any one of a plurality of unit region groups in accordance with to which of a plurality of predetermined groups the directionality of the input image in the each of the plurality of unit regions belongs, the directionality having been discriminated by the directionality discrimination means; and
filter means for calculating the pixel value of the each pixel of the output image by use of the filter coefficient group optimized for a unit region group to which a unit region including the each pixel belongs.

2. The image filter device as set forth in claim 1, further comprising:
activity calculation means for calculating activity of the input image in the each of the plurality of unit regions,
the classification means classifying the each of the plurality of unit regions as any one of the plurality of unit region groups in accordance with to which of a plurality of predetermined groups the directionality and the activity of the input image in the each of the plurality of unit regions belong.

3. The image filter device as set forth in claim 1, wherein the directionality discrimination means discriminates the directionality of the input image in the each of the plurality of unit regions by detecting an edge direction of the input image in the each of the plurality of unit regions.

4. The image filter device as set forth in claim 3, further comprising reference region changing means for optimizing, for a unit region group to which a unit region at least a part of which overlaps the reference region belongs, a shape of the reference region, wherein the shape of the reference region which shape has been optimized is associated with the each of the plurality of unit region groups.

5. A decoding apparatus which decodes coded data and generates a filtered decoded image,
said decoding apparatus comprising:
an image filter device recited in claim 3; and
predicted image generation means for generating a predicted image in the each of the plurality of unit regions with reference to an output image generated by the image filter device,
assuming that a decoded image obtained by adding (i) the predicted image generated by the predicted image generation means and (ii) a residual image decoded from the coded data is an input image, the image filter device generating the filtered decoded image as the output image.

6. The decoding apparatus as set forth in claim 5, wherein the filter means (i) with reference to directionality information which has been decoded from the coded data and is associated with each of a plurality of filter coefficient groups, selects, from the plurality of filter coefficient groups included in the coded data, a filter coefficient group optimized for each of the plurality of unit region groups and (ii) calculates a pixel value of each pixel of the output image by use of the filter coefficient group selected for a unit region group to which a unit region including the each pixel belongs.

7. An encoding apparatus which generates coded data by encoding a residual image between an encoding target image and a predicted image,
said encoding apparatus comprising:
an image filter device recited in claim 3; and
predicted image generation means for generating a predicted image in the each of the plurality of unit regions with reference to an output image generated by the image filter device,
assuming that a decoded image obtained by adding (i) the predicted image generated by the predicted image generation means and (ii) the residual image is an input image, the image filter device generating the output image.

8. The image filter device as set forth in claim 1, wherein the directionality of the input image in the each of the plurality of unit regions is discriminated in accordance with at least one of (i) a direction indicated by a prediction parameter which is used to generate a predicted image in the each of the plurality of unit regions by intra prediction with reference to a reference image corresponding to the input image and (ii) a shape of the each of the plurality of unit regions.

9. The image filter device as set forth in claim 8, further comprising reference region changing means for optimizing, for a unit region group to which a unit region at least a part of which overlaps the reference region belongs, a shape of the reference region, wherein the shape of the reference region which shape has been optimized is associated with the each of the plurality of unit region groups.

10. A decoding apparatus which decodes coded data and generates a filtered decoded image,
said decoding apparatus comprising:
an image filter device recited in claim 8,
assuming that a decoded image obtained by adding (i) the predicted image generated by intra prediction with reference to a reference image corresponding to the input image and (ii) a residual image decoded from the coded data is an input image, the image filter device generating the filtered decoded image as an output image.

11. An encoding apparatus which generates coded data by encoding a residual image between an encoding target image and a predicted image,
said encoding apparatus comprising:
an image filter device recited in claim 8,
assuming that a decoded image obtained by adding (i) the predicted image generated by intra prediction with reference to a reference image corresponding to the input image and (ii) the residual image is an input image, the image filter device generating an output image.

12. An image filter device comprising:
filter means for acting on an input image constituted by a plurality of unit regions;

characteristic value calculating means for calculating a first characteristic value and a second characteristic value each of which indicates an image characteristic of the input image in each of the plurality of unit regions and which differ in derivation method; and characteristic value division means for in accordance with characteristic value division information, dividing, into a plurality of characteristic value partial regions, a characteristic value region spanned by the first characteristic value and the second characteristic value, the filter means calculating a pixel value of each pixel of an output image in the each of the plurality of unit regions by use of a filter coefficient set for a characteristic value partial region to which the first characteristic value and the second characteristic value belong, the first characteristic value and the second characteristic value each having been calculated for the each of the plurality of unit regions.

13. The image filter device as set forth in claim 12, wherein the characteristic value division means divides, by a first division, the characteristic value region into one or more characteristic value partial regions, and further divides, by a second division, each of the one or more characteristic value partial regions obtained by the first division into one or more characteristic value partial regions, and the image filter device further comprising tap number setting means for in accordance with tap number specification information obtained from an outside, setting a tap number of the filter means for each of the one or more characteristic value partial regions obtained by the first division.

14. The image filter device as set forth in claim 13, further comprising on/off control means for in accordance with on/off specification information obtained from an outside, controlling on/off of the filter means for each of the one or more characteristic value partial regions obtained by the second division.

* * * * *